US009393491B2

(12) United States Patent
Barney et al.

(10) Patent No.: US 9,393,491 B2
(45) Date of Patent: Jul. 19, 2016

(54) WIRELESS ENTERTAINMENT DEVICE, SYSTEM, AND METHOD

(71) Applicant: MQ Gaming, LLC, Irvine, CA (US)

(72) Inventors: Jonathan A. Barney, Newport Beach, CA (US); Denise Chapman Weston, Wakefield, RI (US)

(73) Assignee: MQ Gaming, LLC, Irvine, CA (US)

( * ) Notice: Subject to any disclaimer, the term of this patent is extended or adjusted under 35 U.S.C. 154(b) by 0 days.

(21) Appl. No.: 14/885,934

(22) Filed: Oct. 16, 2015

(65) Prior Publication Data

US 2016/0030836 A1 Feb. 4, 2016

Related U.S. Application Data

(60) Continuation of application No. 14/568,834, filed on Dec. 12, 2014, now Pat. No. 9,162,148, which is a continuation of application No. 14/204,021, filed on Mar. 11, 2014, now Pat. No. 8,913,011, which is a (Continued)

(51) Int. Cl.
*G06F 17/00* (2006.01)
*A63F 13/235* (2014.01)

(Continued)

(52) U.S. Cl.
CPC ............... *A63F 13/235* (2014.09); *A63F 13/02* (2013.01); *A63F 13/04* (2013.01); *A63F 13/06* (2013.01);

(Continued)

(58) Field of Classification Search
USPC ...................................................... 463/37–42
See application file for complete search history.

(56) References Cited

U.S. PATENT DOCUMENTS

| | | | |
|---|---|---|---|
| 973,105 A | 10/1910 | Chamberlain, Jr. |
| 1,661,058 A | 2/1928 | Theremin |

(Continued)

FOREIGN PATENT DOCUMENTS

| | | |
|---|---|---|
| CN | 1032246 | 4/1989 |
| CN | 2113224 U | 2/1992 |

(Continued)

OTHER PUBLICATIONS

"Kirby Tilt 'n' Tumble 2" http://www.unseen64.net/2008/04/08/koro-koro-kirby-2-kirby-tilt-n-tumble-2-gc-unreleased/, Apr. 8, 2008 (accessed on Jul. 29, 2011).

(Continued)

*Primary Examiner* — Ronald Laneau

(74) *Attorney, Agent, or Firm* — Knobbe, Martens, Olson & Bear LLP

(57) ABSTRACT

A wireless input device for playing an interactive motion-sensitive game using a wireless-compatible game console in which a virtual play environment is represented through one or more computer-animated visual, aural or tactile effects is provided wherein game play is conducted by moving, shaking, twisting, waving or pointing the input device in a particular manner. The input device can include motion-sensitive circuitry and/or command circuitry for generating control signals and/or an effects generator and associated control circuitry to enable the input device to selectively generate at least one visual, aural or tactile effect comprising sound, lighting or vibration. The input device can include a wireless transceiver for providing two-way wireless communication with the wireless-compatible game console. An optional display screen displays short text messages received through wireless communications with the wireless-compatible game console.

20 Claims, 47 Drawing Sheets

Related U.S. Application Data continuation of application No. 13/776,426, filed on Feb. 25, 2013, now Pat. No. 8,711,094, which is a continuation of application No. 13/589,034, filed on Aug. 17, 2012, now Pat. No. 8,384,668, which is a continuation of application No. 13/452,508, filed on Apr. 20, 2012, now Pat. No. 8,248,367, which is a continuation of application No. 13/314,980, filed on Dec. 8, 2011, now Pat. No. 8,164,567, which is a continuation of application No. 13/231,813, filed on Sep. 13, 2011, now Pat. No. 8,169,406, which is a continuation of application No. 12/261,864, filed on Oct. 30, 2008, now Pat. No. 8,089,458, which is a division of application No. 10/954,025, filed on Sep. 29, 2004, now Pat. No. 7,445,550, which is a continuation-in-part of application No. 10/397,054, filed on Mar. 25, 2003, now Pat. No. 7,500,917, which is a continuation-in-part of application No. 09/792,282, filed on Feb. 22, 2001, now Pat. No. 6,761,637.

(51) Int. Cl.

| | |
|---|---|
| ***A63F 13/30*** | (2014.01) |
| ***A63F 13/20*** | (2014.01) |
| ***A63J 21/00*** | (2006.01) |
| ***A63F 13/219*** | (2014.01) |
| ***A63F 13/98*** | (2014.01) |
| ***A63F 13/90*** | (2014.01) |
| ***A63F 13/40*** | (2014.01) |
| ***A63F 13/213*** | (2014.01) |
| ***A63F 13/497*** | (2014.01) |
| ***A63F 13/69*** | (2014.01) |
| ***A63F 13/211*** | (2014.01) |
| ***A63F 13/25*** | (2014.01) |
| ***A63F 13/285*** | (2014.01) |
| ***G06F 3/0487*** | (2013.01) |
| ***A63F 13/24*** | (2014.01) |
| ***A63F 13/825*** | (2014.01) |
| *A63F 1/00* | (2006.01) |
| *A63F 9/24* | (2006.01) |
| *A63H 3/36* | (2006.01) |
| *A63H 30/04* | (2006.01) |

(52) U.S. Cl.

CPC ................. *A63F 13/08* (2013.01); *A63F 13/10* (2013.01); *A63F 13/12* (2013.01); *A63F 13/211* (2014.09); *A63F 13/213* (2014.09); *A63F 13/24* (2014.09); *A63F 13/25* (2014.09); *A63F 13/285* (2014.09); *A63F 13/497* (2014.09); *A63F 13/69* (2014.09); *A63F 13/825* (2014.09); *A63J 21/00* (2013.01); *G06F 3/0487* (2013.01); *A63F 1/00* (2013.01); *A63F 2009/2402* (2013.01); *A63F 2009/248* (2013.01); *A63F 2009/2429* (2013.01); *A63F 2009/2433* (2013.01); *A63F 2009/2452* (2013.01); *A63F 2009/2489* (2013.01); *A63F 2250/485* (2013.01); *A63F 2300/105* (2013.01); *A63F 2300/1031* (2013.01); *A63F 2300/1056* (2013.01); *A63F 2300/1062* (2013.01); *A63F 2300/1087* (2013.01); *A63F 2300/204* (2013.01); *A63F 2300/402* (2013.01); *A63F 2300/403* (2013.01); *A63F 2300/406* (2013.01); *A63F 2300/807* (2013.01); *A63H 3/36* (2013.01); *A63H 30/04* (2013.01)

(56) References Cited

U.S. PATENT DOCUMENTS

| | | | |
|---|---|---|---|
| 1,789,680 | A | 1/1931 | Gwinnett |
| 2,001,366 | A | 5/1935 | Mittelman |
| 2,752,725 | A | 7/1956 | Unsworth |
| 2,902,023 | A | 9/1959 | Waller |
| 3,135,512 | A | 6/1964 | Taylor |
| 3,336,030 | A | 8/1967 | Martell et al. |
| 3,395,920 | A | 8/1968 | Moe |
| 3,454,920 | A | 7/1969 | Mehr |
| 3,456,134 | A | 7/1969 | Ko |
| 3,468,533 | A | 9/1969 | House, Jr. |
| 3,474,241 | A | 10/1969 | Kuipers |
| D220,268 | S | 3/1971 | Kliewer |
| 3,572,712 | A | 3/1971 | Vick |
| 3,633,904 | A | 1/1972 | Kojima |
| 3,660,648 | A | 5/1972 | Kuipers |
| 3,707,055 | A | 12/1972 | Pearce |
| 3,795,805 | A | 3/1974 | Swanberg et al. |
| 3,843,127 | A | 10/1974 | Lack |
| 3,949,364 | A | 4/1976 | Clark et al. |
| 3,949,679 | A | 4/1976 | Barber |
| 3,973,257 | A | 8/1976 | Rowe |
| 3,978,481 | A | 8/1976 | Angwin et al. |
| 3,997,156 | A | 12/1976 | Barlow et al. |
| 4,009,619 | A | 3/1977 | Snymann |
| 4,038,876 | A | 8/1977 | Morris |
| 4,055,341 | A | 10/1977 | Martinez |
| 4,063,111 | A | 12/1977 | Dobler et al. |
| 4,153,250 | A | 5/1979 | Anthony |
| 4,166,406 | A | 9/1979 | Maughmer |
| 4,171,737 | A | 10/1979 | McLaughlin |
| 4,175,665 | A | 11/1979 | Dogliotti |
| 4,205,785 | A | 6/1980 | Stanley |
| 4,231,077 | A | 10/1980 | Joyce et al. |
| 4,240,638 | A | 12/1980 | Morrison et al. |
| 4,282,681 | A | 8/1981 | McCaslin |
| 4,287,765 | A | 9/1981 | Kreft |
| 4,296,929 | A | 10/1981 | Meyer et al. |
| 4,303,978 | A | 12/1981 | Shaw |
| 4,318,245 | A | 3/1982 | Stowell et al. |
| 4,321,678 | A | 3/1982 | Krogmann |
| 4,325,199 | A | 4/1982 | McEdwards |
| 4,337,948 | A | 7/1982 | Breslow |
| 4,342,985 | A | 8/1982 | Desjardins |
| 4,402,250 | A | 9/1983 | Baasch |
| 4,412,205 | A | 10/1983 | Von Kemenczky |
| 4,425,488 | A | 1/1984 | Moskin |
| 4,443,866 | A | 4/1984 | Burgiss |
| 4,450,325 | A | 5/1984 | Luque |
| 4,503,299 | A | 3/1985 | Henrard |
| 4,514,600 | A | 4/1985 | Lentz |
| 4,514,798 | A | 4/1985 | Lesche |
| 4,540,176 | A | 9/1985 | Baer |
| 4,546,551 | A | 10/1985 | Franks |
| 4,558,604 | A | 12/1985 | Auer |
| 4,561,299 | A | 12/1985 | Orlando |
| 4,575,621 | A | 3/1986 | Dreifus |
| 4,578,674 | A | 3/1986 | Baker et al. |
| 4,595,369 | A | 6/1986 | Downs |
| 4,623,887 | A | 11/1986 | Welles |
| 4,623,930 | A | 11/1986 | Oshima |
| 4,627,620 | A | 12/1986 | Yang |
| 4,645,458 | A | 2/1987 | Williams |
| 4,672,374 | A | 6/1987 | Desjardins |
| 4,678,450 | A | 7/1987 | Scolari et al. |
| 4,695,058 | A | 9/1987 | Carter, III et al. |
| 4,695,953 | A | 9/1987 | Blair et al. |
| 4,699,379 | A | 10/1987 | Chateau et al. |
| 4,739,128 | A | 4/1988 | Grisham |
| 4,750,733 | A | 6/1988 | Foth |
| 4,761,540 | A | 8/1988 | McGeorge |
| 4,776,253 | A | 10/1988 | Downes |
| 4,787,051 | A | 11/1988 | Olson |
| 4,816,810 | A | 3/1989 | Moore |
| 4,817,950 | A | 4/1989 | Goo |
| 4,819,182 | A | 4/1989 | King et al. |

(56) References Cited

U.S. PATENT DOCUMENTS 4,837,568 A 6/1989 Snaper et al.
4,839,838 A 6/1989 LaBiche et al.
4,843,568 A 6/1989 Kreuger et al.
4,849,655 A 7/1989 Bennett
4,851,685 A 7/1989 Dubgen
4,858,390 A 8/1989 Kenig
4,858,930 A 8/1989 Sato
4,862,165 A 8/1989 Gart
4,882,717 A 11/1989 Hayakawa et al.
4,891,032 A 1/1990 Davis
4,904,222 A 2/1990 Gastgeb et al.
4,910,677 A 3/1990 Remedio et al.
4,914,598 A 4/1990 Krogmann
4,918,293 A 4/1990 McGeorge
4,924,358 A 5/1990 VonHeck
4,932,917 A 6/1990 Klitsner
4,957,291 A 9/1990 Miffitt
4,960,275 A 10/1990 Magon
4,961,369 A 10/1990 McGill
4,964,837 A 10/1990 Collier
4,967,321 A 10/1990 Cimock
4,969,647 A 11/1990 Mical et al.
4,980,519 A 12/1990 Mathews
4,988,981 A 1/1991 Zimmerman et al.
4,994,795 A 2/1991 MacKenzie
5,011,161 A 4/1991 Galphin
5,036,442 A 7/1991 Brown
RE33,662 E 8/1991 Blair et al.
5,045,843 A 9/1991 Hansen
5,048,831 A 9/1991 Sides
D320,624 S 10/1991 Taylor
5,058,480 A 10/1991 Suzuki et al.
5,059,958 A 10/1991 Jacobs et al.
5,062,696 A 11/1991 Oshima
5,068,645 A 11/1991 Drumm
D322,242 S 12/1991 Cordell
5,076,584 A 12/1991 Openiano
D325,225 S 4/1992 Adhida
5,114,155 A 5/1992 Tillery et al.
5,114,344 A 5/1992 Fumagalli et al.
5,124,938 A 6/1992 Algrain
5,127,657 A 7/1992 Ikezawa et al.
5,128,671 A 7/1992 Thomas, Jr.
D328,463 S 8/1992 King et al.
5,136,222 A 8/1992 Yamamoto
5,138,154 A 8/1992 Hotelling
5,145,446 A 9/1992 Kuo
D331,058 S 11/1992 Morales
5,166,502 A 11/1992 Rendleman
5,170,002 A 12/1992 Suzuki et al.
5,175,481 A 12/1992 Kanno
5,177,311 A 1/1993 Suzuki et al.
5,178,477 A 1/1993 Gambaro
5,181,181 A 1/1993 Glynn
5,184,830 A 2/1993 Okada et al.
5,188,368 A 2/1993 Ryan
5,190,285 A 3/1993 Levy et al.
5,192,082 A 3/1993 Inoue et al.
5,192,823 A 3/1993 Suzuki et al.
5,194,006 A 3/1993 Zaenglein, Jr.
5,194,048 A 3/1993 Briggs
5,202,844 A 4/1993 Kamio
5,207,426 A 5/1993 Inoue et al.
5,212,368 A 5/1993 Hara
5,213,327 A 5/1993 Kitaue
5,223,698 A 6/1993 Kapur
5,231,568 A 7/1993 Cohen et al.
D338,242 S 8/1993 Cordell
5,232,223 A 8/1993 Dornbusch
5,236,200 A 8/1993 McGregor et al.
5,247,651 A 9/1993 Clarisse
D340,042 S 10/1993 Copper et al.
5,259,626 A 11/1993 Ho
5,262,777 A 11/1993 Low et al.
D342,256 S 12/1993 Payne et al.
5,277,645 A 1/1994 Kelley et al.
5,279,513 A 1/1994 Connelly
5,280,744 A 1/1994 DeCarlo
D345,164 S 3/1994 Grae
5,290,964 A 3/1994 Hiyoshi et al.
5,292,124 A 3/1994 Carpenter
5,292,254 A 3/1994 Miller et al.
5,296,871 A 3/1994 Paley
5,299,967 A 4/1994 Gilbert
5,307,325 A 4/1994 Scheiber
5,310,192 A 5/1994 Miyake
5,317,394 A 5/1994 Hale
5,319,548 A 6/1994 Germain
5,320,358 A 6/1994 Jones
5,320,362 A 6/1994 Bear et al.
5,329,276 A 7/1994 Hirabayashi
5,332,322 A 7/1994 Gambaro
5,339,095 A 8/1994 Redford
D350,736 S 9/1994 Takahashi et al.
D350,782 S 9/1994 Barr
D351,430 S 10/1994 Barr
5,354,057 A 10/1994 Pruitt et al.
5,356,343 A 10/1994 Lovetere
5,357,267 A 10/1994 Inoue
5,359,321 A 10/1994 Ribic
5,359,348 A 10/1994 Pilcher et al.
5,363,120 A 11/1994 Drumm
5,365,214 A 11/1994 Angott et al.
5,366,229 A 11/1994 Suzuki
5,369,580 A 11/1994 Monji
5,369,889 A 12/1994 Callaghan
5,372,365 A 12/1994 McTeigue et al.
5,373,857 A 12/1994 Travers et al.
5,378,197 A 1/1995 Briggs
5,382,026 A 1/1995 Harvard et al.
5,392,613 A 2/1995 Bolton et al.
5,393,074 A 2/1995 Bear et al.
5,396,227 A 3/1995 Carroll et al.
5,396,265 A 3/1995 Ulrich et al.
5,403,238 A 4/1995 Baxter et al.
5,405,294 A 4/1995 Briggs
5,411,269 A 5/1995 Thomas
5,416,535 A 5/1995 Sato et al.
5,421,575 A 6/1995 Triner
5,421,590 A 6/1995 Robbins
5,422,956 A 6/1995 Wheaton
5,429,361 A 7/1995 Raven et al.
5,430,435 A 7/1995 Hoch
5,432,864 A 7/1995 Lu et al.
5,435,561 A 7/1995 Conley
5,435,569 A 7/1995 Zilliox
D360,903 S 8/1995 Barr et al.
5,439,199 A 8/1995 Briggs et al.
5,440,326 A 8/1995 Quinn
5,443,261 A 8/1995 Lee et al.
5,452,893 A 9/1995 Faulk et al.
5,453,053 A 9/1995 Danta et al.
5,453,758 A 9/1995 Sato
D362,870 S 10/1995 Oikawa
5,459,489 A 10/1995 Redford
5,469,194 A 11/1995 Clark et al.
5,481,957 A 1/1996 Paley
5,482,510 A 1/1996 Ishii et al.
5,484,355 A 1/1996 King
5,485,171 A 1/1996 Copper et al.
5,488,362 A 1/1996 Ullman et al.
5,490,058 A 2/1996 Yamasaki
5,498,002 A 3/1996 Gechter
5,502,486 A 3/1996 Ueda
5,506,605 A 4/1996 Paley
5,509,806 A 4/1996 Ellsworth
5,512,892 A 4/1996 Corballis et al.
5,516,105 A 5/1996 Eisenbrey et al.
5,517,183 A 5/1996 Bozeman
5,523,800 A 6/1996 Dudek
5,524,637 A 6/1996 Erickson
5,526,022 A 6/1996 Donahue et al.
5,528,265 A 6/1996 Harrison
5,531,443 A 7/1996 Cruz

(56) References Cited

U.S. PATENT DOCUMENTS 5,533,933 A 7/1996 Garnjost et al.
5,541,860 A 7/1996 Takei et al.
5,550,721 A 8/1996 Rapisarda
5,551,701 A 9/1996 Bouton et al.
5,554,033 A 9/1996 Bizzi et al.
5,554,980 A 9/1996 Hashimoto et al.
5,561,543 A 10/1996 Ogawa
5,563,628 A 10/1996 Stroop
5,569,085 A 10/1996 Igarashi et al.
D375,326 S 11/1996 Yokoi et al.
5,573,011 A 11/1996 Felsing
5,574,479 A 11/1996 Odell
5,579,025 A 11/1996 Itoh
D376,826 S 12/1996 Ashida
5,580,319 A 12/1996 Hamilton
5,581,484 A 12/1996 Prince
5,585,584 A 12/1996 Usa
5,586,767 A 12/1996 Bohland
5,587,558 A 12/1996 Matsushima
5,587,740 A 12/1996 Brennan
5,594,465 A 1/1997 Poulachon
5,598,187 A 1/1997 Ide et al.
5,602,569 A 2/1997 Kato
5,603,658 A 2/1997 Cohen
5,605,505 A 2/1997 Han
5,606,343 A 2/1997 Tsuboyama
5,611,731 A 3/1997 Bouton et al.
5,613,913 A 3/1997 Ikematsu et al.
5,615,132 A 3/1997 Horton
5,621,459 A 4/1997 Ueda
5,623,581 A 4/1997 Attenberg
5,624,117 A 4/1997 Ohkubo et al.
5,627,565 A 5/1997 Morishita et al.
5,629,981 A 5/1997 Nerlikar
5,632,878 A 5/1997 Kitano
D379,832 S 6/1997 Ashida
5,640,152 A 6/1997 Copper
5,641,288 A 6/1997 Zzenglein, Jr.
5,642,931 A 7/1997 Gappelberg
5,643,087 A 7/1997 Marcus et al.
5,645,077 A 7/1997 Foxlin
5,645,277 A 7/1997 Cheng
5,647,796 A 7/1997 Cohen
5,649,867 A 7/1997 Briggs
5,651,049 A 7/1997 Easterling et al.
5,655,053 A 8/1997 Renie
5,662,332 A 9/1997 Garfield
5,662,525 A 9/1997 Briggs
5,666,138 A 9/1997 Culver
5,667,217 A 9/1997 Kelly et al.
5,667,220 A 9/1997 Cheng
5,670,845 A 9/1997 Grant
5,670,988 A 9/1997 Tickle
5,672,090 A 9/1997 Liu
5,674,128 A 10/1997 Holch et al.
5,676,450 A 10/1997 Sink et al.
5,676,673 A 10/1997 Ferre et al.
5,679,004 A 10/1997 McGowan et al.
5,682,181 A 10/1997 Nguyen et al.
5,685,776 A 11/1997 Stambolic et al.
5,685,778 A 11/1997 Sheldon et al.
5,694,340 A 12/1997 Kim
5,698,784 A 12/1997 Hotelling et al.
5,701,131 A 12/1997 Kuga
5,702,232 A 12/1997 Moore
5,702,305 A 12/1997 Norman et al.
5,702,323 A 12/1997 Poulton
5,703,623 A 12/1997 Hall et al.
5,716,216 A 2/1998 O'Loughlin et al.
5,716,281 A 2/1998 Dote
5,724,106 A 3/1998 Autry et al.
5,724,497 A 3/1998 San et al.
5,726,675 A 3/1998 Inoue
5,733,131 A 3/1998 Park
5,734,371 A 3/1998 Kaplan
5,734,373 A 3/1998 Rosenberg
5,734,807 A 3/1998 Sumi
D393,884 S 4/1998 Hayami
5,736,970 A 4/1998 Bozeman
5,739,811 A 4/1998 Rosenberg et al.
5,741,182 A 4/1998 Lipps et al.
5,741,189 A 4/1998 Briggs
5,742,233 A 4/1998 Hoffman et al.
5,742,331 A 4/1998 Uomori
5,745,226 A 4/1998 Gigioli
D394,264 S 5/1998 Sakamoto et al.
5,746,602 A 5/1998 Kikinis
5,751,273 A 5/1998 Cohen
5,752,880 A 5/1998 Gabai et al.
5,752,882 A 5/1998 Acres et al.
5,757,305 A 5/1998 Xydis
5,757,354 A 5/1998 Kawamura
5,757,360 A 5/1998 Nitta et al.
D395,464 S 6/1998 Shiibashi et al.
5,764,224 A 6/1998 Lilja et al.
5,769,719 A 6/1998 Hsu
5,770,533 A 6/1998 Franchi
5,771,038 A 6/1998 Wang
5,772,508 A 6/1998 Sugita et al.
D396,468 S 7/1998 Schindler et al.
5,775,998 A 7/1998 Ikematsu et al.
5,779,240 A 7/1998 Santella
5,785,317 A 7/1998 Sasaki
5,785,592 A 7/1998 Jacobsen
5,785,952 A 7/1998 Taylor et al.
5,786,626 A 7/1998 Brady et al.
D397,162 S 8/1998 Yokoi et al.
5,791,648 A 8/1998 Hohl
5,794,081 A 8/1998 Itoh
5,796,354 A 8/1998 Cartabiano et al.
5,803,740 A 9/1998 Gesink et al.
5,803,840 A 9/1998 Young
5,806,849 A 9/1998 Rutkowski
5,807,284 A 9/1998 Foxlin
5,810,666 A 9/1998 Mero et al.
5,811,896 A 9/1998 Grad
5,819,206 A 10/1998 Horton et al.
5,820,462 A 10/1998 Yokoi et al.
5,820,471 A 10/1998 Briggs
5,820,472 A 10/1998 Briggs
5,822,713 A 10/1998 Profeta
5,825,298 A 10/1998 Walter
5,825,350 A 10/1998 Case, Jr. et al.
D400,885 S 11/1998 Goto
5,830,065 A 11/1998 Sitrick
5,831,553 A 11/1998 Lenssen et al.
5,833,549 A 11/1998 Zur et al.
5,835,077 A 11/1998 Dao et al.
5,835,156 A 11/1998 Blonstein et al.
5,835,576 A 11/1998 Katz
5,836,817 A 11/1998 Acres et al.
5,838,138 A 11/1998 Henty
5,841,409 A 11/1998 Ishibashi et al.
D402,328 S 12/1998 Ashida
5,847,854 A 12/1998 Benson, Jr.
5,850,624 A 12/1998 Gard
5,851,149 A 12/1998 Xidos et al.
5,853,327 A 12/1998 Gilboa
5,853,332 A 12/1998 Briggs
5,854,622 A 12/1998 Brannon
5,855,483 A 1/1999 Collins et al.
D405,071 S 2/1999 Gambaro
5,865,680 A 2/1999 Briggs
5,867,146 A 2/1999 Kim et al.
5,874,941 A 2/1999 Yamada
5,875,257 A 2/1999 Marrin et al.
D407,071 S 3/1999 Keating
D407,761 S 4/1999 Barr
5,893,562 A 4/1999 Spector
5,897,437 A 4/1999 Nishiumi
5,898,421 A 4/1999 Quinn
5,900,867 A 5/1999 Schindler et al.
5,901,246 A 5/1999 Hoffberg et al.
5,902,968 A 5/1999 Sato et al.

(56) References Cited

U.S. PATENT DOCUMENTS

| | | | |
|---|---|---|---|
| 5,906,542 | A | 5/1999 | Neumann |
| D410,909 | S | 6/1999 | Tickle |
| 5,908,996 | A | 6/1999 | Litterst et al. |
| 5,911,634 | A | 6/1999 | Nidata et al. |
| 5,912,612 | A | 6/1999 | DeVolpi |
| 5,913,019 | A | 6/1999 | Attenberg |
| 5,913,727 | A | 6/1999 | Ahdoot |
| 5,919,149 | A | 7/1999 | Allum |
| 5,923,317 | A | 7/1999 | Sayler et al. |
| 5,924,695 | A | 7/1999 | Heykoop |
| 5,926,780 | A | 7/1999 | Fox et al. |
| 5,929,782 | A | 7/1999 | Stark et al. |
| 5,929,841 | A | 7/1999 | Fujii |
| 5,929,848 | A | 7/1999 | Albukerk et al. |
| D412,940 | S | 8/1999 | Kato et al. |
| 5,931,739 | A | 8/1999 | Layer et al. |
| 5,942,969 | A | 8/1999 | Wicks |
| 5,944,533 | A | 8/1999 | Wood |
| 5,946,444 | A | 8/1999 | Evans et al. |
| 5,947,789 | A | 9/1999 | Chan |
| 5,947,868 | A | 9/1999 | Dugan |
| 5,955,713 | A | 9/1999 | Titus |
| 5,955,988 | A | 9/1999 | Blonstein |
| 5,956,035 | A | 9/1999 | Sciammarella |
| 5,957,779 | A | 9/1999 | Larson |
| 5,961,386 | A | 10/1999 | Sawaguchi |
| 5,963,136 | A | 10/1999 | O'Brien |
| 5,964,660 | A | 10/1999 | James et al. |
| 5,967,898 | A | 10/1999 | Takasaka et al. |
| 5,967,901 | A | 10/1999 | Briggs |
| 5,971,270 | A | 10/1999 | Barna |
| 5,971,271 | A | 10/1999 | Wynn et al. |
| 5,973,757 | A | 10/1999 | Aubuchon et al. |
| 5,980,254 | A | 11/1999 | Muehle et al. |
| 5,982,352 | A | 11/1999 | Pryor |
| 5,982,356 | A | 11/1999 | Akiyama |
| 5,984,785 | A | 11/1999 | Takeda et al. |
| 5,984,788 | A | 11/1999 | Lebensfeld et al. |
| 5,986,570 | A | 11/1999 | Black et al. |
| 5,986,644 | A | 11/1999 | Herder |
| 5,987,421 | A | 11/1999 | Chuang |
| 5,989,120 | A | 11/1999 | Truchsess |
| 5,991,085 | A | 11/1999 | Rallison et al. |
| 5,991,693 | A | 11/1999 | Zalewski |
| 5,996,033 | A | 11/1999 | Chiu-Hao |
| 5,999,168 | A | 12/1999 | Rosenberg |
| 6,001,014 | A | 12/1999 | Ogata |
| 6,001,015 | A | 12/1999 | Nishiumi et al. |
| 6,002,394 | A | 12/1999 | Schein |
| 6,009,458 | A | 12/1999 | Hawkins et al. |
| D419,199 | S | 1/2000 | Cordell et al. |
| D419,200 | S | 1/2000 | Ashida |
| 6,010,406 | A | 1/2000 | Kajikawa et al. |
| 6,011,526 | A | 1/2000 | Toyoshima et al. |
| 6,012,980 | A | 1/2000 | Yoshida et al. |
| 6,012,984 | A | 1/2000 | Roseman |
| 6,013,007 | A | 1/2000 | Root et al. |
| 6,016,144 | A | 1/2000 | Blonstein |
| 6,019,680 | A | 2/2000 | Cheng |
| 6,020,876 | A | 2/2000 | Rosenberg |
| 6,024,647 | A | 2/2000 | Bennett et al. |
| 6,024,675 | A | 2/2000 | Kashiwaguchi |
| 6,025,830 | A | 2/2000 | Cohen |
| 6,037,882 | A | 3/2000 | Levy |
| 6,044,297 | A | 3/2000 | Sheldon |
| 6,049,823 | A | 4/2000 | Hwang |
| 6,052,083 | A | 4/2000 | Wilson |
| 6,057,788 | A | 5/2000 | Cummings |
| 6,058,342 | A | 5/2000 | Orbach |
| 6,059,576 | A | 5/2000 | Brann |
| 6,060,847 | A | 5/2000 | Hettema et al. |
| 6,066,075 | A | 5/2000 | Poulton |
| 6,069,594 | A | 5/2000 | Barnes et al. |
| 6,072,467 | A | 6/2000 | Walker |
| 6,072,470 | A | 6/2000 | Ishigaki |
| 6,075,443 | A | 6/2000 | Schepps et al. |
| 6,075,575 | A | 6/2000 | Schein et al. |
| 6,076,734 | A | 6/2000 | Dougherty et al. |
| 6,077,106 | A | 6/2000 | Mish |
| 6,078,789 | A | 6/2000 | Bodenmann |
| 6,079,982 | A | 6/2000 | Meader |
| 6,080,063 | A | 6/2000 | Khosla |
| 6,081,819 | A | 6/2000 | Ogino |
| 6,084,315 | A | 7/2000 | Schmitt |
| 6,084,577 | A | 7/2000 | Sato et al. |
| 6,085,805 | A | 7/2000 | Bates |
| 6,087,950 | A | 7/2000 | Capan |
| 6,089,987 | A | 7/2000 | Briggs |
| 6,091,342 | A | 7/2000 | Janesch et al. |
| D429,718 | S | 8/2000 | Rudolph |
| 6,095,926 | A | 8/2000 | Hettema et al. |
| 6,102,406 | A | 8/2000 | Miles et al. |
| 6,110,000 | A | 8/2000 | Ting |
| 6,110,039 | A | 8/2000 | Oh |
| 6,110,041 | A | 8/2000 | Walker et al. |
| 6,115,028 | A | 9/2000 | Balakrishnan |
| 6,127,928 | A | 10/2000 | Issacman et al. |
| 6,127,990 | A | 10/2000 | Zwern |
| 6,129,549 | A | 10/2000 | Thompson |
| 6,132,318 | A | 10/2000 | Briggs |
| 6,137,457 | A | 10/2000 | Tokuhashi |
| D433,381 | S | 11/2000 | Talesfore |
| 6,142,870 | A | 11/2000 | Wada |
| 6,142,876 | A | 11/2000 | Cumbers |
| 6,144,367 | A | 11/2000 | Berstis |
| 6,146,278 | A | 11/2000 | Kobayashi |
| 6,148,100 | A | 11/2000 | Anderson et al. |
| 6,149,490 | A | 11/2000 | Hampton |
| 6,150,947 | A | 11/2000 | Shima |
| 6,154,723 | A | 11/2000 | Cox et al. |
| 6,155,926 | A | 12/2000 | Miyamoto et al. |
| 6,160,405 | A | 12/2000 | Needle |
| 6,160,540 | A | 12/2000 | Fishkin et al. |
| 6,160,986 | A | 12/2000 | Gabai et al. |
| 6,162,122 | A | 12/2000 | Acres et al. |
| 6,162,123 | A | 12/2000 | Woolston |
| 6,162,191 | A | 12/2000 | Foxlin |
| 6,164,808 | A | 12/2000 | Shibata |
| 6,171,190 | B1 | 1/2001 | Thanasack et al. |
| 6,174,242 | B1 | 1/2001 | Briggs et al. |
| 6,176,837 | B1 | 1/2001 | Foxlin |
| 6,181,253 | B1 | 1/2001 | Eschenbach et al. |
| 6,181,329 | B1 | 1/2001 | Stork et al. |
| 6,183,364 | B1 | 2/2001 | Trovato |
| 6,183,365 | B1 | 2/2001 | Tonomura et al. |
| 6,184,847 | B1 | 2/2001 | Fateh et al. |
| 6,184,862 | B1 | 2/2001 | Leiper |
| 6,184,863 | B1 | 2/2001 | Sibert |
| 6,186,902 | B1 | 2/2001 | Briggs |
| 6,191,774 | B1 | 2/2001 | Schena |
| 6,196,893 | B1 | 3/2001 | Casola et al. |
| 6,198,295 | B1 | 3/2001 | Hill |
| 6,198,470 | B1 | 3/2001 | Agam et al. |
| 6,198,471 | B1 | 3/2001 | Cook |
| 6,200,216 | B1 | 3/2001 | Peppel |
| 6,200,219 | B1 | 3/2001 | Rudell et al. |
| 6,200,253 | B1 | 3/2001 | Nishiumi |
| 6,201,554 | B1 | 3/2001 | Lands |
| 6,206,745 | B1 | 3/2001 | Gabai et al. |
| 6,206,782 | B1 | 3/2001 | Walker et al. |
| 6,210,287 | B1 | 4/2001 | Briggs |
| 6,211,861 | B1 | 4/2001 | Rosenberg et al. |
| 6,214,155 | B1 | 4/2001 | Leighton |
| 6,217,450 | B1 | 4/2001 | Meredith |
| 6,217,478 | B1 | 4/2001 | Vohmann |
| 6,220,171 | B1 | 4/2001 | Hettema et al. |
| 6,220,964 | B1 | 4/2001 | Miyamoto |
| 6,220,965 | B1 | 4/2001 | Hanna et al. |
| 6,222,522 | B1 | 4/2001 | Mathews |
| D442,998 | S | 5/2001 | Ashida |
| 6,224,486 | B1 | 5/2001 | Walker et al. |
| 6,224,491 | B1 | 5/2001 | Hiromi et al. |
| 6,225,987 | B1 | 5/2001 | Matsuda |
| 6,226,534 | B1 | 5/2001 | Aizawa |

(56) References Cited

U.S. PATENT DOCUMENTS

| | | | |
|---|---|---|---|
| 6,227,966 | B1 | 5/2001 | Yokoi |
| 6,227,974 | B1 | 5/2001 | Eilat et al. |
| 6,231,451 | B1 | 5/2001 | Briggs |
| 6,234,803 | B1 | 5/2001 | Watkins |
| 6,238,289 | B1 | 5/2001 | Sobota et al. |
| 6,238,291 | B1 | 5/2001 | Fujimoto et al. |
| 6,239,806 | B1 | 5/2001 | Nishiumi et al. |
| RE37,220 | E | 6/2001 | Rapisarda et al. |
| 6,241,611 | B1 | 6/2001 | Takeda et al. |
| 6,243,491 | B1 | 6/2001 | Andersson |
| 6,243,658 | B1 | 6/2001 | Raby |
| 6,244,987 | B1 | 6/2001 | Ohsuga et al. |
| 6,245,014 | B1 | 6/2001 | Brainard et al. |
| 6,248,019 | B1 | 6/2001 | Mudie et al. |
| 6,254,101 | B1 | 7/2001 | Young |
| 6,254,394 | B1 | 7/2001 | Draper et al. |
| 6,261,180 | B1 | 7/2001 | Lebensfeld et al. |
| 6,264,202 | B1 | 7/2001 | Briggs |
| 6,264,558 | B1 | 7/2001 | Nishiumi et al. |
| 6,265,984 | B1 | 7/2001 | Molinaroli |
| 6,267,673 | B1 | 7/2001 | Miyamoto et al. |
| 6,273,425 | B1 | 8/2001 | Westfall et al. |
| 6,273,819 | B1 | 8/2001 | Strauss et al. |
| 6,276,353 | B1 | 8/2001 | Briggs et al. |
| 6,280,327 | B1 | 8/2001 | Leifer et al. |
| 6,280,328 | B1 | 8/2001 | Holch et al. |
| 6,283,862 | B1 | 9/2001 | Richter |
| 6,283,871 | B1 | 9/2001 | Briggs |
| 6,287,200 | B1 | 9/2001 | Sharma |
| 6,290,565 | B1 | 9/2001 | Galyean, III et al. |
| 6,290,566 | B1 | 9/2001 | Gabai et al. |
| 6,293,684 | B1 | 9/2001 | Riblett |
| 6,297,751 | B1 | 10/2001 | Fadavi-Ardekani |
| 6,301,534 | B1 | 10/2001 | McDermott |
| 6,302,793 | B1 | 10/2001 | Fertitta, III et al. |
| 6,302,796 | B1 | 10/2001 | Lebensfeld et al. |
| 6,304,250 | B1 | 10/2001 | Yang |
| 6,311,982 | B1 | 11/2001 | Lebensfeld et al. |
| 6,312,335 | B1 | 11/2001 | Tosaki et al. |
| 6,315,673 | B1 | 11/2001 | Kopera |
| 6,320,495 | B1 | 11/2001 | Sporgis |
| 6,322,365 | B1 | 11/2001 | Shechter et al. |
| 6,323,614 | B1 | 11/2001 | Palaxxolo |
| 6,323,654 | B1 | 11/2001 | Needle |
| 6,325,718 | B1 | 12/2001 | Nishiumi et al. |
| 6,328,648 | B1 | 12/2001 | Walker et al. |
| 6,328,650 | B1 | 12/2001 | Fukawa et al. |
| 6,329,648 | B1 | 12/2001 | Delatorre |
| 6,330,427 | B1 | 12/2001 | Tabachnik |
| 6,331,841 | B1 | 12/2001 | Tokuhashi |
| 6,331,856 | B1 | 12/2001 | VanHook |
| 6,332,840 | B1 | 12/2001 | Nishiumi et al. |
| 6,337,954 | B1 | 1/2002 | Soshi |
| 6,342,010 | B1 | 1/2002 | Slifer |
| 6,346,047 | B1 | 2/2002 | Sobota |
| 6,347,993 | B1 | 2/2002 | Kondo et al. |
| 6,347,998 | B1 | 2/2002 | Yoshitomi et al. |
| 6,350,199 | B1 | 2/2002 | Williams et al. |
| 6,352,478 | B1 | 3/2002 | Gabai et al. |
| 6,356,867 | B1 | 3/2002 | Gabai et al. |
| 6,361,396 | B1 | 3/2002 | Snyder |
| 6,361,507 | B1 | 3/2002 | Foxlin |
| D456,410 | S | 4/2002 | Ashida |
| 6,364,735 | B1 | 4/2002 | Bristow et al. |
| 6,368,177 | B1 | 4/2002 | Gabai et al. |
| 6,368,217 | B2 | 4/2002 | Kanno |
| 6,369,794 | B1 | 4/2002 | Sakurai et al. |
| 6,369,908 | B1 | 4/2002 | Frey et al. |
| 6,371,375 | B1 | 4/2002 | Ackley et al. |
| 6,371,853 | B1 | 4/2002 | Borta |
| 6,375,566 | B1 | 4/2002 | Yamada |
| 6,375,569 | B1 | 4/2002 | Acres |
| 6,375,572 | B1 | 4/2002 | Masuyama et al. |
| 6,375,578 | B1 | 4/2002 | Briggs |
| 6,377,793 | B1 | 4/2002 | Jenkins |
| 6,377,906 | B1 | 4/2002 | Rowe |
| D456,854 | S | 5/2002 | Ashida |
| 6,383,079 | B1 | 5/2002 | Takeda et al. |
| 6,386,538 | B1 | 5/2002 | Mejia |
| 6,392,613 | B1 | 5/2002 | Goto |
| 6,394,904 | B1 | 5/2002 | Stalker |
| 6,400,480 | B1 | 6/2002 | Thomas |
| 6,400,996 | B1 | 6/2002 | Hoffberg et al. |
| 6,404,409 | B1 | 6/2002 | Solomon |
| 6,409,379 | B1 | 6/2002 | Gabathuler et al. |
| 6,409,604 | B1 | 6/2002 | Matsuno |
| 6,409,687 | B1 | 6/2002 | Foxlin |
| D459,727 | S | 7/2002 | Ashida |
| D460,787 | S | 7/2002 | Nishikawa |
| 6,414,589 | B1 | 7/2002 | Angott et al. |
| 6,415,223 | B1 | 7/2002 | Lin |
| 6,421,056 | B1 | 7/2002 | Nishiumi |
| 6,424,264 | B1 | 7/2002 | Giraldin et al. |
| 6,424,333 | B1 | 7/2002 | Tremblay |
| 6,426,719 | B1 | 7/2002 | Nagareda |
| 6,426,741 | B1 | 7/2002 | Goldsmith et al. |
| 6,438,193 | B1 | 8/2002 | Ko et al. |
| D462,683 | S | 9/2002 | Ashida |
| 6,445,960 | B1 | 9/2002 | Borta |
| 6,452,494 | B1 | 9/2002 | Harrison |
| 6,456,276 | B1 | 9/2002 | Park |
| D464,052 | S | 10/2002 | Fletcher |
| D464,950 | S | 10/2002 | Fraquelli et al. |
| 6,462,769 | B1 | 10/2002 | Trowbridge et al. |
| 6,463,257 | B1 | 10/2002 | Wood |
| 6,463,859 | B1 | 10/2002 | Ikezawa et al. |
| 6,466,198 | B1 | 10/2002 | Feinstein |
| 6,466,831 | B1 | 10/2002 | Shibata |
| 6,473,070 | B2 | 10/2002 | Mishra et al. |
| 6,473,713 | B1 | 10/2002 | McCall |
| 6,474,159 | B1 | 11/2002 | Foxlin et al. |
| 6,482,067 | B1 | 11/2002 | Pickens |
| 6,484,080 | B2 | 11/2002 | Breed |
| 6,490,409 | B1 | 12/2002 | Walker |
| 6,492,981 | B1 | 12/2002 | Stork et al. |
| 6,494,457 | B2 | 12/2002 | Conte et al. |
| 6,496,122 | B2 | 12/2002 | Sampsell |
| 6,509,217 | B1 | 1/2003 | Reddy |
| 6,512,511 | B2 | 1/2003 | Willner |
| 6,517,438 | B2 | 2/2003 | Tosaki |
| 6,518,952 | B1 | 2/2003 | Leiper |
| 6,525,660 | B1 | 2/2003 | Surintrspanont |
| 6,526,158 | B1 | 2/2003 | Goldberg |
| 6,527,638 | B1 | 3/2003 | Walker et al. |
| 6,527,646 | B1 | 3/2003 | Briggs |
| 6,530,838 | B2 | 3/2003 | Ha et al. |
| 6,530,841 | B2 | 3/2003 | Bull et al. |
| 6,538,675 | B2 | 3/2003 | Aratani |
| D473,942 | S | 4/2003 | Motoki et al. |
| 6,540,607 | B2 | 4/2003 | Mokris et al. |
| 6,540,611 | B1 | 4/2003 | Nagata |
| 6,544,124 | B2 | 4/2003 | Ireland |
| 6,544,126 | B2 | 4/2003 | Sawano |
| 6,545,611 | B2 | 4/2003 | Hayashi et al. |
| 6,545,661 | B1 | 4/2003 | Goschy et al. |
| 6,551,165 | B2 | 4/2003 | Smirnov |
| 6,551,188 | B2 | 4/2003 | Toyama et al. |
| 6,554,707 | B1 | 4/2003 | Sinclair et al. |
| 6,554,781 | B1 | 4/2003 | Carter et al. |
| D474,763 | S | 5/2003 | Tozaki et al. |
| 6,558,225 | B1 | 5/2003 | Rehkemper et al. |
| 6,560,511 | B1 | 5/2003 | Yokoo et al. |
| 6,561,049 | B2 | 5/2003 | Akiyama et al. |
| 6,565,438 | B2 | 5/2003 | Ogino |
| 6,565,444 | B2 | 5/2003 | Nagata et al. |
| 6,567,536 | B2 | 5/2003 | McNitt et al. |
| 6,569,023 | B1 | 5/2003 | Briggs |
| 6,572,108 | B1 | 6/2003 | Bristow |
| 6,575,753 | B2 | 6/2003 | Rosa et al. |
| 6,577,350 | B1 | 6/2003 | Proehl |
| 6,579,098 | B2 | 6/2003 | Shechter |
| 6,582,299 | B1 | 6/2003 | Matsuyama et al. |
| 6,582,380 | B2 | 6/2003 | Kazlausky et al. |
| 6,583,783 | B1 | 6/2003 | Dietrich |

(56) References Cited

U.S. PATENT DOCUMENTS

| | | | |
|---|---|---|---|
| 6,585,596 | B1 | 7/2003 | Liefer et al. |
| 6,589,120 | B1 | 7/2003 | Takahashi |
| 6,590,536 | B1 | 7/2003 | Walton |
| 6,591,677 | B2 | 7/2003 | Rothoff |
| 6,592,461 | B1 | 7/2003 | Raviv et al. |
| 6,595,863 | B2 | 7/2003 | Chamberlain et al. |
| 6,597,342 | B1 | 7/2003 | Haruta |
| 6,597,443 | B2 | 7/2003 | Boman |
| 6,598,978 | B2 | 7/2003 | Hasegawa |
| 6,599,194 | B1 | 7/2003 | Smith |
| 6,605,038 | B1 | 8/2003 | Teller et al. |
| 6,607,123 | B1 | 8/2003 | Jollifee et al. |
| 6,608,563 | B2 | 8/2003 | Weston et al. |
| 6,609,969 | B1 | 8/2003 | Luciano et al. |
| 6,609,977 | B1 | 8/2003 | Shimizu |
| 6,616,452 | B2 | 9/2003 | Clark et al. |
| 6,616,535 | B1 | 9/2003 | Nishizak |
| 6,616,607 | B2 | 9/2003 | Hashimoto |
| 6,626,728 | B2 | 9/2003 | Holt |
| 6,628,257 | B1 | 9/2003 | Oka |
| 6,629,019 | B2 | 9/2003 | Legge et al. |
| 6,632,142 | B2 | 10/2003 | Keith |
| 6,633,155 | B1 | 10/2003 | Liang |
| 6,634,949 | B1 | 10/2003 | Briggs et al. |
| 6,636,826 | B1 | 10/2003 | Abe et al. |
| 6,641,482 | B2 | 11/2003 | Masuyama et al. |
| 6,642,837 | B1 | 11/2003 | Vigoda et al. |
| 6,650,029 | B1 | 11/2003 | Johnston |
| 6,650,313 | B2 | 11/2003 | Levine |
| 6,650,345 | B1 | 11/2003 | Saito |
| 6,651,268 | B1 | 11/2003 | Briggs |
| 6,654,001 | B1 | 11/2003 | Su |
| 6,672,962 | B1 | 1/2004 | Ozaki et al. |
| 6,676,520 | B2 | 1/2004 | Nishiumi et al. |
| 6,676,524 | B1 | 1/2004 | Botzas |
| 6,677,990 | B1 | 1/2004 | Kawahara |
| 6,681,629 | B2 | 1/2004 | Foxlin et al. |
| 6,682,074 | B2 | 1/2004 | Weston |
| 6,682,351 | B1 | 1/2004 | Abraham-Fuchs et al. |
| 6,684,062 | B1 | 1/2004 | Gosior et al. |
| D486,145 | S | 2/2004 | Kaminski et al. |
| 6,686,954 | B1 | 2/2004 | Kitaguchi |
| 6,692,170 | B2 | 2/2004 | Abir |
| 6,693,622 | B1 | 2/2004 | Shahoian et al. |
| 6,702,672 | B1 | 3/2004 | Angell et al. |
| 6,709,336 | B2 | 3/2004 | Siegel et al. |
| 6,712,692 | B2 | 3/2004 | Basson |
| 6,716,102 | B2 | 4/2004 | Whitten et al. |
| 6,717,573 | B1 | 4/2004 | Shahoian et al. |
| 6,717,673 | B1 | 4/2004 | Janssen |
| 6,718,280 | B2 | 4/2004 | Hermann |
| 6,725,107 | B2 | 4/2004 | MacPherson |
| 6,725,173 | B2 | 4/2004 | An |
| 6,726,099 | B2 | 4/2004 | Becker et al. |
| D489,361 | S | 5/2004 | Mori et al. |
| 6,729,934 | B1 | 5/2004 | Driscoll et al. |
| 6,733,390 | B2 | 5/2004 | Walker et al. |
| 6,736,009 | B1 | 5/2004 | Schwabe |
| 6,739,874 | B2 | 5/2004 | Marcus et al. |
| 6,739,979 | B2 | 5/2004 | Tracy |
| D491,924 | S | 6/2004 | Kaminski et al. |
| D492,285 | S | 6/2004 | Ombao et al. |
| 6,743,104 | B1 | 6/2004 | Ota et al. |
| 6,746,334 | B1 | 6/2004 | Barney |
| 6,747,562 | B2 | 6/2004 | Giraldin et al. |
| 6,747,632 | B2 | 6/2004 | Howard |
| 6,747,690 | B2 | 6/2004 | Molgaard |
| 6,749,432 | B2 | 6/2004 | French et al. |
| 6,752,719 | B2 | 6/2004 | Himoto et al. |
| 6,753,849 | B1 | 6/2004 | Curran et al. |
| 6,753,888 | B2 | 6/2004 | Kamiwada |
| 6,757,068 | B2 | 6/2004 | Foxlin |
| 6,757,446 | B1 | 6/2004 | Li |
| 6,761,637 | B2 * | 7/2004 | Weston .................. A63F 13/06 463/1 |
| 6,765,553 | B1 | 7/2004 | Odamura |
| D495,336 | S | 8/2004 | Andre et al. |
| 6,770,863 | B2 | 8/2004 | Walley |
| 6,773,325 | B1 | 8/2004 | Mawle et al. |
| 6,773,344 | B1 | 8/2004 | Gabai et al. |
| 6,785,539 | B2 | 8/2004 | Hale |
| 6,786,877 | B2 | 9/2004 | Foxlin |
| 6,796,177 | B2 | 9/2004 | Mori |
| 6,796,908 | B2 | 9/2004 | Weston |
| 6,797,895 | B2 | 9/2004 | Lapstun |
| 6,811,489 | B1 | 11/2004 | Shimizu |
| 6,811,491 | B1 | 11/2004 | Levenberg et al. |
| 6,812,583 | B2 | 11/2004 | Cheung et al. |
| 6,812,881 | B1 | 11/2004 | Mullaly et al. |
| 6,813,525 | B2 | 11/2004 | Reid |
| 6,813,574 | B1 | 11/2004 | Yedur |
| 6,813,584 | B2 | 11/2004 | Zhou et al. |
| 6,816,151 | B2 | 11/2004 | Dellinger |
| 6,821,204 | B2 | 11/2004 | Aonuma et al. |
| 6,821,206 | B1 | 11/2004 | Ishida et al. |
| 6,835,135 | B1 | 12/2004 | Silverbrook et al. |
| 6,836,705 | B2 | 12/2004 | Hellmann |
| 6,836,751 | B2 | 12/2004 | Paxton |
| 6,836,971 | B1 | 1/2005 | Wang |
| 6,842,991 | B2 | 1/2005 | Levi |
| 6,846,238 | B2 | 1/2005 | Wells |
| 6,850,221 | B1 | 2/2005 | Tickle |
| 6,850,844 | B1 | 2/2005 | Walters |
| 6,852,032 | B2 | 2/2005 | Ishino |
| 6,856,327 | B2 | 2/2005 | Choi |
| D502,468 | S | 3/2005 | Knight et al. |
| 6,868,738 | B2 | 3/2005 | Moscrip |
| 6,872,139 | B2 | 3/2005 | Sato et al. |
| 6,873,406 | B1 | 3/2005 | Hines |
| D503,750 | S | 4/2005 | Kit et al. |
| 6,878,066 | B2 | 4/2005 | Leifer |
| 6,882,824 | B2 | 4/2005 | Wood |
| D504,677 | S | 5/2005 | Kaminski et al. |
| D505,424 | S | 5/2005 | Ashida et al. |
| 6,890,262 | B2 | 5/2005 | Oishi |
| 6,891,469 | B2 | 5/2005 | Engellenner et al. |
| 6,891,526 | B2 | 5/2005 | Gombert |
| 6,894,686 | B2 | 5/2005 | Stamper et al. |
| 6,897,845 | B2 | 5/2005 | Ozawa |
| 6,897,854 | B2 | 5/2005 | Cho |
| 6,902,483 | B2 | 6/2005 | Lin |
| 6,903,725 | B2 | 6/2005 | Nacson |
| 6,905,411 | B2 | 6/2005 | Nguyen et al. |
| 6,906,700 | B1 | 6/2005 | Armstrong |
| 6,908,386 | B2 | 6/2005 | Suzuki et al. |
| 6,908,388 | B2 | 6/2005 | Shimizu |
| 6,918,833 | B2 | 7/2005 | Emmerson et al. |
| 6,921,332 | B2 | 7/2005 | Fukunaga |
| 6,922,632 | B2 | 7/2005 | Foxlin |
| 6,924,787 | B2 | 8/2005 | Kramer et al. |
| 6,925,410 | B2 | 8/2005 | Narayanan |
| 6,929,543 | B1 | 8/2005 | Ueshima et al. |
| 6,929,548 | B2 | 8/2005 | Wang |
| 6,932,698 | B2 | 8/2005 | Sprogis |
| 6,932,706 | B1 | 8/2005 | Kaminkow |
| 6,933,861 | B2 | 8/2005 | Wang |
| 6,933,923 | B2 | 8/2005 | Feinstein |
| 6,935,864 | B2 | 8/2005 | Shechter et al. |
| 6,935,952 | B2 | 8/2005 | Walker et al. |
| 6,939,232 | B2 | 9/2005 | Tanaka et al. |
| 6,948,999 | B2 | 9/2005 | Chan |
| 6,954,980 | B2 | 10/2005 | Song |
| 6,955,606 | B2 | 10/2005 | Taho et al. |
| 6,956,564 | B1 | 10/2005 | Williams |
| 6,965,374 | B2 | 11/2005 | Villet et al. |
| 6,966,775 | B1 | 11/2005 | Kendir et al. |
| 6,967,563 | B2 | 11/2005 | Bormaster |
| 6,967,566 | B2 | 11/2005 | Weston et al. |
| 6,982,697 | B2 | 1/2006 | Wilson et al. |
| 6,983,219 | B2 | 1/2006 | Mantyjarvi |
| 6,984,208 | B2 | 1/2006 | Zheng |
| 6,990,639 | B2 | 1/2006 | Wilson |
| 6,993,451 | B2 | 1/2006 | Chang et al. |
| 6,995,748 | B2 | 2/2006 | Gordon et al. |

(56) References Cited

U.S. PATENT DOCUMENTS 6,998,966 B2 2/2006 Pedersen
7,000,469 B2 2/2006 Foxlin et al.
7,002,591 B1 2/2006 Leather
7,004,847 B2 2/2006 Henry
7,005,985 B1 2/2006 Steeves
7,029,400 B2 4/2006 Briggs
7,031,875 B2 4/2006 Ellenby et al.
7,038,661 B2 5/2006 Wilson et al.
7,040,986 B2 5/2006 Koshima
7,040,993 B1 5/2006 Lovitt
7,040,998 B2 5/2006 Jolliffe et al.
7,052,391 B1 5/2006 Luciano, Jr.
7,055,101 B2 5/2006 Abbott et al.
7,056,221 B2 6/2006 Thirkettle et al.
7,059,974 B1 6/2006 Golliffe et al.
7,066,781 B2 6/2006 Weston
D524,298 S 7/2006 Hedderich et al.
7,081,033 B1 7/2006 Mawle
7,081,051 B2 7/2006 Himoto et al.
7,086,645 B2 8/2006 Hardie
7,090,582 B2 8/2006 Danieli et al.
7,094,147 B2 8/2006 Nakata
7,098,891 B1 8/2006 Pryor
7,098,894 B2 8/2006 Yang
7,102,615 B2 9/2006 Marks
7,102,616 B1 9/2006 Sleator
7,107,168 B2 9/2006 Oystol
D531,228 S 10/2006 Ashida et al.
7,115,032 B2 10/2006 Cantu et al.
7,117,009 B2 10/2006 Wong et al.
7,118,482 B2 10/2006 Ishihara et al.
7,126,584 B1 10/2006 Nishiumi et al.
7,127,370 B2 10/2006 Kelly
D531,585 S 11/2006 Weitgasser et al.
7,133,026 B2 11/2006 Horie et al.
7,136,674 B2 11/2006 Yoshie et al.
7,136,826 B2 11/2006 Alsafadi
7,137,899 B2 11/2006 Hiei
7,139,983 B2 11/2006 Kelts
7,140,962 B2 11/2006 Okuda et al.
7,142,191 B2 11/2006 Idesawa et al.
7,145,551 B1 12/2006 Bathiche
7,149,627 B2 12/2006 Ockerse
7,154,475 B2 12/2006 Crew
7,155,604 B2 12/2006 Kawai
7,158,116 B2 1/2007 Poltorak
7,158,118 B2 1/2007 Liberty
7,160,196 B2 1/2007 Thirkettle et al.
7,168,089 B2 1/2007 Nguyen et al.
7,173,604 B2 2/2007 Marvit
7,176,919 B2 2/2007 Drebin
7,180,414 B2 2/2007 Nyfelt
7,180,503 B2 2/2007 Burr
7,182,691 B1 2/2007 Schena
7,183,480 B2 2/2007 Nishitani et al.
7,184,059 B1 2/2007 Fouladi
D543,246 S 5/2007 Ashida et al.
7,220,220 B2 5/2007 Stubbs et al.
7,223,173 B2 5/2007 Masuyama et al.
7,225,101 B2 5/2007 Usuda et al.
7,231,063 B2 6/2007 Naimark
7,233,316 B2 6/2007 Smith et al.
7,236,156 B2 6/2007 Liberty et al.
7,239,301 B2 7/2007 Liberty et al.
7,252,572 B2 8/2007 Wright et al.
7,261,690 B2 8/2007 Teller et al.
7,262,760 B2 8/2007 Liberty
RE39,818 E 9/2007 Slifer
7,288,028 B2 10/2007 Rodriguez et al.
D556,201 S 11/2007 Ashida et al.
7,291,014 B2 11/2007 Chung et al.
7,292,151 B2 11/2007 Ferguson et al.
7,297,059 B2 11/2007 Vancura et al.
7,301,527 B2 11/2007 Marvit
7,301,648 B2 11/2007 Foxlin
D556,760 S 12/2007 Ashida et al.
7,307,617 B2 12/2007 Wilson et al.
D559,847 S 1/2008 Ashida et al.
D561,178 S 2/2008 Azuma
7,331,857 B2 2/2008 MacIver
7,335,134 B1 2/2008 LaVelle
D563,948 S 3/2008 d'Hoore
7,337,965 B2 3/2008 Thirkettle et al.
7,339,105 B2 3/2008 Eitaki
7,345,670 B2 3/2008 Armstrong
D567,243 S 4/2008 Ashida et al.
7,359,121 B2 4/2008 French et al.
7,359,451 B2 4/2008 McKnight
7,361,073 B2 4/2008 Martin
RE40,324 E 5/2008 Crawford
7,371,177 B2 5/2008 Ellis et al.
7,379,566 B2 5/2008 Hildreth
7,387,559 B2 6/2008 Sanchez-Castro et al.
7,394,459 B2 7/2008 Bathiche et al.
7,395,181 B2 7/2008 Foxlin
7,398,151 B1 7/2008 Burrell et al.
7,408,453 B2 8/2008 Breed
7,414,611 B2 8/2008 Liberty
7,419,428 B2 9/2008 Rowe
7,424,388 B2 9/2008 Sato
7,428,499 B1 9/2008 Philyaw
7,435,179 B1 10/2008 Ford
7,441,151 B2 10/2008 Whitten et al.
7,442,108 B2 10/2008 Ganz
7,445,550 B2 11/2008 Barney et al.
7,465,212 B2 12/2008 Ganz
7,488,231 B2 2/2009 Weston
7,488,254 B2 2/2009 Himoto
7,489,299 B2 2/2009 Liberty et al.
7,492,268 B2 2/2009 Ferguson et al.
7,492,367 B2 2/2009 Mahajan et al.
7,500,917 B2 3/2009 Barney et al.
7,502,759 B2 3/2009 Hannigan et al.
7,519,537 B2 4/2009 Rosenberg
7,524,246 B2 4/2009 Briggs et al.
7,535,456 B2 5/2009 Liberty et al.
7,536,156 B2 5/2009 Tischer
7,556,563 B2 7/2009 Ellis et al.
7,564,426 B2 7/2009 Poor
7,568,289 B2 8/2009 Burlingham et al.
7,572,191 B2 8/2009 Weston et al.
7,582,016 B2 9/2009 Suzuki
7,596,466 B2 9/2009 Ohta
7,614,958 B2 11/2009 Weston et al.
7,623,115 B2 11/2009 Marks
7,627,139 B2 12/2009 Marks
7,627,451 B2 12/2009 Vock et al.
7,645,178 B1 1/2010 Trotto et al.
7,662,015 B2 2/2010 Hui
7,663,509 B2 2/2010 Shen
7,674,184 B2 3/2010 Briggs et al.
7,704,135 B2 4/2010 Harrison
7,704,146 B2 4/2010 Ellis
7,727,090 B2 6/2010 Gant
7,749,089 B1 7/2010 Briggs et al.
7,774,155 B2 8/2010 Sato et al.
7,775,882 B2 8/2010 Kawamura et al.
7,775,884 B1 8/2010 McCauley
7,789,741 B1 9/2010 Fields
7,796,116 B2 9/2010 Salsman et al.
7,828,295 B2 11/2010 Matsumoto et al.
7,850,527 B2 12/2010 Barney et al.
7,878,905 B2 2/2011 Weston et al.
7,883,420 B2 2/2011 Bradbury
7,896,742 B2 3/2011 Weston et al.
7,927,216 B2 4/2011 Ikeda
7,942,745 B2 5/2011 Ikeda
7,989,971 B2 8/2011 Lemieux
8,021,239 B2 9/2011 Weston et al.
8,025,573 B2 9/2011 Stenton et al.
8,033,901 B2 10/2011 Wood
8,089,458 B2 1/2012 Barney et al.
8,164,567 B1 4/2012 Barney et al.
8,169,406 B2 5/2012 Barney et al.

(56) References Cited

U.S. PATENT DOCUMENTS 8,184,097 B1 5/2012 Barney et al.
8,206,223 B2 6/2012 Marans et al.
8,226,493 B2 7/2012 Briggs et al.
8,248,367 B1 8/2012 Barney et al.
8,287,372 B2 10/2012 Hong et al.
8,287,373 B2 10/2012 Marks et al.
8,330,284 B2 12/2012 Weston et al.
8,342,929 B2 1/2013 Briggs et al.
8,368,648 B2 2/2013 Barney et al.
8,373,659 B2 2/2013 Barney et al.
8,384,668 B2 2/2013 Barney et al.
8,439,757 B2 5/2013 Hornsby et al.
8,469,766 B2 6/2013 Zheng
8,475,275 B2 7/2013 Weston et al.
8,491,389 B2 7/2013 Weston et al.
8,531,050 B2 9/2013 Barney et al.
8,535,153 B2 9/2013 Bradbury et al.
8,602,857 B2 12/2013 Morichau-Beauchant et al.
8,608,535 B2 12/2013 Weston et al.
8,686,579 B2 4/2014 Barney et al.
8,702,515 B2 4/2014 Weston et al.
8,708,821 B2 4/2014 Barney et al.
8,711,094 B2 4/2014 Barney et al.
8,753,165 B2 6/2014 Weston
8,758,136 B2 6/2014 Briggs et al.
8,790,180 B2 7/2014 Barney et al.
8,795,079 B2 8/2014 Penzias, III
8,814,688 B2 8/2014 Barney et al.
8,827,810 B2 9/2014 Weston et al.
8,834,271 B2 9/2014 Ikeda
8,870,655 B2 10/2014 Ikeda
8,888,576 B2 11/2014 Briggs et al.
8,913,011 B2 12/2014 Barney et al.
8,915,785 B2 12/2014 Barney et al.
8,961,260 B2 2/2015 Weston
8,961,312 B2 2/2015 Barney et al.
9,039,533 B2 5/2015 Barney et al.
9,138,650 B2 9/2015 Barney et al.
9,149,717 B2 10/2015 Barney et al.
9,162,148 B2 10/2015 Barney et al.
9,162,149 B2 10/2015 Weston et al.
9,186,585 B2 11/2015 Briggs et al.
9,272,206 B2 3/2016 Weston et al.
2001/0010514 A1 8/2001 Ishino
2001/0015123 A1 8/2001 Nishitani et al.
2001/0018361 A1 8/2001 Acres
2001/0024973 A1 9/2001 Meredith
2001/0031652 A1 10/2001 Gabai et al.
2001/0031662 A1 10/2001 Larian
2001/0034257 A1 10/2001 Weston et al.
2001/0039206 A1 11/2001 Peppel
2001/0040591 A1 11/2001 Abbott et al.
2001/0049302 A1 12/2001 Hagiwara et al.
2001/0054082 A1 12/2001 Rudolph et al.
2002/0005787 A1* 1/2002 Gabai .................... H04B 1/202 340/12.29
2002/0024500 A1 2/2002 Howard
2002/0024675 A1 2/2002 Foxlin
2002/0028071 A1 3/2002 Molgaard
2002/0028710 A1 3/2002 Ishihara et al.
2002/0032067 A1 3/2002 Barney
2002/0036617 A1 3/2002 Pryor
2002/0038267 A1 3/2002 Can et al.
2002/0052238 A1 5/2002 Muroi
2002/0058459 A1* 5/2002 Holt ....................... A63H 33/22 446/484
2002/0068500 A1 6/2002 Gabai et al.
2002/0072418 A1 6/2002 Masuyama
2002/0075335 A1 6/2002 Relimoto
2002/0077180 A1 6/2002 Swanberg et al.
2002/0077182 A1 6/2002 Swanberg et al.
2002/0090985 A1 7/2002 Tochner et al.
2002/0090992 A1 7/2002 Legge et al.
2002/0098887 A1 7/2002 Himoto et al.
2002/0103026 A1 8/2002 Himoto et al.
2002/0107069 A1 8/2002 Ishino
2002/0107591 A1* 8/2002 Gabai ...................... A63H 3/28 700/94
2002/0116615 A1 8/2002 Nguyen et al.
2002/0118147 A1 8/2002 Solomon
2002/0123377 A1 9/2002 Shulman
2002/0126026 A1 9/2002 Lee et al.
2002/0128056 A1 9/2002 Kato
2002/0137427 A1 9/2002 Peters
2002/0137567 A1 9/2002 Cheng
2002/0140745 A1 10/2002 Ellenby
2002/0158751 A1 10/2002 Bormaster
2002/0158843 A1 10/2002 Levine
2002/0183961 A1 12/2002 French et al.
2003/0013513 A1 1/2003 Rowe
2003/0022736 A1 1/2003 Cass
2003/0027634 A1 2/2003 Matthews, III
2003/0036425 A1 2/2003 Kaminkow et al.
2003/0037075 A1 2/2003 Hannigan
2003/0038778 A1 2/2003 Noguera
2003/0040347 A1 2/2003 Roach et al.
2003/0052860 A1 3/2003 Park et al.
2003/0057808 A1 3/2003 Lee et al.
2003/0060286 A1 3/2003 Walker et al.
2003/0063068 A1 4/2003 Anton
2003/0064812 A1 4/2003 Rappaport et al.
2003/0069077 A1 4/2003 Korienek
2003/0073505 A1 4/2003 Tracy
2003/0095101 A1 5/2003 Jou
2003/0096652 A1 5/2003 Siegel et al.
2003/0107551 A1 6/2003 Dunker
2003/0114233 A1 6/2003 Hiei
2003/0134679 A1 7/2003 Siegel et al.
2003/0144047 A1 7/2003 Sprogis
2003/0144056 A1 7/2003 Leifer et al.
2003/0149803 A1 8/2003 Wilson et al.
2003/0166416 A1 9/2003 Ogata
2003/0171145 A1 9/2003 Rowe
2003/0171190 A1 9/2003 Rice
2003/0190967 A1 10/2003 Henry
2003/0193572 A1 10/2003 Wilson et al.
2003/0195037 A1 10/2003 Vuong et al.
2003/0195041 A1 10/2003 McCauley
2003/0195046 A1 10/2003 Bartsch
2003/0204361 A1 10/2003 Townsend
2003/0214259 A9 11/2003 Dowling et al.
2003/0216176 A1 11/2003 Shimizu
2003/0222851 A1 12/2003 Lai
2003/0234914 A1 12/2003 Solomon
2004/0028258 A1 2/2004 Naimark
2004/0033833 A1 2/2004 Briggs et al.
2004/0034289 A1 2/2004 Teller et al.
2004/0043806 A1 3/2004 Kirby et al.
2004/0048666 A1 3/2004 Bagley
2004/0063480 A1 4/2004 Wang
2004/0070564 A1 4/2004 Dawson
2004/0075650 A1 4/2004 Paul
2004/0081313 A1 4/2004 McKnight et al.
2004/0095317 A1 5/2004 Zhang
2004/0102247 A1 5/2004 Smoot et al.
2004/0119693 A1 6/2004 Kaemmler
2004/0121834 A1 6/2004 Libby et al.
2004/0134341 A1 7/2004 Sandoz
2004/0140954 A1 7/2004 Faeth
2004/0143413 A1 7/2004 Oystol
2004/0147317 A1 7/2004 Ito et al.
2004/0152499 A1 8/2004 Lind et al.
2004/0152515 A1 8/2004 Wegmuller et al.
2004/0174287 A1 9/2004 Deak
2004/0193413 A1 9/2004 Wilson
2004/0198158 A1 10/2004 Driscoll et al.
2004/0203638 A1 10/2004 Chan
2004/0207597 A1 10/2004 Marks
2004/0214642 A1 10/2004 Beck
2004/0218104 A1 11/2004 Smith
2004/0222969 A1 11/2004 Buchenrieder
2004/0227725 A1 11/2004 Calarco
2004/0229693 A1 11/2004 Lind
2004/0229696 A1 11/2004 Beck

(56) References Cited

U.S. PATENT DOCUMENTS

2004/0236453 A1 11/2004 Szoboszlay
2004/0239626 A1 12/2004 Noguera
2004/0252109 A1 12/2004 Trent et al.
2004/0254020 A1 12/2004 Dragusin
2004/0259651 A1 12/2004 Storek
2004/0268393 A1 12/2004 Hunleth
2005/0017454 A1 1/2005 Endo et al.
2005/0020369 A1 1/2005 Davis
2005/0032582 A1 2/2005 Mahajan et al.
2005/0047621 A1 3/2005 Cranfill
2005/0054457 A1 3/2005 Eyestone
2005/0059488 A1 3/2005 Larsen et al.
2005/0059503 A1 3/2005 Briggs et al.
2005/0060586 A1 3/2005 Burger et al.
2005/0076161 A1 4/2005 Albanna
2005/0085298 A1 4/2005 Woolston
2005/0110751 A1 5/2005 Wilson et al.
2005/0116020 A1 6/2005 Smolucha et al.
2005/0125826 A1 6/2005 Hunleth
2005/0127868 A1 6/2005 Calhoon et al.
2005/0130739 A1 6/2005 Argentar
2005/0134555 A1 6/2005 Liao
2005/0138851 A1 6/2005 Ingraselino
2005/0156883 A1 7/2005 Wilson et al.
2005/0162389 A1 7/2005 Obermeyer
2005/0164601 A1 7/2005 McEachen et al.
2005/0170889 A1 8/2005 Lum et al.
2005/0172734 A1 8/2005 Alsio
2005/0174324 A1 8/2005 Liberty
2005/0176485 A1 8/2005 Ueshima
2005/0179644 A1 8/2005 Alsio
2005/0202866 A1 9/2005 Luciano et al.
2005/0210418 A1 9/2005 Marvit
2005/0210419 A1 9/2005 Kela
2005/0212749 A1 9/2005 Marvit et al.
2005/0212750 A1 9/2005 Marvit et al.
2005/0212751 A1 9/2005 Marvit et al.
2005/0212752 A1 9/2005 Marvit et al.
2005/0212753 A1 9/2005 Marvit et al.
2005/0212754 A1 9/2005 Marvit et al.
2005/0212755 A1 9/2005 Marvit
2005/0212756 A1 9/2005 Marvit et al.
2005/0212757 A1 9/2005 Marvit et al.
2005/0212758 A1 9/2005 Marvit et al.
2005/0212759 A1 9/2005 Marvit et al.
2005/0212760 A1 9/2005 Marvit et al.
2005/0212764 A1 9/2005 Toba
2005/0212767 A1 9/2005 Marvit
2005/0215295 A1 9/2005 Arneson
2005/0215322 A1 9/2005 Himoto et al.
2005/0217525 A1 10/2005 McClure
2005/0227579 A1 10/2005 Yamaguchi et al.
2005/0233808 A1 10/2005 Himoto et al.
2005/0239548 A1 10/2005 Ueshima et al.
2005/0243061 A1 11/2005 Liberty et al.
2005/0243062 A1 11/2005 Liberty
2005/0253806 A1 11/2005 Liberty et al.
2005/0256675 A1 11/2005 Kurata
2005/0277465 A1 12/2005 Whitten et al.
2005/0278741 A1 12/2005 Robarts
2006/0007115 A1 1/2006 Furuhashi
2006/0028446 A1 2/2006 Liberty
2006/0040720 A1 2/2006 Harrison
2006/0046849 A1 3/2006 Kovacs
2006/0092133 A1 5/2006 Touma
2006/0094502 A1 5/2006 Katayama et al.
2006/0122474 A1 6/2006 Teller et al.
2006/0123146 A1 6/2006 Wu et al.
2006/0148563 A1 7/2006 Yang
2006/0152487 A1 7/2006 Grunnet-Jepsen
2006/0152488 A1 7/2006 Salsman
2006/0152489 A1 7/2006 Sweetser
2006/0178212 A1 8/2006 Penzias
2006/0205507 A1 9/2006 Ho
2006/0231794 A1 10/2006 Sakaguchi et al.
2006/0246403 A1 11/2006 Monpouet et al.
2006/0252475 A1 11/2006 Zalewski et al.
2006/0252477 A1 11/2006 Zalewski et al.
2006/0256081 A1 11/2006 Zalewski et al.
2006/0258452 A1 11/2006 Hsu
2006/0264258 A1 11/2006 Zalewski et al.
2006/0264260 A1 11/2006 Zalewski et al.
2006/0267935 A1 11/2006 Corson
2006/0273907 A1 12/2006 Heiman
2006/0282873 A1 12/2006 Zalewski et al.
2006/0284842 A1 12/2006 Poltorak
2006/0287030 A1 12/2006 Briggs et al.
2006/0287085 A1 12/2006 Mao
2006/0287086 A1 12/2006 Zalewski et al.
2006/0287087 A1 12/2006 Zalewski et al.
2007/0015588 A1 1/2007 Matsumoto et al.
2007/0021208 A1 1/2007 Mao et al.
2007/0049374 A1 3/2007 Ikeda et al.
2007/0050597 A1 3/2007 Ikeda
2007/0052177 A1 3/2007 Ikeda et al.
2007/0060391 A1 3/2007 Ikeda et al.
2007/0066394 A1 3/2007 Ikeda et al.
2007/0066396 A1* 3/2007 Weston .................. A63F 13/98
463/39
2007/0072680 A1 3/2007 Ikeda et al.
2007/0082720 A1 4/2007 Bradbury et al.
2007/0087837 A1 4/2007 Bradbury et al.
2007/0087838 A1 4/2007 Bradbury et al.
2007/0087839 A1 4/2007 Bradbury et al.
2007/0091084 A1 4/2007 Ueshima et al.
2007/0093170 A1 4/2007 Zheng
2007/0093291 A1 4/2007 Hulvey
2007/0093293 A1 4/2007 Osnato
2007/0100696 A1 5/2007 Illingworth
2007/0159362 A1 7/2007 Shen
2007/0173705 A1 7/2007 Teller et al.
2007/0252815 A1 11/2007 Kuo
2007/0257884 A1 11/2007 Taira
2007/0265075 A1 11/2007 Zalewski
2007/0265076 A1 11/2007 Lin
2007/0265088 A1 11/2007 Nakada et al.
2008/0015017 A1 1/2008 Ashida et al.
2008/0039202 A1 2/2008 Sawano et al.
2008/0119270 A1 5/2008 Ohta
2008/0121782 A1 5/2008 Hotelling et al.
2008/0174550 A1 7/2008 Laurila
2008/0183678 A1 7/2008 Weston et al.
2008/0273011 A1 11/2008 Lin
2008/0278445 A1 11/2008 Sweester
2009/0009294 A1 1/2009 Kupstas
2009/0033621 A1 2/2009 Quinn
2009/0156309 A1 6/2009 Weston et al.
2009/0203446 A1 8/2009 Bradbury et al.
2009/0215534 A1 8/2009 Wilson et al.
2009/0273560 A1 11/2009 Kalanithi et al.
2009/0326851 A1 12/2009 Tanenhaus
2010/0056285 A1 3/2010 Weston et al.
2010/0105475 A1 4/2010 Mikhailov
2010/0144436 A1 6/2010 Marks et al.
2010/0289744 A1 11/2010 Cohen
2011/0081969 A1 4/2011 Ikeda
2011/0177853 A1 7/2011 Ueshima
2011/0190052 A1 8/2011 Takeda
2013/0116020 A1 5/2013 Barney et al.
2013/0116051 A1 5/2013 Barney et al.
2013/0196727 A1 8/2013 Barney et al.
2013/0196770 A1 8/2013 Barney et al.
2013/0303276 A1 11/2013 Weston et al.
2014/0194206 A1 7/2014 Barney et al.
2014/0235341 A1 8/2014 Barney et al.
2014/0256446 A1 9/2014 Barney et al.
2014/0323221 A1 10/2014 Ikeda
2014/0342831 A1 11/2014 Weston et al.
2014/0378233 A1 12/2014 Weston et al.
2015/0050971 A1 2/2015 Briggs et al.
2015/0094140 A1 4/2015 Barney et al.
2015/0165316 A1 6/2015 Barney et al.
2015/0251100 A1 9/2015 Barney et al.

(56) References Cited

U.S. PATENT DOCUMENTS

| | | | |
|---|---|---|---|
| 2015/0290545 | A1 | 10/2015 | Barney et al. |
| 2015/0328556 | A1 | 11/2015 | Weston |
| 2015/0360125 | A1 | 12/2015 | Barney et al. |

FOREIGN PATENT DOCUMENTS

| | | | |
|---|---|---|---|
| CN | 1338961 | | 3/2002 |
| CN | 1559644 | | 1/2005 |
| DE | 3930581 | | 3/1991 |
| DE | 19701374 | | 7/1997 |
| DE | 19632273 | | 2/1998 |
| DE | 19648487 | | 6/1998 |
| DE | 19814254 | | 10/1998 |
| DE | 19937307 | | 2/2000 |
| DE | 10029173 | | 1/2002 |
| DE | 10219198 | | 11/2003 |
| EP | 0 264 782 | A2 | 4/1988 |
| EP | 0 570 999 | | 12/1988 |
| EP | 0 322 825 | A2 | 7/1989 |
| EP | 0 695 565 | A1 | 2/1996 |
| EP | 0 835 676 | | 4/1998 |
| EP | 0 848 226 | | 6/1998 |
| EP | 0 852 961 | | 7/1998 |
| EP | 1 062 994 | | 12/2000 |
| EP | 1 279 425 | | 1/2003 |
| EP | 1 293 237 | | 3/2003 |
| EP | 0 993 845 | | 12/2005 |
| FR | 2547093 | A1 | 12/1984 |
| GB | 2244546 | | 12/1991 |
| GB | 2284478 | | 6/1995 |
| GB | 2307133 | | 5/1997 |
| GB | 2310481 | | 8/1997 |
| GB | 2316482 | | 2/1998 |
| GB | 2319374 | | 5/1998 |
| GB | 2325558 | A | 11/1998 |
| GB | 2388418 | | 11/2003 |
| JP | 62-14527 | | 1/1987 |
| JP | 63-186687 | | 8/1988 |
| JP | 03-210622 | | 9/1991 |
| JP | 06-050758 | | 2/1994 |
| JP | 6154422 | | 6/1994 |
| JP | 06-198075 | | 7/1994 |
| JP | 6190144 | | 7/1994 |
| JP | H0677387 | | 10/1994 |
| JP | 06-308879 | | 11/1994 |
| JP | 07-028591 | | 1/1995 |
| JP | 07-044315 | | 2/1995 |
| JP | 07-107573 | | 4/1995 |
| JP | 07-115690 | | 5/1995 |
| JP | 07-146123 | | 6/1995 |
| JP | 07-200142 | | 8/1995 |
| JP | 07-262797 | | 10/1995 |
| JP | 07-302148 | | 11/1995 |
| JP | 07-318332 | | 12/1995 |
| JP | 08-095704 | | 4/1996 |
| JP | 08-106352 | | 4/1996 |
| JP | 08-111144 | | 4/1996 |
| JP | 08-114415 | | 5/1996 |
| JP | 08-122070 | | 5/1996 |
| JP | 08-152959 | | 6/1996 |
| JP | 08-191953 | | 7/1996 |
| JP | 08-211993 | | 8/1996 |
| JP | 08-221187 | | 8/1996 |
| JP | 08-305355 | | 11/1996 |
| JP | 08-335136 | | 12/1996 |
| JP | 09-034456 | | 2/1997 |
| JP | 09-149915 | | 6/1997 |
| JP | 09-164273 | | 6/1997 |
| JP | 09-225137 | | 9/1997 |
| JP | 09-230997 | | 9/1997 |
| JP | 09-237087 | | 9/1997 |
| JP | 09-274534 | | 10/1997 |
| JP | 09-319510 | | 12/1997 |
| JP | 10-021000 | | 1/1998 |
| JP | 10-033831 | | 2/1998 |
| JP | 10-043349 | A | 2/1998 |
| JP | 10-099542 | | 4/1998 |
| JP | 10-154038 | | 6/1998 |
| JP | 10-235019 | | 9/1998 |
| JP | 10-254614 | | 9/1998 |
| JP | 11-053994 | | 2/1999 |
| JP | 11-099284 | | 4/1999 |
| JP | 2000-176150 | | 6/2000 |
| JP | 2000-208756 | | 7/2000 |
| JP | 2000-270237 | | 9/2000 |
| JP | 2000-300839 | | 10/2000 |
| JP | 2000-308756 | | 11/2000 |
| JP | 2000-325653 | | 11/2000 |
| JP | 2001-038052 | | 2/2001 |
| JP | 2001-058484 | | 3/2001 |
| JP | 2001-104643 | | 4/2001 |
| JP | U20009165 | | 4/2001 |
| JP | 2001-175412 | | 6/2001 |
| JP | 2001-251324 | | 9/2001 |
| JP | 2001-265521 | | 9/2001 |
| JP | 2001-306245 | | 11/2001 |
| JP | 2002-007057 | | 1/2002 |
| JP | 2002-062981 | | 2/2002 |
| JP | 2002-78969 | | 3/2002 |
| JP | 2002-082751 | | 3/2002 |
| JP | 2002-091692 | | 3/2002 |
| JP | 2002-126375 | | 5/2002 |
| JP | 2002-136694 | | 5/2002 |
| JP | 2002-153673 | | 5/2002 |
| JP | 2002-202843 | | 7/2002 |
| JP | 2002-224444 | | 8/2002 |
| JP | 2002-233665 | | 8/2002 |
| JP | 2002-298145 | | 10/2002 |
| JP | 2003-053038 | | 2/2003 |
| JP | 2003-140823 | | 5/2003 |
| JP | 2003-208263 | | 7/2003 |
| JP | 2003 236246 | | 8/2003 |
| JP | 2003-325974 | | 11/2003 |
| JP | 2004-062774 | | 2/2004 |
| JP | 2004-313429 | | 11/2004 |
| JP | 2004-313492 | | 11/2004 |
| JP | 2005-040493 | | 2/2005 |
| JP | 2005-063230 | | 3/2005 |
| JP | 2006-113019 | | 4/2006 |
| JP | 2006-136694 | | 6/2006 |
| JP | 2006-216569 | | 8/2006 |
| JP | 2007-083024 | | 4/2007 |
| JP | 4043702 | | 2/2008 |
| NL | 9300171 | | 8/1994 |
| RU | 2077358 | C1 | 4/1997 |
| RU | 2125853 | | 2/1999 |
| RU | 2126161 | | 2/1999 |
| WO | WO 90/07961 | | 7/1990 |
| WO | WO 94/02931 | | 3/1994 |
| WO | WO 95/11730 | A1 | 5/1995 |
| WO | WO 96/05766 | | 2/1996 |
| WO | WO 96/14115 | | 5/1996 |
| WO | WO 96/14121 | | 5/1996 |
| WO | WO 97/09101 | | 3/1997 |
| WO | WO 97/12337 | | 4/1997 |
| WO | WO 97/17598 | | 5/1997 |
| WO | WO 97/20305 | | 6/1997 |
| WO | WO 97/28864 | | 8/1997 |
| WO | WO 97/32641 | | 9/1997 |
| WO | WO 98/11528 | | 3/1998 |
| WO | WO 98/36400 | | 8/1998 |
| WO | WO 99/58214 | | 11/1999 |
| WO | WO 00/33168 | | 6/2000 |
| WO | WO 00/35345 | | 6/2000 |
| WO | WO 00/61251 | A1 | 10/2000 |
| WO | WO 00/63874 | | 10/2000 |
| WO | WO 00/67863 | | 11/2000 |
| WO | WO 01/46916 | A2 | 6/2001 |
| WO | WO 01/87426 | | 11/2001 |
| WO | WO 01/91042 | | 11/2001 |
| WO | WO 02/17054 | | 2/2002 |
| WO | WO 02/34345 | | 5/2002 |
| WO | WO 02/47013 | | 6/2002 |

(56) References Cited

FOREIGN PATENT DOCUMENTS

| | | | |
|---|---|---|---|
| WO | WO 03/015005 | | 2/2003 |
| WO | WO 03/043709 | | 5/2003 |
| WO | WO 03/044743 | A2 | 5/2003 |
| WO | WO 03/088147 | | 10/2003 |
| WO | WO 03/107260 | | 12/2003 |
| WO | WO 2004/039055 | | 5/2004 |
| WO | WO 2004/051391 | | 6/2004 |
| WO | WO 2004/087271 | | 10/2004 |
| WO | WO 2006/039339 | | 4/2006 |
| WO | WO 2006/101880 | | 9/2006 |
| WO | WO 2007/058996 | | 5/2007 |
| WO | WO 2007/120880 | | 10/2007 |

OTHER PUBLICATIONS

"Emerald Forest Toys" [online] [retrieved on Sep. 14, 2005], retrieved from Internet <URL:http://www.pathworks.net/print_eft.html>.
Boulanger et al., "The 1997 Mathews Radio Baton and Improvisation Modes," Music Synthesis Department, Berklee College of Music (1997).
Complainants' Petition for Review, dated Sep. 17, 2012.
Complainants' Response to Commission's Request for Statements on the Public Interest, dated Oct. 10, 2012.
Complainants' Response to Respondents' Petition for Review, dated Sep. 25, 2012.
*Creative Kingdoms LLC* v. *ITC*, The United States Court of Appeals for the Federal Circuit, No. 2014-1072, dated Dec. 19, 2014.
Exintaris, et al., "Ollivander's Magic Wands : HCI Development," available at http://www.cim.mcgill.ca/~jer/courses/hci/project/2002/www.ece.mcgill.ca/%257Eeurydice/hci/notebook/final/MagicWand.pdf (2002).
Expert Report of Branimir R. Vojcic, Ph.D. on Behalf of Complainants Creative Kingdoms, LLC and New ingdoms, LLC, dated Nov. 17, 2011.
Expert Report of Kenneth Holt on Behalf of Respondents Nintendo of America, Inc. and Nintendo Co., Ltd., dated Nov. 3, 2011.
Expert Report of Nathaniel Polish, Ph.D. on Behalf of Respondents Nintendo of America, Inc. and Nintendo Co., Ltd., dated Nov. 3, 2011.
IGN Article—Mad Catz Rumble Rod Controller, Aug. 20, 1999.
Initial Determination on Violation of Section 337 and Recommended Determination on Rememdy and Bond, dated Aug. 31, 2012.
Marrin, Teresa, "Toward an Understanding of Musical Gesture: Mapping Expressive Intention with the Digital Baton," Masters Thesis, Massachusetts Institute of Technology, Program in Media Arts and Sciences (1996).
Nintendo N64 Controller Pak Instruction Booklet, 1997.
Paradiso, et al., "Musical Applications of Electric Field Sensing", available at http://pubs.media.mit.edu/pubs/papers/96_04_cmj.pdf (1996).
Paradiso, Joseph A., "The Brain Opera Technology: New Instruments and Gestural Sensors for Musical Interaction and Performance" (Nov. 1998) (electronic copy available at http://pubs.media.mit.edu/pubs/papers/98_JNMR_Brain_Opera.pdf).
Petition of the Office of Unfair Import Investigations for Review-In-Part of the Final Initial Determination, dated Sep. 17, 2012.
Pre-Hearing Statement of Complainants Creative Kingdoms, LLC and New Kingdoms, LLC, dated Jan. 13, 2012.
Public Version of Commission Opinion from United States International Trade Commission, dated Oct. 28, 2013.
Respondents Nintendo Co., Ltd. and Nintendo of America Inc.'s Contingent Petition for Review of Initial Determination, dated Sep. 17, 2012.
Respondents Nintendo Co., Ltd. and Nintendo of America Inc.'s Objections and Supplemental Responses to Complainants Creative Kingdoms, LLC and New Kingdoms, LLC's Interrogatory Nos. 35, 44, 47, 53, and 78, dated Oct. 13, 2011.
Respondents Nintendo Co., Ltd. and Nintendo of America Inc.'s Response to Complainants' and Staff's Petitions for Review, dated Sep. 25, 2012.
Response of the Office of Unfair Import Investigations to the Petitions for Review, dated Sep. 25, 2012.
Response to Office Action dated Sep. 18, 2009 for U.S. Appl. No. 11/404,844.
Specification of the Bluetooth System—Core v1.0b, Dec. 1, 1999.
Verplaetse,"Inertial Proprioceptive Devices: Self-Motion Sensing Toys and Tools," IBM Systems Journal, vol. 35, Nos. 3&4 (Sep. 1996).
"At-home fishing", http:www.virtualpet.com/vp/media/fishing/homef.jpg (accessed on Jan. 14, 2010).
"Coleco Vision: Super Action™ Controller Set," www.vintagecomputing.com/wp-content/images/retroscan/coleco_sac_1_large.jpg. (downloaded from Internet on Sep. 2, 2011; available at http://www.vintagecomputing.com on Sep. 4, 2006).
"Controllers—Atari Space Age Joystic," AtariAge: Have You Played Atari Today? www.atariage.com/controller_page.html?SystemID=2600& ControllerID-12., Sep. 1, 2006.
"Controllers—Booster Grip, AtariAge: Have You Played Atari Today?" www.atariage.com/controller_page.html?SystemID=2600& ControllerID=18., (accessed on Jul. 29, 2011; allegedly available as early as Sep. 1, 2006).
"Electronic Plastic: BANDAI—Power Fishing" "Power Fishing Company: BANDAI," 1 page, http://www.handhelden.com/Bandai/PowerFishing.html., 1984 (accessed on Jul. 29, 2011).
"Game Controller" Wikipedia, Jan. 5, 2005.
"Get Bass," Videogame by Sega, The International Arcade Museum and the KLOV (accessed at http://www.arcade-museum.com/game_detail.php?game_id=7933 on Jul. 29, 2011).
"Glove-based input interfaces" Cyberglove/Cyberforce, http://www.angelfire.com/ca7/mellott124/glove1.htm (accessed on Jul. 29, 2011).
"Harry Potter Magic Spell Challenge," Tiger Electronics, 2001.
"Imp Coexists With Your Mouse," Byte, p. 255, Jan. 1994.
"MEMS enable smart golf clubs," Small Times, Jan. 6, 2005, accessed at http://dpwsa.electroiq.com/index/display/semiconductors-article-display/269788/articles/small-times/consumer/2005/01/mems-enable-smart-golf-clubs.html on Jul. 29, 2011.
"Miacomet and Interact Announce Agreement to Launch Line of Reel Feel™ Sport Controllers", PR Newswire (May 13, 1999), accessed at http://www.thefreelibrary.com/_print/PrintArticle.aspx?id=54621351 on Sep. 7, 2011.
"The N.I.C.E. Project," YouTube video uploaded by evltube on Nov. 20, 2007 (accessed at http://www.youtube.com/watch?v=ihGXa21qLms on Sep. 8, 2011; digital copy of video available upon request).
"212 Series Encoders" HT12A/HT12E by HOLTEK—Product Specification, Apr. 2000.
"212 Series of Decoders" HT12D/HT12F by HOLTEK—Product Specification, Nov. 2002.
"ASCII Entertainment releases the Grip," ASCII Entertainment Software—Press News—Coming Soon Magazine, May 1997 (electronic version accessed at http://www.csoon.com/issue25/p_ascii4.htm on Sep. 6, 2011).
"Enchanted Spell-Casting Sorcerers Wand" by Ken Holt as featured on www.inventionconnection.com online advertisement, Dec. 2002.
"Interview with Pat Goschy, the "Real" Nintendo Wii Inventor," YouTube video uploaded by agbulls on Jan. 14, 2008 (accessed at http://www.youtube.com/watch?v=oKtZysYGDLE on Feb. 11, 2011; digital copy of video available upon request).
"Micro Tilt Switch" D6B by Omron® Product Specification, Jan. 2007.
"Nintendo Wii Controller Invented by Americans: Midway Velocity Controller Technology Brief," You Tube Video presentation dated Jun. 28, 2000; uploaded by drjohniefever on Sep. 8, 2007 (accessed at http://www.youtube.com/watch?v=wjLhSrSxFNw on Jun. 30, 2010; digital copy of video available upon request).
"Raise High the 3D Roof Beam: Kids shape these PC games as they go along." by Anne Field, article as featured in Business Week 2001. (Nov. 26, 2001).

(56) References Cited

OTHER PUBLICATIONS

"Serial-in Parallel-out Shift Register" SN54/74LS164 by Motorola—Product Specification, Fifth Edition, 1992.
"Sony PS2 Motion Controller 5 years ago (2004)," YouTube Video uploaded by r1oot on Jul. 8, 2009 (accessed at http://www.youtube.com/watch?v=JbSzmRt7HhQ&feature=related on Sep. 6, 2011; digital video available upon request).
"The Big Ideas Behind Nintendo's Wii," Business Week, Nov. 16, 2006 (accessed at http://www.businessweek.com/technology/content/nov2006/tc20061116_750580.htm on Aug. 31, 2011).
"The Magic Labs Conjure Wands" as featured on www.magic-lab.com Product Specification, Dec. 2002.
"Tilt Switch" by Fuji & Co. as featured on www.fuji-piezo.com online advertisement, May 2001.
"Toy Wand Manufacturer Selects MEMSIC Sensor: Magic Labs cuts costs with MEMSIC sensor" Press Release by MEMSIC, Inc. as featured on www.memsic.com, May 2002.
"Wii Mailbag," IGN.com, Jan. 26, 2006 (accessed at http://uk.wii.ign.com/mail/2006-01-26.html on Aug. 31, 2011).
Acar, et al., "Experimental evaluation and comparative analysis of commercial variable-capacitance MEMS accelerometers," Journal of Micromechanics and Microengineering, vol. 13 (1), pp. 634-645, May 2003.
Achenbach, "Golf's New Measuring Stick," Golfweek, 1 page., Jun. 11, 2005.
Act Labs, Miacomet Background, Jan. 27, 2001, http://web.archive.org/web/200101271753/http://www.act-labs.com/ realfeel_background.htm, (accessed on Sep. 7, 2011).
Agard, "Advances in Strapdown Inertial Systems," Agard Lecture Series No. 133, Advisory Group for Aerospace Research and Development, Neuilly-Sur-Seine (France) May 1984.
AirPad Controller Manual, (AirPad Corp. 2000).
Airpad Motion Reflex Controller for Sony Playstation—Physical Product, (AirPad Corp. 2000).
Algrain, "Estimation of 3-D Angular Motion Using Gyroscopes and Linear Accelerometers," IEEE Transactions on Aerospace and Electronic Systems, vol. 27, No. 6, pp. 910-920, Nov. 1991.
Algrain, et al., "Accelerometer Based Line-of-Sight Stabilization Approach for Pointing and Tracking System," Second IEEE Conference on Control Applications, Sep. 13-16, 1993 Vancouver, B.C.., pp. 159-163 Sep. 13-16, 1993.
Algrain, et al., "Interlaced Kalman Filtering of 3-D Angular Motion Based on Euler's Nonlinear Equations," IEEE Transactions on Aerospace and Electronic Systems, vol. 30, No. 1, Jan. 1994.
Allen, et al., "A General Method for Comparing the Expected Performance of Tracing and Motion Capture Systems," {VRST} '05: Proceedings of the ACM Symposium on Virtual Reality Software and Technology, Nov. 7-9, 2005 Monterey, California Nov. 7-9, 2005.
Allen, et al., "Tracking: Beyond 15 Minutes of Thought," SIGGRAPH 2001 Course 11, Aug. 2001.
Analog Devices "ADXL202E Low-Cost .+-.2 g Dual-Axis Accelerometer with Duty Cycle Output" Data Sheet, Rev. A, Oct. 2000.
Analog Devices "ADXL330 Small, Low Power, 3-Axis ±2 g iMEMS Accelerometer" Data Sheet, Rev. PrA Oct. 2005.
Analog Devices "ADXL50 Monolithic Accelerometer with Signal Conditioning" Data Sheet Mar. 1996.
Analog Devices "ADXRS150±150°/s Single Chip Yaw Rate Gyro with Signal Conditioning" Data Sheet, Rev. B, Mar. 2004.
Analog Devices "ADXRS401 ±75°/s Single Chip Yaw Rate Gyro with Signal Conditioning" Data Sheet, Rev. O, Jul. 2004.
Analog Devices "MicroConverter®, Multichannel 12-Bit ADC with Embedded Flash MCU, ADuC812" Data Sheet (Feb. 2003), available at http://www.analog.com/static/imported-files/data_sheets/ADUC812.pdf.
Analog Devices, "ADXL150/ADXL250, ±5g to ±50g, Low Noise, Low Power, Single/Dual Axis iMEMS® Accelerometers," Data Sheet, Rev. 0 (Apr. 1998).
Ang, et al., "Design and Implementation of Active Error Canceling in Hand-held Microsurgical Instrument," Paper presented at 2001 IEEE/RSJ International Conference on Intelligent Robots and Systems (Oct./Nov. 2001).
Ang, et al., "Design of All-Accelerometer Inertial Measurement Unit for Tremor Sensing in Hand-held Microsurgical Instrument," Proceedings of the 2003 IEEE International Conference on Robotics & Automation, Sep. 14-19, 2003, Taipei, Taiwan, pp. 1781-1786, Sep. 14-19, 2003.
Apostolyuk, Vladislav, "Theory and Design of Micromechanical Vibratory Gyroscopes," MEMS/NEMS Handbook, Springer, vol. 1, pp. 173-195 (May 2006).
Ascension Technology, 6D Bird Class B Installation and Operation Guide, Apr. 30, 2003.
ASCII, picture of one-handed controller, 2 pages, Feb. 6, 2006.
Ator, "Image-Velocity Sensing with Parallel-Slit Reticles," Journal of the Optical Society of America, vol. 53, No. 12, pp. 1416-1422, Dec. 1963.
Azarbayejani, et al, "Real-Time 3-D Tracking of the Human Body," M.I.T. Media Laboratory Perceptual Computing Section Technical Report No. 374, Appears in Proceedings of Image'Com 96, Bordeaux, France, May 1996.
Azarbayejani, et al., "Visually Controlled Graphics," M.I.T. Media Laboratory Perceptual Computing Section Technical Report No. 374, Appears in IEEE Transactions on Pattern Analysis and Machine Intelligence, vol. 15, No. 6, pp. 602-605, Jun. 1993.
Azuma et al., "Improving Static and Dynamic Registration in an Optical See-Through HMD," Paper Presented at SIGGRAPH '94 Annual Conference in Orlando, FL, Mar. 1994.
Azuma, "Predictive Tracking for Augmented Reality," Ph.D. Dissertation, University of North Carolina at Chapel Hill, Department of Computer Science, Feb. 1995.
Azuma, et al., "A Frequency-Domain Analysis of Head-Motion Prediction," Paper Presented at SIGGRAPH '95 Annual Conference in Los Angeles, CA, Feb. 1995.
Azuma, et al., "A motion-stabilized outdoor augmented reality system," Proceedings of IEEE Virtual Reality '99, Houston, TX, Mar. 13-17, 1999, pp. 252-259.
Azuma, et al., "Making Augmented Reality Work Outdoors Requires Hybrid Tracking," Proceedings of the International Workshop on Augmented Reality, San Francisco, CA, Nov. 1, 1998.
Bachmann et al., "Inertial and Magnetic Posture Tracking for Inserting Humans into Networked Virtual Environments," Virtual Reality Software and Technology archive, Paper Presented at ACM Symposium on Virtual Reality Software and Technology in Banff, Alberta, Canada, Dec. 2000.
Bachmann et al., "Orientation Tracking for Humans and Robots Using Inertial Sensors" Paper Presented at 199 International Symposium on Computational Intelligence in Robotics & Automation (CIRA '99), Mar. 1999.
Bachmann, "Inertial and Magnetic Angle Tracking of Limb Segments for Inserting Humans into Synthetic Environments," Dissertation, Naval Postgraduate School, Monterey, CA (Dec. 2000).
Badler, et al., "Multi-Dimensional Input Techniques and Articulated Figure Positioning by Multiple Constraints," Interactive 3D Graphics, Oct. 1986; pp. 151-169.
Baker et al., "Active Multimodal Control of a 'Floppy' Telescope Structure," Proc. SPIE, vol. 4825, pp. 74-81 (2002).
Balakrishnan, "The Rockin' Mouse: Integral 3D Manipulation on a Plane," Published in Proceedings of 1997 ACM Conference on Human Factors in Computing Systems (CHI'97), pp. 311-318, Jun. 1997.
Ballagas, et al., "iStuff: A Physical User Interface Toolkit for Ubiquitous Computer Environments," Paper presented at SIGCHI Conference on Human Factors in Computing Systems, Apr. 2003.
Baraff, "An Introduction to Physically Based Modeling: Rigid Body Simulation I—Unconstrained Rigid Body Dynamics," SIGGRAPH 97 Course Notes, Robotics Institute, Carnegie Mellon University (Aug. 1997).
Baudisch, et al., "Soap: a Pointing Device that Works in Mid-air," Proc. UIST'06, Oct. 15-18, 2006, Montreux, Switzerland (Oct. 2006).

(56) References Cited

OTHER PUBLICATIONS

BBN Report No. 7661, "Virtual Environment Technology for Training (VETT)," The Virtual Environment and Teleoperator Research Consortium (VETREC), pp. III-A-27 to III-A-40 (Mar. 1992).
Behringer, "Improving the Registration Precision by Visual Horizon Silhouette Matching," Paper presented at First IEEE Workshop on Augmented Reality (Feb. 1998).
Behringer, "Registration for Outdoor Augmented Reality Applications Using Computer Vision Techniques and Hybrid Sensors," Paper presented at IEEE Virtual Reality (VR '99) Conference in Houston, TX (Mar. 1999).
BEI GyrochipTM Model QRS11 Data Sheet, BEI Systron Donner Inertial Division, BEI Technologies, Inc., (Sep. 1998).
Benbasat, "An Inertial Measurement Unit for User Interfaces," Massachusetts Institute of Technology Masters Thesis, (Sep. 2000).
Benbasat, et al., "An Inertial Measurement Framework for Gesture Recognition and Applications," Paper Presented at International Gesture Workshop on Gesture and Sign Languages in Human-Computer Interaction (GW '01), London, UK (Sep. 2001).
Bhatnagar, "Position trackers for Head Mounted Display systems: A survey" (Technical Report), University of North Carolina at Chapel Hill (Mar. 1993).
Bianchi, "A Tailless Mouse, New cordless Computer Mouse Invented by ArcanaTech," Inc.com, Jun. 1, 1992 (accessed at http://www.inc.com/magazine/19920601/4115.html on Jun. 17, 2010).
Bishop, "The Self-Tracker: A Smart Optical Sensor on Silicon," Ph.D. Dissertation, Univ. of North Carolina at Chapel Hill (1984), 65 pages.
Bjork, Staffan et al., "Pirates! Using the Physical World as a Game Board," Reportedly presented as part of INTERACT 2001: 8th TC.13 IFIP International Conference on Human-Computer Interaction, Tokyo Japan (Jul. 9-13, 2001).
Bluffing Your Way in Pokemon, Oct. 14, 2002, 7 pages.
Bona, et al., "Optimum Reset of Ship's Inertial Navigation System," IEEE Transactions on Aerospace and Electronic Systems, Abstract only (1965) (accessed at http://oai.dtic.mil/oai/oai?verb=getRecord&metadataPrefix=html&identifier=AD0908193 on Jun. 17, 2010).
Borenstein, et al., "Where am I? Sensors and Methods for Mobile Robot Positioning" (Apr. 1996).
Borovoy, R. , et al., "Things that Blink: Computationally Augmented Name Tags," IBM Systems Journal, vol. 35, Nos. 3 & 4, 1996; pp. 488-495 (May 1996).
Borovoy, Richard et al., "Groupwear: Nametags That Tell About Relationships," Chi 98, Apr. 1998, pp. 329-330.
Boser, "3-Axis Accelerometer with Differential Sense Electronics," Berkeley Sensor & Actuator Center, available at http://www.eecs.berkeley.edu/.about.boser/pdf/3axis.pdf (Feb. 1997).
Boser, "Accelerometer Design Example: Analog Devices XL-05/5," Berkeley Sensor & Actuator Center, available at http://wvvw.eecs.berkeley.edu/.about.boser/pdf/xI05.pdf (1996).
Bowman, et al., "An Introduction to 3-D User Interface Design," MIT Presence, vol. 10, No. 1, pp. 96-108 (Feb. 2001).
Briefs, (New & Improved), (Brief Article), PC Magazine, Oct. 26, 1993.
Britton et al., "Making Nested Rotations Convenient for the User," SIGGRAPH '78 Proceedings of the 5th Annual Conference on Computer Graphics and Interactive Techniques, vol. 12, Issue 3, pp. 222-227 (Aug. 1978).
Britton, "A Methodology for the Ergonomic Design of Interactive Computer Graphic Systems, and its Application to Crystallography" Ph.D. Dissertation, University of North Carolina at Chapel Hill, Dept. of Computer Science (1977).
Brownell, Richard, Review: Peripheral-GameCube-G3 Wireless Controller, gamesarefun.com, Jul. 13, 2003 (accessed at http://www.gamesarefun.com/gamesdb/perireview.php?perireviewid=1 on Jul. 29, 2011).
Buchanan, Levi: "Happy Birthday, Rumble Pak," IGN.com, Apr. 3, 2008 (accessed at http://retro.ign.com/articles/864/864231p1.html on Jul. 29, 2011).
Business Wire, "Feature/Virtual reality glasses that interface to Sega channel,Time Warner, TCI; project announced concurrent with COMDEX," Nov. 14, 1994 (accessed at http://findarticles.com/p/articles/mi_m0EIN/is_1994_Nov_14/ai_15923497/?tag=content;col1 on Jul. 7, 2010).
Business Wire, "Free-space 'Tilt' Game Controller for Sony Playstation Uses Scenix Chip; SX Series IC Processes Spatial Data in Real Time for On-Screen," Dec. 6, 1999 (accessed at http://findarticles.com/p/articles/mi_m0EIN/is_1999_Dec_6/ai_58042965/?tag=content;col1 on Jul. 7, 2010)).
Business Wire, "Logitech MAGELLAN 3D Controller," Apr. 14, 1997 (accessed at http://www.thefreelibrary.com/_/print/PrintArticle.aspx?id=19306114 on Feb. 10, 2011).
Business Wire, "Mind Path Introduces GYROPOINT RF Wireless Remote," Jan. 27, 2000 (accessed at http://www.allbusiness.com/company-activities-management/operations-office/6381880-1.html on Jun. 17, 2010).
Business Wire, "Pegasus' Wireless PenCell Writes on Thin Air with ART's Handwriting Recognition Solutions," Business Editors/High Tech Writers Telecom Israel 2000 Hall 29, Booth 19-20, Nov. 7, 2000 (accessed at http://www.highbeam.com/doc/1G1-66658008.html on Jun. 17, 2010).
Business Wire, "RPI ships low-cost pro HMD Plus 3D Mouse and VR PC graphics card system for CES," Jan. 9, 1995 (accessed at http://www.highbeam.com/doc/1G1-16009561.html on Jun. 17, 2010).
Business Wire, "InterSense Inc. Launches InertiaCube2—The World's Smallest Precision Orientation Sensor with Serial Interface," Aug. 14, 2001 (accessed at http://www.highbeam.com/doc/1G1-77183067.html/print on Sep. 7, 2011.).
Buxton et al., "A Study in Two-Handed Input," Proceedings of CHI '86, pp. 321-326 (1986) (accessed at http://www.billbuxton.com/2hands.html on Jul. 29, 2011).
Buxton, Bill, "A Directory of Sources for Input Technologies" (last updated Apr. 19, 2001), http://web.archive.org/web/20010604004849/http://www.billbuxton.com/InputSources.html (accessed on Sep. 8, 2011).
Buxton, Bill, "Human input/output devices," In M. Katz (ed.), Technology Forecast: 1995, Menlo Park, CA: Price Waterhouse World Firm Technology Center, pp. 49-65 (Sep. 1994).
Canaday, "R67-26 The Lincoln Wand," IEEE Transactions on Electronic Computers, vol. EC-16, No, 2, p. 240 (Apr. 1967) (downloaded from IEEE Xplore on Jul. 7, 2010).
Caruso, "Application of Magnetoresistive Sensors in Navigation Systems," Sensors and Actuators, SAE SP-1220, pp. 15-21 (Feb. 1997); text of article accessed at http://www.ssec.honeywell.com/position-sensors/datasheets/sae.pdf.
Caruso, "Applications of Magnetic Sensors for Low Cost Compass Systems," Honeywell, SSEC, Paper presented at IEEE 2000 Position Location and Navigation Symposium (Mar. 2000), accessed at http://www.ssec.honeywell.com/magnetic/datasheets/lowcost.pdf.
Caruso, et al., "A New Perspective on Magnetic Field Sensing," Sensors Magazine, Dec. 1, 1998 (accessed at http://www.sensorsmag.com/sensors/electric-magnetic/a-new-perspective-magnetic-field-sensing-855 on Jun. 17, 2010).
Caruso, et al., "Vehicle Detection and Compass Applications using AMR Magnetic Sensors", Paper presented at 1999 Sensors Expo in Baltimore, Maryland (May 1999), available at http://masters.donntu.edu.ua/2007/kita/gerus/library/amr.pdf.
Chatfield, "Fundamentals of High Accuracy Inertial Navigation," vol. 174 Progress in Astronautics and Aeronautics, American Institute of Aeronautics and Astronautics, Inc. (1997).
Cheng, "Direct interaction with Large-Scale Display Systems using Infrared Laser Tracking Devices," Paper presented at Australasian Symposium on Information Visualisation, Adelaide, Australia (Jan. 2003).
Cheok, et al., "Micro-Accelerometer Based Hardware Interfaces for Wearable Computer Mixed Reality Applications," 6th International Symposium on Wearable Computers (ISWC'02), 8 pages.
Cho, et al., "Magic Wand: A Hand-Drawn Gesture Input Device in 3-D Space with Inertial Sensors," Proceedings of the 9th Intl Workshop on Frontiers in Handwriting Recognition (IWFHR-9 2004), IEEE (Aug. 2004).

(56) References Cited

OTHER PUBLICATIONS

Clark, James H., "Designing Surfaces in 3-D," Graphics and Image Processing—Communications of the ACM, Aug. 1976; vol. 19; No. 8; pp. 454-460.
Clark, James H., "Three Dimensional Man Machine Interaction," Siggraph '76, Jul. 14-16, Philadelphia, Pennsylvania, 1 page.
CNet News.com, "Nintendo Wii Swings Into Action," May 25, 2006 (accessed at http://news.cnet.com/2300-1043_3-6070295-4.html on Aug. 5, 2011).
Cooke, et al., "NPSNET: Flight simulation dynamic modeling using quaternions," Presence, vol. 1, No. 4, pp. 404-420, (Jan. 25, 1994).
Crecente, Brian, "Motion Gaming Gains Momentum," kotaku.com, Sep. 17, 2010 (accessed at http://kotaku.com/5640867/motion-gaming-gains-momentum on Aug. 31, 2011).
CSIDC Winners—"Tablet-PC Classroom System Wins Design Competition," IEEE Computer Society Press, vol. 36, Issue 8, pp. 15-18, IEEE Computer Society, Aug. 2003.
Cutrone, "Hot products: Gyration GyroPoint Desk, GyroPoint Pro gyroscope-controlled wired and wireless mice," Results from the Comdex Show Floor, Computer Reseller News, Dec. 4, 1995 (accessed from LexisNexis research database on Feb. 17, 2011; see pp. 8 and 9 of reference submitted herewith).
Deering, Michael F. , "HoloSketch A Virtual Reality Sketching Animation Tool," ACM Transactions on Computer-Human Interaction, Sep. 1995; vol. 2, No. 3; pp. 220-238.
Deruyck, et al., "An Electromagnetic Position Sensor," Polhemus Navigation Sciences, Inc., Burlington, VT (Nov. 1973) (Abstract from DTIC Online).
Dichtburn, "Camera in Direct3D" Toymaker (Feb. 6, 2005), http://web.archive.org/web/20050206032104/http:/toymaker.info/games/html/camera.html (accessed on Jul. 29, 2011).
Digital ID Cards The next generation of 'smart' cards will have more than a one-track mind. Wall Street Journal, Jun. 25, 2001.
Donelson, et al., "Spatial Management of Information", Proceedings of 1978 ACM SIGGRAPH Conference in Atlanta, Georgia, pp. 203-209 (Aug. 1977).
Druin et al., Robots: Exploring New Technologies for Learning for Kids; 2000; Chapter One: To Mindstorms and Beyond; 27 pages (Jun. 2000).
Drzymala, Robert E., et al., "A Feasibility Study Using a Stereo-Optical Camera System to Verify Gamma Knife Treatment Specification," Proceedings of 22nd Annual EMBS International Conference, Jul. 2000; pp. 1486-1489.
Durlach, et al., "Virtual Reality: Scientific and Technological Challenges," National Academy Press (1995).
Emura, et al., "Sensor Fusion based Measurement of Human Head Motion," 3rd IEEE International Workshop on Robot and Human Communication (Jul. 1994).
Ewalt, David M., "Nintendo's Wii is a Revolution," Review, Forbes.com, Nov. 13, 2006 (accessed at http://www.forbes.com/2006/11/13/wii-review-ps3-tech-media-cx_de_1113wii.html on Jul. 29, 2011).
Ferrin, "Survey of Helmet Tracking Technologies," Proc. SPIE vol. 1456, p. 86-94 (Apr. 1991).
Fielder, Lauren "E3 2001: Nintendo unleashes GameCube software, a new Miyamoto game, and more," GameSpot, May 16, 2001 (accessed at http://www.gamespot.com/news/2761390/e3-2001-nintendo-unleashes-gamecube-software-a-new-miyamoto-game-and-more?tag=gallery_summary%3Bstory on Jul. 29, 2011).
U.S. Appl. No. 09/520,148, filed Mar. 7, 2000 by Miriam Mawle.
Foremski, T., "Remote Control Mouse Aims at Interactive TV" Electronics Weekly, Mar. 9, 1994.
Foxlin, "Head-tracking Relative to a Moving Vehicle or Simulator Platform Using Differential Inertial Sensors," Proceedings of Helmet and Head-Mounted Displays V, SPIE vol. 4021, AeroSense Symposium, Orlando, FL, Apr. 24-25, 2000 (2000).
Foxlin, "Inertial Head Tracker Sensor Fusion by a Complementary Separate-bias Kalman Filter," Proceedings of the IEEE 1996 Virtual Reality Annual International Symposium, pp. 185-194, 267 (Mar./Apr. 3, 1996).
Foxlin, "Generalized architecture for simultaneous localization, auto-calibration, and map-building," IEEE/RSJ Conf. on Intelligent Robots and Systems (IROS 2002), Oct. 2-4, 2002, Lausanne, Switzerland (Oct. 2002).
Foxlin, "Motion Tracking Requirements and Technologies," Chapter 8, from Handbook of Virtual Environment Technology, Kay Stanney, Ed., Lawrence Erlbaum Associates (Jan. 2002) (extended draft version available for download at http://www.intersense.com/pages/44/119/).
Foxlin, "Pedestrian Tracking with Shoe-Mounted Inertial Sensors," IEEE Computer Graphics and Applications, vol. 25, No. 6, pp. 38-46, (Nov./Dec. 2005).
Foxlin, et al., "An Inertial Head-Orientation Tracker with Automatic Drift Compensation for Use with HMD's," Proceedings of the 1994 Virtual Reality Software and Technology Conference, Aug. 23-26, 1994, Singapore, pp. 159-173 (1994).
Foxlin, et al., "Constellation™: A Wide-Range Wireless Motion-Tracking System for Augmented Reality and Virtual Set Applications," ACM SIGGRAPH 98, Orlando, Florida, Jul. 19-24, 1998 (1998).
Foxlin, et al., "Miniature 6-DOF Inertial System for Tracking HMDs," SPIE vol. 3362, Helmet and Head-Mounted Displays III, AeroSense 98, Orlando, FL, Apr. 13-14, 1998 (1998).
Foxlin, et al., "WearTrack: A Self-Referenced Head and Hand Tracker for Wearable Computers and Portable VR," Proceedings of International Symposium on Wearable Computers (ISWC 2000), Oct. 16-18, 2000, Atlanta, GA (2000).
Foxlin, et al., "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality (ISMAR 2004), Nov. 2-5, 2004, Washington, D.C. (2004).
Foxlin, et al., "Miniaturization, Calibration & Accuracy Evaluation of a Hybrid Self-Tracker," IEEE/ACM International Symposium on Mixed and Augmented Reality (ISMAR 2003), Oct. 7-10, 2003, Tokyo, Japan (2003).
Foxlin, et al., "VIS-Tracker: A Wearable Vision-Inertial Self-Tracker," IEEE VR2003, Mar. 22-26, 2003, Los Angeles, CA (2003).
Frankle, "E3 2002: Roll O Rama," Roll-o-Rama GameCube Preview at IGN, May 23, 2002 (accessed at http://cube.ign.com/articles/360/360662p1.html on Sep. 7, 2011).
Friedmann, et al., "Device Synchronization Using an Optimal Linear Filter," SI3D '92: Proceedings of the 1992 symposium on Interactive 3D graphics, pp. 57-62 (Mar./Apr. 1992).
Friedmann, et al., "Synchronization in virtual realities," M.I.T. Media Lab Vision and Modeling Group Technical Report No. 157, Jan. 1991 to appear in Presence, vol. 1, No. 1, MIT Press, Cambridge, MA (1991).
FrontSide Field Test, "Get This!" Golf Magazine, Jun. 2005, p. 36.
Fuchs, Eric, "Inertial Head-Tracking," MS Thesis, Massachusetts Institute of Technology, Dept. of Electrical Engineering and Computer Science (Sep. 1993).
Furniss, Maureen, "Motion Capture," posted at http://web.mit.edu/m-i-t/articles/index_furniss.html on Dec. 19, 1999; paper presented at the Media in Transition Conference at MIT on Oct. 8, 1999 (accessed on Sep. 8, 2011).
gamecubicle.com News Article, Nintendo WaveBird Controller, http://www.gamecubicle.com/news-Nintendo_gamecube_wavebird_controller.htm, May 14, 2002 (accessed on Aug. 5, 2011).
Geen, et al., "New iMEMS® Angular-Rate-Sensing Gyroscope," Analog Dialogue 37-03, pp. 1-3 (2003).
Gelmis, J., "Ready to Play, The Future Way," Buffalo News, Jul. 23, 1996 (accessed from LexisNexis research database on Sep. 6, 2011).
Grimm, et al., "Real-Time Hybrid Pose Estimation from Vision and Inertial Data," Proceedings of the First Canadian Conference on Computer and Robot Vision (CRV'04), IEEE Computer Society (Apr. 2004).
Gyration Ultra Cordless Optical Mouse, Setting Up Ultra Mouse, Gyration Quick Start Card part No. DL-00071-0001 Rev. A. Gyration, Inc., Jun. 2003.
Gyration Ultra Cordless Optical Mouse, User Manual, Gyration, Inc., Saratoga, CA (2003).

(56) References Cited

OTHER PUBLICATIONS

Gyration, "Gyration MicroGyro 100 Developer Kit Data Sheet," http://web.archive.org/web/19980708122611/www.gyration.com/html/devkit.ht- ml (Jul. 1998).
Gyration, Inc., GyroRemote GP240-01 Professional Series (Sep. 2003).
Harada, et al., "Portable Absolute Orientation Estimation Device with Wireless Network Under Accelerated Situation" Proceedings of the 2004 IEEE International Conference on Robotics & Automation, New Orleans, LA, Apr. 2004, pp. 1412-1417(Apr. 2004).
Harada, et al., "Portable orientation estimation device based on accelerometers, magnetometers and gyroscope sensors for sensor network," Proceedings of IEEE International Conference on Multisensor Fusion and Integration for Intelligent Systems (MFI 2003), pp. 191-196, (Aug. 2003).
Haykin, et al., "Adaptive Tracking of Linear Time-Variant Systems by Extended RLS Algorithms, IEEE Transactions on Signal Processing," vol. 45, No. 5, pp. 1118-1128 (May 1997).
Heath, "Virtual Reality Resource Guide AI Expert," v9 n5 p. 32(14) (May 1994) (accessed at http://ftp.hitl.washington.edu/scivw-ftp/commercial/VR-Resource-Guide.txt on Jun. 17, 2010).
HiBall-3100—"Wide-Area, High-Precision Tracker and 3D Digitizer," www.3rdtech.com/HiBall.htm (accessed on Jul. 29, 2011).
Hinckley, "Synchronous Gestures for Multiple Persons and Computers," Paper presented at ACM UIST 2003 Symposium on User Interface Software & Technology in Vancouver, BC, Canada (Nov. 2003).
Hinckley, et al., "A Survey of Design Issues in Spatial Input," Paper presented at 7th Annual ACM Symposium on User Interface Software and Technology (Nov. 1994).
Hinckley, et al., "Sensing Techniques for Mobile Interaction," Proceedings of the 13th Annual ACM Symposium on User Interface Software and Technology (ACM UIST), San Diego, CA, (Nov. 2000).
Hinckley, et al., "The VideoMouse: A Camera-Based Multi-Degree-of-Freedom Input Device" ACM UIST'99 Symposium on User Interface Software & Technology, CHI Letters vol. 1 No. 1, pp. 103-112 (Sep. 1999).
Hinckley, Ken, "Haptic Issues for Virtual Manipulation," Ph.D. Dissertation University of Virginia, Dept. of Computer Science (Jan. 1997).
Hind, Nicholas, "Cosmos: A composition for Live Electronic Instruments Controlled by the Radio Baton and Computer Keyboard (Radio Baton and Magic Glove)," A Final Project Submitted to the Department of Music of Stanford University in Partial Fulfillment of the Requirements for the Degree of Doctor Musical Arts/UMI Microform 9837187, Jan. 1998.
Hoffman, Hunter G., "Physically Touching Virtual Objects Using Tactile Augmentation Enhances the Realism of Virtual Environments," IEEE Virtual Reality Annual International Symposium '98, Atlanta, Georgia, Mar. 14-18, 1998, 5 pages (Mar. 1998).
Hogue, Andrew, "MARVIN: A Mobile Automatic Realtime visual and Inertial tracking system," Master's Thesis, York University (May 2003), available at http://www.cse.yorku.ca/~hogue/marvin.pdf.
Holden, Maureen K. et al., "Use of Virtual Environments in Motor Learning and Rehabilitation," Department of Brain and Cognitive Sciences, Handbook of Virtual Environments: Design, Implementation, and Applications, Chap. 49, pp. 999-1026, Stanney (ed), Lawrence Erlbaum Associates (Jan. 2002).
Holloway, Richard Lee, "Registration Errors in Augmented Reality Systems," Ph.D. Dissertation, University of North Carolina at Chapel Hill, Dept. of Computer Science (1995).
Immersion CyberGlove product, Immersion Corporation, http://www.cyberglovesystem.com (Jul. 2001).
Immersion, "Immersion Ships New Wireless CyberGlove(R) II Hand Motion-Capture Glove; Animators, Designers, and Researchers Gain Enhanced Efficiency and Realism for Animation, Digital Prototyping and Virtual Reality Projects," Business Wire, Dec. 7, 2005 (available at http://ir.immersion.com/releasedetail.cfm?releaseid=181278).
Interfax Press Release, "Tsinghua Tongfang Releases Unique Peripheral Hardware for 3D Gaming," Apr. 2002, 1 page. (Apr. 2002).
Intersense, "InterSense InertiaCube2 Devices," (Specification) (image) (2001).
Intersense, "InterSense InertiaCube2 Manual for Serial Port Model" (2001).
Intersense, "IS-900 Product Technology Brief," http://www.intersense.com/uploadedFiles/Products/White.sub.--Papers/IS900-.sub.--Tech.sub.--Overview.sub.--Enhanced.pdf (1999).
Intersense, "InterSense Inc., The New Standard in Motion Tracking," Mar. 27, 2004, http://web.archive,org!web12004040500550Z/http://intersense.com (accessed on May 19, 2009).
Intersense, "InterSense Mobile Mixed Reality Demonstration," YouTube Video dated Oct. 2006 on opening screen; uploaded by InterSenseInc. on Mar. 14, 2008 (accessed at http://www.youtube.com/watch?v=daVdzGK0nUE&feature=channel_page on Sep. 8, 2011; digital copy of video available upon request).
Intersense, "IS-900 Precision Motion Trackers," Jun. 14, 2002, http://web.archive.org/web/20020614110352/http://www.isense.com/products/prec/is900/ (accessed on Sep. 8, 2011).
Intersense, Inc., "Comparison of Intersense IS-900 System and Optical Systems," Whitepaper, Jul. 12, 2004., available at http://www.jazdtech.com/techdirect/research/InterSense-Inc.htm?contentSetId=60032939&supplierId=60018705.
Jacob, "Human-Computer Interaction—Input Devices," ACM Computing Surveys, vol. 28, No. 1, pp. 177-179 (Mar. 1996); link to text of article provided at http://www.cs.tufts.edu/~jacob/papers/.
Jakubowski, et al., "Increasing Effectiveness of Human Hand Tremor Separation Process by Using Higher-Order Statistics," Measurement Science Review, vol. 1, No. 1 (2001).
Ji, H. "Study on the Infrared Remote-Control Lamp-Gesture Device," Yingyong Jiguang/Applied Laser Technology, v. 17, n. 5, p. 225-227, Language: Chinese—Abstract only, Oct. 1997.
Jiang, "Capacitive position-sensing interface for micromachined inertial sensors," Dissertation at Univ. of Cal. Berkeley, 2003.
Ju, et al., "The Challenges of Designing a User Interface for Consumer Interactive Television Consumer Electronics Digest of Technical Papers.," IEEE 1994 International Conference on vol. , Issue , Jun. 21-23, 1994 pp. 114-115 (Jun. 1994) (downloaded from IEEE Xplore on Jul. 13, 2010).
Keir, et al., "Gesture-recognition with Nonreferenced Tracking," IEEE Symposium on 3D User Interfaces, pp. 151-158, Mar. 25-26, 2006.
Kennedy, P.J. "Hand-held Data Input Device," IBM Technical Disclosure Bulletin, vol. 26, No. 11, pp. 5826-5827, Apr. 1984.
Kessler, et al., "The Simple Virtual Environment Library: an Extensible Framework for Building VE Applications," Presence, MIT Press vol. 9, No. 2. pp. 187-208 (Apr. 2000).
Kindratenko, "A Comparison of the Accuracy of an Electromagnetic and a Hybrid Ultrasound-Inertia Position Tracking System," MIT Presence, vol. 10, No. 6, pp. 657-663, Dec. 2001.
Klein et al., "Tightly Integrated Sensor Fusion for Robust Visual Tracking," British Machine Vision Computing, vol. 22, No. 10, pp. 769-776, Feb. 2004.
Kohlhase, "NASA Report, The Voyager Neptune travel guide," Jet Propulsion Laboratory Publication 89-24, (Jun. 1989).
Kormos, D.W., et al., "Intraoperative, Real-Time 3-D Digitizer for Neurosurgical Treatment and Planning," IEEE (Feb. 1993) (Abstract only).
Kosak, Dave, "Mind-Numbing New Interface Technologies," Gamespy.com, Feb. 1, 2005 (accessed at http://www.gamespy.com/articles/584/584744p1.html on Aug. 31, 2011).
Krumm et al., "How a Smart Environment can Use Perception," Paper presented at UBICOMP 2001 Workshop on Perception for Ubiquitous Computing (2001).
Kuipers, Jack B., "SPASYN—Electromagnetic Relative Position and Orientation Tracking System," IEEE Transactions on Instrumentation and Measurement, vol. 29, No. 4, pp. 462-466 (Dec. 1980).
Kunz, Andreas M. et al., "Design and Construction of a New Haptic Interface," Proceedings of DETC '00, ASME 2000 Design Engineering Technical Conferences and Computers and Information in Engineering Conference, Baltimore, Maryland, Sep. 10-13, 2000.

(56) References Cited

OTHER PUBLICATIONS

La Scala, et al., "Design of an Extended Kalman Filter Frequency Tracker," IEEE Transactions on Signal Processing, vol. 44, No. 3 (Mar. 1996).
Laughlin, et al., "Inertial Angular Rate Sensors: Theory and Applications," SENSORS Magazine Oct. 1992.
Lee, et al., "Innovative Estimation Method with Measurement Likelihood for all-Accelerometer Type Inertial Navigation System," IEEE Transactions on Aerospace and Electronic Systems, vol. 38, No. 1, Jan. 2002.
Lee, et al., "Tilta-Pointer: the Free-Space Pointing Device," Princeton COS 436 Project (Fall 2004); retrieved from Google's cache of http://www.milyehuang.com/cos436/project/specs.html on May 27, 2011.
Lee, et al., "Two-Dimensional Position Detection System with MEMS Accelerometer for Mouse Applications," Design Automation Conference, 2001, Proceedings, 2001 pp. 852-857, Jun. 2001.
Leganchuk, et al., "Manual and Cognitive Benefits of Two-Handed Input: An Experimental Study," ACM Transactions on Computer-Human Interaction, vol. 5, No. 4, pp. 326-259, Dec. 1998.
Liang, et al., "On Temporal-Spatial Realism in the Virtual Reality Environment," ACM 1991 Symposium on User Interface Software and Technology (Nov. 1991).
Link, "Field-Qualified Silicon Accelerometers from 1 Milli g to 200,000 g," Sensors, Mar. 1993.
Liu, et al., "Enhanced Fisher Linear Discriminant Models for Face Recognition," Paper presented at 14th International Conference on Pattern Recognition (ICPR'98), Queensland, Australia (Aug. 1998).
Lobo, et al., "Vision and Inertial Sensor Cooperation Using Gravity as a Vertical Reference," IEEE Trans. on Pattern Analysis and Machine Intelligence, vol. 25, No. 12, pp. 1597-1608, Dec. 2003.
Logitech, "Logitech Tracker—Virtual Reality Motion Tracker," downloaded from http://www.vrealities.com/logitech.html on Jun. 18, 2010.
Logitech, Inc. "3D Mouse & Head Tracker Technical Reference Manual," Nov. 1992.
Logitech's WingMan Cordless RumblePad Sets PC Gamers Free, Press Release, Sep. 2, 2001 (accessed at http://www.logitech.com/en-us/172/1373 on Aug. 5, 2011).
Louderback, J. "Nintendo Wii", Reviews by PC Magazine, Nov. 13, 2006 (accessed at http://www.pcmag.com/article/print/193909 on Sep. 8, 2011).
Luethi, P. et al., "Low Cost Inertial Navigation System" (2000); downloaded from http://www.electronic -engineering.ch/study/ins/ins.html on Jun. 18, 2010.
Luinge, "Inertial sensing of human movement," Thesis, University of Twente, Twente University Press, (Oct. 2002).
Luinge, et al., "Estimation of orientation with gyroscopes and accelerometers," Proceedings of the First Joint BMES/EMBS Conference, 1999, vol. 2, p. 844 (Oct. 1999).
MacKenzie, et al., "A two-ball mouse affords three degrees of freedom," Extended Abstracts of the CHI '97 Conference on Human Factors in Computing Systems, pp. 303-304. New York: ACM (Oct. 1997).
Mackinlay, "Rapid Controlled Movement Through a Virtual 3D Workspace," ACM SIGGRAPH Computer Graphics archive, vol. 24, No. 4, pp. 171-176 (Aug. 1990).
MacLean, "Designing with Haptic Feedback", Paper presented at IEEE Robotics and Automation (ICRA '2000) Conference in San Francisco, CA, Apr. 22-28, 2000.
Maggioni, C., "A novel gestural input device for virtual reality," IEEE Virtual Reality Annual International Symposium (Cat. No. 93CH3336-5), 118-24, Jan. 1993.
Marks, Richard (Jan. 21, 2004) (Windows Media v7). EyeToy: A New Interface for Interactive Entertainment, Stanford University (accessed at http://lang.stanford.edu/courses/ee380/2003-2004/040121-ee380-100.wmv on Sep. 7, 2011; digital copy of video available upon request).
Marrin, "Possibilities for the Digital Baton as a General Purpose Gestural Interface," Late-Breaking/Short Talks, Paper presented at CHI 97 Conference in Atlanta Georgia, Mar. 22-27, 1997 (accessed at http://www.sigchi.org/chi97/proceedings/short-talk/tm.htm on Aug. 5, 2011).
Marrin, Teresa et al., "The Digital Baton: A Versatile Performance Instrument," Paper presented at International Computer Music Conference, Thessaloniki, Greece (Sep. 1997) (text of paper available at http://quod.lib.umich.edu/cgi/p/pod/dod-idx?c=icmc;idno=bbp2372.1997.083).
Marti, et al., "Biopsy navigator: a smart haptic interface for interventional radiological gestures" Proceedings of the Computer Assisted Radiology and Surgery (CARS 2003) Conference, International Congress Series, vol. 1256, pp. 788-793 (Jun. 2003) (e-copy of text of paper available at http://infoscience.epfl.ch/record/29966/files/CARS03-GM.pdf).
Masliah, "Measuring the Allocation of Control in 6 Degree of Freedom Docking Experiment," Paper presented at SIGCHI Conference on Human Factors in Computing Systems, The Hague, Netherlands (Apr. 2000).
Maybeck, "Stochastic Models, Estimation and Control," vol. 1, Chapter 1, Introduction (1979).
Merians, et al., "Virtual Reality-Augmented Rehabilitation for Patients Following Stroke," Physical Therapy, vol. 82, No. 9, Sep. 2002.
Merrill, "FlexiGesture: A sensor-rich real-time adaptive gesture and affordance learning platform for electronic music control," Thesis, Massachusetts Institute of Technology, Jun. 2004.
Meyer, et al., "A Survey of Position Tracker," MIT Presence, vol. 1, No. 2, pp. 173-200, (Nov. 1992).
Miller, Paul, "Exclusive shots of Goschy's prototype 'Wiimote' controllers," Engadget, Jan. 15, 2008 (accessed at http://www.engadget.com/2008/01/15/exclusive-shots-of-goschys-prototype-wiimote-controllers/ on Aug. 31, 2011).
Miller, Ross, "Joystiq interview: Patrick Goschy talks about Midway, tells us he 'made the Wii'," Joystiq.com, Jan. 16, 2008 (accessed at http://www.joystiq.com/2008/01/16/joystiq-interview-patrick-goschy-talks-about-midway-tells-us-h/ on Aug. 31, 2011).
Mizell, "Using Gravity to Estimate Accelerometer Orientation," Proceedings of the Seventh IEEE International Symposium on Wearable Computers (ISWC '03), IEEE Computer Society (Oct. 2003).
Morgan, C., "Still chained to the overhead projector instead of the podium," (TV Interactive Corp's LaserMouse Remote Pro infrared mouse) (clipboard) (brief article) (product announcement) Government Computer News, Jun. 13, 1994.
Morris, "Accelerometry—a technique for the measurement of human body movements," J Biomechanics vol. 6, pp. 729-736 (Nov. 1973).
Moser, "Low Budget Inertial Navigation Platform (2000)," www.tmoser.ch/typo3/11.0.html (accessed on Jul. 29, 2011).
Mulder, "Human movement tracking technology," Technical Report, NSERC Hand Centered Studies of Human Movement project, available through anonymous ftp in fas.sfu.ca:/pub/cs/graphics/vmi/HMTT.pub.ps. Z., Burnab, B.C, Canada: Simon Fraser University (Jul. 1994).
Myers, et al., "Interacting at a Distance: Measuring the Performance of Laser Pointers and Other Devices," CHI 2002, Apr. 2002.
Naimark, et al., "Encoded LED System for Optical Trackers," Paper presented at Fourth IEEE and ACM International Symposium on Mixed and Augmented Reality (ISMAR 2005), Oct. 5-8, 2005, Vienna Austria (2005) (electronic version of text of paper available for download at http://www.intersense.com/pages/44/129/).
Naimark, et al., "Circular Data Matrix Fiducial System and Robust Image Processing for a Wearable Vision-Inertial Self-Tracker," IEEE International Symposium on Mixed and Augmented Reality (ISMAR 2002), Darmstadt, Germany (Sep./Oct. 2002).
Navarrette, et al., "Eigenspace-based Recognition of Faces: Comparisons and a new Approach," Paper Presented at 11th International Conference on Image Analysis and Processing (Sep. 2001).
New Strait Times Press Release, "Microsoft's New Titles," Mar. 1998, 1 page.
News Article, "New Game Controllers Using Analog Devices' G-Force Tilt to be Featured at E3", Norwood, MA (May 10, 1999) (accessed at http://www.thefreelibrary.com/_/print/PrintArticle.aspx?id=54592268 on Jun. 17, 2010).

(56) References Cited

OTHER PUBLICATIONS

Nintendo Tilt Controller Ad, Electronic Gaming Monthly, 1994, 1 page.
Nintendo, Game Boy Advance SP System Instruction Booklet (2003).
Nintendo, Nintendo Game Boy Advance System Instruction Booklet (2001-2003).
Nintendo, Nintendo Game Boy Advance Wireless Adapter, Sep. 26, 2003.
Nishiyama, "A Nonlinear Filter for Estimating a Sinusoidal Signal and its Parameters in White Noise: on the Case of a Single Sinusoid," IEEE Transactions on Signal Processing, vol. 45, No. 4, pp. 970-981 (Apr. 1997).
Nishiyama, "Robust Estimation of a Single Complex Sinusoid in White Noise-H∞ Filtering Approach," IEEE Transactions on Signal Processing, vol. 47, No. 10, pp. 2853-2856 (Oct. 1999).
Odell, "An Optical Pointer for Infrared Remote Controllers," (1995) (downloaded from IEEE Xplore on Jul. 7, 2010).
Ojeda, et al., "No GPS? No Problem!" University of Michigan Develops Award-Winning Personal Dead-Reckoning (PDR) System for Walking Users, available at http://www.engin.umich.edu/research/mrl/urpr/In_Press/P135.pdf, (2004 or later).
Omelyan, "On the numerical integration of motion for rigid polyatomics: The modified quaternion approach" Computers in Physics, vol. 12 No. 1, pp. 97-103 (Jan./Feb. 1998).
Ovaska, "Angular Acceleration Measurement: A Review," Paper presented at IEEE Instrumentation and Measurement Technology Conference, St. Paul, MN, May 18-21, 1998 (1998).
Pai, et al., "The Tango: A Tangible Tangoreceptive Whole-Hand Interface," Paper presented at Joint Eurohaptics and IEEE Symposium on Haptic Interfaces for Virtual Environment and Teleoperator Systems, Pisa, Italy, Mar. 18-20, 2005 (2005).
Pajama Sam: No Need to Hide When It's Dark Outside Infogames, Sep. 6, 2002.
Paley, W. Bradford, "Interaction in 3D Graphics," SIGGRAPH Computer Graphics Newsletter, col. 32, No. 4 (Nov. 1998) (accessed at http://www.siggraph.org/publications/newsletter/v32n4/contributions/paley.html on Aug. 2, 2011).
Paradiso, et al., "Interactive Therapy with Instrumented Footwear," CHI 2004, Apr. 24-29, 2004, Vienna, Austria.
Park, Adaptive control strategies for MEMS gyroscopes (Dissertation), Univ. Cal. Berkley (Dec. 2000).
PC World, "The 20 Most Innovative Products of the Year," Dec. 27, 2006 (accessed at http://www.pcworld.com/printable/article/id,128176/printable.html on Aug. 2, 2011).
PCTracker, Technical Overview, available at http://www.est-kl.com/fileadmin/media/pdf/InterSense/PCTracker_Tech_Overview.pdf (date unknown).
Perry, Simon, "Nintendo to Launch Wireless Game Boy Adaptor," Digital Lifestyles, http://digital-lifestyles.info/2003/09/26/Nintendo-to-launch-wireless-game-boy-adaptor/, Sep. 26, 2003 (accessed on Jul. 29, 2011).
Phillips, "Forward/Up Directional Incompatibilities During Cursor Placement Within Graphical User Interfaces," Ergonomics, vol. 48, No. 6, May 15, 2005.
Phillips, "LPC2104/2105/2106, Single-chip 32-bit microcontrollers; 128 kB ISP/IAP Flash with 64 kB/32 kB/16 kB RAM," 32 pages, Dec. 22, 2004.
Phillips, "TechWatch: On the Right Track: A unique optical tracking system gives users greater freedom to explore virtual worlds," Computer Graphics World, vol. 23, Issue 4 (Apr. 2000).
Pierce, et al., "Image Plane Interaction Techniques in 3D Immersive Environments," Paper presented at 1997 symposium on Interactive 3D graphics, Providence, RI (Apr. 1997).
Pilcher, "AirMouse Remote Controls," IEEE Conference on Consumer Electronics (Jun. 1992).
Pique, "Semantics of Interactive Rotations," Interactive 3D Graphics, Proceedings of the 1986 workshop on Interactive 3D graphics, pp. 259-269 (Oct. 1986).
Polhemus, "Polhemus 3Space Fastrak devices" (image) (2001).
PowerGlove product Program Guide, Mattel, 1989 (Text of Program Guide provided from http://hiwaay.net/~lkseitz/cvtg/power_glove.shtml; the text was typed in by Lee K. Sietz; document created Aug. 25, 1988; accessed on Aug. 2, 2011).
PR Newswire, "Five New Retailers to Carry Gyration's Gyropoint Point and Gyropoint Pro," Jul. 8, 1996 (accessed at http://www.thefreelibrary.com/_/print/PrintArticle.aspx?id=54592268 on Jun. 18, 2010).
PR Newswire, "Three-Axis MEMS-based Accelerometer From STMicroelectronics Targets Handheld Terminals," Feb. 18, 2003 (accessed at http://www.thefreelibrary.com/_/print/PrintArticle.aspx?id=54592268 on Aug. 3, 2011).
Pryor, et al., "A Reusable Software Architecture for Manual Controller Integration," IEEE Conf. on Robotics and Automation, Univ of Texas, pp. 3583-3588 (Apr. 1997).
Raab, et al., "Magnetic Position and Orientation Tracking System," IEEE Transactions on Aerospace and Electronic Systems, vol. AES-15, No. 5, pp. 709-718 (Sep. 1979).
Radica Legends of the Lake™ Instruction Manual (2003).
Regan, "Smart Golf Clubs," baltimoresun.com, Jun. 17, 2005.
Rekimoto, "Tilting Operations for Small Screen Interfaces," Tech Note presented at 9th Annual ACM Symposium on User Interface Software and Technology (UIST'96) (Nov. 1996) (electronic copy available for download at http://www.sonycsl.co.jp/person/rekimoto/papers/uist96.pdf.
Response filed May 3, 2010 to Office Action dated Feb. 5, 2010 for U.S. Appl. No. 12/222,787, filed Aug. 15, 2008, now U.S. Pat. No. 7,774,155 (including Rule 1.132 Declaration by Steve Mayer).
Reunert, "Fiber-Optic Gyroscopes: Principles and Applications," Sensors, Aug. 1993, pp. 37-38.
Ribo, et al., "Hybrid Tracking for Outdoor Augmented Reality Applications," IEEE Computer Graphics and Applications, vol. 22, No. 6, pp. 54-63, Nov./Dec. 2002.
Riviere, et al., "Adaptive Canceling of Physiological Tremor for Improved Precision in Microsurgery," IEEE Transactions on Biomedical Engineering, vol. 45, No. 7, pp. 839-846 (Jul. 1998).
Roberts, "The Lincoln Wand," 1966 Proceedings of the Fall Joint Computer Conference (1966), available for electronic download at http://www.computer.org/portal/web/csdl/doi/10.1109/AFIPS, Apr. 1966,105.
Robinette, et al., "Implementation of Flying, Scaling, and Grabbing in Virtual Worlds," ACM Symposium (Jun. 1992).
Robinette, et al., "The Visual Display Transformation for Virtual Reality," University of North Carolina at Chapel Hill (Sep. 1994).
Roetenberg, "Inertial and magnetic sensing of human motion," Thesis, University of Twente (May 2006).
Roetenberg, et al., "Inertial and Magnetic Sensing of Human Movement Near Ferromagnetic Materials," Paper presented at Second IEEE and ACM International Symposium on Mixed and Augmented Reality, Mar. 2003 (electronic copy available at http://www.xsens.com/images/stories/PDF/Inertial%20and%20magnetic%20sensing%20of%20human%20movement%20near%20ferromagnetic%20materials.pdf.
Rolland, et al., "A Survey of Tracking Technology for Virtual Environments," University of Central Florida, Center for Research and Education in Optics Lasers (CREOL) (Jan. 2001).
Romer, Kay et al., Smart Playing Cards: A Ubiquitous Computing Game, Personal and Ubiquitous Computing, Dec. 2002, vol. 6, Issue 5-6, pp. 371-377, London, England.
Rothman, Wilson, "Unearthed: Nintendo's Pre-Wiimote Prototype," gizmodo.com, Aug. 29, 2007 (accessed at http://gizmodo.com/gadgets/exclusive/unearthed-nintendo-2001-prototype-motion+sensing-one+handed-controller-by-gyration-294642.php on Aug. 31, 2011).
Rothman, Wilson, "Wii-mote Prototype Designer Speaks Out, Shares Sketchbook," Gizmodo.com, Aug. 30, 2007 (accessed at http://gizmodo.com/gadgets/exclusive/wii+mote-prototype-designer-speaks-out-shares-sketchbook-295276.php on Aug. 31, 2011).
Sakai, et al., "Optical Spatial Filter Sensor for Ground Speed," Optical Review, vol. 2, No. 1, pp. 65-67 (Jan. 1995).

(56) References Cited

OTHER PUBLICATIONS

Santiago, Alves, "Extended Kalman filtering applied to a full accelerometer strapdown inertial measurement unit," M.S. Thesis, Massachusetts Institute of Technology, Dept. of Aeronautics and Astronautics, Santiago (Sep. 1992).
Satterfield, Shane, "E3 2002: Nintendo announces new GameCube games," GameSpot, http://www.gamespot.com/gamecube/action/rollorama/news/2866974/e3-2002-nintendo-announces-new-gamecube-games, May 21, 2002 (accessed on Aug. 11, 2011).
Sawada, et al., "A Wearable Attitude-Measurement System Using a Fiberoptic Gyroscope," MIT Presence, vol. 11, No. 2, pp. 109-118, Apr. 2002.
Saxena, et al., "In Use Parameter Estimation of Inertial Sensors by Detecting Multilevel Quasi-Static States," Berlin: Springer-Verlag, pp. 595-601 (2005).
Sayed, "A Framework for State-Space Estimation with Uncertain Models," IEEE Transactions on Automatic Control, vol. 46, No. 7, Jul. 2001.
Schofield, Jack, et al., Games reviews, "Coming up for airpad," The Guardian (Feb. 3, 2000) (accessed at http://www.guardian.co.uk/technology/2000/feb/03/online supplement5/print on Jun. 18, 2010).
Sega/Sports Sciences, Inc., "Batter Up, It's a Hit," Instruction Manual, Optional Equipment Manual (1994).
Sega/Sports Sciences, Inc., "Batter Up, It's a Hit," Photos of baseball bat (1994).
Selectech Airmouse, "Mighty Mouse", Electronics Today International, p. 11 (Sep. 1990).
Shoemake, Ken, "Quaternions," available online at http://campar.in.tum.de/twiki/pub/Chair/DwarfTutorial/quatut.pdf (date unknown).
Skiens, Mike, "Nintendo Announces Wireless GBA Link", Bloomberg, Sep. 25, 2003 (accessed at http://www.nintendoworldreport.com/news/9011).
Smartswing, "SmartSwing: Intelligent Golf Clubs that Build a Better Swing," http://web.archive.org/web/20040728221951/http://www.smartswinggolf.com/ (accessed on Sep. 8, 2011).
Smartswing, "The SmartSwing Learning System Overview," Apr. 26, 2004, http://web.archive.org/web/20040426215355/http://www.smartswinggolf.com/tls/index.html (accessed on Jul. 29, 2011).
Smartswing, "The SmartSwing Learning System: How it Works," 3 pages, Apr. 26, 2004, http://web.archive.org/web/20040426213631/http://www.smartswinggolf.com/tls/how_it_works.html (accessed on Jul. 29, 2011).
Smartswing, "The SmartSwing Product Technical Product: Technical Information," Apr. 26, 2004, http://web.archive.org/web/20040426174854/http://www.smartswinggolf.com/products/technical_info.html (accessed on Jul. 29, 2011).
Smartswing, Training Aid, Austin, Texas, Apr. 2005.
Sorenson, et al., "The Minnesota Scanner: A Prototype Sensor for Three-Dimensional Tracking of Moving Body Segments," IEEE Transactions on Robotics and Animation, vol. 5, No. 4 (Aug. 1989).
Star Wars Action Figure with CommTech Chip by Hasbro (1999).
Stars Wars Episode 1 CommTech Reader Instruction Manual (1998).
Stovall, "Basic Inertial Navigation," NAWCWPNS TM 8128, Navigation and Data Link Section, Systems Integration Branch (Sep. 1997).
Sulic, "Logitech Wingman Cordless Rumblepad Review," Gear Review at IGN, Jan. 14, 2002 (accessed at http://gear.ign.com/articles/317/317472p1.html on Aug. 1, 2011).
Sutherland, "A Head-Mounted Three Dimensional Display," Paper presented at AFIPS '68 Fall Joint Computer Conference, Dec. 9-11, 1968, (1968); electronic paper available at www.cise.ufl.edu/~lok/teaching/dcvef05/papers/sutherland-headmount.pdf.
Sutherland, Ivan E., "Sketchpad: A Man-Machine Graphical Communication System," Proceedings of the AFIPS Spring Joint Computer Conference, Detroit, Michigan, May 21-23, 1963, pp. 329-346 (source provided is reprinting of text accessed at http://www.guidebookgallery.org/articles/sketchpadamanmachinegraphicalcommunicationsystem on Sep. 8, 2011).
Tech Designers Rethink Toys: Make Them Fun Wall Street Journal, Dec. 17, 2001.
Templeman, James N., "Virtual Locomotion: Walking in Place through Virtual Environments," Presence, vol. 8, No. 6, pp. 598-617, Dec. 1999.
Timmer, "Modeling Noisy Time Series: Physiological Tremor," International Journal of Bifurcation and Chaos, vol. 8, No. 7 (1998).
Timmer, et al., "Characteristics of Hand Tremor Time Series," Biological Cybernetics, vol. 70, No. 1, pp. 75-80 (May 1993).
Timmer, et al., "Cross-Spectral Analysis of Tremor Time Series," International Journal of Bifurcation and Chaos, vol. 10, No. 11 pp. 2595-2610 (Nov. 2000); electronic text available at http://www.fdmold.uni-freiburg.de/groups/timeseries/tremor/pubs/cs_review.pdf.
Timmer, et al., "Pathological Tremors: Deterministic Chaos or Nonlinear Stochastic Oscillators?" Chaos, vol. 10, No. 1 pp. 278-288 (Mar. 2000).
Timmer, et al., Cross-Spectral Analysis of Physiological Tremor and Muscle Activity: II Application to Synchronized Electromyogram, Biological Cybernetics, vol. 78 (Jun. 1998) (copy provided obtained from http://arxiv.org/abs/chao-dyn/9805012).
Titterton, et al., "Strapdown Inertial Navigation Technology," Peter Peregrinus Ltd., pp. 1-56 and pp. 292-321 (May 1997).
Toy Designers Use Technology in New Ways as Sector Matures, WSJ.com, Dec. 17, 2001.
Traq 3D, "Healthcare,"http: //www.traq3d.com/Healthcare/Healthcare.aspx (accessed on Jan. 21, 2010).
Ulanoff, Lance, "Nintendo's Wii is the Best Product Ever," PC Magazine, Jun. 21, 2007 (accessed at http://www.pcmag.com/print_article2/0,1217,a=210070,00.asp?hidPrint=true on Aug. 1, 2011).
Unc Computer Science Department, "News & Notes from Sitterson Hall," UNC Computer Science, Department Newsletter, Issue 24, Spring 1999 (Apr. 1999) (accessed at http://www.cs.unc.edu/NewsAndNotes/Issue24/ on Jun. 18, 2010).
Urban, "BAA 96-37 Proposer Information," DARPA/ETO (1996) (accessed at http://wwwfbodaily.com/cbd/archive/1996/08(August)/19-Aug-1996/Aso1001.htm on Jul. 27, 2010).
US Dynamics Corp, "Spinning Mass Mechanical Gyroscopes," Aug. 2006.
US Dynamics Corp, "The Concept of 'Rate', (more particularly, angular rate pertaining to rate gyroscopes) (rate gyro explanation)," Aug. 2006.
US Dynamics Corp, "US Dynamics Model 475 Series Rate Gyroscope Technical Brief," Dec. 2005.
US Dynamics Corp, "US Dynamics Rate Gyroscope Interface Brief (rate gyro IO)" Aug. 2006.
Van Den Bogaard, Thesis, "Using linear filters for real-time smoothing of rotational data in virtual reality application," dated Aug. 2, 2004, available at http://www.science.uva.nl/research/ias/alumni/m.sc.theses/theses/RobvandenBogaarad.pdf.
Van Laerhoven et al., "Using an Autonomous Cube for Basic Navigation and Input," Proceedings of the 5th International Conference on Multimodal interfaces, Vancouver, British Columbia, Canada, pp. 203-210, Nov. 5-7, 2003.
Van Rheeden, et al., "Noise Effects on Centroid Tracker Aim Point Estimation," IEEE Trans. on Aerospace and Electronic Systems, vol. 24, No. 2, pp. 177-185 (Mar. 1988).
Vaz, et al., "An Adaptive Estimation of Periodic Signals Using a Fourier Linear Combiner," IEEE Transactions on Signal Processing, vol. 42, No. 1, pp. 1-10 (Jan. 1994).
Verplaetse, "Inertial-Optical Motion-Estimating Camera for Electronic Cinematography," Masters Thesis, MIT, Media Arts and Sciences (Jun. 1997).
Villoria, Gerald, "Hands on Roll-O-Rama Game Cube," Game Spot, http://www.gamespot.com/gamecube/action/rollorama/news.html?sid=2868421&com_act=convert&om_clk=newsfeatures&tag=newsfeatures;title;1&m, May 29, 2002 (accessed on Jul. 29, 2011).
Virtual Fishing, Operational Manual, 2 pages, Tiger Electronics, Inc. (1998).
Vorozcovs, et al., "The Hedgehog: A Novel Optical Tracking Method for Spatially Immersive Displays," MIT Presence, vol. 15, No. 1, pp. 108-121, Feb. 2006.

(56) References Cited

OTHER PUBLICATIONS

VTI, Mindflux-Vti CyberTouch, http://www.mindflux.com/au/products/vti/cybertouch.html (1996).
Wang, et al., "Tracking a Head-Mounted Display in a Room-Sized Environment with Head-Mounted Cameras," Paper presented at SPIE 1990 Technical Symposium on Optical Engineering and Photonics in Aerospace Sensing (Apr. 1990).
Ward, et al., "A Demonstrated Optical Tracker With Scalable Work Area for Head-Mounted Display Systems," Paper presented at 1992 Symposium on Interactive 3D Graphics (Mar. 1992).
Watt, Alan, 3D Computer Graphics, Chapter 1: "Mathematical fundamentals of computer graphics," 3rd ed. Addison-Wesley, pp. 1-26 (Dec. 2000).
Welch, "Hawkeye Zooms in on Mac Screens with Wireless Infrared Penlight Pointer," MacWeek, May 3, 1993 (excerpt of article accessed at http://www.accessmylibrary.com/article/print/1G1-13785387 on Jun. 18, 2010).
Welch, et al., "High-Performance Wide-Area Optical Tracking: The HiBall Tracking System," MIT Presence: Teleoperators & Virtual Environments (Feb. 2001).
Welch, et al., "SCAAT: Incremental Tracking with Incomplete Information," Paper presented at SIGGRAPH 97 Conference on Computer Graphics and Interactive Techniques (Aug. 1997), available at http://www.cs.unc.edu/~welch/media/pdf/scaat.pdf.
Welch, et al., "The HiBall Tracker: High-Performance Wide-Area Tracking for Virtual and Augmented Environments," Paper presented at 1999 Symposium on Virtual Reality Software and Technology in London, Dec. 20-22, 1999, available at http://www.cs.unc.edu/~welch/media/pdf/VRST99_HiBall.pdf.
Welch, et al., "Complementary Tracking and Two-Handed Interaction for Remote 3D Medical Consultation with a PDA," Paper presented at Trends and Issues in Tracking for Virtual Environments Workshop at IEEE Virtual Reality 2007 Conference (Mar. 2007), available at http://www.cs.unc.edu/~welch/media/pdf/Welch2007_TwoHanded.pdf.
Welch, et al., "Motion Tracking: No Silver Bullet, but a Respectable Arsenal," IEEE Computer Graphics and Applications, vol. 22, No. 6, pp. 24-38 (Nov./Dec. 2002), available at http://www.cs.unc.edu/~tracker/media/pdf/cga02_welch_tracking.pdf.
Welch, Hybrid Self-Tracker: An Inertial/Optical Hybrid Three-Dimensional Tracking System, University of North Carolina Chapel Hill Department of Computer Science, TR 95-048 (1995).
Widrow, et al., "Fundamental Relations Between the LMS Algorithm and the DFT," IEEE Transactions on Circuits and Systems, vol. CAS-34, No. 7 (Jul. 1987).
Wiley, M., "Nintendo Wavebird Review," Jun. 11, 2002, http://gear.ign.com/articles/361/361933p1.html (accessed on Aug. 1, 2011).
Williams, et al., "Physical Presence: Palettes in Virtual Spaces," Society of Photo-Optical Instrumentation Engineers (SPIE) Conference Series, vol. 3639, No. 374-384 (May 1999), available at http://www.fakespacelabs.com/papers/3639_46_LOCAL.pdf.
Williams, et al., "Implementation and Evaluation of a Haptic Playback System," vol. 3, No. 3, Haptics-e, May 2004.
Williams, et al., "The Virtual Haptic Back Project," presented at the IMAGE 2003 Conference, Scottsdale, Arizona, Jul. 14-18, 2003.
Wilson, "Wireless User Interface Devices for Connected Intelligent Environments," http://research.microsoft.com/en-us/um/people/awilson/publications/old/ubicomp%202003.pdf (Oct. 2003).
Wilson, "WorldCursor: Pointing in Intelligent Environments with the World Cursor," http://www.acm.org/uist/archive/adjunct/2003/pdf/demos/d4-wilson.pdf (2003).
Wilson, "XWand: UI for Intelligent Environments," http://research.microsoft.com/en-us/um/people/awilson/wand/default.htm, Apr. 2004.
Wilson, et al., "Demonstration of the Xwand Interface for Intelligent Spaces," UIST '02 Companion, pp. 37-38 (Oct. 2002).
Wilson, et al., "Gesture Recognition Using the Xwand," http://www.ri.cmu.edu/pub_files/pub4/wilson_daniel_h_2004_1/wilson_daniel_h_2004_1.pdf (Apr. 2004).
Wilson, et al., "Xwand: UI for Intelligent Spaces," Paper presented at CHI 2003 Conference, Ft. Lauderdale, FL, Apr. 5-10, 2003, available at http://research.microsoft.com/en-us/um/people/awilson/publications/WilsonCHI2003/CHI%202003%20XWand.pdf (2003).
Wired Glove, Wikipedia article, 4 pages, http://en.wikipedia.org/wiki/Wired_glove, Nov. 18, 2010.
Wormell, "Unified Camera, Content and Talent Tracking in Digital Television and Movie Production," Presented at NAB 2000, Las Vegas, NV, Apr. 8-13, 2000 (available for download at http://www.intersense.com/pages/44/116/) (2003).
Wormell, et al., "Advancements in 3D Interactive Devices for Virtual Environments," Presented at the Joint International Immersive Projection Technologies (IPT)/Eurographics Workshop on Virtual Environments (EGVE) 2003 Workshop, Zurich, Switzerland, May 22-23, 2003 (available for download at http://www.intersense.com/pages/44/123/) (2003).
Worringham, et al., "Directional Stimulus-Response Compatibility: A Test of Three Alternative Principles," Ergonomics, vol. 41, Issue 6, pp. 864-880 (Jun. 1998).
Yang, et al., "Implementation and Evaluation of 'Just Follow Me': An Immersive, VR-Based, Motion-Training System," MIT Presence: Teleoperators and Virtual Environments, vol. 11, No. 3, at 304-23 (MIT Press), Jun. 2002.
You, et al., "Hybrid Inertial and Vision Tracking for Augmented Reality Registration," http://graphics.usc.edu/cgit/pdf/papers/Vr1999.PDF (Mar. 1999).
You, et al., "Orientation Tracking for Outdoor Augmented Reality Registration," IEEE Computer Graphics and Applications, IEEE, vol. 19, No. 6, pp. 36-42 (Nov. 1999).
Youngblut, et al., "Review of Virtual Environment Interface Technology," Institute for Defense Analyses (Mar. 1996).
Yun, et al., "Recent Developments in Silicon Microaccelerometers," Sensors, 9(10) University of California at Berkeley, Oct. 1992.
Zhai, "Human Performance in Six Degree of Freedom Input Control," Ph.D. Thesis, University of Toronto (1995).
Zhai, "User Performance in Relation to 3D Input Device Design," Computer Graphics 32(4), pp. 50-54, Nov. 1998; copy of text downloaded from http://www.almaden.ibm.com/u/zhai/papers/siggraph/final.html on Aug. 1, 2011.
Zhou, et al., "A survey—Human Movement Tracking and Stroke Rehabilitation," Technical Report: CSM-420, ISSN 1744-8050, Dept. of Computer Sciences, University of Essex, UK, Dec. 8, 2004.
Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004.
Zowie Playsets, http://www.piernot.com/proj/zowie/ (accessed on Jul. 29, 2011).
"HyperScan", release date Oct. 2006. Source http://www.giantbomb.com/hyperscan/3045-1 041.
"Smart Card News Online", published Oct. 25, 2006, source www.smartcard.co.ukINOLARCH/2006/October/251006.html.
"Gatemaster Features", "Gatemaster Main Screen", "Gatemaster: So You're a Computer Geek eh?", and "Gatemaster Pricing" by Gate Master Management System, internet article, Jul. 9, 1997; http://web.archive.org/web/19970709135000/www.gatemaster.com/gmfeat.htm (accessed on Dec. 11, 2008).
"Ollivanders: Makers of Fine Wands." Dec. 2, 2002. [online] [retrieved on Mar. 30, 2005], Retrieved from Internet (URL:http//www.cim.mcgill.edu/!jer/courses/hci/assignments/2002/www.ece.mcgill.ca/%7Eeuryd).
International Preliminary Examination Report, International App. No. PCT/US00/09482; dated Apr. 24, 2001; 4 pages.
International Search Report and Written Opinion, International App. No. PCT/US04/08912; mailed Aug. 26, 2004.
International Search Report and Written Opinion, International App. No. PCT/US05/34831; mailed Jul. 2, 2008; 11 pages.
International Search Report and Written Opinion; International Appl. No. PCT/US2006/043915; mailed Mar. 9, 2007; 8 pages.
Laser Tag: General info: History of Laser Tag, http://lasertag.org/general/history.html (accessed on Mar. 13, 2008; historical dates start on Mar. 1984).

(56) References Cited

OTHER PUBLICATIONS

Laser Tag: Lazer Tag Branded Gear; last update Sep. 26, 2006, http://home.comcast.net/—ferret1963/Lazer_Tag_Brand.HTML (accessed on Mar. 13, 2008; historical dates start in 1986).
Owl Magic Wand & Owl Magic Orb Raving Toy Maniac, Nov. 19, 2001. [online] [retrieved on Mar. 30, 2005], Retrieved from the Internet (URL:http://www.toymania.com/news/messages/1358.shtm1).
Kirby Tilt 'n' Tumble (GCN-GBA Spaceworld 2001, You Tube Video, uploaded by adonfjv on Sep. 5, 2006 (accessed at http://www.youtube.com/watch?v=5rLhlwp2iGk on Sep. 7, 2011; digital copy of video available upon request).
Piyabongkarn, "The Development of a MEMS Gyroscope for Absolute Angle Measurement," Dissertation, Univ. Minnesota, Nov. 2004 (Abstract only).
Resnick, et al., "Digital Manipulatives: New Toys to Think With," Chi 98; Apr. 1998; pp. 281-287.

* cited by examiner

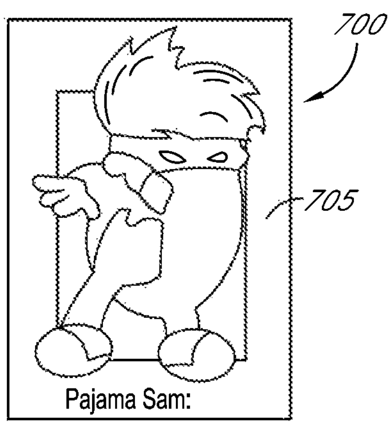
FIG. 34A
FIG. 34B
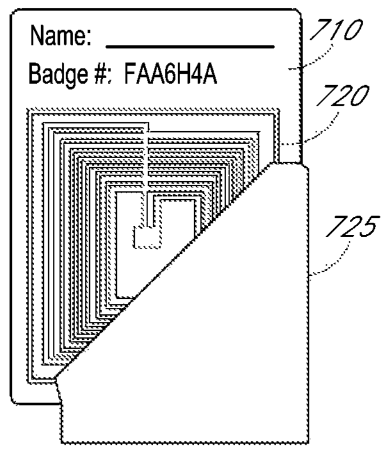
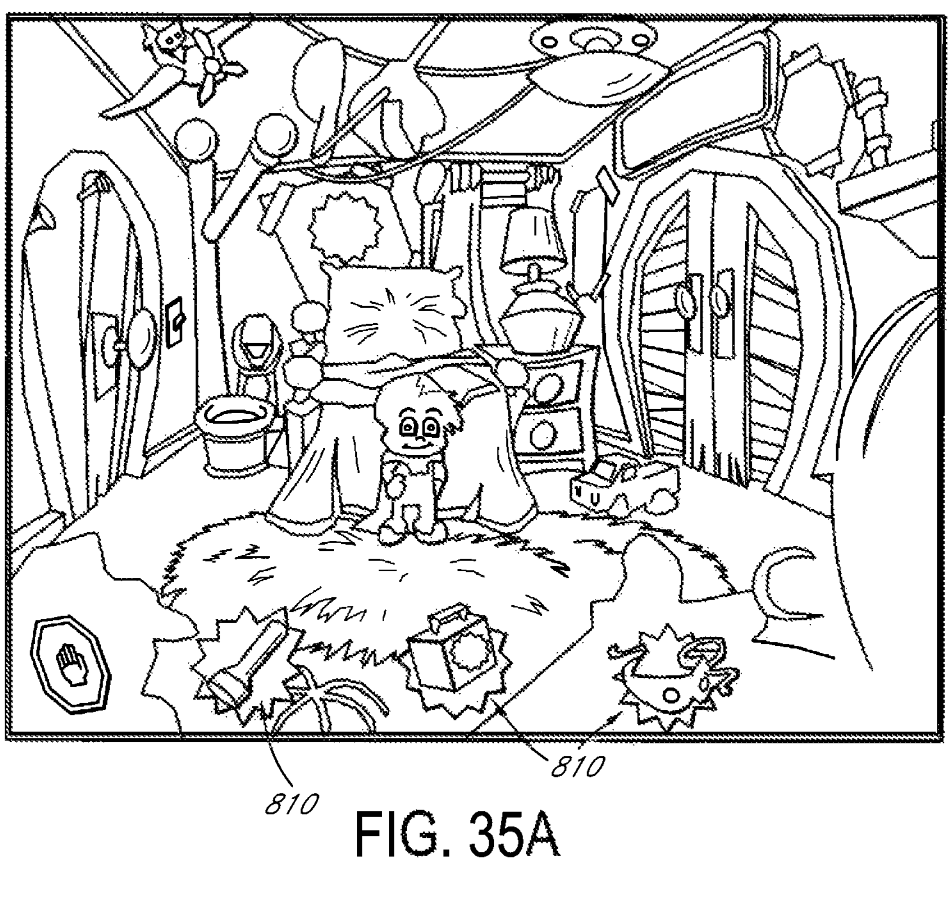
FIG. 35A

WIRELESS ENTERTAINMENT DEVICE, SYSTEM, AND METHOD

RELATED APPLICATIONS

The present application is a continuation of U.S. patent application Ser. No. 14/568,834, filed Dec. 12, 2014, which is a continuation of U.S. patent application Ser. No. 14/204,021, filed Mar. 11, 2014, which is a continuation of U.S. patent application Ser. No. 13/776,426, filed Feb. 25, 2013, now U.S. Pat. No. 8,711,094, which is a continuation of U.S. patent application Ser. No. 13/589,034, filed Aug. 17, 2012, now U.S. Pat. No. 8,384,668, which is a continuation of U.S. patent application Ser. No. 13/452,508, filed Apr. 20, 2012, now U.S. Pat. No. 8,248,367, which is a continuation of U.S. patent application Ser. No. 13/314,980, filed Dec. 8, 2011, now U.S. Pat. No. 8,164,567, which is a continuation of U.S. patent application Ser. No. 13/231,813, filed Sep. 13, 2011, now U.S. Pat. No. 8,169,406, which is a continuation of U.S. patent application Ser. No. 12/261,864, filed Oct. 30, 2008, now U.S. Pat. No. 8,089,458 which is a divisional of U.S. patent application Ser. No. 10/954,025, filed Sep. 29, 2004, now U.S. Pat. No. 7,445,550, which is a continuation-in-part of U.S. patent application Ser. No. 10/397,054, filed Mar. 25, 2003, now U.S. Pat. No. 7,500,917, which is a continuation-in-part of U.S. patent application Ser. No. 09/792,282, filed Feb. 22, 2001, now U.S. Pat. No. 6,761,637, each of which is hereby incorporated herein by reference in its entirety to be part of this specification. U.S. Prov. Appl. No. 60/184,128, filed Feb. 22, 2000 is also incorporated herein by reference in its entirety.

BACKGROUND

1. Field

The present invention generally relates to children's games and, in particular, to magic wands and interactive games and play systems utilizing wireless transponders and receivers for providing a magical interactive play experience. The present invention also relates particularly to interactive toys, games and play systems utilizing radio frequency transponders and transceivers to provide a unique interactive game play experience.

2. Description of the Related Art

Games, toys, play structures and other similar entertainment systems are well known for providing play and interaction among children and adults. A variety of commercially available play toys and games are also known for providing valuable learning and entertainment opportunities for children, such as role playing, reading, memory stimulation, tactile coordination and the like.

Magic and wizardry are classic play themes that continue to capture imaginations and entertain new generations of children and adults alike. Magic and the seemingly limitless possibilities of fun and exciting things brought to life through magic challenge children's imaginations, creativity and social interactivity.

While there are many games and toys that specifically target magic and wizardry as a central play theme, most offer only a superficially engaging play experience, particularly for older children. Very few offer a fully immersive play experience that allows participants to carry out and immerse themselves in a realistic fantasy experience of practicing, performing and mastering "real" magic. In any event, there is always demand for more exciting and entertaining games and toys that increase learning and entertainment opportunities for children and stimulate creativity and imagination.

SUMMARY

Embodiments of the present invention provide a unique play experience carried out utilizing an interactive "wand" and/or other seemingly magical actuation/tracking device. The wand or other actuation device allows play participants to electronically and "magically" interact with their surrounding play environment(s), thereby giving play participants the realistic illusion of practicing, performing and mastering "real" magic.

Embodiments of the invention may be carried out in association with virtually any suitable play environment, play structure, play area or other area (either commercial or residential), as desired. It can also be carried out in non-physical play environments, such as television, radio, virtual reality, computer games and the like. The play environment may be simply a themed play area, or even a multi-purpose area such as a restaurant dining facility, family room, bedroom or the like. The play environment may either be real or imaginary (i.e., computer/TV generated), and either local or remote, as desired. Optionally, multiple play participants, each provided with a suitable "wand" and/or other actuation/tracking device, may play and interact together, either within or outside one or more compatible play environments, to achieve desired goals, master certain magical spells and/or produce desired seemingly magical effects within the play environment.

In accordance with one embodiment the present invention provides a toy wand or other seemingly magical object which provides a basic foundation for a complex, interactive entertainment system to create a seemingly magic interactive play experience for play participants who possess and learn to use the magical wand toy.

In accordance with another embodiment, the present invention provides an interactive play system and seemingly magical wand toy for enabling a trained user to electronically send and receive information to and from other wand toys and/or to and from various transceivers distributed throughout a play facility and/or connected to a master control system. The toy wand or other seemingly magical object is configured to use a send/receive radio frequency communications protocol which provides a basic foundation for a complex, interactive entertainment system to create a seemingly magic interactive play experience for play participants who possess and learn to use the magical wand toy.

In accordance with another embodiment the present invention provides a "magic" training facility wherein play participants can select and/or build and then learn to use a "real" magic wand. The wand allows play participants to electronically and "magically" interact with their surrounding play environment simply by pointing, touching or using their wands in a particular manner to achieve desired goals or produce desired effects within the play environment. Various wireless receivers or actuators are distributed throughout the play facility to facilitate such interaction and to facilitate full immersion in the fantasy of practicing, performing and mastering "real" magic.

In accordance with another embodiment the present invention provides a wand actuator device for actuating various interactive play effects within a compatible play environment. The wand comprises an elongated hollow pipe or tube having a proximal end or handle portion and a distal end or transmitting portion. An internal cavity may be provided to receive one or more batteries to power optional lighting, laser or sound effects and/or to power long-range transmissions such as via an infrared LED transmitter device or RF transmitter device. The distal end of the wand may be fitted with an RFID (radio frequency identification device) transponder that is operable to provide relatively short-range RF communications (<60 cm) with one or more receivers or transceivers distributed throughout a play environment. A magnetic tip may also be provided for actuating various effects via one or more magnetically operated reed switches. The handle portion of the wand may be fitted with an ornamental knob that is selected by play participants from an available assortment. Knobs may be fitted with an optional rotary switch that may be selectably rotated to indicate different spells, commands or combinations of spells and commands for activating or controlling various associated special effects.

In accordance with another embodiment the present invention provides a wand having an RFID transponder or tag. The transponder contains certain electronics comprising a radio frequency tag pre-programmed with a unique person identifier number ("UPIN"). The UPIN may be used to identify and track individual play participants and/or wands within the play facility. Optionally, each tag may also include a unique group identifier number ("UGIN"), which may be used to match a defined group of individuals having a predetermined relationship. The RFID transponder or other identifying device is preferably used to store certain information identifying each play participant and/or describing certain powers or abilities possessed by an imaginary role-play character. Players advance in a magic adventure game by finding clues, casting spells and solving various puzzles presented. Players may also gain (or lose) certain attributes, such as magic skills, magic strength, fighting ability, various spell-casting abilities, combinations of the same or the like. All of this information is preferably stored on the RFID transponder and/or an associated database indexed by UPIN so that the character attributes may be easily and conveniently transported to other similarly-equipped play facilities, computer games, video games, home game consoles, hand-held game units, and the like. In this manner, an imaginary role-play character is created and stored on a transponder device that is able to seamlessly transcend from one play environment to the next.

In accordance with another embodiment, the present invention provides an RFID card or badge intended to be affixed or adhered to the front of a shirt or blouse worn by a play participant while visiting an RF equipped play facility. The badge comprises a paper, cardboard or plastic substrate having a front side and a back side. The front side may be imprinted with graphics, photos, or any other information desired. The front side may include any number of other designs or information pertinent to its application. The obverse side of the badge contains certain electronics comprising a radio frequency tag pre-programmed with a unique person identifier number ("UPIN"). The UPIN may be used to identify and track individual play participants within the play facility. Optionally, each tag may also include a unique group identifier number ("UGIN") which may be used to match a defined group of individuals having a predetermined relationship.

In accordance with another embodiment, the present invention provides an electronic role-play game utilizing specially configured electronically readable character cards. Each card is configured with an RFID or a magnetic "swipe" strip or the like, that may be used to store certain information describing the powers or abilities of an imaginary role-play character that the card represents. As each play participant uses his or her favorite character card in various play facilities the character represented by the card gains (or loses) certain attributes, such as magic skill level, magic strength, flight ability, various spell-casting abilities, etc. All of this information is preferably stored on the card so that the character attributes may be easily and conveniently transported to other similarly-equipped play facilities, computer games, video games, home game consoles, hand-held game units, and the like. In this manner, an imaginary role-play character is created and stored on a card that is able to seamlessly transcend from one play medium to the next.

In accordance with another embodiment the present invention provides a trading card game wherein a plurality of cards depicting various real or imaginary persons, characters and/or objects are provided and wherein each card has recorded or stored thereon in an electronically readable format certain selected information pertaining to the particular person, character or object, such as performance statistics, traits/powers, or special abilities. The information is preferably stored on an RFID tracking tag associated with each card and which can be read electronically and wirelessly over a predetermined range preferably greater than about 1 cm when placed in the proximity of a suitably configured RF reader. Optionally, the RFID tag may be read/write capable such that the information stored thereon may be changed or updated in any manner desired. Alternatively, a magnetic strip, bar code or similar information storage means may be used to store relevant information on the card.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which:

FIGS. 34A and 34B are front and rear views, respectively, of an alternative embodiment of a role-play character card for use with a specially configured interactive game and/or game play facility having features and advantages in accordance with the present invention;

FIGS. 35A-35G are various illustrations of a role-play adventure game configured to be utilized with the role-play character card of FIGS. 34A and 34B and having features and advantages in accordance with the present invention;

DETAILED DESCRIPTION

Figure 1:
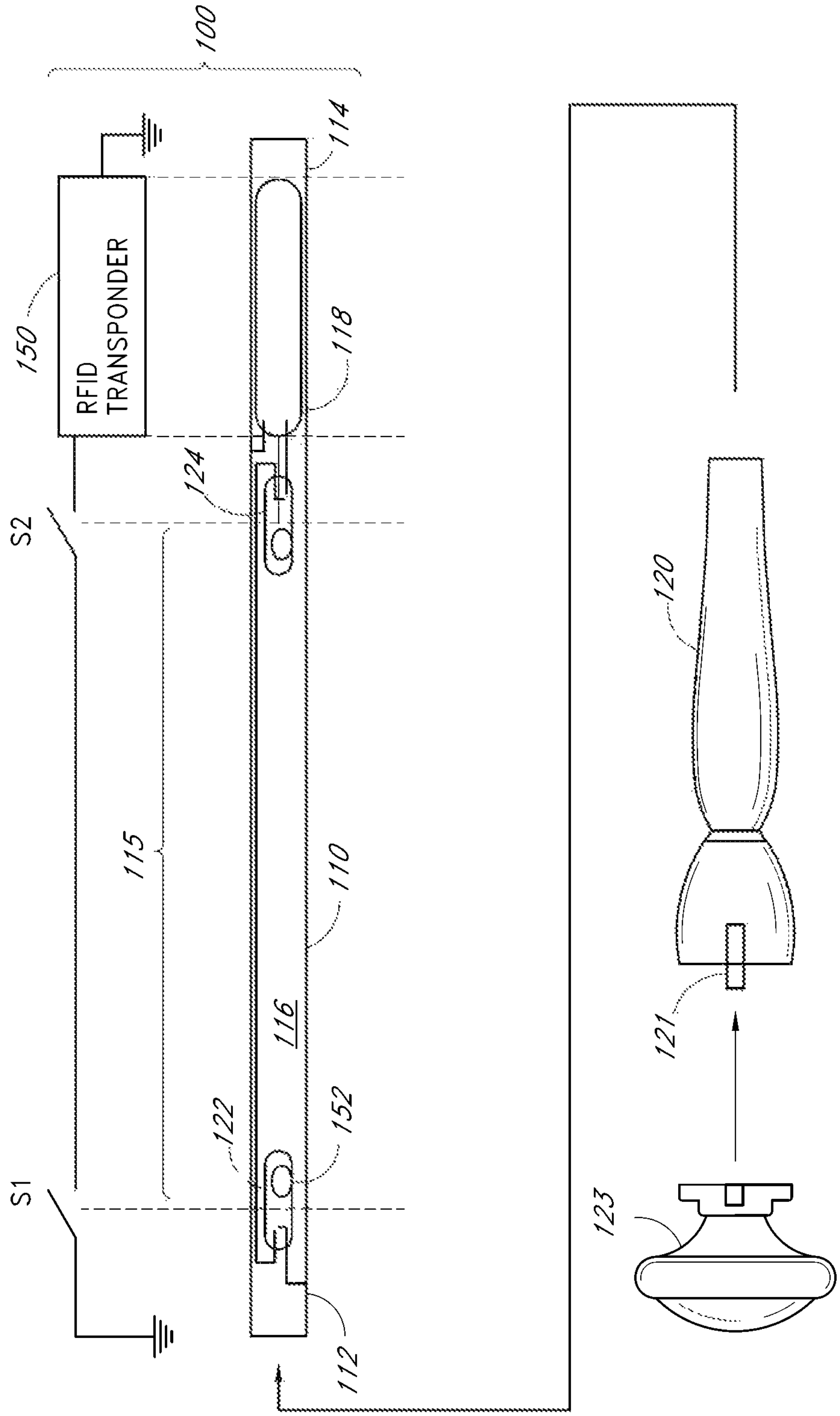
FIG. 1 is a schematic illustration of one embodiment of an interactive wand toy having features and advantages in accordance with the present invention.

For convenience of description and for better clarity and understanding of the invention similar elements to those previously described may be identified with similar or identical reference numerals. However, not all such elements in all embodiments are necessarily identical as there may be differences that become clear when read and understood in the context of each particular disclosed preferred embodiment.

Interactive Wand

A wand is provided that allows play participants to electronically and "magically" interact with their surrounding play environment simply by pointing or using their wands in a particular manner to achieve desired goals or produce desired effects within the play environment. Use of the wand may be as simple as touching it to a particular surface or "magical" item within a suitably configured play environment or it may be as complex as shaking or twisting the wand a predetermined number of times in a particular manner and/or pointing it accurately at a certain target desired to be "magically" transformed or otherwise affected.

For example, various wand-compatible receivers may be distributed throughout a play facility that will allow wand users to activate various associated play effects and/or to play a game using the wand. As play participants play and interact within each play environment they learn more about the "magical" powers possessed by the wand and become more adept at using the wand within various game contexts to achieve desired goals or desired play effects. Optionally, play participants may collect points or earn additional magic levels or ranks for each play effect or task they successfully achieve. In this manner, play participants may compete with one another to see who can score more points and/or achieve the highest magic level.

Additional optional circuitry and/or position sensors may be added, if desired, to allow the "magic wand" 100 to be operated by waving, shaking, stroking and/or tapping it in a particular manner. If provided, these operational aspects would need to be learned by play participants as they train in the various play environments. One goal, for example, may be to become a "grand wizard" or master of the wand. This means that the play participant has learned and mastered every aspect of operating the wand to produce desired effects within each play environment. Of course, additional effects and operational nuances can (and preferably are) always added over time in order to keep the interactive experience fresh and continually changing. Optionally, as shown and discussed in more detail in connection with FIG. 19G, the wand may be configured such that it is able to display 50 or more characters on a LTD or LCD screen. The wand may also be configured to respond to other signals, such as light, sound, or voice commands as will be readily apparent to those skilled in the art.

FIG. 1 illustrates the basic construction of one preferred embodiment of an interactive "magic" wand toy 100 having features and advantages in accordance with the present invention. While a magic wand is specifically contemplated and described herein as the most preferred embodiment of the invention, those skilled in the art will readily appreciate from the disclosure herein that the invention is not limited to wands, but may be carried out using any number or variety of other objects and toys for which it may be desirable to imbue special "magic" powers or other functionalities described herein. Other suitable magical objects and toys may include, for example and without limitation, ordinary sticks, tree branches, flowers, swords, staffs, scepters, whips, paddles, nunchuks, cricket bats, baseball bats, various sporting balls, brooms, feather dusters, paint brushes, wooden spoons, chop sticks, pens, pencils, crayons, umbrellas, walking canes, candy canes, candle sticks, candles, tapers, musical instruments (e.g., flutes, recorders, drum sticks), books, diaries, flashlights, telescopes, kaleidoscopes, laser pointers, ropes, tassels, gloves, coats, hats, shoes and other clothing items, fishing rods and simulated fishing rods, dolls, action figures, stuffed animals, rings, bracelets necklaces and other jewelry items, key chain trinkets, lighters, rocks, crystals, crystal balls, prisms, and various simulated play objects such as apples, arranges, bananas, carrots, celery and other fruits/vegetables. However, magic wands are particularly preferred because they are highly versatile, can transcend a wide variety of different play themes and play environments, and wands can be customized and personalized in their fabrication, assembly and finish as will be described herein in more detail.

As illustrated in FIG. 1, the wand 100 essentially comprises an elongated hollow pipe or tube 110 having a proximal end 112 and a distal end 114. An internal cavity 116 is preferably provided to receive and safely house various circuitry for activating and operating the wand and various wand-controlled effects (described later). Batteries, optional lighting, laser or sound effects and/or the like may also be provided and housed within cavity 116, if desired, as will be described in more detail later. An optional button may also be provided, if desired, to enable particular desired functions, such as sound or lighting effects or longer-range transmissions. While a hollow metal or plastic tube 110 is preferred, it will be appreciated that virtually any other mechanical structure or housing may be used to support and contain the various components and parts described herein, including integrally molded or encapsulated containment structures such as epoxy resins and the like. If a metal tube is selected, care must be taken to ensure that it does not unduly interfere with any of the magnetic, RFID or RF/IR devices described herein. Thus, for example, any RF antennas should preferably be mounted near or adjacent an end opening and/or other opening of the tube 110 to ensure adequate operating range and desired directionality.

The proximal end 112 of tube 110 is preferably adapted to secure the tube 110 to an optional handle 120. The handle 120 may further include securement means, such as threaded stud 121, snap latches, mating magnets or the like, for receiving and securing an optional decorative knob 123. For example, knobs 123 may be purchased, selected and/or earned by play participants as they advance in a game and/or when they play different games. The distal end 114 of the wand is preferably fitted with an RFID (radio frequency identification) transponder or tag 118 that is operable to provide relatively short-range RF communications (less than about 200 cm) using one or more RFID reader units or reader/writer units (sometimes referred to herein as "receivers" or "transceivers," respectively), described in more detail later. The transponder 118 contains certain electronics comprising a radio frequency tag pre-programmed with a unique person identifier number ("UPIN"). The UPIN may be used to identify and track individual wands and/or play participants. Optionally, each tag may also include a unique group identifier number ("UGIN") which may be used to match a defined group of individuals having a predetermined or desired relationship.

The RFID transponder is preferably used to store certain information identifying each play participant and/or describing certain powers or abilities possessed by an imaginary role-play character. For example, players may advance in a magic adventure game by finding clues, casting spells and solving various puzzles presented. Players may also gain (or lose) certain attributes, such as magic skills, magic strength, fighting ability, various spell-casting abilities, combinations of the same or the like, based on game play, skill-level and/or the purchase of collateral play objects. Some or all of this information is preferably stored on the RFID transponder 118 so that the character attributes may be easily and conveniently transported to various compatible play facilities, games, video games, home game consoles, hand-held game units, and the like. Alternatively, only the UPIN and/or UGIN are stored on the transponder 118 and all other desired information is stored on a computer-accessible database indexed by UPIN and/or UGIN.

Figure 2A:
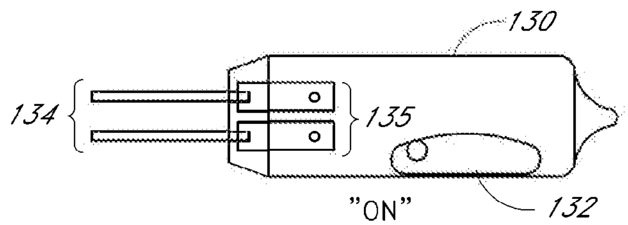
FIGS. 2A and 2B are schematic illustrations of a mercury tilt switch for use in accordance with one embodiment of the present invention and being shown in the OFF and ON conditions, respectively.
Figure 2B:
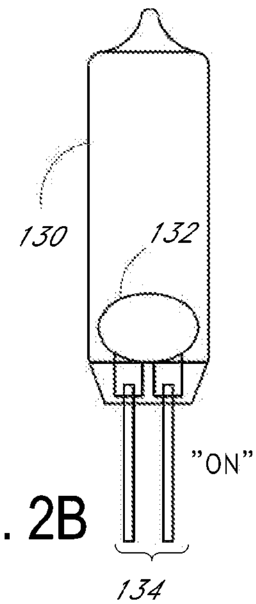

Operation of the transponder 118 (and/or other wireless communication devices described later) is preferably controlled by internal activation circuitry 115 comprising, in the particular embodiment illustrated, a pair of series-connected mercury tilt sensors 122 and 124 (represented in the corresponding schematic diagram as switches S1 and S2, respectively). As illustrated in FIGS. 2A and 2B each mercury tilt sensor 122, 124 comprises a sealed, evacuated glass bulb 130 within which is contained a small ball of liquid mercury. A pair of electrical leads 134 extends through the glass bulb 130 at the sealed end thereof and form closely spaced contacts 136. In one orientation (e.g., FIG. 2B) the ball of mercury 132 is drawn by gravity to cover or envelope the contacts 136, thus completing the electrical circuit and closing the switch S1/S2 (ON state). In all other orientations (e.g., FIG. 2A) the ball of mercury 132 does not contact or envelope both contacts 136 and, thus, the circuit remains open (OFF state). The particular orientation and tilt angle required to trigger either ON or OFF conditions will depend on the size of the glass bulb 130, amount of contained mercury 132 and the size and spacing of contacts 136. If mercury sensors are used, preferably they are encased in a metal and/or epoxy jacket so as to ensure against breakage and possible health and environmental hazards. Preferably, each mercury sensor is encased in epoxy within a sealed stainless steel ferule.

Figure 3A:
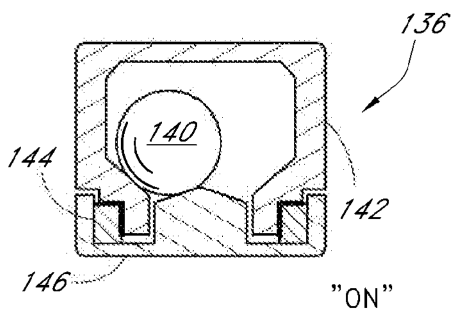
FIGS. 3A and 3B are schematic illustrations of a micro-ball tilt switch (normally closed configuration) for use in accordance with one embodiment of the present invention and being shown in the ON and OFF conditions, respectively.
Figure 3B:
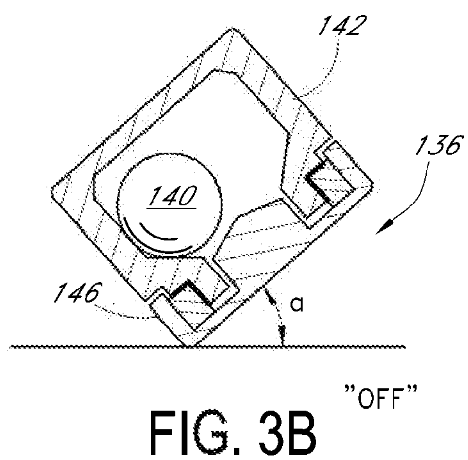

Alternatively, one or more micro-ball tilt sensors 136 or 138 may be used instead of or in addition to mercury switches 122, 124. For example, FIGS. 3A and 3B are schematic illustrations of a micro-ball tilt switch 136 (normally closed configuration) that may be adapted for use in accordance with an alternative embodiment of the invention. The tilt switches 136, 138 generally comprise upper and lower conductive enclosures 142, 146, respectively, separated by a suitable insulating material 144 and a conductive ball 140 that is free to move within. In one orientation (e.g., FIG. 3A) the internally contained conductive ball 140 rests within an annular groove completing the electrical circuit between the top conductive enclosure 142 and bottom conductive enclosure 146 (ON state). But, when the sensor 136 is tilted by an amount greater than angle $\alpha$ (FIG. 3B), the ball 140 rolls away from the lower conductive enclosure 141 and, thus, the circuit is opened (OFF state).

Figure 4A:
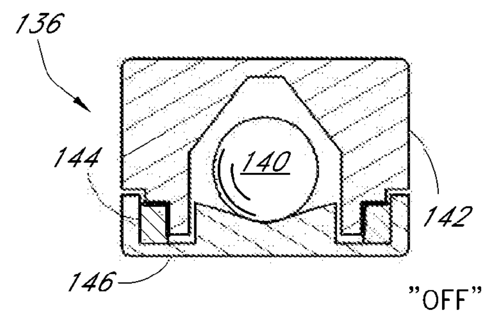
FIGS. 4A and 4B are schematic illustrations of a micro-ball tilt switch (normally open configuration) for use in accordance with one embodiment of the present invention and being shown in the ON and OFF conditions, respectively.
Figure 4B:
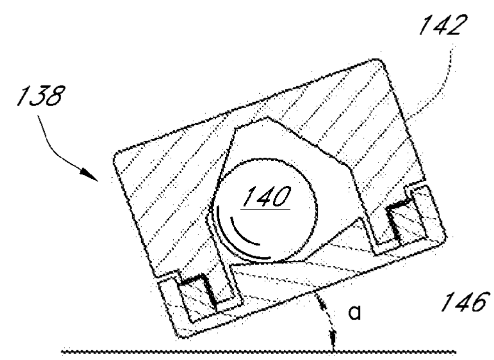

FIGS. 4A and 4B are schematic illustrations of another embodiment of a micro-ball tilt switch 138 (normally open configuration) that may also be adapted for use in accordance with a further alternative embodiment of the present invention. In this case, in a first orientation (e.g., FIG. 4A) an internally contained conductive ball 140 rests within a central conical pocket formed in the lower conductive enclosure 146 and is thereby prevented from contacting and completing electrical connection to the upper conductive enclosure 142 (OFF state). But, when the sensor 138 is tilted by an amount greater than angle $\alpha$ (FIG. 4B) the ball 140 rolls out of the conical pocket, touching and completing the circuit with the upper conductive enclosure 142 (ON state). The particular orientation and range of tilt angles required to trigger either ON or OFF conditions of micro-ball sensors 136, 138 can be varied and/or adjusted to meet varying needs and skill levels of wand users.

Figure 5A:
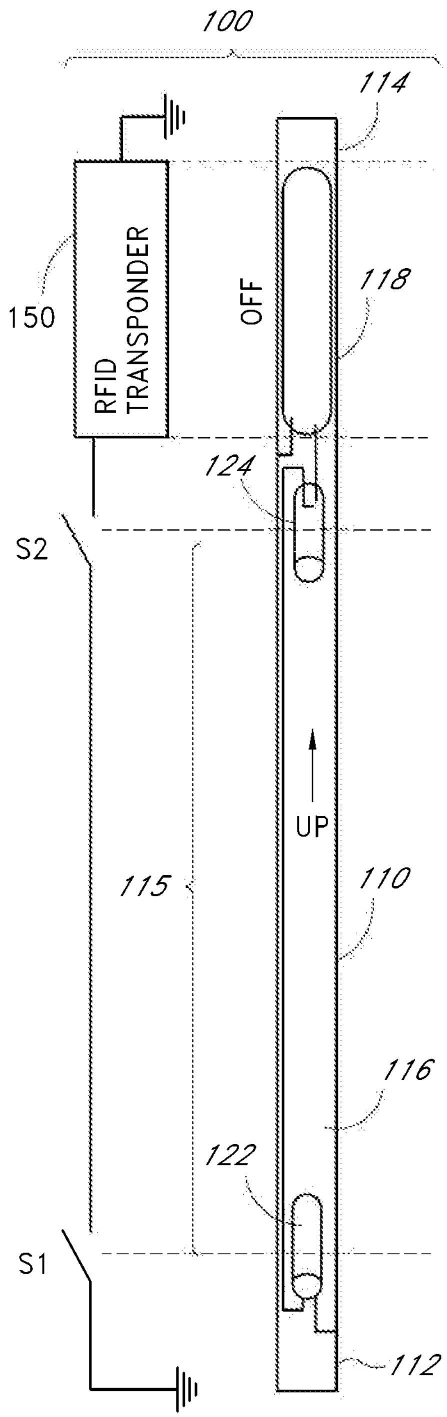
FIGS. 5A and 5B are schematic illustrations of the interactive wand toy of FIG. 1 in upward and downward orientations, respectively.
Figure 5B:
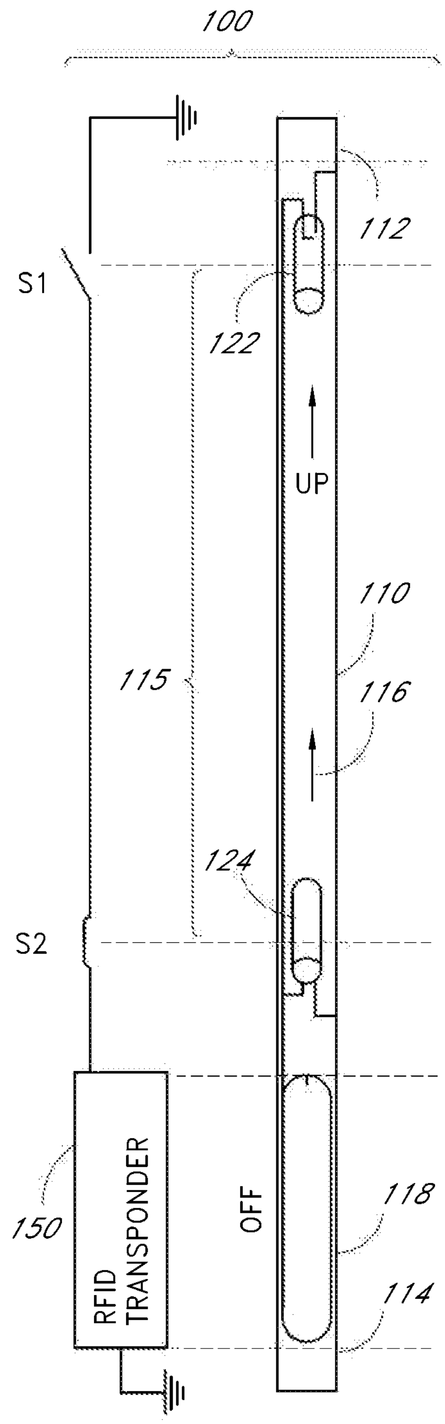

Referring to FIGS. 5A and 5B tilt sensors 122 and 124 are preferably oppositely oriented and spaced apart between opposite ends of the tube 110, as illustrated. Those skilled in the art will appreciate from the disclosure herein that in virtually any static position of the wand 100 at least one of tilt sensors 122, 124 will be in the OFF state. Thus, the transponder 118 can essentially only be activated when the wand is in a non-static condition or, in other words, when the wand is in motion. More specifically, the placement and orientation of the tilt sensors 122, 124 is preferably such that different accelerations or motions are required at the proximal and distal ends 112 and 114 in order to trigger both tilt sensors 122, 124 to their ON positions (or OFF positions, as the case may be) and, thus, to enable or activate transponder 118 (or other wireless communication devices described later).

As illustrated in FIG. 5A, when the wand 100 is held in an upright orientation, tilt sensor 122 (S1) is in its ON state (Static-ON) and tilt sensor 124 (S2) is in its OFF state (Static-OFF). Because the sensors are wired in series, the activation circuit 115 is OFF (open circuit) and the transponder 118 is disabled. Of course, those skilled in the art will readily appreciate from the disclosure herein that if transponder 118 requires a short circuit to disable, then the sensors 122 and 124 would preferably be wired in parallel and, in the orientation shown, the activation circuit 115 would be shorted through S1. On the other hand, when the wand 100 is held in an upside down orientation (FIG. 5B), tilt sensor 122 (S1) is in its OFF state (Static-OFF) and tilt sensor 124 (S2) is in its ON state (Static-ON) such that the activation circuit 115 remains OFF (open circuit) and the transponder 118 remains disabled. Again, if transponder 118 requires a short circuit to disable, then the sensors 122 and 124 would preferably be wired in parallel and, in the orientation shown, the activation circuit 115 would be shorted through S2.

Figure 6:
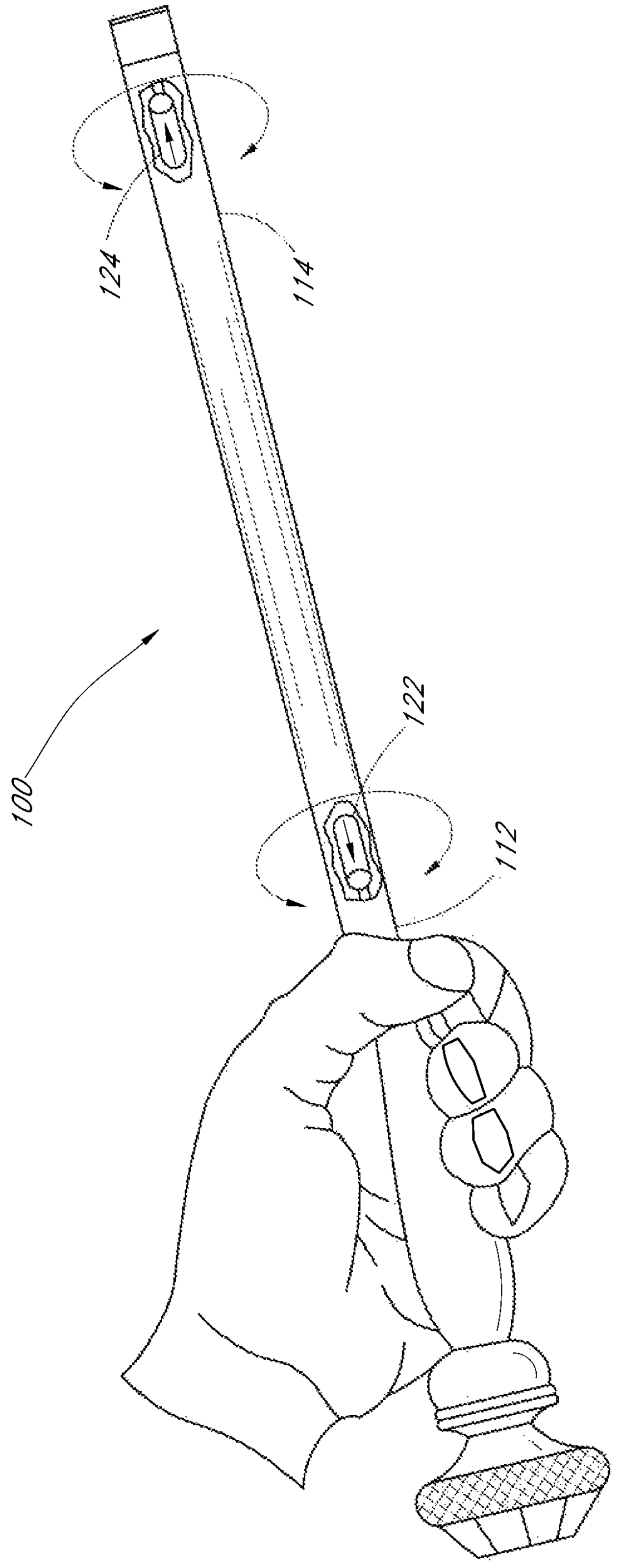
FIG. 6 is a partial perspective view of a user waving the interactive wand toy of FIG. 1 in such a way to produce actuation thereof.

Advantageously, the wand activation circuit 115 in accordance with the above-described preferred embodiment is essentially only activated (and transponder 118 is only enabled) when a user actively moves the wand 100 in such particular way as to impart different transient acceleration forces on the distal and proximal ends of the wand 100 (or wherever the sensors are located if not at the distal and proximal ends). In particular, the transient acceleration forces must be sufficient enough at one end of the wand to overcome the gravitational forces acting on the upper sensor (Static-OFF), but not sufficient enough at the other end to overcome the gravitational forces acting on the lower sensor (Static-ON). This transient condition is illustrated in FIG. 6.

The wand activation circuit 115 (and, thus, transponder 118) is activated by holding the wand tilted slightly upward in one hand while gently and smoothly waving it so that the distal end 114 of the wand follows an upward-cresting arcing pattern while the proximal end 112 remains relatively steady or follows a smaller, more gentle arcing pattern. The acceleration forces caused by the upward arcing motion at the distal end 114 counteract gravitational forces on the tilt sensor 124 and cause it to switch from its OFF state to its ON state. At the same time, the smaller arcing motion and acceleration forces at the proximal end 112 are not sufficient to counteract the gravitation forces on the tilt sensor 122 and, thus, it remains in its ON state. The result is that both sensors 122 and 124 are momentarily in their ON state and the wand activation circuit 115 thereby momentarily activates the transponder 118. The complexity and learnability of the described motion is similar to a golf swing. Only with this particular motion (or other similar learned motions) executed in a precise and repeatable fashion will the transient conditions be satisfied to cause both sensors 122 and 124 to switch to their ON state, thereby momentarily activating transponder 118. If the arcing motion is too fast or too pronounced, the lower sensor 122 will switch to its OFF state. On the other hand, if the arcing motion is too slow or too shallow, the upper sensor 124 will not switch to its ON state. Thus, successful operation of the wand 100 requires real skill, patience and training.

Those skilled in the art will readily appreciate and understand from the disclosure herein that various additional and/or alternative wand activation circuits can be designed and configured so as to respond to different desired wand activation motions. For example, this may be achieved by adding more sensors and/or by changing sensor positions and orientations. For example, one wand motion may trigger a first wand activation circuit (and a first wand effect) while a different wand motion may trigger a second wand activation circuit (and a second wand effect). The number, type and complexity of wand motions and corresponding wand activation circuits are limited only by design and cost considerations and user preferences. Most desirably 6-12 unique wand activation motions and corresponding wand activation circuits are provided. Of course, those skilled in the art will recognize from the disclosure herein that multiple wand activation circuits may share one or more sensors and/or other supporting circuitry and components, as required or desired. Alternatively, a single, multi-mode wand activation circuit may be provided that can respond to multiple wand motions.

The degree of difficulty and skill required to master each wand motion can preferably be adjusted to suit the age and skill-level of each user. Generally speaking, selecting tilt sensors 122, 124 having narrow activation ranges increases the difficulty level of the wand, as it makes it more difficult to satisfy the transient conditions required to turn each sensor to its ON or active state. Similarly, adding more sensors also increases the difficulty level, as it decreases the probability that all required transient conditions can be satisfied in a given moment. Placement and orientation of the sensors 122 and 124 (and any other sensors) can also make a difference in the degree of difficulty and skill required. For example, spacing the sensors closer together (e.g., 3-5 cm apart) generally makes it more difficult to operate the wand as it becomes harder and harder to create different transient conditions relative to each sensor location. Conversely, spacing sensors farther apart (e.g., 10-35 cm apart) makes it easier. An optimal sensor spacing is about 8-12 cm. Optionally, some or all of these degree-of-difficulty parameters can be adjusted or changed as skill-levels increase or as other circumstances warrant.

Of course, those skilled in the art will appreciate from the disclosure herein that the wand activation circuitry 115 is not limited to those including mercury or micro-ball tilt sensors, as illustrated, but may be practiced using a wide variety of other motion and/or tilt sensors and/or other supporting circuitry elements and components that are selected and adapted to the purposes described herein. These include, without limitation, impact sensors, micro-sensors, gyro-sensors, force sensors, micro-switches, momentum sensors, vibration sensors, gravity sensors, accelerometers, and all variety of reed switches (gravity, momentum, magnetic or otherwise). Moreover, any one or more of these and/or other similar sensor devices may also be used in conjunction with other supporting circuitry elements or components (either internal or external to the wand 100) as desired, including microprocessors, computers, controller boards, PID circuitry, input/output devices, combinations of the same and the like. Mercury and micro-ball tilt sensors as illustrated and described above are particularly preferred as they are relatively inexpensive and reliable.

Figure 7:
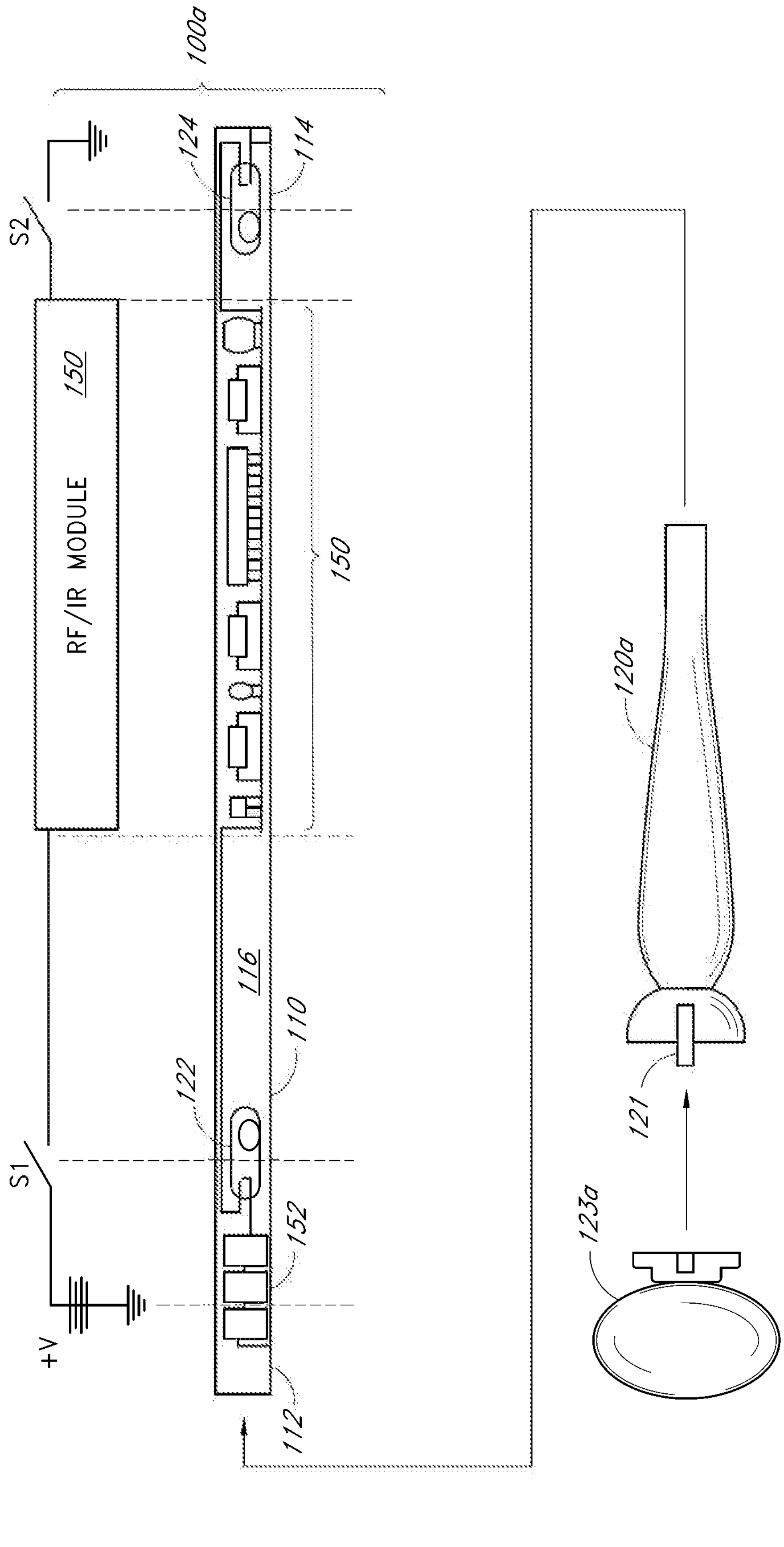
FIG. 7 is a schematic illustration of an alternative embodiment of an interactive wand toy including an optional RF/IR module and having features and advantages in accordance with the present invention.

FIG. 7 is a schematic illustration of an alternative embodiment of an interactive wand 100*a* including an optional RF/IR module adapted for long-range wireless communications (up to about 100 meters). Wand 100*a* is essentially the same as wand 100 illustrated and described above in connection with FIG. 1, except longer-range wand operation is achieved by replacing the RFID transponder 118 in wand 100 (FIG. 1) with an auxiliary RF/IR transmitter 150 (see FIGS. 22 and 25 accompanying discussion for circuit schematic and other details). If line of sight or directional actuation is desired, an infrared LED transmitter of the type employed in standard television remote controls may be provided instead of or in addition to the RF transmitter 118, as those skilled in the art will readily appreciate. In the latter case, a hole (not shown) would preferably be provided in the distal end 114 of the wand to accommodate the transmitting LED of the IR transmitter circuit. Of course, a wide variety of other wireless communications devices, as well as various optional sound and lighting effects may also be provided, as desired.

RF/IR transmitter module 150 and/or any other desired optional effects may be actuated using the wand activating circuit 115 substantially as illustrated and described above in connection with FIGS. 1-6. As illustrated in FIG. 7, tilt sensors 122, 124 (S1/S2) are wired in series with the RF/IR module, between batteries 152 (voltage source V+) and ground (all or part of tube 110). Thus, RF/IR module 150 is powered when sensors 122 and 124 are both in their ON state (switches S1 and S2 are both closed). Again, this transient state can essentially only be achieved when a skilled user actively moves the wand 100*a* in such particular way as to impart different transient acceleration forces on the distal and proximal ends of the wand 100*a*, as illustrated and described above in connection with FIG. 6. Other than as noted above it will be understood that the wand 100*a* is in all other material respects essentially the same as wand 100 illustrated and described in connection with FIGS. 1-5. Note that the handle 120*a* and knob 123*a* are slightly modified, as these elements are preferably uniquely customized/personalized for each wand and/or wand user as will be discussed in more detail later.

Furthermore, the wand activation circuitry 115 may advantageously comprise a microprocessor that communicates with the sensors 122, 124 and the transmitter module 150. In one embodiment, the microprocessor receives at least one signal from the sensors 122, 124 indicative of the state of the sensors. For instance, the microprocessor may determine when each of the sensors 122, 124 are in an ON or an OFF state or when one of the sensors 122, 124 switches states. Based on the states of the sensors 122, 124, the microprocessor then outputs a signal to the transmitter module 150 that causes activation or deactivation of the transmitter module 150.

In another embodiment, the microprocessor is capable of measuring a duration of time related to the operational states of the sensors 122, 124. For example, the microprocessor may use a clock signal or an external timer to determine the duration of time during which at least one of the sensors 122, 124 is in an ON state. The microprocessor may then use this duration of time when outputting a signal to the transmitter module 150. For example, the microprocessor may correlate the duration of time that a sensor 122, 124 is activated (e.g., in an ON state) with an intensity, level, or type of a "spell" being cast by the user. For instance, if the user, while "casting a spell," is able to move the wand 100 so as to keep at least one of the sensors 122, 124 activated for a certain period of time, the microprocessor may assign a particular level or intensity to the spell being cast. Thus, the microprocessor may output different signals, which represent different spells or spell intensities, to the transmitter module 150 based on the length of time of the sensor activation. In one embodiment, the microprocessor may associate longer durations of sensor activation with higher intensity spells.

In yet other embodiments, the microprocessor calculates the duration of time between successive activations, or triggering, of the sensors 122, 124. For example, the microprocessor may determine how much time passes between the activation of the sensor 122 and the activation of the sensor 124, which are caused by the user's operation of the wand 100. For instance, the microprocessor may associate simultaneous or shorter durations of time between the activations of the two sensors 122, 124 with a more advanced, or higher-level, spell. Thus, the user that operates the wand 100 so as to activate each of the sensors 122, 124 within a relatively short period of time is able to cast higher-level spells. On the other hand, if there is a greater delay between the activations of the sensors 122, 124, the microprocessor assigns a lower intensity level to the spell being cast. In yet other embodiments, the time during or between the sensor activations is used by the microprocessor to determine which of a variety of spells is achieved by the user.

In other embodiments, the microprocessor may compare the duration of time of sensor activation or time between successive activations, to a predetermined time. For example, if the duration of time between successive activations is less than the predetermined time, the "spell" may be assigned a higher intensity level. If the duration of time between successive activations is greater than the predetermined time, the "spell" may be assigned a higher lower level. In addition, in some embodiments, the microprocessor does not calculate the specific value of the duration of time but determines if the duration of time exceeds or does not exceed a predetermined time.

In yet other embodiments of the invention, the duration of time during or between activation of the sensors 122, 124 is output to a receiver external to the wand 100. The receiver then processes the duration of time in determining which effect, or which level of an effect, is caused by the particular wand activation motions and associated duration(s) of time. In yet other embodiments, the foregoing microprocessor may be used in a wand 100 comprising a transponder 118 instead of, or in combination with, the transmitter module 150.

In another embodiment, the microprocessor accesses a look-up table that associates specific durations of time, or ranges of durations of time, with the intensity or the type of the spell being cast. For example, the look-up table may associate durations of time less than 0.1 seconds between successive sensor activations with a higher level spell, durations of time from 0.1 to 0.2 seconds with a mid-level spell, and durations of time greater than 0.2 seconds with a lower level spell. In one embodiment, the look-up table is stored in a memory, such as for example a read-only memory (ROM), on the wand 100. The look-up table may be internal or external to the microprocessor. In yet other embodiments, the look-up table may be accessible by the receiver of the signal from the wand 100.

Figure 8:
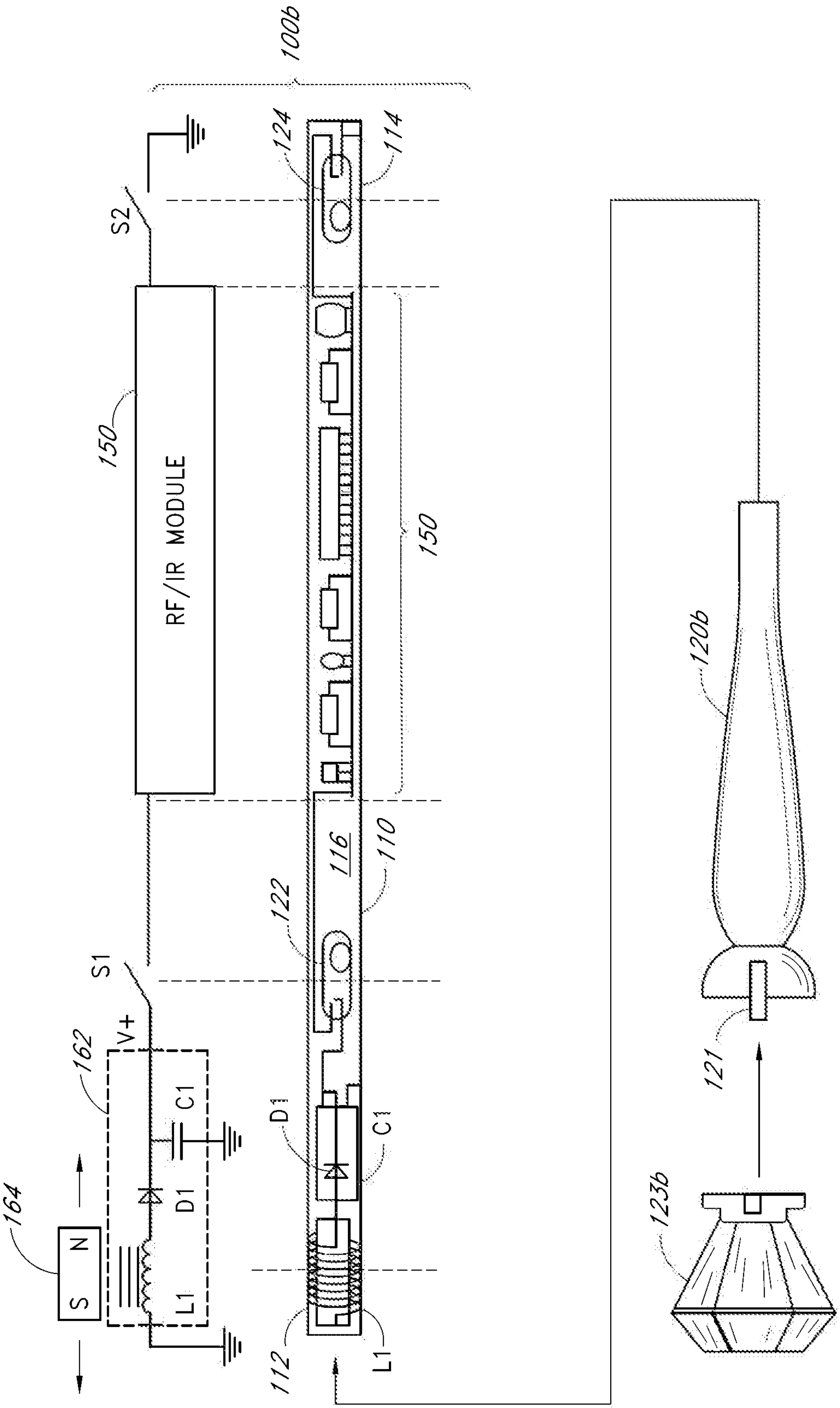
FIG. 8 is a schematic illustration of a further alternative embodiment of an interactive wand toy including an optional magnetic inductance energy source having features and advantages in accordance with the present invention.

FIG. 8 is a schematic illustration of a further alternative embodiment of an interactive wand toy including an optional magnetic inductance energy source. Wand 100*b* is essentially the same as wand 100*a* illustrated and described above in connection with FIG. 7, except that batteries 152 are replaced with a magnetic inductance energy generator 162. The magnetic inductance energy generator 162 comprises an inductance coil L1 sized and arranged such that when it is exposed to a fluctuating magnetic field (e.g., a moving permanent magnet 164 rubbed back and forth and/or an externally generated electromagnetic field) an alternating current is generated. This generated current is rectified by diode D1 or, alternatively, a full wave bridge rectifier (not shown), and charges preferably an electrolytic capacitor C1 until it reaches a predetermined operating voltage V+. If desired, a voltage regulator device, such as a zener diode (not shown) and/or active regulation circuitry may be added to stabilize and increase the efficiency of the magnetic inductance energy generator 162.

Alternatively, those skilled in the art will appreciate from the disclosure herein that a various magnetic field effect sensors, such as Wiegand sensors and the like, may readily be used in place of or in addition to inductor L1 where, for example, it is desired to increase the energy-generating efficiency of the circuit 162. For example, U.S. Pat. No. 6,191,687 to Dlugos discloses a Wiegand effect energy generator comprising a Wiegand wire that changes its magnetic state in response to being exposed to an alternating magnetic field. The Wiegand wire has core and shell portions with divergent magnetic properties. The magnetic properties of the wire are such that it produces an output power signal that corresponds to the strength and rate of change of a magnetic field to which the Wiegand wire is exposed. Such energy pulses generally are between about 5 and 6 volts and 10 microseconds in width. Such energy pulses have sufficient voltage and duration to power a low power transmitter such as RF/IR module 150. One suitable Wiegand sensor that may be utilized in accordance with the present invention is the series 2000 sensor sold by EHD Corp. The Series 2000 Wiegand sensor produces pulses in response to alternating magnetic fields or permanent magnets that pass near the sensor.

The energy generating circuit 162 is preferably such that the wand 100*b* has no movable parts and requires no maintenance such as replacing batteries or the like over its anticipated life. All energy is generated and stored by rubbing the wand back and forth with a permanent magnet and/or by placing the wand within an externally generated electromagnetic field. Preferably, the inductor L1 (or Wiegand wire) and capacitor C1 are selected such that 5-10 seconds of exposure to an external fluctuating magnetic field will fully charge the capacitor C1, thus enabling the wand RF/IR transmitter to be activated at least once and preferably 5-20 times without having to recharge. Advantageously, the absence of replaceable batteries or other visible electronic technology significantly increases the reality and full immersion experience of the magical fantasy and gives users the feeling of practicing, performing and mastering "real" magic using a "real" magic wand 100*b*. Optionally, a non-replaceable permanent rechargeable battery and/or a factory replaceable battery (not shown) may be provided in place of or in addition to the energy generating circuit 162 where it is desired to provide long-term energy storage. Other than replacing batteries 152 with magnetic inductance energy generator 162, the wand 100*b* is in all other material respects essentially the same as wand 100*a* illustrated and described above in connection with FIG. 7. Note that the handle 120*b* and knob 123*b* are slightly modified, as these elements are preferably uniquely customized/personalized for each wand and/or wand user as will be discussed in more detail later.

Figure 9:
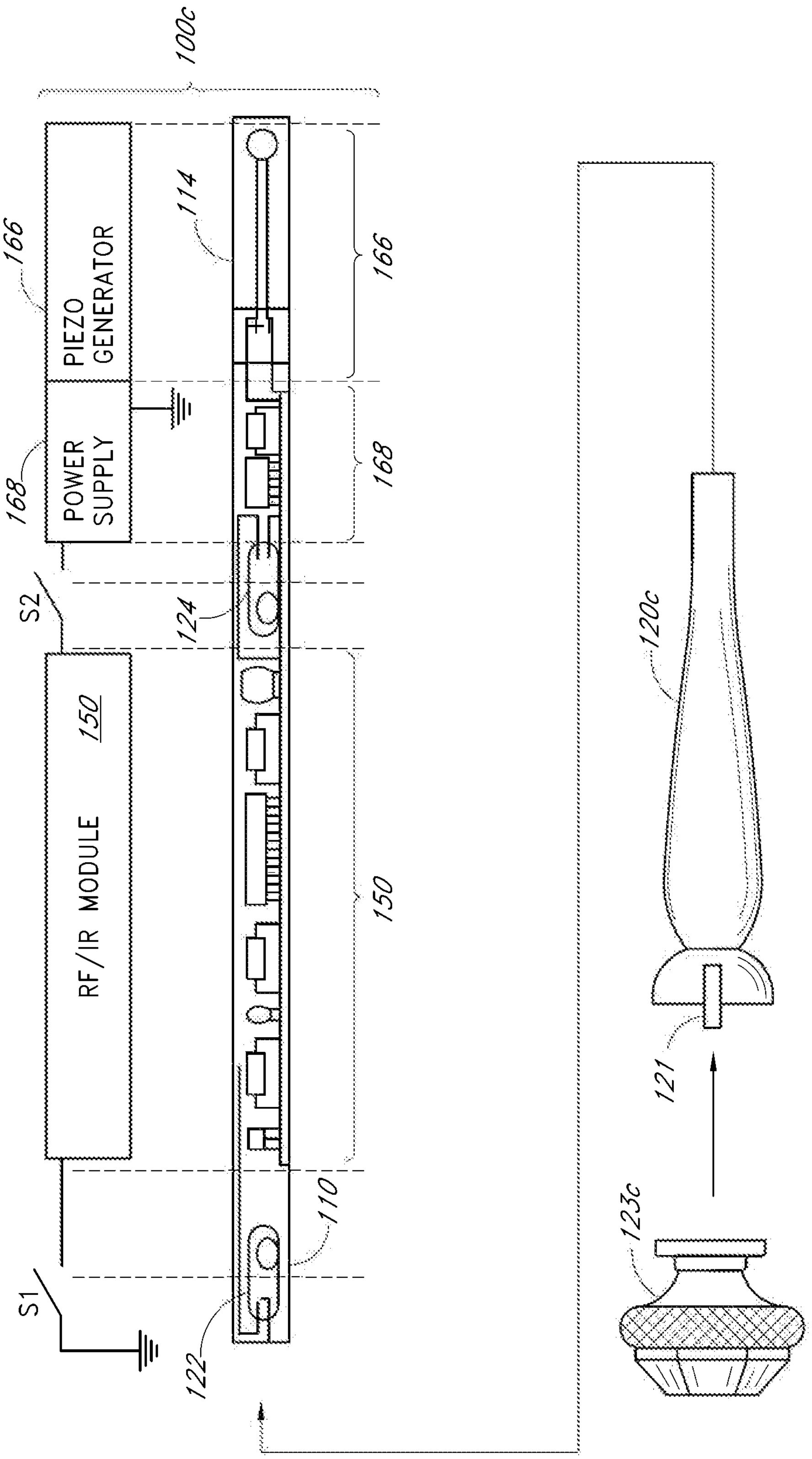
FIG. 9 is a schematic illustration of a further alternative embodiment of an interactive wand toy including an optional piezo generator energy source having features and advantages in accordance with the present invention.

FIG. 9 is a schematic illustration of a further alternative embodiment of an interactive wand toy including an optional piezoelectric generator. Wand 100*c* is essentially the same as wand 100*b* illustrated and described above in connection with FIG. 8, except that magnetic inductance energy generator 162 has been replaced with a piezo generator 166 and power supply 168.

Piezoelectricity refers to a unique property of certain materials such as quartz, Rochelle salt, and certain solid-solution ceramic materials such as lead zirconate-titanate (Pb(ZrxTi1-x)O3) ("PZT") that causes induced stresses to produce an electric voltage or, conversely, that causes applied voltages to produce an induced stress. In a "generator" mode, electricity is developed when a piezoelectric ("piezo") crystal is mechanically stressed. Conversely, in a "motor" mode, the piezo crystal reacts mechanically when an electric field is applied.

PZT is one of the leading piezoelectric materials used today. It can be fabricated in bimorph or unimorph structures (piezo elements), and operated in flexure mode. These structures have the ability to generate high electrical output from a source of low mechanical impedance (conversely, to develop large displacement at low levels of electrical excitation). Typical applications include force transducers, spark pumps for cigarette lighters and boiler ignition, microphone heads, stereophonic pick-ups, etc.

It is known that piezo elements can be used to generate small a mounts of useful energy from motion. For example, U.S. Pat. No. 3,456,134 to Ko, incorporated in its entirety by reference herein, discloses a piezoelectric energy converter for electronic implants, wherein body motion is converted into electrical energy using a piece of piezoelectric PZT in the form of a resonant cantilever beam. See also, U.S. Pat. No. 6,438,193 to Ko et. al, which discloses a similar piezo generator for self-powered tire revolution counter. Such piezo generators have particular application and benefit to batteryless toys and wands of the type disclosed and described herein.

Figure 10:
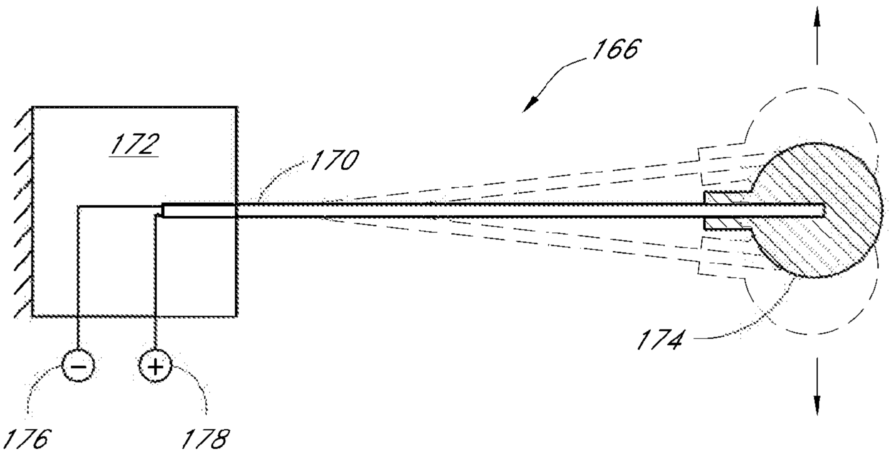
FIG. 10 is a schematic illustration of a piezo armature for use in a piezo generator having features and advantages in accordance with the present invention.

FIG. 10 is a cross-sectional view of such a piezo generator 166 comprising a "bimorph" piezo element 170 rigidly mounted at one end forming a cantilever beam. A "bimorph" is a flexing-type piezoelectric element, which has the capacity for handling larger motions and smaller forces than single piezoelectric plates. The bimorph piezo element 170 comprises two planar piezo crystals secured together face-to-face with a shim or vane therebetween. Mechanical bending of the element 170 causes it to produce a corresponding voltage between output electrodes 176, 178.

Figure 11:
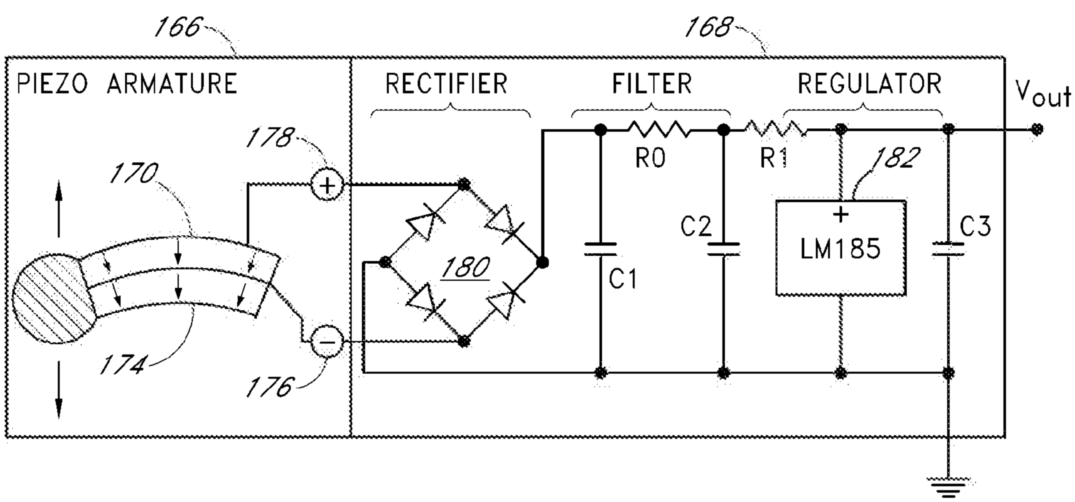
FIG. 11 is a schematic circuit diagram of the piezo generator and power supply of FIG. 9 having features and advantages in accordance with the present invention.

The piezoelectric element 170 is mounted and enclosed within the distal end of tube 110 (FIG. 9) and its free end is loaded with a small weight 174 selected to resonate at a suitable frequency corresponding to the likely or anticipated movement of the wand 100*c*. A typical measured oscillation frequency is on the order of 10-100 Hz. As the wand is moved periodically, the piezo element 170 vibrates back and forth producing electrical pulses. These electrical pulses are then rectified by a full wave bridge rectifier 180 (FIG. 11), are filtered by a filter circuit comprising capacitors C1, C2 and resisters R0, R1 and are stored in an energy storage capacitor C3, preferably a low-voltage electrolytic capacitor.

In order to draw maximum power from the piezo element 170, the power supply circuit 168 "load" impedance preferably is selected to match the output impedance of the piezo element 170. In order to minimize the ripple effect (peak-to-peak magnitude of rippling imposed on the nominal DC voltage level) energy storage capacitor C3 is preferably selected to be as large as possible, given available space constraints. To improve the stability of the power-supply an optional voltage regulator 182 may be added. For example, an LM185 IC band-gap voltage regulator may be chosen.

The piezo generator and power supply circuits 166, 168 preferably have sufficient power output under normal operating conditions such that the wand 100*c* requires no other internal energy sources such as replaceable batteries or the like. All energy is generated and stored by normal motion of the wand during use, e.g. during spell casting or during normal walking or running while carrying the wand 100*c*. Preferably, the energy storage capacitor C3 is selected such that when fully charged, it provides sufficient stored energy to enable the wand to be activated at least once and preferably 50-100 times without having to recharge. Advantageously, the absence of replaceable batteries or other visible electronic technology significantly increases the reality and full immersion experience of the fantasy and gives users the feeling of practicing, performing and mastering "real" magic using a "real" magic wand 100*c*. Optionally, a non-replaceable permanent rechargeable battery and/or a factory replaceable battery (not shown) may be provided in place of or in addition to the energy generating circuit 166 where it is desired to provide long-term energy storage. The wand 100*c* in all other material respects is essentially the same as wand 100*b* illustrated and described above in connection with FIG. 8. Note that the handle 120*c* and knob 123*c* are slightly modified, as these elements are preferably uniquely customized/personalized for each wand and/or wand user as will be discussed in more detail later.

Figure 12:
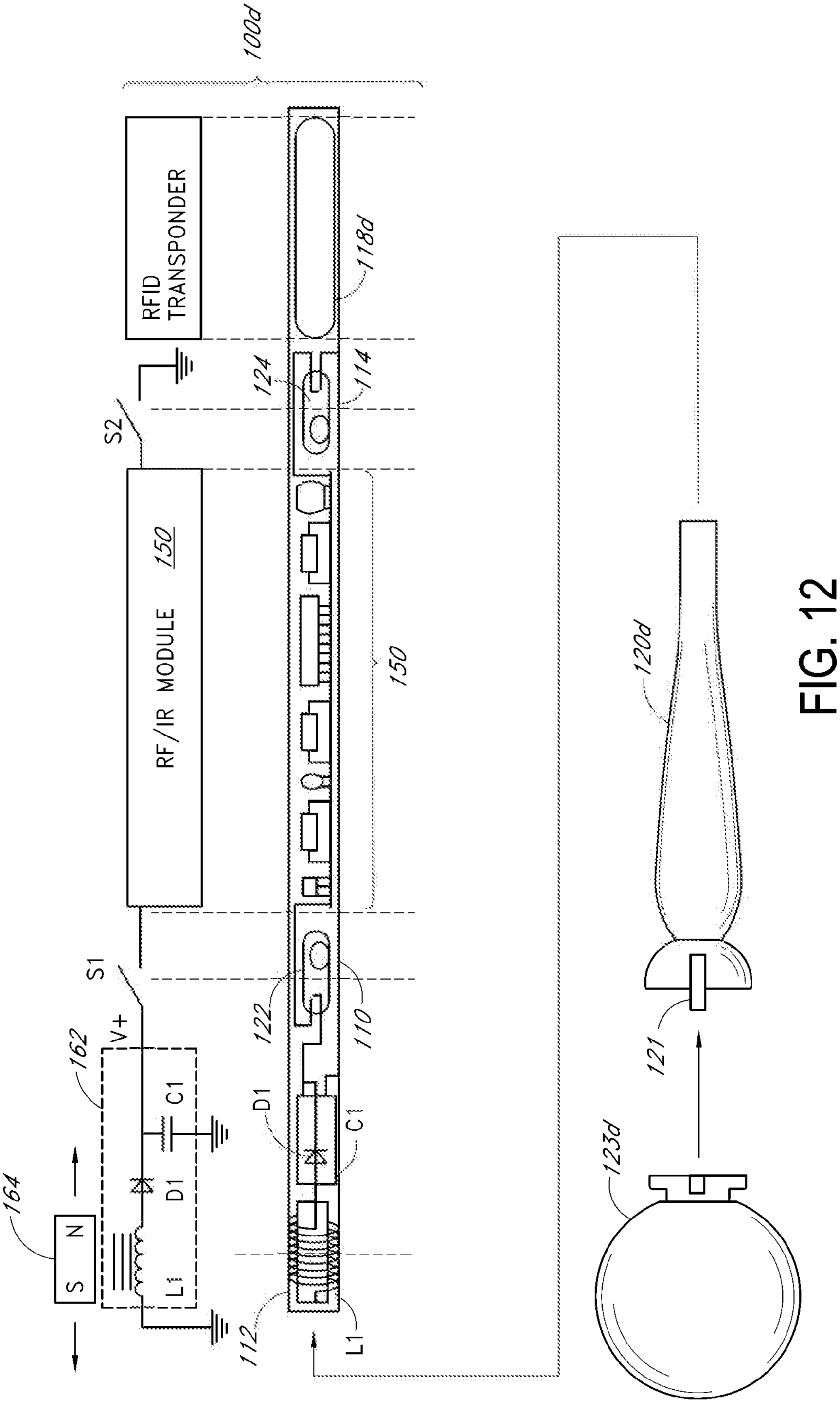
FIG. 12 is a schematic illustration of a further alternative embodiment of an interactive wand toy including an RF/IR module and optional RFID transponder having features and advantages in accordance with the present invention.

FIG. 12 is a schematic illustration of a further alternative embodiment of an interactive wand toy including an RF/IR module and optional RFID transponder. Wand 100*d* is essentially the same as wand 100*b* illustrated and described above in connection with FIG. 8, except for the addition of optional RFID transponder 118*d*.

As with the RFID transponder 118 illustrated and described above in connection with FIG. 1, RFID transponder 118*d* is operable to provide relatively short-range RF communications (less than about 200 cm) using one or more RFID reader units or reader/writer units, described in more detail later. The transponder 118*d* also preferably contains certain electronics comprising a radio frequency tag pre-programmed with a unique person identifier number ("UPIN"). The UPIN may be used to identify and track individual wands and/or play participants. Optionally, each tag 118*d* may also include a unique group identifier number ("UGIN") which may be used to match a defined group of individuals having a predetermined or desired relationship.

The RFID transponder is preferably used to store certain information identifying each play participant and/or describing certain powers or abilities possessed by an imaginary role-play character. For example, players may advance in a magic adventure game by finding clues, casting spells and solving various puzzles presented. Players may also gain (or lose) certain attributes, such as magic skills, magic strength, fighting ability, various spell-casting abilities, combinations of the same or the like, based on game play, skill-level and/or the purchase of collateral play objects. Some or all of this information is preferably stored on the RFID transponder 118*d* so that the character attributes may be easily and conveniently transported to various compatible play facilities, games, video games, home game consoles, hand-held game units, and the like. Alternatively, only the UPIN and UGIN are stored on the transponder 118 and all other desired information is stored on a computer-accessible database indexed by UPIN and/or UGIN.

If desired, RFID transponder 118*d* may be electronically interlocked and controlled by a corresponding wand activation circuit such as illustrated and described above in connection with FIG. 1. More preferably, however, the RFID tag 118*d* is not interlocked, but is always activated. In this manner, transponder 118*d* can be easily read at short range using an RFID reader/writer (described later) to sense and track play participants and/or to activate various simple wand effects. Longer range RF communications via RF/IR module 150 are preferably only enabled when an appropriate wand activation motion is executed as described above in connection with FIGS. 1-6. The wand 100*d* in all other material respects is essentially the same as wand 100*b* illustrated and described above in connection with FIG. 8. Note that the handle 120*d* and knob 123*d* are slightly modified, as these elements are preferably uniquely customized/personalized for each wand and/or wand user as will be discussed in more detail later.

Figure 13:
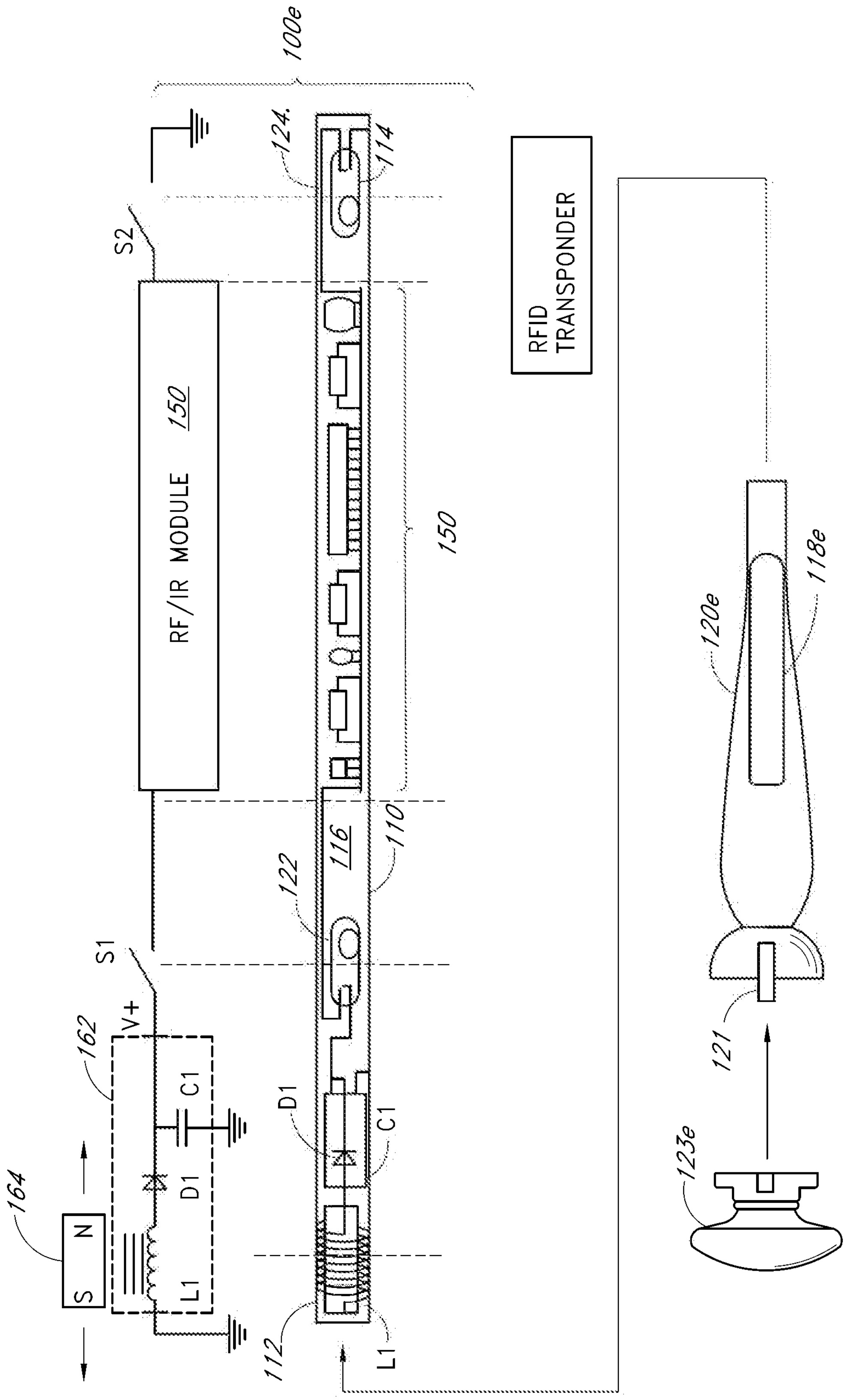
FIG. 13 is a schematic illustration of a further alternative embodiment of an interactive wand toy including an RF/IR module and optional RFID transponder having features and advantages in accordance with the present invention.

FIG. 13 is a schematic illustration of a further alternative embodiment of an interactive wand toy including an RF/IR module and optional RFID transponder. Wand 100*e* is essentially the same as wand 100*d* illustrated and described above in connection with FIG. 12, except for the location and placement of the RFID transponder 118*e*.

As with the RFID transponder 118*d* illustrated and described above in connection with FIG. 12, RFID transponder 118*e* provides relatively short-range RF communications using one or more RFID reader units or reader/writer units, described in more detail later. The transponder 118*e* also preferably contains certain electronics comprising a radio frequency tag pre-programmed with a unique person identifier number ("UPIN") and unique group identifier number ("UGIN"). Preferably, RFID tag 118*e* is always activated so that it can be easily read at short range using an RFID reader/writer (described later) to sense and track play participants and/or to activate various simple wand effects. Placing the RFID tag 118*e* in the handle 120*e*, allows for modular construction and functionality of a wand 100*e* as auxiliary handles may be interchanged having other unique RFID tags with unique stored information. Optionally, the tag-containing handle 120*e* and knob 123*e* may be omitted altogether in the case, for example, where a less expensive wand is desired.

As described above, longer range RF communications via RF/IR module 150 are preferably enabled only when an appropriate wand activation motion is executed as described above in connection with FIGS. 1-6. The wand 100*e* in all other material respects is essentially the same as wand 100*d* illustrated and described above in connection with FIG. 12. Note that the handle 120*e* and knob 123*d* are slightly modified, as these elements are preferably uniquely customized/personalized for each wand and/or wand user as will be discussed in more detail later.

In certain advanced applications, it is desirable to wirelessly communicate specific data and commands to achieve different or varied wand effects. For example, it may desirable to wirelessly send one command signal that turns a certain object (e.g., a lamp) "OFF" and another command signal that turns an object "ON". As described above in connection with FIGS. 1-6, this functionality may be achieved using multiple wand activation circuits (or a single multi-mode circuit) responsive to various unique wand motions whereby each wand motion, if executed successfully, causes a different RF or IR signal to be transmitted to control or activate the desired effect (e.g., turning a light ON or OFF or simulating the levitation of an object).

Another convenient way to achieve similar functionality is to load data bits representing specific desired commands directly into a data buffer of RF/IR module 150*f* (FIG. 14A) and then, using only a single wand activation circuit and a single learned wand motion, cause an RF or IR signal to be transmitted, thereby carrying the command signal and data to an RF or IR receiver and associated effect. Thus, for example, one or more tilt sensors 192, 194 (illustrated schematically as switches S3/S4) may be provided in a convenient location within the wand 100*f* (e.g., within the handle 120). These sensors are preferably mounted and oriented such that axial rotation of the wand shaft 110 and/or wand handle 120*f* causes the sensors to alternately switch from their ON to their OFF state. As illustrated in the circuit schematic accompanying FIG. 14A, each sensor controls one data input bit of the RF/IR module data bus (e.g., S3, S4).

Figures 14A, 14B:
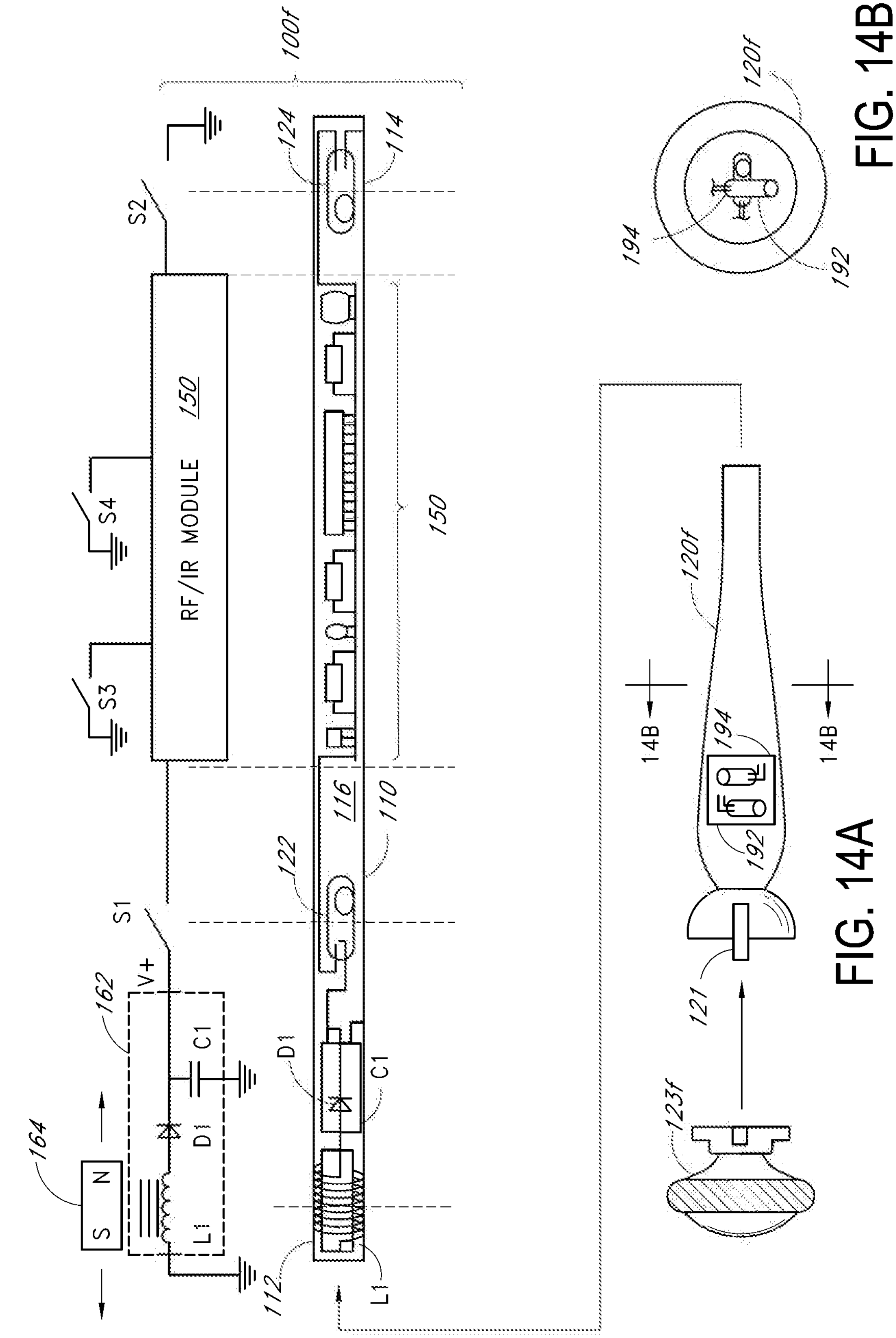
FIG. 14A is a schematic illustration of a further alternative embodiment of an interactive wand toy including optional orientation sensors having features and advantages in accordance with the present invention.
FIG. 14B is a detail transverse cross-sectional view of the handle portion of the interactive wand toy of FIG. 14A, illustrating the preferred placement and orientation of the optional orientation sensors and having features and advantages in accordance with the present invention.
Figures 15A, 15B:
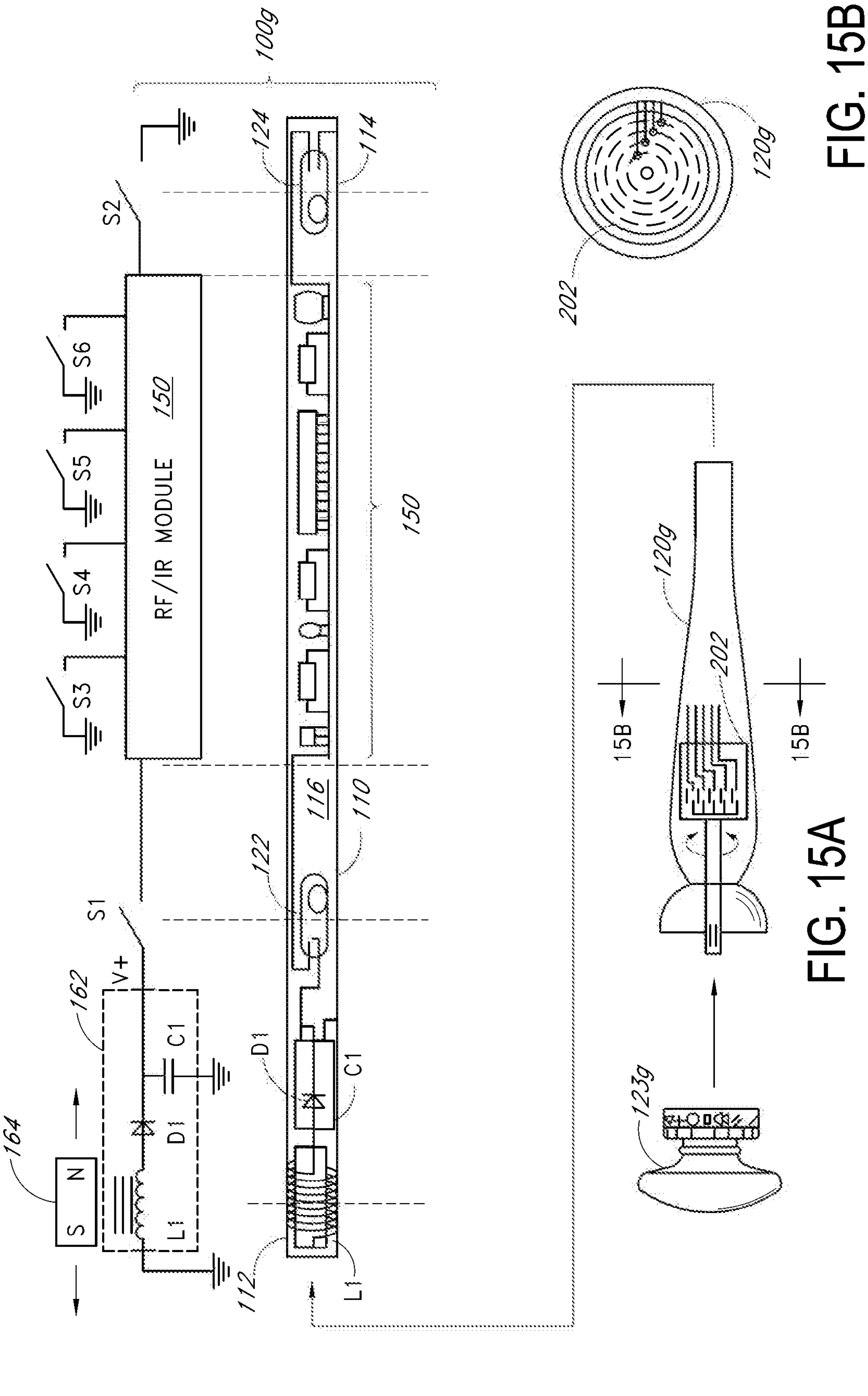
FIG. 15A is a schematic illustration of a further alternative embodiment of an interactive wand toy including an optional rotary switch having features and advantages in accordance with the present invention.
FIG. 15B is a detail transverse cross-sectional view of the handle portion of the interactive wand toy of FIG. 15A illustrating one preferred embodiment of a rotary switch having features and advantages in accordance with the present invention.

Preferably, sensors 192, 194 are disposed at an angle of between about 60 and 120 degrees (most preferably about 90 degrees) from one another within a transverse plane of the wand (see, e.g., FIG. 14B). Those skilled in the art will readily appreciate that in this manner, four possible wand orientations are possible resulting in four unique sensor pair states as follows: ON/ON; OFF/OFF; ON/OFF and OFF/ON. These four sensor states can represent, for example, four unique command signals sent using the RF/IR module 150*f*. The wand 100*f* in all other material respects is essentially the same as wand 100*b* illustrated and described above in connection with FIG. 8. Note that the handle 120*f* and knob 123*f* are slightly modified, as these elements are preferably uniquely customized/personalized for each wand and/or wand user as will be discussed in more detail later.

Where it is desired to send a larger number of unique command signals, various combinations of additional orientation sensors and/or wand activation circuits may be added, as desired. Alternatively, various dials, switches and/or other inputs may be provided for selecting from a number of unique wand commands or "spells." For example, in one preferred embodiment illustrated in FIGS. 15A-C a wand 100*g* is provided including a knob-actuated rotary switch 202 which directly loads up to 4 data bits (up to 16 possible unique codes) representing specific desired commands directly into a data buffer of RF/IR module 150*g* (FIG. 15A).

Figure 15C:
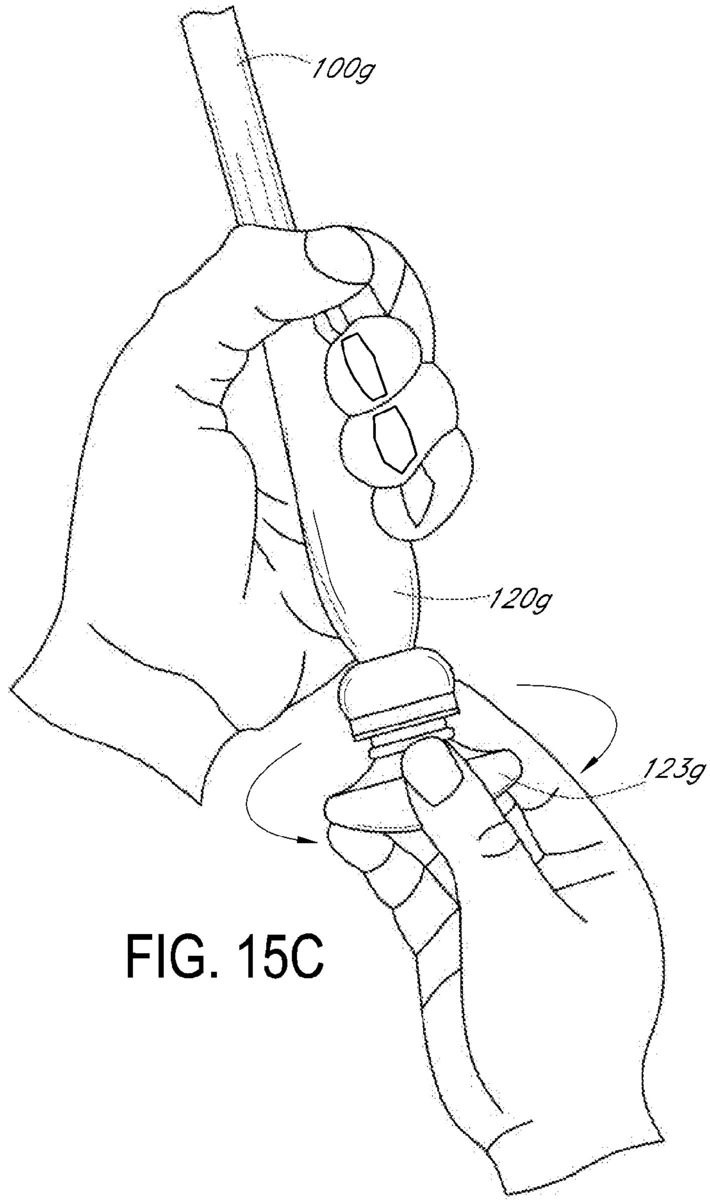
FIG. 15C is a partial perspective view of a user rotating the knob of the interactive wand toy of FIG. 15A in such a way to produce a desired wand operation or effect.
Figure 15D:
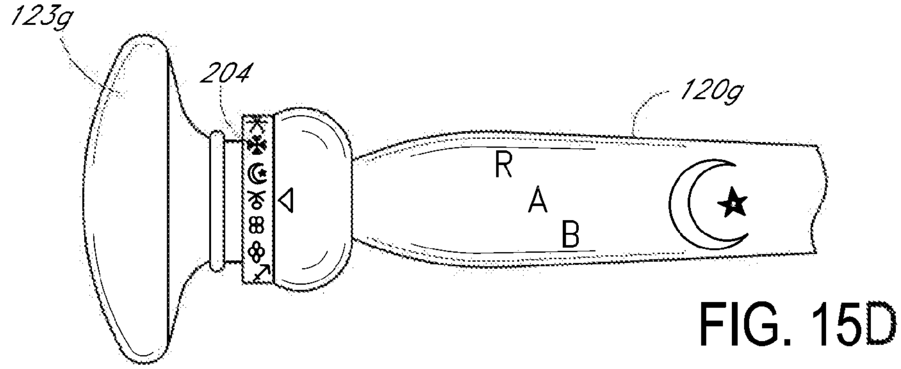
FIG. 15D is a detail view of the handle portion and rotatable knob of the interactive wand toy of FIGS. 15A and 15B.

As illustrated in FIG. 15C a user rotates the knob 123*g* and sets it to the desired spell represented by magic symbols 204 (FIG. 15D). Then, using only a single wand activation circuit and a single learned wand motion, the user causes an RF or IR signal to be transmitted, carrying the unique command signal/data to an RF or IR receiver, thereby controlling or activating an associated effect. Alternatively, a potentiometer may be used in conjunction with an A/D converter circuit instead of rotary switch 202 for selecting wand functions/spells. The wand 100*g* in all other material respects is essentially the same as wand 100*b* illustrated and described above in connection with FIG. 8. Note that the handle 120*g* and knob 123*g* are slightly modified, as these elements are preferably uniquely customized/personalized for each wand and/or wand user as will be discussed in more detail later.

Figures 16A, 16B:
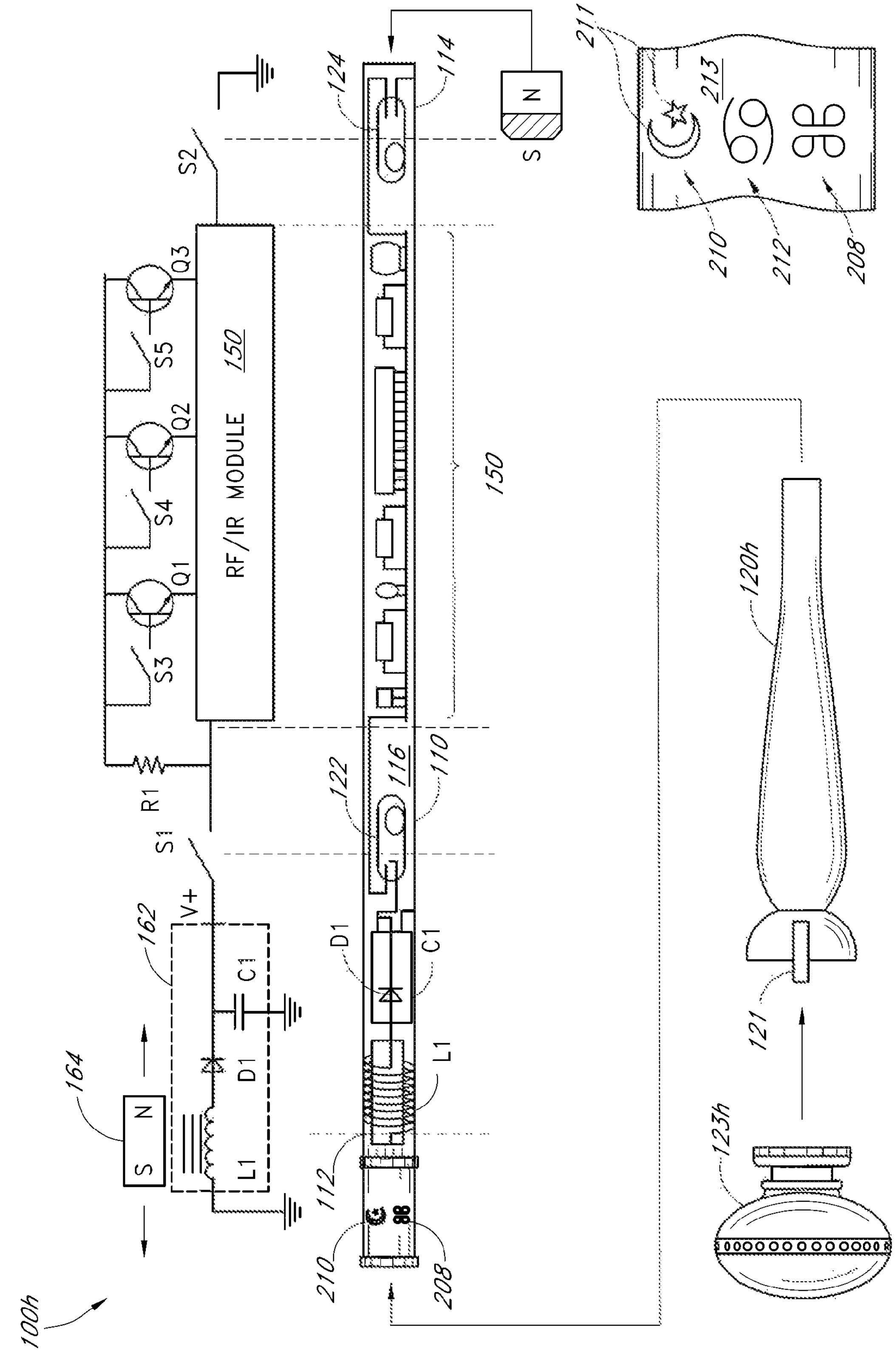
FIG. 16A is a schematic illustration of a further alternative embodiment of an interactive wand toy including optional touch sensor elements having features and advantages in accordance with the present invention.
FIG. 16B is a detail view of one embodiment of a touch sensor element of FIG. 16A having features and advantages in accordance with the present invention.

FIG. 16A is a schematic illustration of a further alternative embodiment of an interactive wand toy including optional touch sensor elements for selecting one or more wand spell commands. Wand 100*h* is essentially the same as wand 100*f* illustrated and described above in connection with FIGS. 14A and 14B, except for the substitution of touch sensor elements 208, 210, 212 for tilt sensors 192, 194.

Touch sensor elements 208, 210, 212 (represented in the accompanying schematic as S3, S4, S5) comprise solid-state electronic switches (no buttons or moving parts) that are activated by the simple touch of a finger. Most preferably, these are solid state touch switches of the type illustrated and described in U.S. Pat. No. 4,063,111 to Dobler et al., the entire contents of which are incorporated herein by reference. As illustrated in FIG. 16B, each touch switch contact element 208, 210, 212 is preferably formed from a pair of conductive electrodes 211 surrounded by, and preferably flush with, an insulating material 213. If desired, the electrodes 211 may be shaped in the form of magic symbols or other shapes consistent with a desired magic theme, as illustrated. During use, the user's finger 217 is placed over the pair of electrodes 211 and thereby forms a portion of an electronic circuit to change the state of a corresponding solid state electronic switching device Q1, Q2, Q3 in communication therewith, such as a MOSFET or PNP transistor. The touch sensor is thereby actuated.

Each touch sensor preferably controls one data input bit of the RF/IR module data bus (e.g., S3, S4, S5). One or more touch switches may be activated during a single wand transmission. Thus, those skilled in the art will readily appreciate that eight possible combinations of touch switch activations are possible corresponding to eight unique command input data sets as follows: ON/ON/ON; OFF/OFF/ON; ON/OFF/ON, OFF/ON/ON, ON/ON/OFF; OFF/OFF/OFF; ON/OFF/OFF, and OFF/ON/OFF These eight sensor states can represent, for example, eight unique command signals sent using the RF/IR module 150*h*.

Figure 16C:
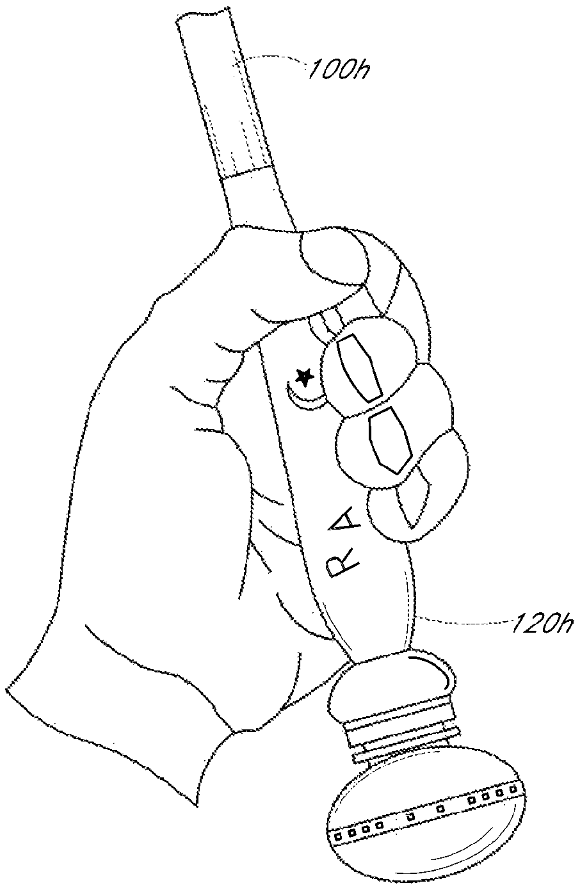
FIG. 16C is a partial perspective view of a user operating the touch-sensor-enabled interactive wand toy of FIG. 15A in such a way to produce a desired wand operation of effect.
Figure 16D:
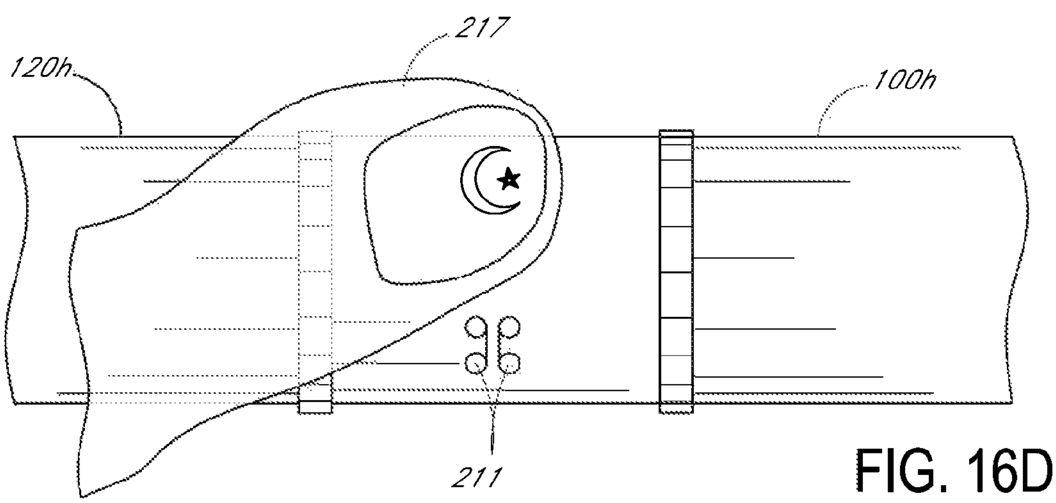
FIG. 16D is a detail view of the handle portion and touch sensor contact elements of the interactive wand toy of FIGS. 16A and 16C.

As illustrated in FIGS. 16C and 16D, a user may select a spell by touching one or more selected magic symbols. Then, while holding the fingers over the selected magic symbols and using only a single wand activation circuit and a single learned wand motion, the user causes an RF or IR signal to be transmitted, carrying the unique command signal/data to an RF or IR receiver, thereby controlling or activating an associated effect.

Figure 17A:
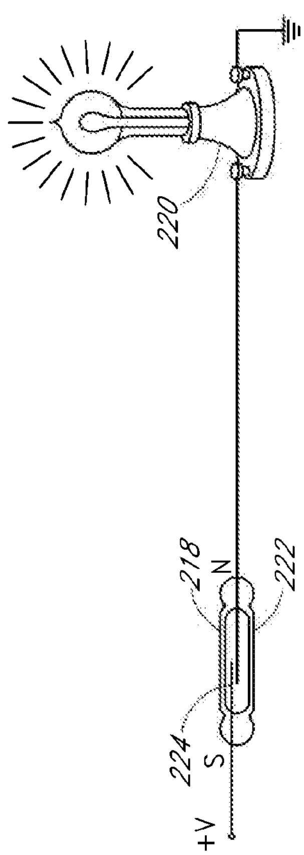
FIGS. 17A-17B are time-sequenced illustrations of one embodiment of a wand-actuated effect using the interactive wand toy of FIG. 16 with optional magnetic tip and a magnetic reed switch having features and advantages in accordance with the present invention.
Figure 17B:
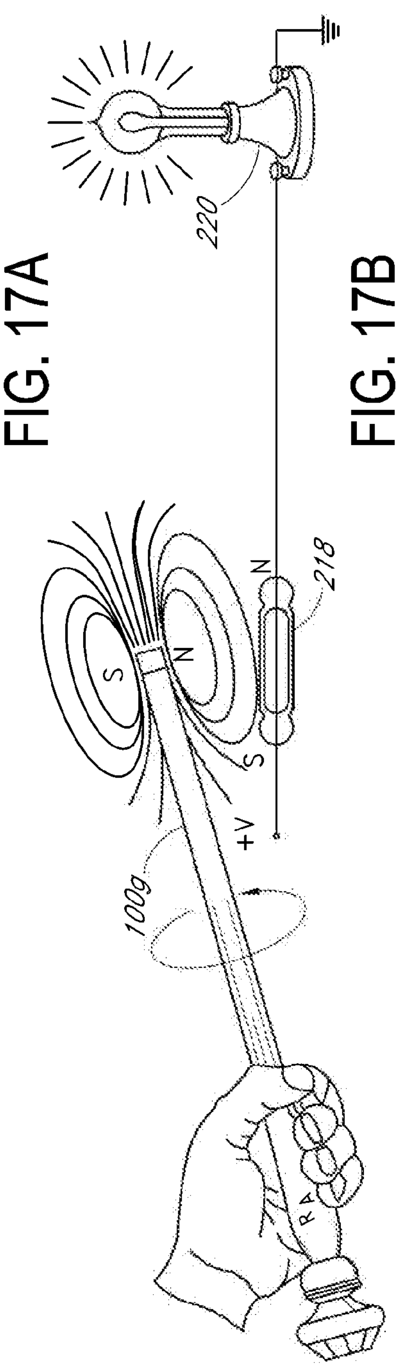

Optionally, wand 100*h* includes a magnetic tip 216, as illustrated in FIG. 16A. This can be especially useful and entertaining for close-range activation of various play effects, such as turning lights on/off, triggering special sound and/or lighting effects. For example, FIGS. 17A-17B are time-sequenced illustrations of one embodiment of a magnetically actuated lighting effect using the interactive wand toy 100*h* with optional magnetic tip 216. A magnetic reed switch 218 is provided in series between the desired lighting effect 220 and a power source (V+). The reed switch is constructed in the normal fashion. Contacts 222, 224 are normally open and, thus, the lighting effect 220 is in its OFF state. But, when the magnetic tip 216 of wand 100*h* is brought into relatively close proximity (2-3 cm) with the reed switch 218, contact elements 222, 224 are magnetized by the magnetic field lines and are drawn toward each other. This causes the contacts 222, 224 to immediately attract, closing the gap and completing the circuit to turn on the lighting effect 220. Of course, those skilled in the art will appreciate from the disclosure herein that various relays, power controllers and the like may be required or desirable to provide adequate control of larger, more complex effects. But all such effects, no matter how small/simple or large/complex, may be triggered with a simple reed switch 218 and a wand 100*h* having a magnetic tip 216, as described above.

Figure 17C:
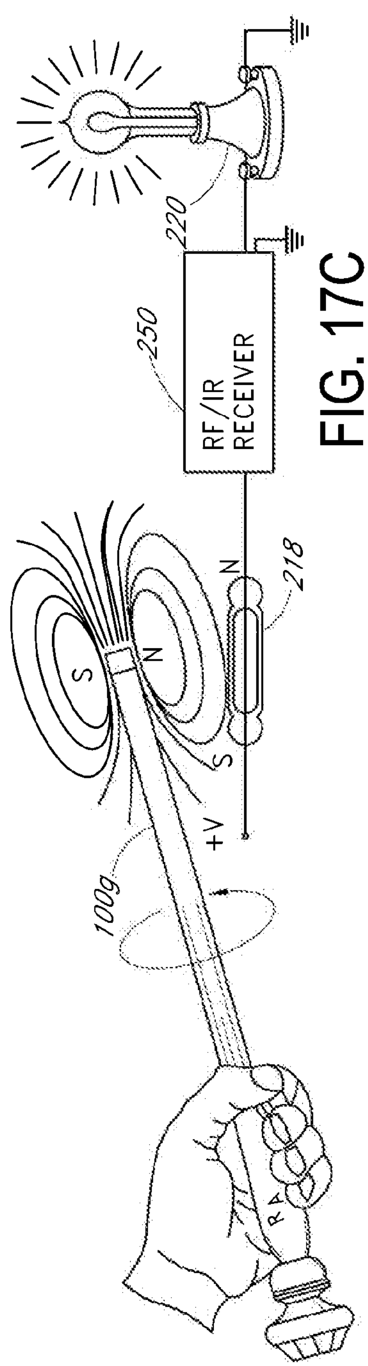
FIG. 17C is an alternative embodiment of a wand-actuated effect using the interactive wand toy of FIG. 16 with optional magnetic tip, a magnetic reed switch and an optional RF/IR receiver having features and advantages in accordance with the present invention.
Figure 18A:
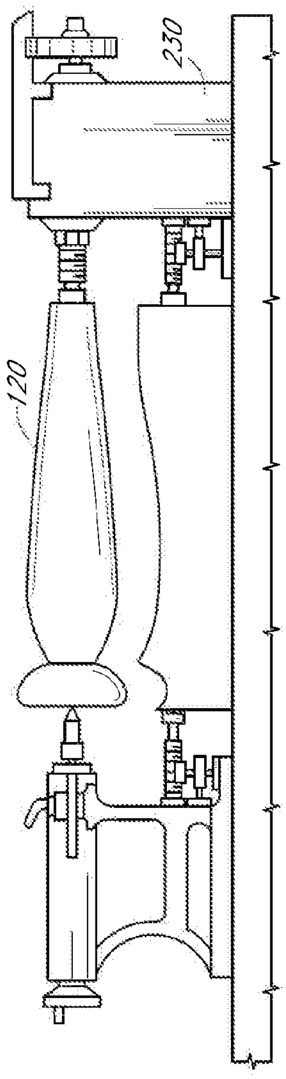
FIGS. 18A and 18B are schematic illustrations showing one preferred method for fabricating, assembling and finishing an interactive wand toy having features and advantages in accordance with the present invention.
Figure 18B:
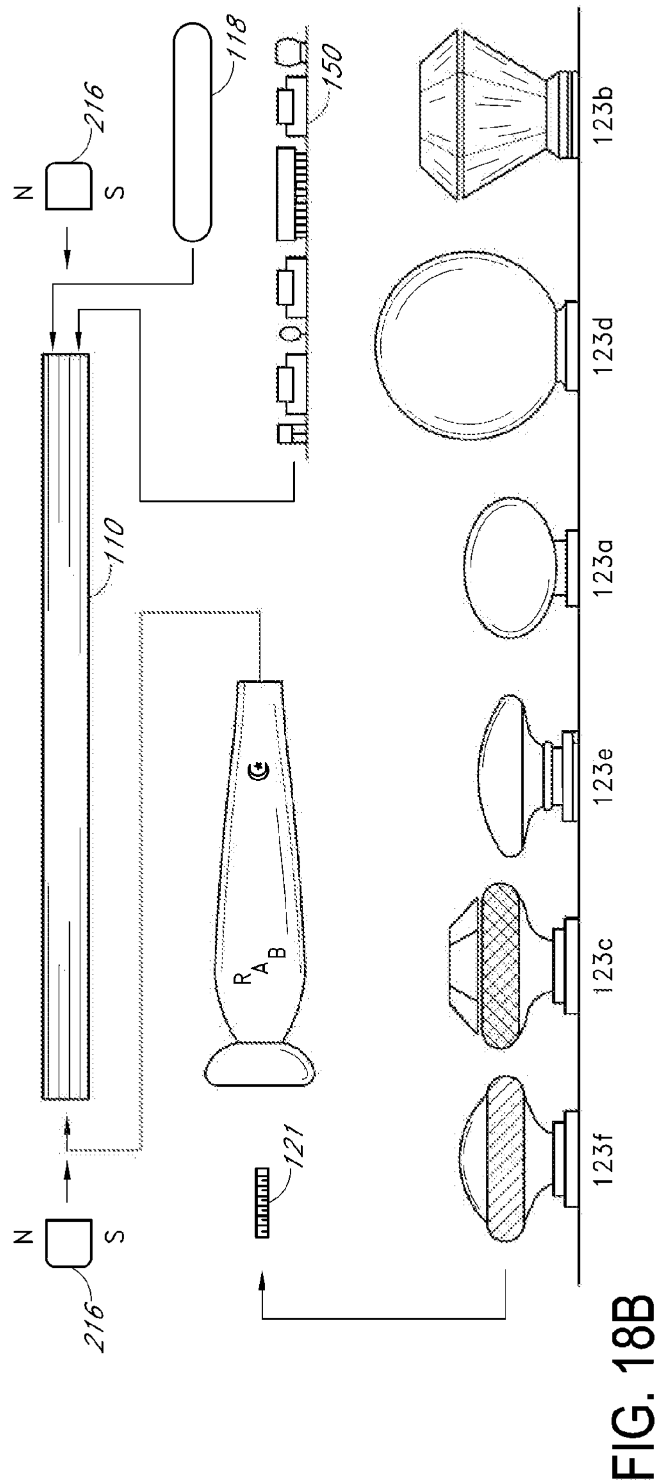

The magnetic tip 216 is especially useful and synergistic in combination with the other disclosed functions and features of wand 100*h*. Thus, for example, as illustrated in FIG. 17C, a desired lighting effect is controlled by RF/IR receiver 250, which is adapted to receive an RF and/or IR command signal from wand 100*h*. The RF/IR receiver 250 (and/or the lighting effect 220) is also controlled by series-connected magnetic reed switch 218, as illustrated and described above (FIGS. 17A, 17B). Desirably, this allows a user to use the wand 100*h* and the magnetic tip 216 thereof to select one or more effects he or she wishes to control or activate. For example, the closure of the magnetic reed switch 218 sends an activation signal to RF/IR receiver 250. In response, the receiver initiates a timer (e.g., 5-10 seconds) wherein its RF and/or IR receiver circuitry is activated and ready to receive one or more transmitted commands for controlling the associated effect 220. Thus, a user may select to control the lighting effect 220 by activating the reed switch 218 with the magnetic tip 216 of wand 100*h*. Then the user may cast a spell (cause the wand 100*h* to transmit an RF or IR command signal) that commands the RF/IR receiver 250 to turn the lighting effect ON or OFF, to change the lighting effect (e.g., change its color or intensity), and/or launch a related effect (e.g., simulated levitation of the lighting source or other desired effects). In this manner, users can maintain direct and precise control over any number of individual play effects as may be desired. The wand 100*h* in all other material respects is essentially the same as wand 100*f* illustrated and described above in connection with FIG. 14. Note that handle 120*h* and knob 123*h* are slightly modified, as these elements are preferably uniquely customized/personalized for each wand and/or wand user as will be discussed in more detail later.

While it is particularly preferred to provide batteryless RF-enabled, RFID-enabled or IR-enabled wand 100, those skilled in the art will recognize from the disclosure herein that the invention may be carried out in a variety of other ways that incorporate some or all of the inventive features disclosed and described herein. For example, wand activation circuit 115 may be implemented in a variety of other gaming and entertainment applications such as, for example, a wireless or hard-wired wand input device for a video game, computer game or home game console, an arcade or redemption challenge device, home-operated amusement device using simple bells and buzzers, or the like. Alternatively, some or all of the various circuitry and components described herein above may be externally implemented such that the wand 100 may not be entirely self-contained, but may rely on certain external components and circuitry for some or all of its functionality. Alternatively, some or all of the various circuitry and components described herein can be implemented in a user-wearable format such that various interactive play effects and the like, as described herein, may be actuated through particular hand or arm motions without the use of a wand.

Proximity Sensor

In yet another embodiment, the wand 100 further comprises a proximity sensor usable to provide a "hover" effect that is indicative of the initialization of a control interlock. When the proximity sensor in the wand 100 is moved within a particular distance of a receiver, such as the RF/IR receiver 150, and/or an effects controller, a "hover" effect occurs, such as, for example, the turning on of a light, the movement or vibration of an object, or any other perceptible signal (visual or audible) that notifies the user that a play effect may be initiated.

For instance, one embodiment of the invention may include a play effect that comprises the moving of a book. When the user brings the wand 100 within a predetermined distance from the book (e.g., one meter), the proximity sensor in the wand 100 causes the wand to output a command signal to a receiver and/or effects controller near the book to initiate a control interlock and to generate a "hover" effect, such as the turning on of a light. At this point, the user is notified that he or she may then cast the appropriate spell, such as by appropriately motioning the wand 100, which causes the book to move. If the user attempts to cast the spell outside of the predetermined distance, the book does not move. This is because the appropriate control interlock is not initiated between the wand 100 and the receiver and/or effects controller.

Furthermore, the foregoing described "hover" effect may be used with passive RFID technology to conserve energy or battery power of the wand 100. In one embodiment, the wand 100 comprises a passive RFID circuit in addition to an activation circuit (e.g., activation circuit 115 of FIG. 1) and may operate in an "active" or a "sleep" mode. During the sleep mode, the activation circuit does not engage in significant activity, which reduces the energy consumption of the wand 100. In addition, during the "sleep" mode, the user may not be able to cast spells with the wand 100. When the passive RFID circuit of the wand 100 is brought within a certain range of an RF transmitter, such as positioned near the effects controller, the passive RFID circuit receives the transmitted RF signal and "awakens" the wand activation circuit into the "active" state. At this point, the user is able to engage in spell casting, such as by motioning the wand, as is described herein. In further embodiments, a perceptible signal, such as a light or a noise, alerts the user when the wand 100 awakens to an "active" mode.

Although disclosed with reference to particular embodiments, a skilled artisan will recognize from the disclosure herein a wide variety of methods and/or devices usable to cause a "hover" effect. For example, the user may use certain voice commands, such as a particular magic word or phrase, to cause the "hover" effect and to initiate a control interlock. In other embodiments, an RFID tag in the wand 100, the receiver, and/or the effects controller is used to initiate the "hover" effect. In yet other embodiments, the proximity sensor is located remote to the wand 100, such as near or in the receiver and/or effects controller.

Wand Operation

A magic wand as disclosed and described herein may be used to cast an infinite possibility of "spells" or commands based on a single wand activation circuit, a single learned wand motion and only a few unique wand command signals selected using any of the various circuits and structures described above in connection with FIGS. 14-16 (of course more complex operations are also possible and desirable). For example, using the wand 100*g* illustrated and described in connection with FIGS. 16A-16D a user can easily transmit three distinct command codes selected by each of the three touch sensors 108, 110, 112. Touching either the "+" or the "−" symbols and waving the wand in the required motion triggers the internal wand activation circuit and causes the wand to transmit a radio frequency (RF) or infrared (IR) signal corresponding to an "ON/CAST" or "OFF/BLOCK" command or spell, respectively. This can be useful, for example, for turning on/off various play effects over long distances (up to 100 meters) and for basic game play such as spell casting competitions, target practice, and the like.

If it is desired to provide signal directionality so that the command signal or spell can be aimed or cast at various particular selected play effects or objects, then a directional signal source such as IR and/or directionalized RF is preferably selected. Alternatively, a combination of directional (e.g., IR) and omni-directional (e.g., RF) signal sources may be used effectively to provide a desired directional spell-casting capability. For example, a momentum-actuated switch or accelerometer (not shown) internally disposed within the tip of wand 100 can be used to activate a directional signal source (e.g., a light bulb or L.E.D. shining a beam or cone of light) when a predetermined momentum force or acceleration is reached. Such a wand with internal wand activation circuitry and/or a directional signal source may replace, for example, a gun or a rifle in a conventional shooting gallery or target game such as disclosed in U.S. Pat. No. 4,296,929 to Meyer et al. and U.S. Pat. No. 5,785,592 to Jacobsen, both of which are incorporated by reference herein in their entireties.

Waving and activating the wand while touching the "*" symbol preferably initiates the beginning of a "complex" spell comprising multiple combinations of the first two (base-2 coding) or all three wand motions (base-3 coding). Of course, those skilled in the art will appreciate that with three touch sensors, up to base-8 coding is possible by including combinations of simultaneously activated sensors. Thus, various spell "recipes" or incantations can be described and carried out using a sequence of individual commands and corresponding wand motions as represented, for example, by the three distinct magic symbols. Table 3, below, illustrates some examples of complex spells/commands that are possible using base-3 coding.

TABLE 1

| Spell Formula | Effect |
|---|---|
| + | "on" or "cast spell" |
| – | "off" or "block spell" |
| * | "start complex spell" |
| *+ | "move object" |
| *– | "stop object" |
| *–*+ | "start/increase levitation" |
| *–*– | "stop/decrease levitation" |
| *+*+ | "unlock/open door" |
| ***– | "lock/close door" |
| *++ | "Fire Spell" |
| *+– | "Block Fire spell" |
| *+++ | "Ice Spell" |
| *++– | "Block Ice Spell" |

Using up to 6 combinations of 2 wand motions (base-2), wand users can produce 126 different spells. Using up to 6 combinations of 3 wand motions (base-3), wand users can produce 1092 different spells. Using up to 6 combinations of 8 wand motions (base-8) produces 299,592 different possible spells. There is virtually no limit to the number of different spells that can be created and executed in this fashion. Preferably, once a complex spell is initiated and during each further step thereof a timer is initiated by the associated active receiver module and/or effects controller. If an additional command signal is not received within a predetermined time period (e.g. 0.5-3 seconds) the complex spell is considered "completed" and the effects controller actuates the appropriate relay to trigger whatever appropriate effect(s) correspond to the complex spell received. If the spell is incomplete or is inaccurate in any way, preferably only a "swoosh" or similar sound effect is triggered indicating that a spell was cast but did not work.

If desired, the active receiver module or associated effects controller can also be configured to give users audible and/or visual cues as each complex spell is being cast. This is in order to help users cast complex spells and help them identify when they have made a mistake or if they are about to cast the wrong or an unintended spell. For example, various themed feedback effects such as glowing lights, halo effects or escalating sound effects can be provided as each step in a complex spell is successfully completed. Again, this helps users learn the spells and understand where they perhaps went wrong in casting a particular spell. It also helps users discover and learn new spells by trial and error experimentation and by memorizing various spell sequences/commands that are observed to produce desired effects.

Preferably, users participate and advance in an interactive magic experience or game over time (e.g., weeks, months or years) according to a predetermined progression of gaming levels, wand levels and/or experience levels. For example, the various RF receivers disposed within a compatible play space could be programmed so that users of Level-1 wands may only be able to cast spells by actually touching their wands to whatever object they wish to control/actuate. Users of Level-2 wands would be able to cast simple (e.g., on/cast and off/block) spells over short and medium range distances, but not complex spells. Users of Level-3 wands would be able to cast simple spells (e.g., on/cast and off/block) and some complex spells (e.g., spells requiring up to 3 wand motions) over short, medium and long range distances, but not more complex spells requiring 4 or more wand motions. Users of Level-4 wands would be able to cast all types and varieties of simple and complex spells over short, medium and long distances using any number of wand motions as desired. Certain "master" level users may also be able to program or define their own spells and share them with other users. There is no limit to the number and complexity of spells and corresponding special effects that may be created.

Wand levels can easily be set and changed, for example, by accessing the internal circuitry of each wand and flipping various dip switches to change the address or coding of the internal RF/IR transmitter. Alternatively, within a play facility wand levels may be set and stored at the receiver/controller level by tracking each wand unique ID code (UPIN/UGIN) and using a computer and an indexed data-base to look up the corresponding wand level and any other relevant gaming information associated with each unique UPIN/UGIN. Preferably, when a user reaches the appropriate number of points or experience for advancement to the next level, a special congratulatory effect is actuated and the user is thereby notified that he or she has earned additional magic powers. If desired, a short graduation ceremony may be presided over by a "Grand Wizard" while the user's wand is upgraded with new magic powers (e.g., insertion of new electronics and/or adjustment of various dip switches, circuit jumpers, combinations of the same or the like).

Wand Fabrication, Assembly and Detailing

One particularly exciting and rewarding aspect of an immersive interactive magic experience in accordance with the present invention is providing users with an opportunity to select, build and/or decorate their own magic wands. Accordingly, preferably all or most of the wand components are standardized, modularized and interchangeable so that various prefabricated wand components and starting materials can be stocked (e.g., in a "wizards workshop") and individually purchased by users to create an endless variety of unique and individualized finished wands having evolving powers, abilities and/or aesthetics.

For the most fully immersive experience possible it is most desirable that users are not distracted by the underlying technology that makes the wand work, but simply enjoy the immersive fantasy experience of practicing, performing and mastering "real" magic using a "real" magic wand. Thus, preferably most, if not all, of the wand components are simple in outward appearance and preferably contain no conspicuous outward manifestations (or have only minimal outward manifestations) of the technology within. Wand materials and components fabricated from natural or simulated natural materials, such as wood, bone, leather, minerals (metals) and crystals are particularly preferred, although certainly not required.

The base wand component comprises the wand shaft 110. This may be a hollow plastic, wood or metal shaft provided in various materials and colors. For beginners or entry level users, a finished wand may be constructed by simply selecting a wand shaft 110 and then fitting it with one or more magnetic end caps 216, as illustrated. This provides a entry level wand (Level-1) that can be used to activate a variety of simple effects such as illustrated and described above in connection with FIGS. 17A-17C. If desired, a small wood lathe 230 can be used to create a custom wand handle 120 fabricated from a selected wood stock and a user's choice of any one of a number of available template patterns. If further desired, the end of the handle may be center-drilled to accommodate a threaded stud 121, bolt or other means for removably securing a selected decorative metal, wood and/or crystal knob 123*a*-123*f*. Such knobs may comprise, for example, any one of a number of standard, internally threaded cabinet knobs or drawer-pulls such as available from Emtek Products Inc. A Level-1 wand constructed in this fashion preferably facilitates basic game play within a compatible play facility, but is not fully functional and, therefore, may not be capable of achieving some of the more desirable play effects or play experiences available.

The next level wand (Level-2) would preferably include, in addition, a simple passive RFID transponder 118 inserted and secured at one end thereof. The transponder 118 provides relatively short-range RF communications and also stores a unique person identifier number ("UPIN") and an optional unique group identifier number ("UGIN"). The UPIN and UGIN may be used to identify and track individual wands and play participants. The RFID transponder 118 also stores certain information identifying each play participant and/or describing certain powers or abilities possessed by an imaginary role-play character represented by the wand. These stored character attributes may be easily and conveniently transported with the wand to various compatible play facilities, games, video games, home game consoles, hand-held game units, and the like. If desired, the transponder 118 may be encapsulated in a colored epoxy, Lucite or the like and thereby disguised as a natural crystal or mineral/stone. A Level-2 wand preferably facilitates basic and intermediate game play within a compatible play facility. It has more functionality than a Level-1 wand, but is still not fully functional and, therefore, may not be capable of achieving some of the most desirable play effects or play experiences available.

The next level wand (Level-3) would preferably include, in addition, an active RF/IR module and associated wand activation circuitry for wirelessly casting a simple spell (e.g., ON/OFF) over longer distances. For example, this would be similar to the wand 100*d*, illustrated and described above in connection with FIG. 12. Preferably, the wand would be self powered, requiring no batteries or other replaceable internal power source. However, if replaceable batteries are desired, they may optionally be encapsulated in a colored epoxy, Lucite or the like and thereby disguised and sold in the form of a natural "energy crystal" or mineral/stone. A Level-3 wand preferably facilitates basic, intermediate and some advanced game play within a compatible play facility. It has more functionality than a Level-1 and Level-2 wand and can cast simple spells over long distances, but is not able to cast more complex spells. Therefore, it may not be capable of achieving some of the most advanced and desirable play effects or play experiences available.

The highest level wand (Level-4) would preferably include, in addition, circuitry and/or structure(s) for selecting and casting more advanced and/or complex spells (e.g., ON/OFF, increase/decrease, UP/DOWN, change colors, simulated levitation, or the like). For example, this would be similar to the wands 100*f*-100*h*, illustrated and described above in connection with FIGS. 14-16. Preferably, the wand would be self powered, requiring no batteries or other replaceable internal power source. A Level-4 wand preferably facilitates basic, intermediate and all advanced game play within a compatible play facility. It has more functionality than a Level-1, Level-2 and Level-3 wand and can cast a variety of simple or complex spells over long distances to achieve the most advanced and spectacular magical play effects.

Figure 19A:
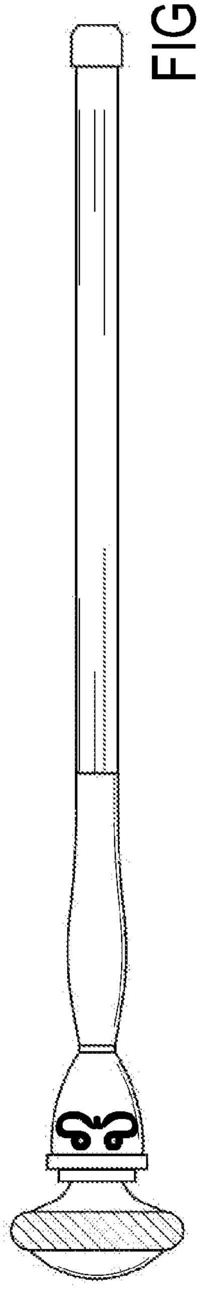
FIGS. 19A-19P are schematic illustrations showing various possible constructions, configurations and finishes of interactive wand toys having features and advantages in accordance with the present invention.
Figure 19B:
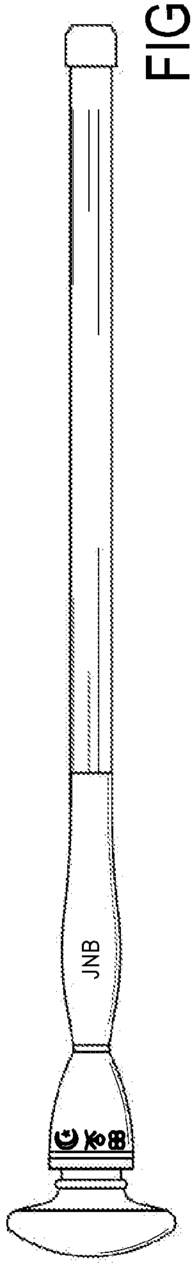
Figure 19C:
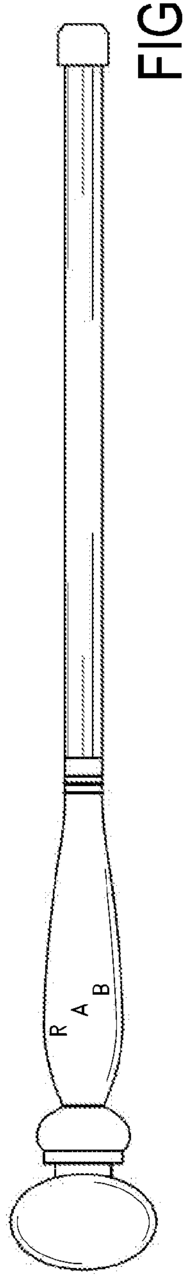
Figure 19E:
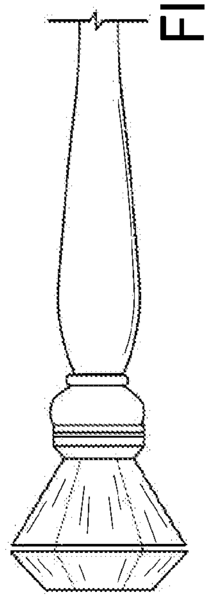
Figure 19D:
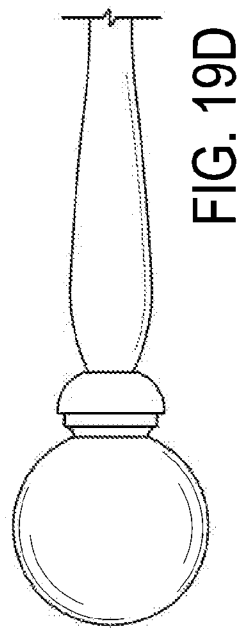
Figure 19F:
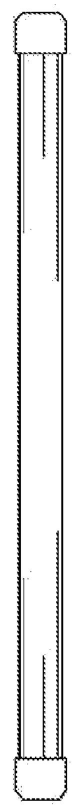
Figure 19G:
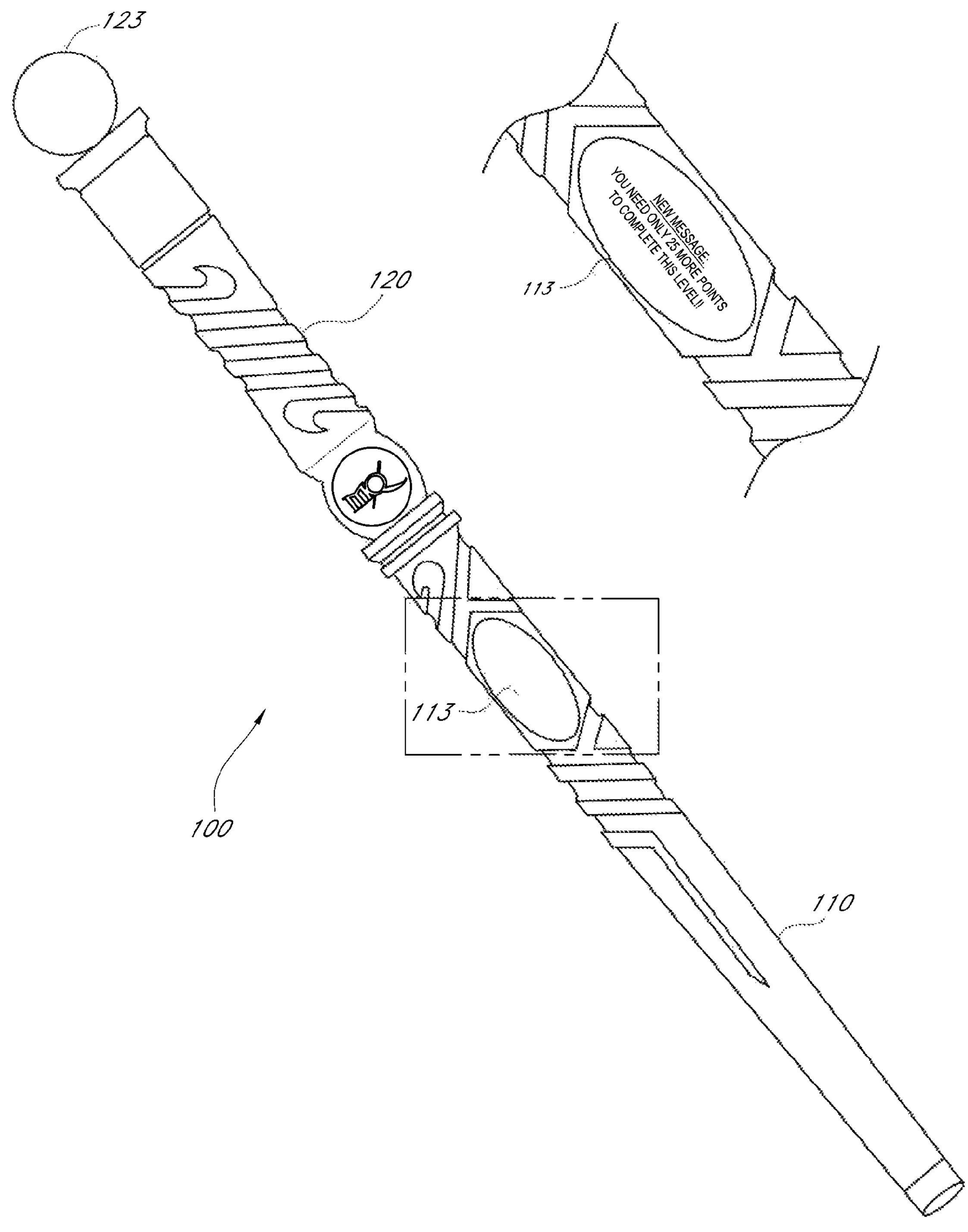
Figure 19H:
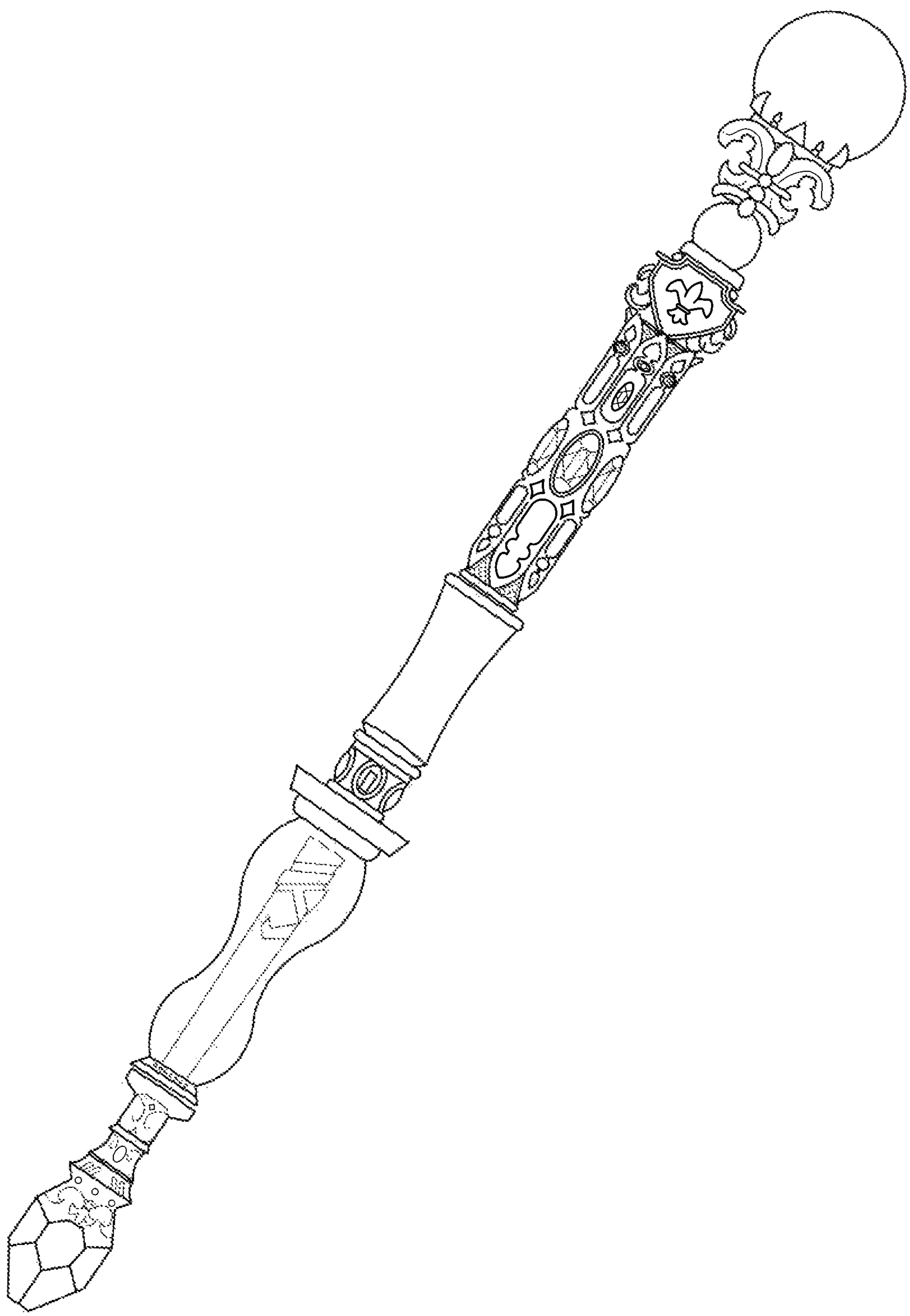
Figure 19I:
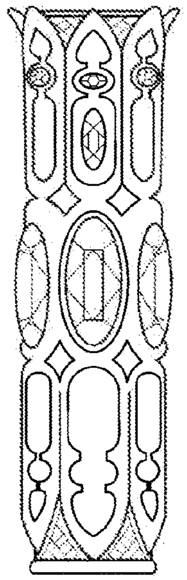
Figure 19J:
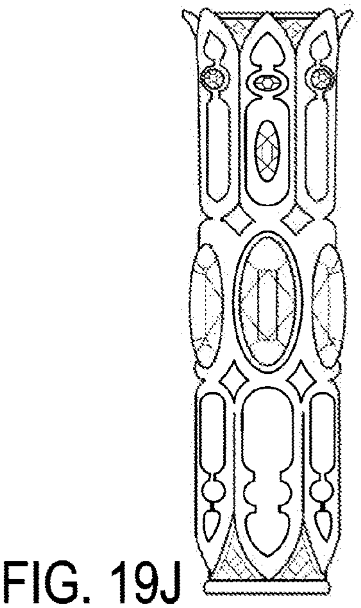
Figure 19K:
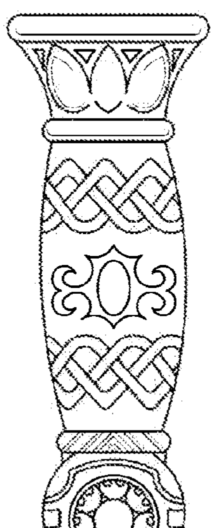
Figure 19L:
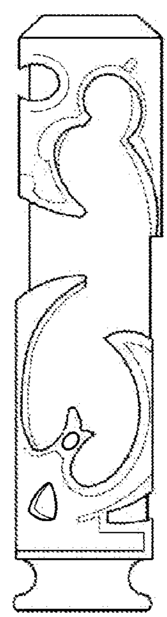
Figure 19M:
Figure 19N:
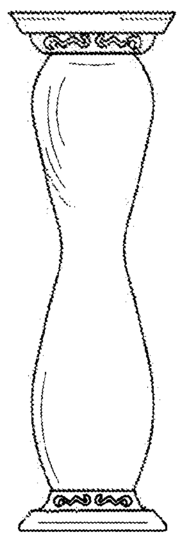
Figure 19O:
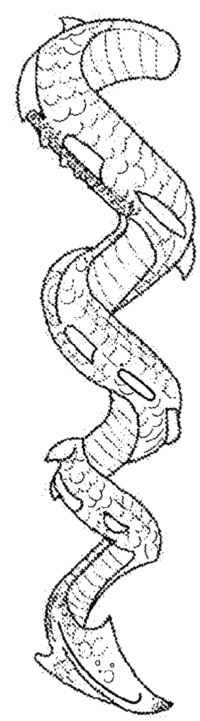
Figure 19P:
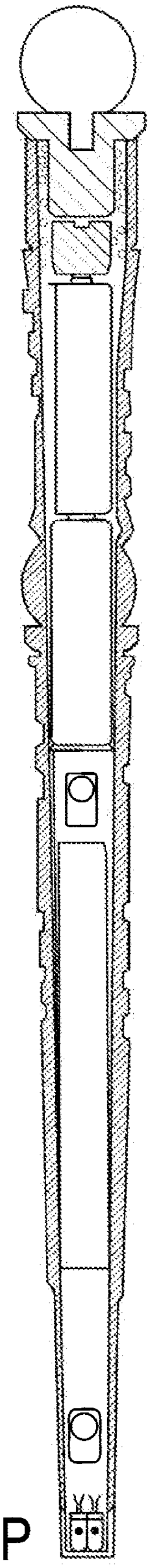

Preferably, in all cases described above, the wand shaft 110, handle 120 and/or knob 123 may be further decorated and/or individualized, as desired, with various monograms, engravings, stickers, stains, custom paint and the like, to suit the tastes of each individual user. For example, various assembly and fabrication stations may preferably be provided within a dedicated "workshop" area whereby wand purchasers may personally attend to the selection, fabrication, assembly and final detailing of their personal wands. Similarly, wand "kits" may also be selected, packaged and sold whereby purchasers can assemble and decorate their own wands in the convenience of their own home using the wand components, materials and decorative elements illustrated and described above. FIGS. 19A-19P illustrate various examples of wands, wand handles or grips, wand add-ons, and wand knobs that have been fabricated, assembled and detailed in a manner as described above.

RFID Tags/Transponders

Many of the preferred embodiments of the invention illustrated and described above are RFID-enabled—that is, they utilize RFID technology to electrically store and communicate certain relevant information (e.g., UPIN and UGIN, game levels, points, combinations of the same or the like) and/or to wirelessly actuate or control various magical play effects. RFID technology provides a universal and wireless medium for uniquely identifying objects and/or people and for wirelessly exchanging information over short and medium range distances (10 cm to 10 meters). Commercially available RFID technologies include electronic devices called transponders or tags, and reader/writer electronics that provide an interface for communicating with the tags. Most RFID systems communicate via radio signals that carry data either uni-directionally (read only) or, more preferably, bi-directionally (read/write).

Figure 21A:
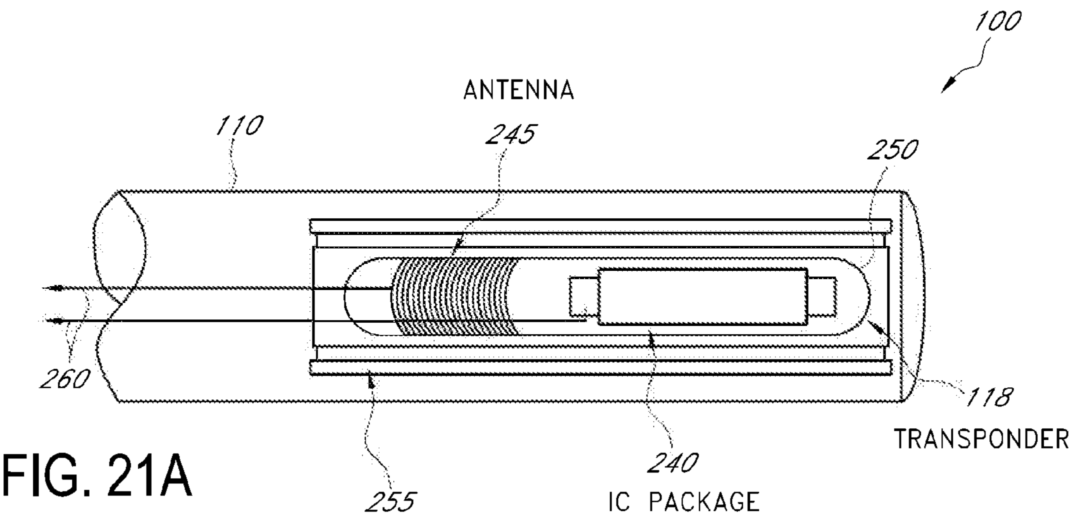
FIG. 21A is a partial cross-section detail view of the distal end of the interactive wand toy of FIG. 1, illustrating the provision of an RFID transponder device therein.

Several examples of RFID tags or transponders particularly suitable for use with the present invention have been illustrated and described herein. For example, in the particular preferred embodiments illustrated and described above, a 134.2 kHz/123.2 kHz, 23 mm glass transponder is preferably selected, such as available from Texas Instruments, Inc. (http://www.tiris.com, e.g., Product No. RI-TRP-WRHP). As illustrated in FIG. 21A, this transponder basically comprises a passive (batteryless) RF transmitter/receiver chip 240 and an antenna 245 provided within an hermetically sealed vial 250. A protective silicon sheathing 255 is preferably inserted around the sealed vial 250 between the vial and the inner wall of the tube 110 to insulate the transponder from shock and vibration. If desired, the RFID transponder 118 may be modified to provide an optional external interrupt/disable line 260, such as illustrated in FIG. 21A and as described in more detail above in connection with FIGS. 1 and 5.

However, those skilled in the art will readily appreciate from the disclosure herein that the invention is not limited to the specific RFID transponder devices disclosed herein, but may be implemented using any one or more of a wide variety of commercially available wireless communication devices such as are known or will be obvious from the disclosure herein to those skilled in the art. These include, without limitation, RFID tags, EAS tags, electronic surveillance transmitters, electronic tracking beacons, Wi-Fi, GPS, bar coding, and the like.

Of particular interest for purposes of practicing the present invention is the wide variety of low-cost RFID tags that are available in the form of a printed circuit on a thin, flat adhesive-backed substrate or foil. For example, the 13.56 MHz RFID tag sold under the brand name Tag-it™ and available from Texas Instruments, Inc. (http://www.tiris.com, Product No. RI-I03-110A) has particular advantages in the context of the present invention. Paper thin and batteryless, this general purpose read/write transponder is placed on a polymer tape substrate and delivered in reels. It fits between layers of laminated paper or plastic to create inexpensive stickers, labels, tickets and badges. Tag-it™ inlays have a useful read/write range of about 25 cm and contain 256 bits of on-board memory arranged in 8×32-bit blocks which may be programmed (written) and read by a suitably configured read/write device. Such tag device is useful for storing and retrieving desired user-specific information such as UPIN, UGIN, first and/or last name, age, rank or level, total points accumulated, tasks completed, facilities visited, etc. If a longer read/write range and/or more memory is desired, optional battery-powered tags may be used instead, such as available from AXCESS, Inc. and/or various other vendors known to those skilled in the art.

Another RFID tagging technology of particular interest for purposes of practicing the present invention are the so-called "chipless" RFID tags. These are extremely low-cost RFID tags that are available in the form of a printed circuit on a thin, flat adhesive. These tags are similar in size, shape and performance to the Tag-it™ inlays described above, except that these tags require no on-board integrated circuit chip. Chipless RFID tags can be electronically interrogated to reveal a pre-encoded unique ID and/or other data stored on the tag. Because the tags do not contain a microchip, they cost much less than conventional RFID tags. An adhesive-backed chipless RFID tag with up to 10 meters range and 256 bits of data, can cost one tenth of their silicon chip equivalents and typically have a greater physical performance and durability. For example, a suitable chipless RFID tag is being made available from Checkpoint Systems under its ExpressTrak™ brand. Very inexpensive chipless RFID tags (and/or other types of RFID tags) may also be directly printed on paper or foil substrates using various conductive inks and the like, such as are available from Parelec Inc. under its Parmod VLT™ brand.

Figure 20A:
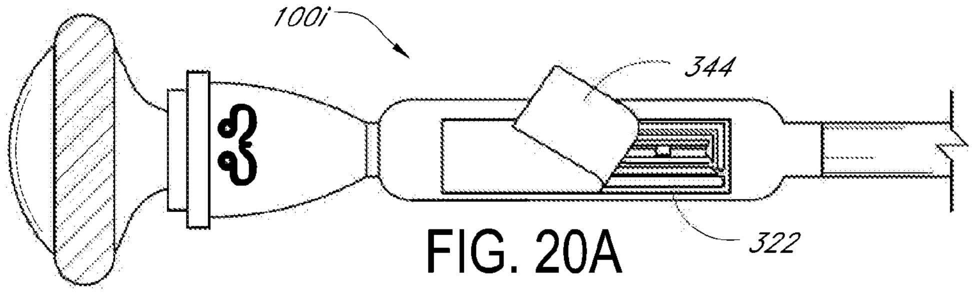
FIGS. 20A and 20B are schematic illustrations showing two alternative preferred embodiments of an RFID-enabled wand toy having features and advantages in accordance with the present invention.
Figure 20B:
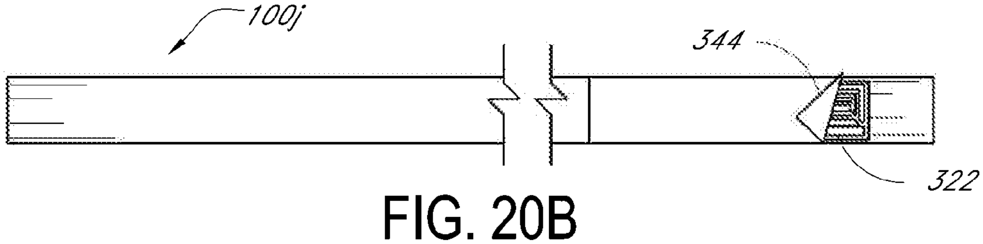

In the context of carrying out an interactive gaming experience, play experience or entertainment experience, such as the type generally disclosed and described herein, such adhesive-backed tag devices and the like are highly advantageous. They are inexpensive, disposable, and may be easily secured or applied to virtually any play object, wand, wristband, badge, card or the like, for electronically storing and retrieving desired user-specific or object-specific information. Such information may include, for example, UPIN, UGIN, object type/size/shape/color, first and/or last name, age, rank or level, total points accumulated, tasks completed, facilities visited, combinations of the same or the like. For example, FIG. 20A illustrates one preferred embodiment of a wand toy 100*i* having an adhesive-backed RFID tag 322 secured thereon for enabling the wand 100*i* to interact with various play effects located within an RFID-enabled play facility or play environment. FIG. 20B illustrates a second preferred embodiment of a wand toy 100*j* having an adhesive-backed RFID tag 322 secured thereon for enabling the wand 100*j* to interact with various play effects located within an RFID-enabled play facility or play environment. Similar RFID tags may also be applied to any of the other wands 100*a-h* disclosed and described herein or any other toys, play objects, jewelry, trinkets, action figures, collectibles, trading cards and generally any other items desired to be incorporated as part of an RFID-enabled gaming experience.

Figure 20C:
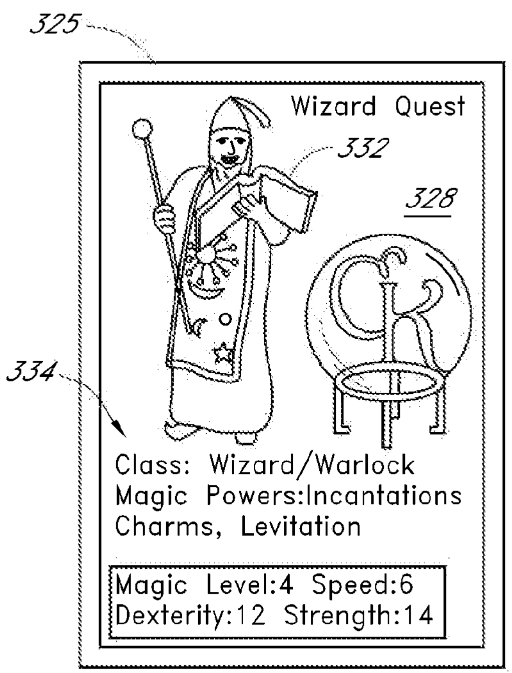
FIGS. 20C and 20D are front and back views, respectively, of a preferred embodiment of an RFID-enabled trading card having features and advantages in accordance with the present invention.
Figure 20D:
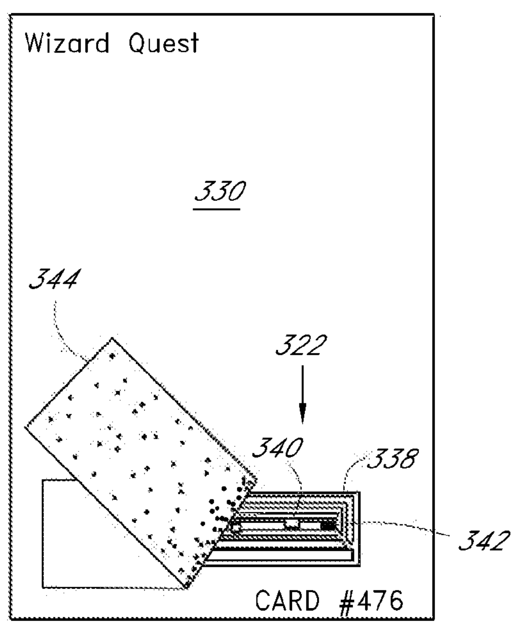
Figure 20E:
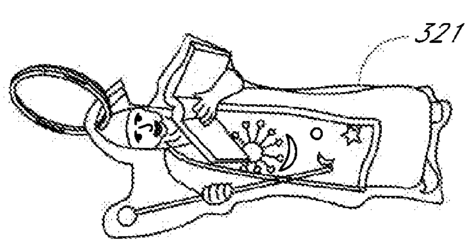
FIGS. 20E and 20F are front and back views, respectively, of a preferred embodiment of an RFID-enabled key chain trinket having features and advantages in accordance with the present invention.
Figure 20F:
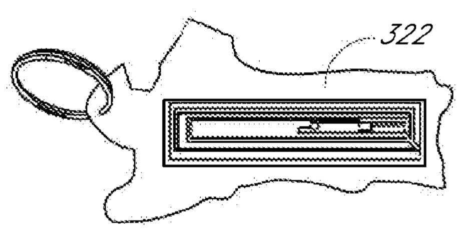

FIGS. 20E and 20F illustrate one possible preferred embodiment of a key chain trinket 321 incorporating an RFID tag 322 suitable for use in various RFID-enabled gaming and entertainment experiences as disclosed herein. Such RFID-enabled items not only make the overall gaming and entertainment experience more exciting and enjoyable, but they can create unique branding opportunities and additional lucrative revenue sources for a play facility owners/operators. Moreover, and advantageously, character attributes developed during a play participant's visit to a local play facility are stored on the tag 322. When the play participant then revisits the same or another compatible play facility, all of the attributes of his character are "remembered" on the tag so that the play participant is able to continue playing with and developing the same role-play character. Similarly, various video games, home game consoles, and/or hand-held game units can be and preferably are configured to communicate with the tag in a similar manner as described above and/or using other well-known information storage and communication techniques. In this manner, a play participant can use the same role play character he or she has developed with specific associated attributes in a favorite video action game, role-play computer game or the like.

Trading cards incorporating RFID tags are also particularly advantageous in the context of an interactive role-playing game such as disclosed herein. For example, FIGS. 20C and 20D are front and rear views, respectively, of an optional RFID-enabled trading card 325 for use within an interactive gaming experience as described herein. For example, such RFID-enabled trading cards may be used instead of or as an adjunct to the wand 100 with RFID transponder 118 as illustrated and described above in connection with FIG. 1. Each card 325 preferably comprises a paper, cardboard or plastic substrate having a front side 328 and a back side 330. The front 328 of the card 325 may be imprinted with graphics, photos, or any other information as desired. In the particular embodiment illustrated, the front 328 contains an image of a magical wizard character 332 in keeping with an overall magic or wizard theme. In addition, the front 328 of the card may include any number of other designs or information 334 pertinent to its use and application in the game. For example, the character's special magic powers, skills and experience level may be indicated, along with any other special powers or traits the character may possess.

The obverse side 330 of the card preferably contains the card electronics comprising an RFID tag 322 pre-programmed with the pertinent information for the particular person, character or object portrayed on the front of the card. The tag 322 generally comprises a spiral wound antenna 338, a radio frequency transmitter chip 340 and various electrical leads and terminals 342 connecting the chip to the antenna. If desired, the tag may be covered with an adhesive paper label 344 or, alternatively, the tag may be molded directly into a plastic sheet substrate from which the card is formed. Preferably, the tag 322 is passive (requires no batteries) so that it is inexpensive to purchase and maintain. The particular tag illustrated is the 13.56 MHz tag sold under the brand name Tag-it™ available from Texas Instruments, Inc. (http://www.tiris.com, Product No. RI-I03-110A). The tag may be "read/write" or "read only", depending on its particular gaming application. Optionally, less expensive chipless tags may also be used with equal efficacy.

Those skilled in the art will readily appreciate from the disclosure herein that a variety of trading card designs having features and advantages as disclosed herein may be used to play a wide variety of unique and exciting games within an RFID-enabled play facility and/or using an RFID-enabled gaming device or game console. Alternatively, persons skilled in the art will appreciate from the disclosure herein that such games may be carried out using a conventional computer gaming platform, home game console, arcade game console, hand-held game device, internet gaming device or other gaming device that includes an RFID interface. Advantageously, play participants can use trading cards 325 to transport information pertinent to a particular depicted person, character or object to a favorite computer action game, adventure game, interactive play facility or the like. For example, a suitably configured video game console and video game may be provided which reads the card information and recreates the appearance and/or traits of the particular depicted person, character or object within the game. If desired, the game console may further be configured to write information to the card in order to change or update certain characteristics or traits of the character, person or object depicted by the card 325 in accordance with a predetermined game play progression.

Advantageously, RFID-enabled character trading cards and character traits, including special powers, and the like, need not be static in the game, but may change over time according to a central story or tale that unfolds in real time (e.g., through televised shows or movies released over the course of weeks, months or years). Thus, a character trading card that may be desirable for game play this week (e.g., for its special magic powers or abilities), may be less desirable next week if the underlying character is injured or captured in the most recent episode of the story. Another significant and surprising advantage of RFID-enabled trading cards is that multiple cards can be stacked and simultaneously read by a single RFID reader even where the cards are closely stacked on top of one another and even though the reader may be hidden from view. This feature and ability creates limitless additional opportunities for exciting game complexities, unique game designs and gaming strategies heretofore unknown.

FIGS. 33A-33D are front views of various alternative embodiments of possible role-play character cards for use within a Harry Potter/Hogwarts interactive play structure. See, for example, U.S. Pat. No. 6,761,637 to Weston, incorporated herein by reference, which describes an interactive play structure in the theme of a "magic" training center for would-be wizards in accordance with the popular characters and storylines of the children's book series "Harry Potter" by J. K Rowling. Role play cards 600 are preferably constructed substantially the same as the card 325 illustrated and described above in connection with FIGS. 20C, 20D, except with different character illustrations and/or graphics. For example, each card 600 may include a different character from a Harry Potter storyline representing a role-play character desired to be imagined by a play participant. The obverse side (not shown) includes an RFID tag, such as illustrated and described above in connection with FIG. 20D. Alternatively, a magnetic "swipe" strip and/or other well known information storage means may be used with efficacy, so long as it is relatively compact, durable and inexpensive.

The particular size, shape and theme of the cards 600 is relatively unimportant. In the particular embodiment illustrated, the cards 600 are shaped and themed so as to be used as bookmarks for Harry Potter series books. These may be packaged and sold together with each Harry Potter book, or they may be sold separately as novelty items or the like. If desired, a hole or eyelet 610 may be provided at the top of each card 600 so as to facilitate wearing the card 600 as a pendant on a necklace 620 or as key-chain trinket. Smaller, pocket-sized cards and/or other similar RFID or magnetic transponder devices may also be used where convenience and market demand dictates. Such transponder devices are commercially available, such as from Texas Instruments, Inc. (http://www.tiris.com, e.g., Prod. Nos. RI-TRPW9WK, RI-TRP-R9QL, RI-TRP-WFOB).

Of course, those skilled in the art will readily appreciate from the disclosure herein that the underlying concept of an RFID-enabled card 325 and card game is not limited to cards depicting fantasy characters or objects, but may be implemented in a wide variety of alternative embodiments, including conventional playing cards, poker cards, board game cards and tokens, sporting cards, educational cards and the like. If desired, any number of other suitable collectible/tradable tokens, coins, trinkets, simulated crystals or the like may also be provided and used with a similar RFID tag device for gaming or entertainment purposes in accordance with the teachings of the present invention.

For example, RFID tag devices may be included on "magic articles" that may be purchased or acquired in a gaming or interactive play system. For instance, a user may purchase an invisibility cloak, magic beads, belts, and the like during an interactive play experience. The RFID tags may be used to communicate to a central database that a certain person has purchased or is possession of the tagged item. The central database may then track the tagged items and/or may cause those in possession of the tagged items to have increased "magical" skills or powers, such as additional protection from the spells "cast" by opposing players.

Figure 20G:
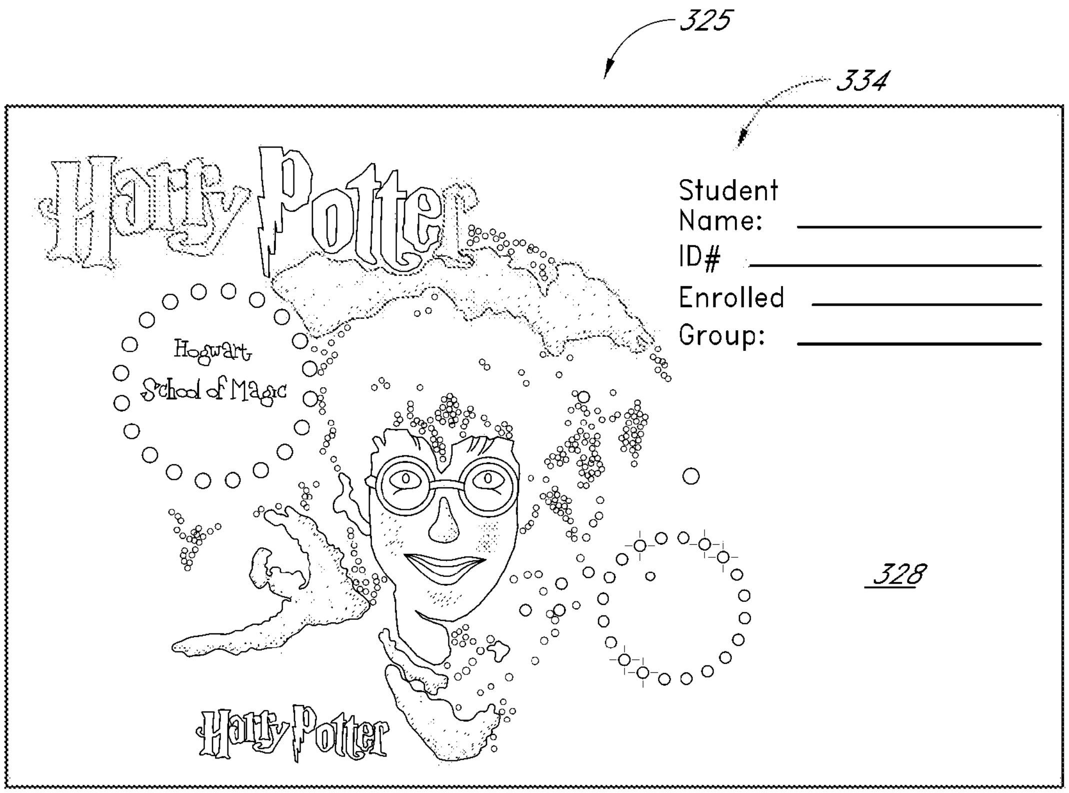
FIGS. 20G and 20H are front and rear views, respectively, of an optional RFID tracking badge or card having features and advantages in accordance with the present invention.
Figure 20H:
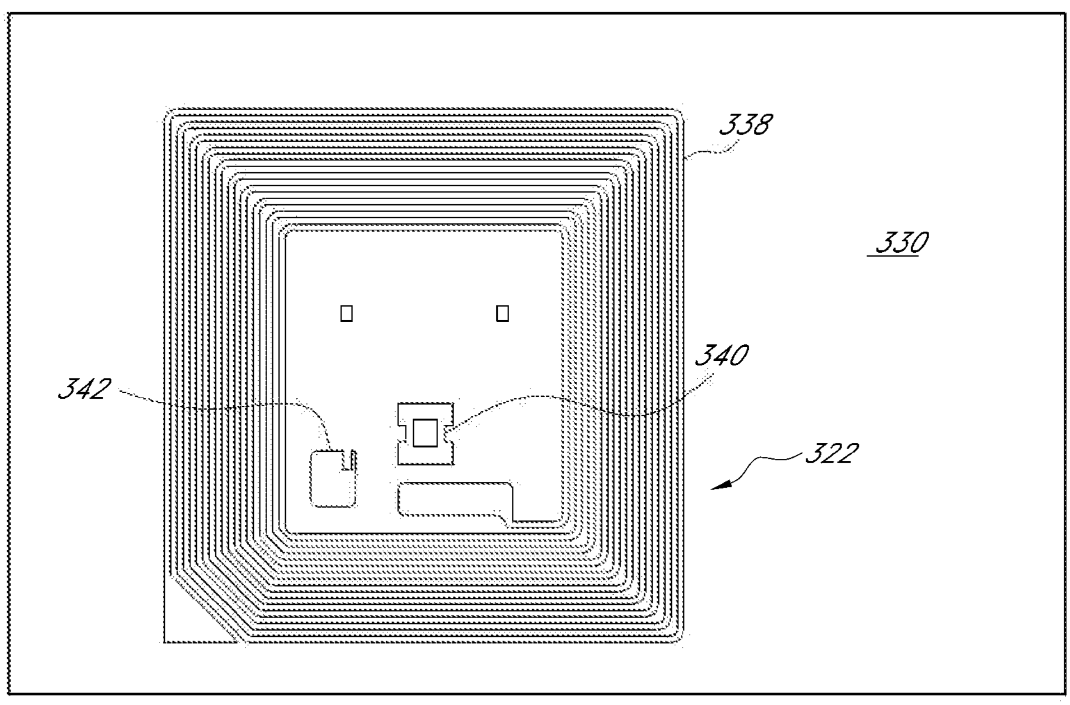

FIGS. 20G and 20H are front and rear views, respectively, of an optional or alternative RFID tracking badge or card 325 that may be used instead of or in addition to the wand 100 described above. The particular badge or card 325 illustrated is intended to be affixed or adhered to the front of a shirt or blouse worn by a play participant during their visit to suitably equipped play or entertainment facilities. The badge preferably comprises a paper, cardboard or plastic substrate having a front side 328 and a back side 330. The front 328 of each card/badge 325 may be imprinted with graphics, photos, or any other information desired. In the particular embodiment illustrated, the front 328 contains an image of Harry Potter in keeping with the overall theme of the game. In addition, the front 328 of the badge 325 may include any number of other designs or information 334 pertinent to its application. For example, the guest's name and associated group may be indicated for convenient reference. A unique tag ID Number may also be displayed for convenient reference and is particularly preferred where the badge 325 is to be reused by other play participants.

The obverse side 330 of the badge 325 contains the badge electronics comprising a radio frequency tag 322 pre-programmed with a unique person identifier number ("UPIN"). The tag 322 generally comprises a spiral wound antenna 338, a radio frequency transmitter chip 340 and various electrical leads and terminals 342 connecting the chip 340 to the antenna. Advantageously, the UPIN may be used to identify and track individual play participants within the play facility. Optionally, each tag 322 may also include a unique group identifier number ("UGIN") which may be used to match a defined group of individuals having a predetermined relationship—either preexisting or contrived for purposes of game play. If desired, the tag 322 may be covered with an adhesive paper label (not shown) or, alternatively, may be molded directly into a plastic sheet substrate comprising the card 325.

RFID Readers/Writers

In accordance with another preferred embodiment of the invention various RFID readers and associated play effects are distributed throughout an entertainment facility and are able to read the RFID tags described herein and to actuate or control one or more effects in response thereto. For example, the UPIN and UGIN information can be conveniently read and provided to an associated computer, central network, display system or other tracking, recording or display device for purposes of interacting with an associated effect and/or creating a record of each play participant's experience within the play facility. This information may be used for purposes of interactive game play, tracking and calculating individual or team scores, tracking and/or locating lost children, verifying whether or not a child is inside a facility, photo capture and retrieval, and many other useful purposes as will be readily obvious and apparent from the disclosure herein to those skilled in the art.

Figure 21B:
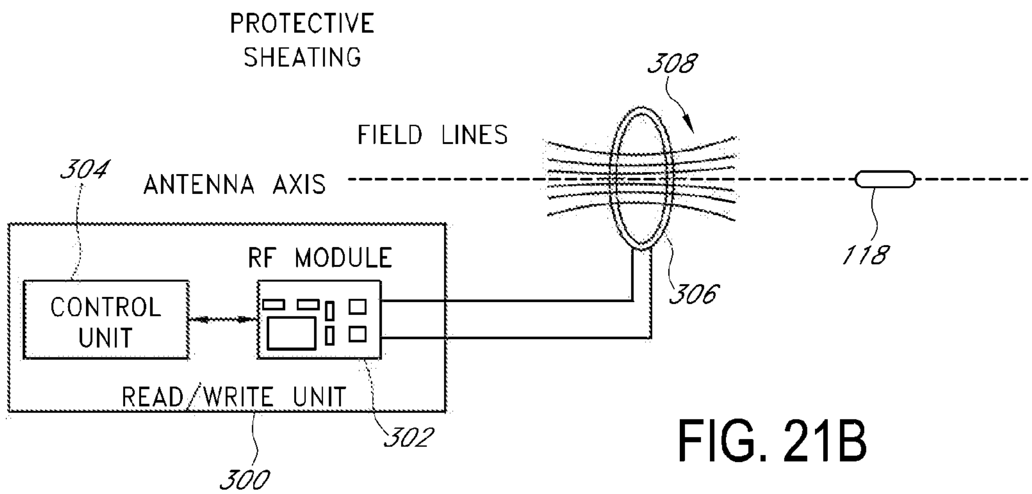
FIG. 21B is a schematic illustration of an RFID read/write unit for use with the interactive wand toy of FIG. 1 having features and advantages in accordance with the present invention.

FIG. 21B is a simplified schematic diagram of one embodiment of an RFID reader/writer 300 for use with the wand and RFID transponder 118 of FIG. 21A. A preferred reader/writer device is the Series 2000 Micro Reader available from Texas Instruments, Inc. (http://www.tiris.com, e.g., Product No. RI-STU-MRD1). As illustrated, the reader/writer 300 basically comprises an RF Module 302, a Control Unit 304 and an antenna 306. When the distal end of wand 100 and its internally contained transponder 118 comes within a predetermined range of antenna 306 (about 20-200 cm) the transponder antenna 245 is excited by the radiated RF fields 308 and momentarily creates a corresponding voltage signal which powers RF transmitter/receiver chip 240. In turn, the RF transmitter/receiver chip 240 outputs an electrical signal response which causes transponder antenna 245 to broadcast certain information stored within the transponder 235 comprising, for example, 80 to 1000 bits of information stored in its internal memory. This information preferably includes a unique user ID (UPIN/UGIN), magic level or rank and/or certain other items of information pertinent to the user, the wand and/or the game or play experience.

A carrier signal embodying this information is received by antenna 306 of RFID reader/writer 300. RF Module 302 decodes the received signal and provides the decoded information to Control Unit 304. Control Unit 304 processes the information and provides it to an associated logic controller, PID controller, computer or the like using a variety of standard electrical interfaces (not shown). Thus, the information transmitted by transponder 118 and received by reader/writer 300 may be used to control one or more associated play effects through a programmable logic controller, for example. In one embodiment, the information transmitted includes data relating to the activation of the sensors 122, 124 of the wand 100. In other embodiments, the transmitted information may include timing information, such as the duration of time that a sensor is activated and/or the duration of time between successive activations of the sensors 122, 124. Play effects, may include, for example, lighting effects, sound effects, various mechanical or pneumatic actuators and the like.

Preferably, RFID reader/writer 300 is also configured to broadcast or "write" certain information back to the transponder 118 to change or update information stored in its internal memory, for example. The exchange of communications occurs very rapidly (about 70 ms) and so, from the user's perspective, it appears to be virtually instantaneous. Thus, the wand 100 may be used to "magically" actuate and/or communicate with various associated effects by simply touching or bringing the tip of the wand 100 into relatively close proximity with the antenna 306 of a reader/writer unit 300.

As indicated above, communication of data between a tag and a reader is by wireless communication. As a result, transmitting such data is always subject to the vagaries and influences of the media or channels through which the data has to pass, including the air interface. Noise, interference and distortion are the primary sources of data corruption that may arise. Thus, those skilled in the art will recognize that a certain degree of care should be taken in the placement and orientation of readers 300 so as to minimize the probability of such data transmission errors. Preferably, the readers are placed at least 30-60 cm away from any metal objects, power lines or other potential interference sources. Those skilled in the art will also recognize that the write range of the tag/reader combination is typically somewhat less (~10-15% less) than the read range and, thus, this should also be taken into account in determining optimal placement and positioning of each reader device 300.

Typical RFID data communication is asynchronous or unsynchronized in nature and, thus, particular attention should be given in considering the form in which the data is to be communicated. Structuring the bit stream to accommodate these needs, such as via a channel encoding scheme, is preferred in order to provide reliable system performance. Various suitable channel encoding schemes, such as amplitude shift keying (ASK), frequency shift keying (FSK), phase shift keying (PSK) and spread spectrum modulation (SSM), are well know to those skilled in the art and will not be further discussed herein. The choice of carrier wave frequency is also important in determining data transfer rates. Generally speaking the higher the frequency the higher the data transfer or throughput rates that can be achieved. This is intimately linked to bandwidth or range available within the frequency spectrum for the communication process. Preferably, the channel bandwidth is selected to be at least twice the bit rate required for the particular game application.

Figure 21C:
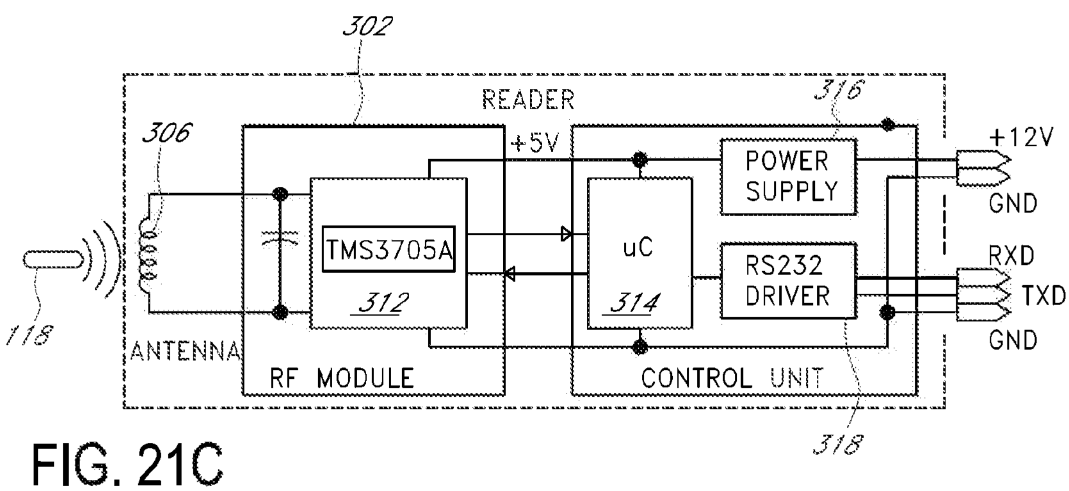
FIG. 21C is a simplified circuit schematic of the RFID read/write unit of FIG. 21B having features and advantages in accordance with the present invention.

FIG. 21C is a simplified circuit schematic of the reader/writer unit 300 of FIG. 21B. The read or write cycle begins with a charge (or powering phase) lasting typically 15-50 ms. During this phase, the RF Module 302 causes the antenna 306 to emit an electromagnetic field at a frequency of about 134.2 kHz. The antenna circuit is mainly formed by the resonance capacitor C1 and the antenna coil 306. A counterpart resonant circuit of the transponder 118 is thereby energized and the induced voltage is rectified by the integrated circuit 240 and stored temporarily using a small internal capacitor (not shown).

The charge phase is followed directly by the read phase (read mode). Thus, when the transponder 118 detects the end of the charge burst, it begins transmitting its data using Frequency Shift Keying (FSK) and utilizing the energy stored in the capacitor. The typical data low bit frequency is 134.2 kHz and the typical data high bit frequency is 123.2 kHz. The low and high bits have different duration, because each bit takes 16 RF cycles to transmit. The high bit has a typical duration of 130 μs, the low bit of 119 μs. Regardless of the number of low and high bits, the transponder response duration is generally less than about 20 ms.

The carrier signal embodying the transmitted information is received by antenna 306 and is decoded by RF module 302. RF Module 302 comprises integrated circuitry 312 that provides the interface between the transponder 118 and the Control Module 304 (data processing unit) of the Reader/Writer Unit 300. It has the primary function and capability to charge up the transponder 118, to receive the transponder response signal and to demodulate it for further digital data processing.

A Control Unit 304, comprising microprocessor 314, power supply 316 and RS232 Driver 318, handles most data protocol items and the detailed fast timing functions of the Reader/Writer Module 300. It may also operate as interface for a PC, logic controller or PLC controller for handling display and command input/output functions, for example, for operating/actuating various associated play effects.

Figure 21D:
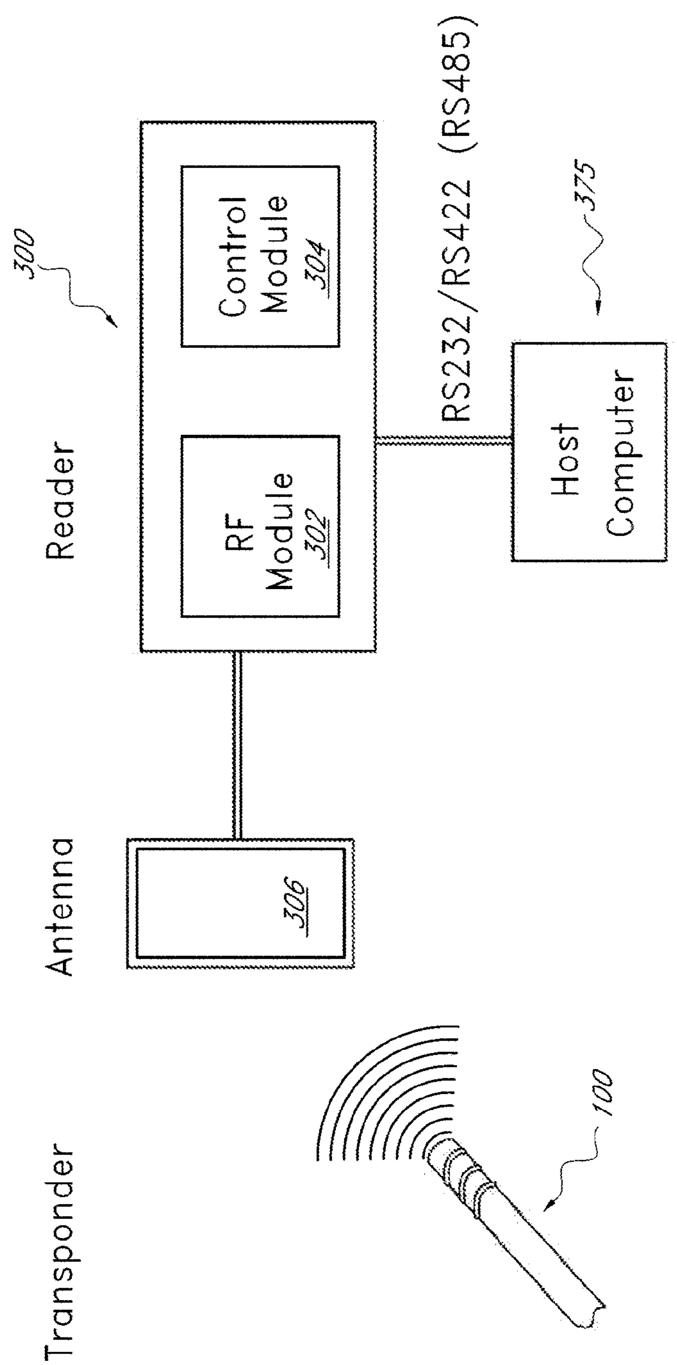
FIG. 21D is a simplified schematic diagram of an RF reader and master control system for use with the magic wand toy actuator of FIG. 20A having features and advantages in accordance with the present invention.

FIG. 21D is a simplified schematic diagram of an alternative embodiment of an RF transceiver 300 configured for use with an optional master control system 375. As illustrated, the transceiver 300 basically comprises an RF Module 302, a Control Module 304 and an antenna 306. When the distal end of wand 100 comes within a predetermined range of antenna 306 (~20-60 cm) the transponder antenna 245 (FIG. 21A) becomes excited and impresses a voltage upon the RF transmitter/receiver chip 240 disposed within transponder 118 at the distal end of the wand 100. In response, the RF transmitter/receiver chip 240 causes transponder antenna 245 to broadcast certain information stored within the transponder 118 comprising 80 bits of read/write memory. This information typically includes the user's unique ID number, magic level or rank and/or certain other information pertinent to the user or the user's play experiences.

This information is initially received by RF Module 302, which can then transfer the information through standard interfaces to an optional Host Computer 375, Control Module 304, printer, or programmable logic controller for storage or action. If appropriate, Control Module 304 provides certain outputs to activate or control one or more associated play effects, such as lighting, sound, various mechanical or pneumatic actuators or the like. Optional Host Computer 375 processes the information and/or communicates it to other transceivers 300, as may be required by the game. If suitably configured, RF Module 302 may also broadcast or "write" certain information back to the transponder 118 to change or update one or more of the 80 read/write bits in its memory.

Figure 21E:
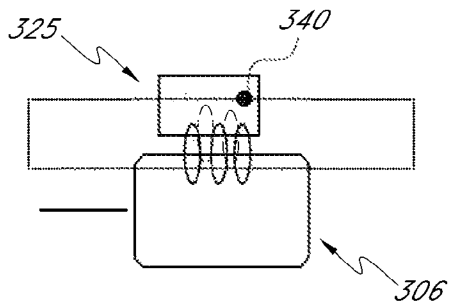
FIGS. 21E and 21F are schematic diagrams illustrating typical operation of an RFID tracking tag as illustrated in FIG. 20.
Figure 21F:
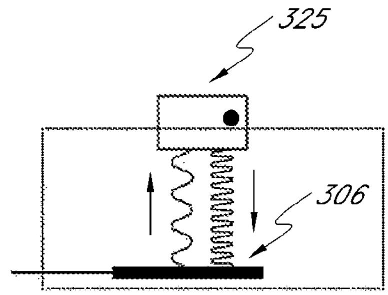
Figure 21G:
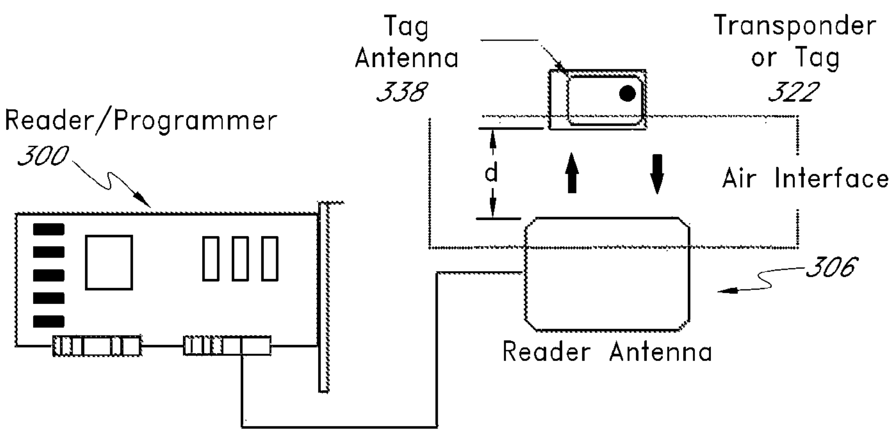
FIG. 21G is simplified schematic diagram of an RFID read/write system for use with an RFID tracking tag as illustrated in FIG. 20 having features and advantages in accordance with the present invention.

FIGS. 21E, 21F and 21G are simplified schematic illustrations of tag and reader operation in accordance with another embodiment of the invention. The tag 322 is initially activated by a radio frequency signal broadcast by an antenna 306 of an adjacent reader or activation device 300. The signal impresses a voltage upon the tag antenna 338 by inductive coupling which is then used to power the chip 340. When activated, the chip 340 transmits via radio frequency a unique identification number preferably corresponding to the UPIN and/or UGIN described above. The signal may be transmitted either by inductive coupling or, more preferably, by propagation coupling over a distance "d" determined by the range of the tag/reader combination. This signal is then received and processed by the associated reader 300 as described above. If desired, the RFID card or badge 325 may also be configured for read/write communications with an associated reader/writer. Thus, the unique tag identifier number (UPIN or UGIN) can be changed or other information may be added.

Figure 21H:
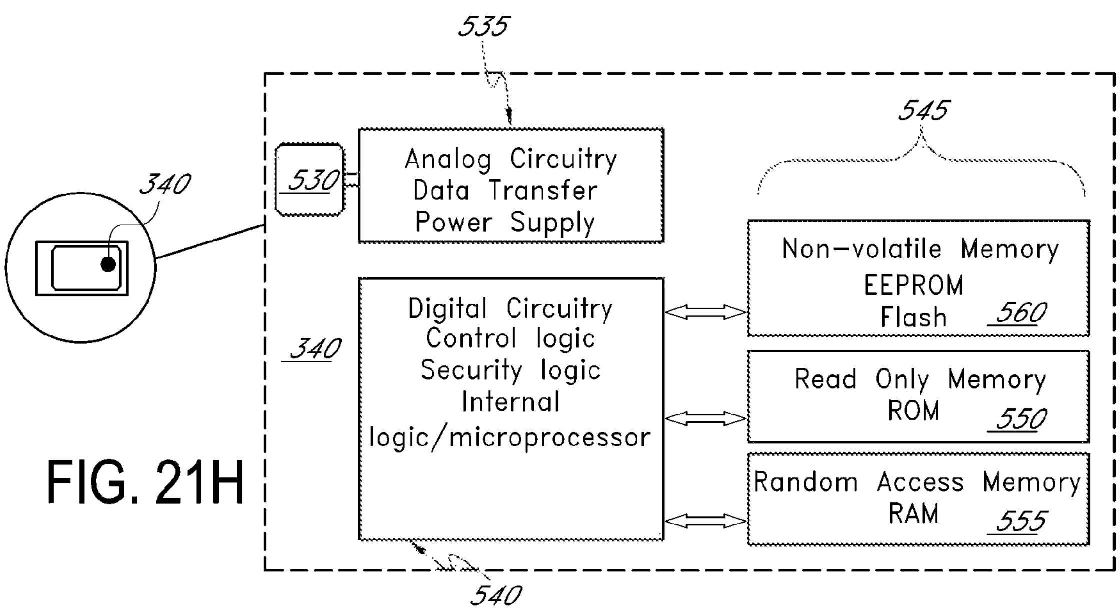
FIG. 21H is a simplified block diagram illustrating the basic organization and function of the electronic circuitry comprising an RFID tracking tag as illustrated in FIG. 20.

FIG. 21H is a simplified block diagram illustrating the basic organization and function of the electronic circuitry comprising the radio frequency transmitter chip 340 of the RFID tag device 322 of FIG. 20H. The chip 340 basically comprises a central processor 530, Analog Circuitry 535, Digital Circuitry 540 and on-board memory 545. On-board memory 545 is divided into read-only memory (ROM) 550, random access memory (RAM) 555 and non-volatile programmable memory 560, which is available for data storage. The ROM-based memory 550 is used to accommodate security data and the tag operating system instructions which, in conjunction with the processor 530 and processing logic deals with the internal "house-keeping" functions such as response delay timing, data flow control and power supply switching. The RAM-based memory 555 is used to facilitate temporary data storage during transponder interrogation and response. The non-volatile programmable memory 560 may take various forms, electrically erasable programmable read only memory (EEPROM) being typical. It is used to store the transponder data and is preferably non-volatile to ensure that the data is retained when the device is in its quiescent or power-saving "sleep" state.

Various data buffers or further memory components (not shown), may be provided to temporarily hold incoming data following demodulation and outgoing data for modulation and interface with the transponder antenna 338. Analog Circuitry 535 provides the facility to direct and accommodate the interrogation field energy for powering purposes in passive transponders and triggering of the transponder response. Analog Circuitry also provides the facility to accept the programming or "write" data modulated signal and to perform the necessary demodulation and data transfer processes. Digital Circuitry 540 provides certain control logic, security logic and internal microprocessor logic required to operate central processor 530

Long Range Transmitter and Receiver

If desired, the wand 100 may also be configured for long range communications with one or more of the transceivers 300 (or other receivers) disposed within a play environment. For example, one or more transceivers 300 may be located on a roof or ceiling surface, on an inaccessible theming element, or other area out of reach of play participants. Such long-range wand operation may be readily achieved using an auxiliary battery powered RF transponder, such as available from Axcess, Inc., Dallas, Tex. If line of sight or directional actuation is desired, a battery-operated infrared LED transmitter and receiver of the type employed in television remote controls may be used, as those skilled in the art will readily appreciate. Of course, a wide variety of other wireless communications devices, as well as various sound and lighting effects may also be provided, as desired.

In many of the preferred embodiments of the invention as illustrated and described herein it is disclosed to use a radio frequency (RF) and/or infrared (IR) transmitter to send wand command signals over relatively long range distances (e.g., 10-100 meters or more). For example, wand 100A illustrated and described in connection with FIG. 7 includes an internal RF/IR Module 150 for communicating various command signals to one or more remote RF/IR receivers and associated effects. Command signal receivers may be located, for example, on a remote roof or ceiling surface of a compatible play facility, a retail mall, restaurant, destination resort facility or even an outdoor public play area. Internal RF/IR Module 150 can comprise any number of small, inexpensive RF transmitters such as are commercially available from Axcess, Inc., of Dallas, Tex. If directionality is desired, any number of small, inexpensive infrared LED transmitters may be used, such as the type commonly employed in television remote controls, keyless entry systems and the like.

Figure 22A:
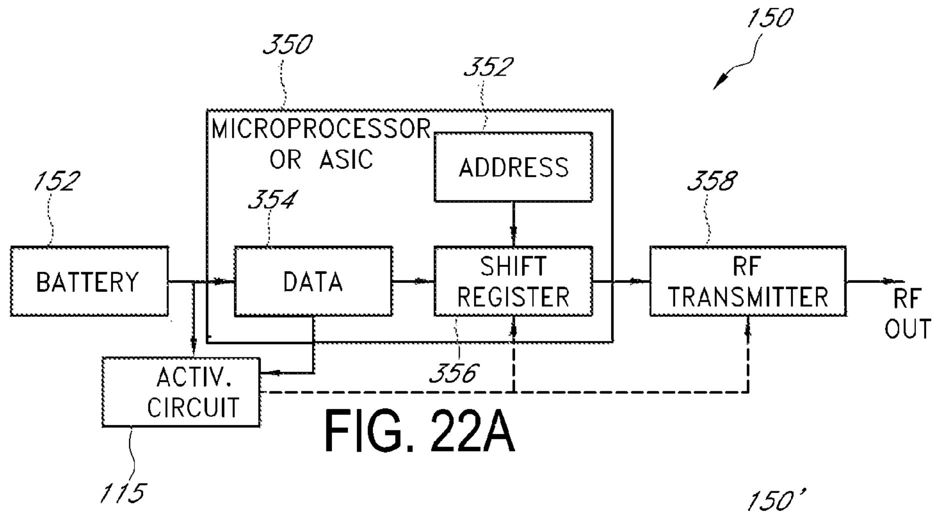
FIG. 22A is a simplified schematic block diagram of an RF transmitter module adapted for use in accordance with one preferred embodiment of the present invention.

FIG. 22A is a schematic block diagram of a particularly preferred transmitter module 150 adapted for use in accordance with the present invention. The transmitter module 150 generally comprises an RF transmitter 358 driven and controlled by a microprocessor or ASIC 350. ASIC 350 includes address storage module 352, data storage module 354 and shift register 356. Address storage module 352 includes a stored address or coded value, for example, in parallel bit format, that is a preselected coded value that may be uniquely associated with a particular transmitter module 150. Address storage module 352 applies the address coded value to an encoder, such as shift register 356 which, when enabled, encodes the coded value by converting it from parallel bit format to serial bit format which is applied to radio frequency (RF) transmitter 358. Similarly, data storage module 354 may include coded data or commands provided by a user (e.g., via any of the various command input circuits and structures described above in connection with FIGS. 14-16). Data storage module 354 applies the coded data values to shift register 356 which, when enabled, encodes the coded data by converting it from parallel bit format to serial bit format which is also applied to radio frequency (RF) transmitter 358. Radio frequency transmitter 358 modulates the coded address and data values which is encoded in serial bit format onto a radio frequency carrier signal which is transmitted as an RF output signal ($RF_{Out}$) such as via a simple loop antenna.

Application of electrical power from an internal battery source 152 (or one or more self-generating power sources as described herein) is preferably controlled via wand activation circuitry 115 such as illustrated and described above in connection with FIGS. 1-6. Thus, transmitter module 150, address storage module 352, data storage module 354, shift register 356 and/or RF transmitter 358, are preferably only powered for a short period of time when the wand circuitry 115 is successfully actuated and a corresponding command signal is to be transmitted. Those skilled in the art will recognize from the disclosure herein that transmitter module 150 may be implemented in a variety of known electrical technologies, such as discrete electronic circuits and/or integrated circuits. An implementation employing an integrated microprocessor or an application specific integrated circuit (ASIC) 350 is shown diagrammatically in FIG. 22A. Preferably, integrated circuitry technology and/or surface mount componentry is used to reduce the physical size of the circuit 150 such that it is able to fit within the relatively small cavity 116 of wand shaft 110 or handle 120 (see FIG. 1).

Figure 23A:
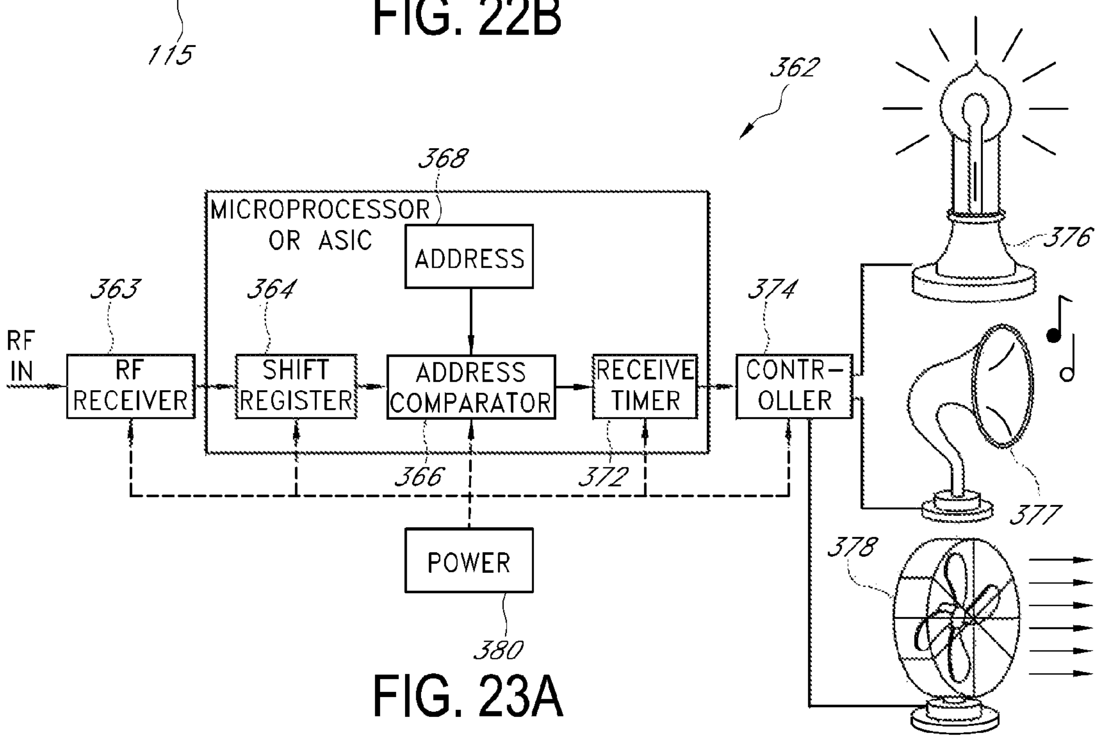
FIG. 23A is a simplified schematic block diagram of an RF receiver module and controller adapted for use in accordance with one preferred embodiment of the present invention.

FIG. 23A is a schematic block diagram of receiver module 362 which operates in conjunction with transmitter module 150 previously described. Radio frequency command signals transmitted by transmitter module 150 are provided as input signals ($RF_{In}$) to RF receiver 363 which may comprise a simple tuned circuit with loop antenna (not shown). Command signals received by RF receiver 363 are applied to a decoder, such as shift register 364 which converts the coded value therein from a serial bit format to a parallel bit format. Address comparator 366 receives at one input the transmitter module coded address value in parallel bit format from shift register 364 and at its other input a preselected fixed or dynamically stored coded value from address storage 368. The preselected coded value from address storage 368 corresponds to the preselected coded value of the transmitter module 150 with which receiver module 362 is associated or compatible. In other words, the preselected coded value stored in transmitter address storage 352 of transmitter module 150 is the same as or compatible with a preselected coded value as is stored in address storage 368 of receiver module 362 with which it is associated or compatible. If the coded address value in the received command signal matches all or a predetermined portion of the preselected fixed or dynamic coded value stored in address storage 368, this coincidence is detected by address comparator 370 and is applied to restart or reset receive timer 372. Receive timer 372 preferably has a time-out period of, for example, 0.5-3 seconds and, if it is not restarted or reset within this time period, it produces a command termination signal which tells an associated controller 374 to process the received command signals(s) and to actuate one or more corresponding play effects such as lighting effects 376, sound effects 377 and motorized actuators 378. In other embodiments, the receive timer 372 may determine the type and/or intensity of the play effect based on the amount of time between command signals. For example, shorter durations of time between command signals may cause higher-intensity play effects, and longer durations of time may cause lower-intensity play effects. Each of the functional elements of receiver module 362 and controller 374 receive electrical power from a suitable power source 380, as illustrated.

In operation, a user activates circuitry 150 by appropriately waving or moving the wand. This causes electrical voltage from battery 150 to be applied across the RF transmitter module 150, thereby causing the RF transmitter module 150 to transmit a desired command signal ($RF_{Out}$) including coded address and optional coded data information. This signal is received and decoded by receiver module 362 as input signal ($RF_{In}$). The decoded transmitter address information is compared to a fixed or dynamically stored coded value from address storage 368. Preferably, an immediate effect such as a pulsing light or sound is actuated by controller 374 in order to provide visual and/or aural cues that a command signal was received. Receive timer 372 is initiated and the RF receiver module 362 awaits the next command signal. If no further signal is received before the time times out, then the spell is assumed to be complete and the controller 374 is instructed to process the received command signal(s) and actuate the appropriate relay(s) thereby triggering whatever appropriate effect(s) correspond to the spell received. Preferably, as noted above, if the spell is incomplete or is inaccurate only a "swoosh" or similar sound effect is triggered indicating that a spell was cast but did not work. For simple spells, a fixed coded value may be stored in address storage 368. For complex spells, the stored coded value may be dynamically changed to match an expected or required series or progression of command signals. Alternatively, address storage 368 may be fixed and command signals may be carried and communicated to controller 374 as decoded data corresponding to data stored in data storage module 354 (FIG. 22A).

For applications supporting multiple wands (i.e., multiple RF transmitter modules 150) within a single play space, the address comparator 366 of receiver module 362 is preferably configured to accept either: (1) a range of valid "compatible" addresses from the set of RF transmitter modules 150; or (2) any valid address from a list of valid addresses stored in address storage module 368. In the first case, each transmitter module 150 within a defined group of transmitter modules (e.g., all Level-1 wands) would preferably be configured to have a coded address value having a portion of address bits that are identical and a portion of address bits that may be unique, but unique data bits as selected by each user. The receiver module 362, upon detecting a compatible address bit sequence, decodes the data bits thereof and sets a latch selected by those particular data bits. A number of such latches, may be provided, for example, for recognizing and distinguishing further such command signals originating from multiple users and/or wands. In the second case, the receiver module 362 stores a list of specific coded values, i.e. valid addresses, in a memory, such as memory 368, and as transmitted addresses are received, they are compared to the valid addresses in this list. Thus, only signals transmitted by RF transmitter modules that are on the list of valid addresses are accepted by receiver module 362. In this manner, for example, command signals sent by Level-1 wands can be distinguished from command signals sent by Level-2 wands, which can be distinguished from Level-3 wands, etc.

Figure 22B:
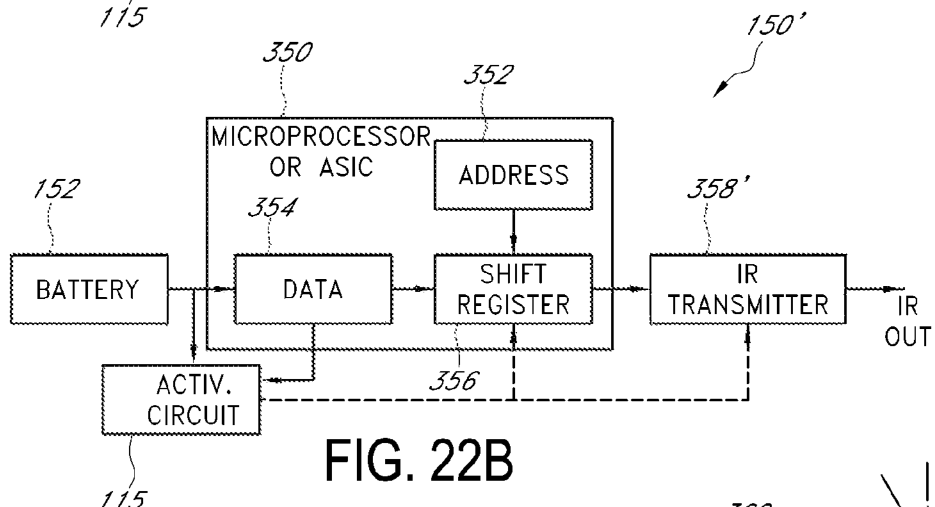
FIG. 22B is a simplified schematic block diagram of an IR transmitter module adapted for use in accordance with one preferred embodiment of the present invention.
Figure 23B:
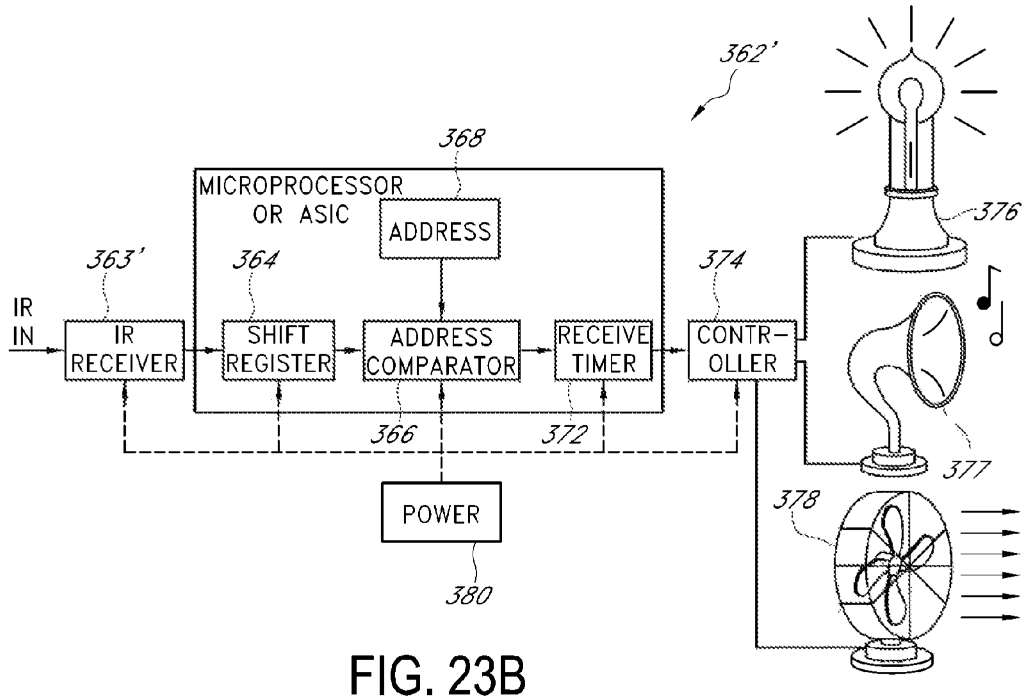
FIG. 23B is a simplified schematic block diagram of an IR receiver module and controller adapted for use in accordance with one preferred embodiment of the present invention.

Although the transmitter module 150 of FIG. 22A and the receiver module 362 of FIG. 23A are described with reference to RF technology, a skilled artisan will recognize from the disclosure herein that other types of wireless technology may also be used. For example, FIG. 22B depicts an IR transmitter module 150' having an IR transmitter 358' that may be used to transmit signals such as the type commonly employed in television remote controls, keyless entry systems and the like. The other components of the IR transmitter module 150' may also be modified such that the IR transmitter module 150' is capable of functioning similarly to the RF transmitter module 150 discussed with reference to FIG. 22A. In addition, FIG. 23B illustrates an IR receiver module 362' having an IR receiver 363' usable to operate with the IR transmitter module 150' of FIG. 22B. The other components of the IR receiver module 362' may also be modified such that the IR receiver module 363' is capable of functioning similarly to the RF receiver module 363 discussed with reference to FIG. 23A.

Figure 24:
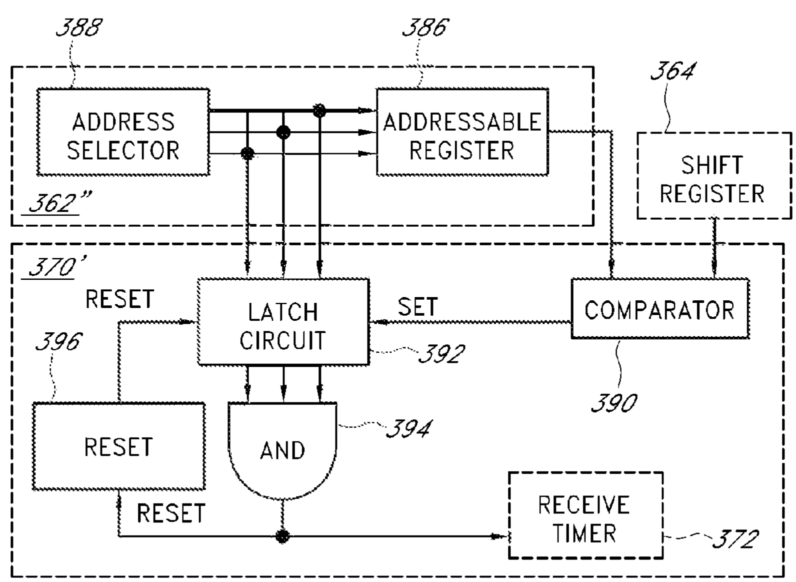
FIG. 24 is a simplified schematic diagram of an alternative embodiment of a portion of the RF receiver module of FIG. 23A adapted for use in accordance with one preferred embodiment of the present invention.

FIG. 24 is a schematic block diagram of a portion of a receiver module 362" including an embodiment of address comparator 370' and of address storage 368' particularly suited for operating with a plurality of simultaneously operating transmitter modules 150 or 150'. For example, blocks in FIG. 24 that are the same as blocks in FIG. 23A and described above are shown in phantom and are identified by the same numeric designation as in FIG. 23A. Address storage 368' includes addressable registers or memory 386 in which are stored the preselected coded identification values corresponding to the preselected coded identification value of each of a plurality of compatible RF transmitter modules 150 desired to be operably associated with receiver 362". Address selector 388 repetitively generates a sequence of addresses including the addresses of all the registers of addressable register 386 within a relatively short time period less than about 50-100 milliseconds. Thus the complete set of preselected stored coded values are applied to one input of coded value comparator 390 whereby the received coded identification value received and decoded at the output of shift register 364 and applied to the other input of coded value comparator 390 is compared to each one of the stored coded values of the set thereof stored in addressable register 386.

Although the receiver module 362" of FIG. 24 is disclosed with reference to particular embodiments, a skilled artisan will recognize from the disclosure herein a wide variety of alternative structures and uses for the receiver module 362". For example, the receiver module 362" may be capable of receiving an IR signal and structured similarly to the IR receiver module 362' of FIG. 23B.

Comparator 370' preferably includes a latch circuit 392 having an addressable latch corresponding to each register in addressable register 386 and that is addressed by the same address value generated by address selector 388 to address register 386. When there is a match at the inputs of coded value comparator 390 between the received coded value and the then produced stored coded value, the occurrence of the match is stored by setting the designated corresponding latch in latch circuit 392. If received coded identification values corresponding to all of the stored fixed coded values are received and properly decoded, then all of the latches in latch circuit 392 will be set, thereby making a "true" condition at the inputs of AND gate 294 and causing its output to become "true". This "true" signal from AND gate 294 resets receive timer 372, as described above in connection with FIG. 23A, and also activates a reset circuit 296 to reset all the latches of latch circuit 392 so that the comparison sequence of received coded identification values to the set of stored fixed coded values begins again. If all of the preselected received coded values are not received, then all of the latches in latch circuit 392 are not set, the output of AND gate 294 does not become "true", and receive timer 372 times out and issues the command termination signal discussed above.

Figure 25:
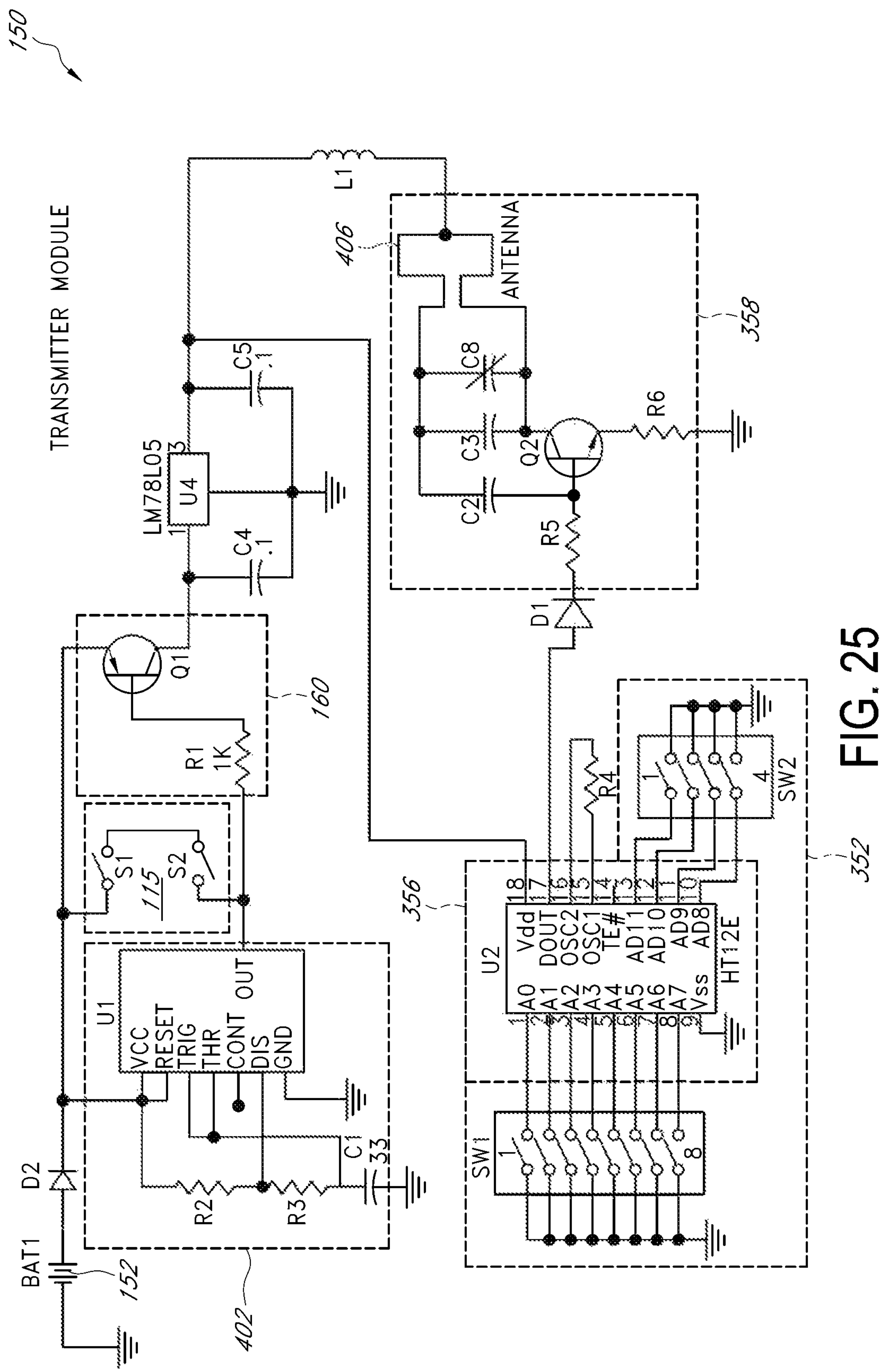
FIG. 25 is a detailed electrical circuit schematic of the RF transmitter module of FIG. 22A adapted for use in accordance with one preferred embodiment of the present invention.

FIG. 25 is a detailed electrical schematic diagram of an exemplary embodiment of transmitter module 150 illustrated and discussed above. Electrical power is provided by one or more batteries 152 and/or other power sources as illustrated and described herein. This power is preferably switched by wand activation circuit 115 and/or optional timer module 402. Electrical power is provided via diode D2 to the transmit timer U1, such as an integrated circuit one-shot multivibrator type LM555 available from National Semiconductor Corporation. The time-out interval of multivibrator U1 is established by resistors R2, R3 and capacitor C1 which need not be high precision components. When wand activation circuit 115 is activated, a voltage is applied through resister R1 to the gate of a transistor Q1. This causes electrical power to be applied from battery 152 to a five-volt voltage regulator U4 such as a type LM78L05 also available from National Semiconductor Corporation. Alternatively, the periodic output from U1 may be applied to the gate of a transistor Q1 to the same effect (e.g., for sending periodic "beacon" transmissions).

Regulated voltage from regulator U4 is applied to shift register 356 (pin 18) and RF transmitter 358. Shift register 356 is implemented by an encoder integrated circuit U2 such as a 212 series encoder type HT12E available from Holtek Microelectronics in Hsinchu, Taiwan, R.O.C. Non-volatile address storage 352 is implemented by twelve single pole switches in switch packages SW1 and SW2 which are set to produce a twelve-bit coded value which is applied in parallel bit format to encoder integrated circuit U2 of shift register 356. Once set by the manufacturer or the user, the preselected coded value stored in address storage 352 is fixed and will not change absent human intervention. However, in alternative embodiments SW2 may be replaced in whole or in part by wand command selection circuitry such as touch switches, mercury tilt switches and the like illustrated and described above in connection with FIGS. 14-16. Such circuitry enables users to actively select and change the coded data impressed upon address lines 8-10 of encoder integrated circuit U2. Integrated circuit U2 reproduces the coded address and data values in pulse-width modulated serial-bit format and applies it through diode D1 to RF transmitter 358. RF transmitter 358 includes a class B biased transistor Q2 in an L-C tuned RF oscillator transmitter coupled to a loop antenna 406 for transmitting the command signal coded values (address bits coded by SW1 and data bits coded by SW2) produced by encoder U2.

Transmitter module 150 need only employ a small antenna such as a small loop antenna and is not required to have optimum antenna coupling. In a typical embodiment, with a transmitter frequency of about 915 MHz, a transmitter peak power output of less than or equal to one milliwatt produces a transmission range R of about 20-30 meters. Other frequencies and power levels may also be employed. The low transmitter power is particularly advantageous in that it allows the size of transmitter module 150 to be made very small.

Figure 26:
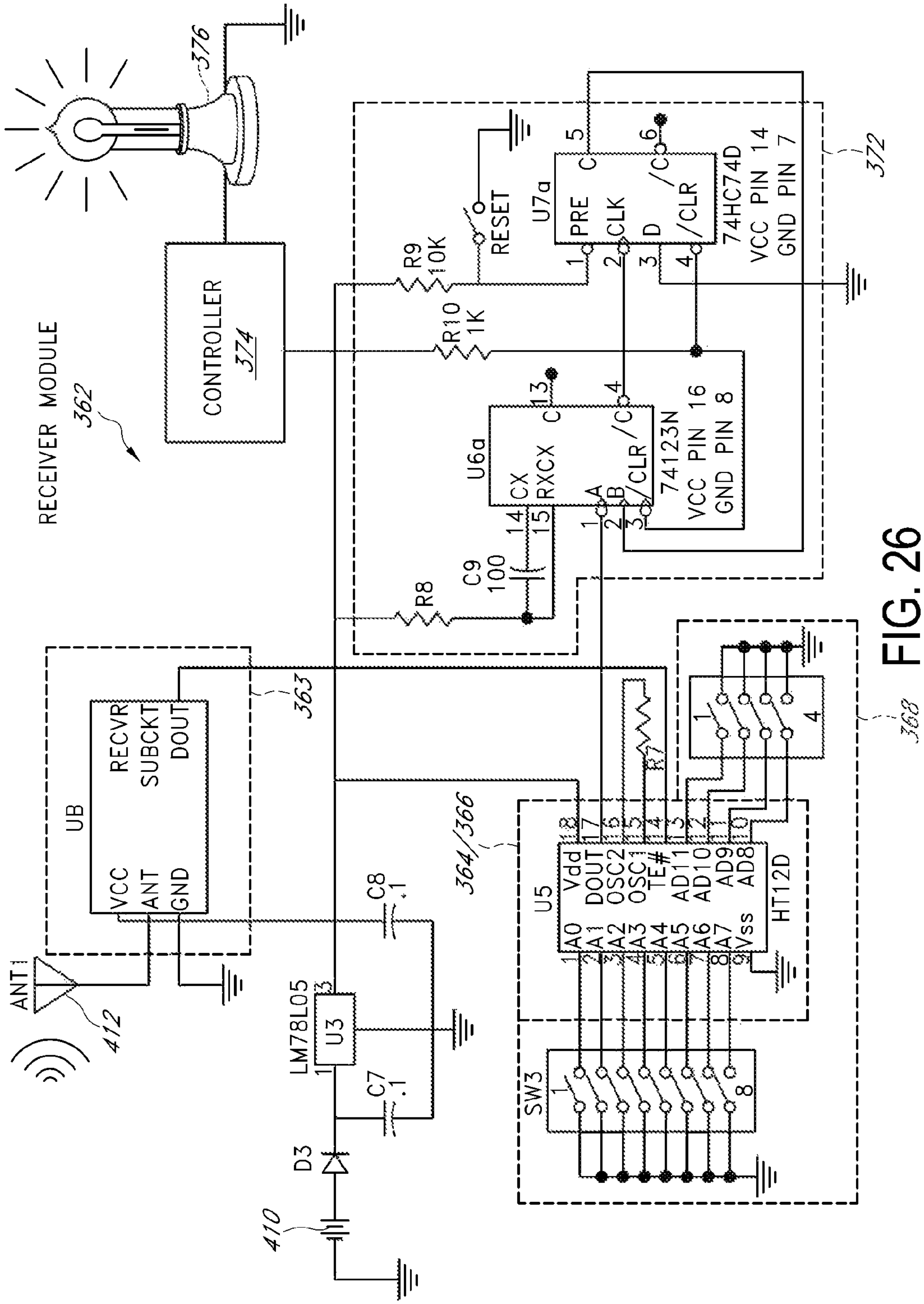
FIG. 26 is a detailed electrical circuit schematic of the RF receiver module of FIG. 23A adapted for use in accordance with one preferred embodiment of the present invention.

FIG. 26 is an electrical schematic diagram of an exemplary embodiment of receiver module 362 illustrated and discussed above. Power is supplied by a voltage source 410 which can be either a battery or a DC power supply. Voltage from voltage source 410 is regulated by voltage regulator circuit U3 such as type LM78L05 to produce a regulated +5 volt power supply for the functional blocks of receiver module 362. In operation, command signals transmitted from transmitter modules are received at loop antenna 412 and applied to RF receiver 363 including a receiver sub-circuit integrated circuit U8 such as type RX-2010 available from RF Monolithics in Dallas, Tex. The identification signal, including the twelve bit coded value in serial-bit format is coupled from the output of receiver sub-circuit U8 to shift register decoder and address comparator 364/366 which are implemented in an integrated circuit U5, such as a 212 series decoder type HT12D also available from Holtek Microelectronics. Decoder U5 converts the coded value in serial-bit format to parallel-bit format and compares that received coded value to the preselected stored coded fixed reference value in parallel bit format determined, for example, by the positions of the twelve single pole switches in switch packages SW3, SW4 of address storage module 368.

Receive timer 372 is implemented by one-shot timer integrated circuit U6*a* such as type 74123N and D-flip flop U7*a* such as type 74HC74D, both of which are available from National Semiconductor Corporation of Santa Clara, Calif. When comparator 366 detects a match between the received coded value from transmitter module 150 and the coded value stored in address storage 368 it resets one-shot timer U6*a*. If one-shot timer U6*a* is not again reset within the time determined by timing resistor R8 and timing capacitor C9, U6*a* then sets flip-flop U7*a* and its Q output becomes low thereby applying a voltage input to controller 374 signifying the end of a transmitted simple or complex spell. Controller 374 then processes the received command signal or signals (e.g., stored in a stack register) and appropriately operates one or more associated play effects 376.

Those skilled in the art will appreciate that the switch positions of the twelve switches SW1, SW2 of transmitter module 150 correspond to the switch positions of the corresponding twelve switches SW3, SW4 of receiver module 362. These preset values may be fixed or dynamic, as discussed above. The twelve-bits available for storing coded values may be apportioned in a convenient way, for example, into an address portion and into a data portion. For example, the twelve-bit coded value can be apportioned into a ten-bit address portion (1024 possible combinations) and a two-bit data portion, which would accommodate up to four different transmitter command signals. If desired, the ten-bit address portion can be further divided into various logical portions representing, for example, the designated wand level (e.g., 1, 2, 3 or 4), special acquired magic powers or skills, experience levels and the like. This coded data would preferably be shared and coordinated between all transmitter modules 150 and receiver modules 362 such that each wand effectively would have its own unique powers and abilities as represented and identified by the coded address data. Thus, certain receivers and associated play effects would not be actuated by certain wands unless the address coding of the transmitter module thereof is coded with the appropriate matching data. In addition, the timing between received signals may be used to determine the appropriate play effect or intensity of a play effect caused by operation of the wand 100. Persons skilled in the art will recognize also that recoding of transmitter modules is a convenient way to provide for advancement of game participants within an interactive gaming experience. For example, this can be accomplished manually (e.g., by flipping dip switches SW1/SW2) or automatically/wirelessly (e.g., via RF programmable code latching circuitry, not shown).

While the foregoing embodiments have been described in terms of a radio frequency (RF) transmission between a transmitter module 150 and receiver module 362, various alternative embodiments could also readily be implemented such as, for example, replacing (or complimenting) RF transmitter and receiver set (358, 363) with an appropriately selected infrared (IR) transmitter and receiver set or a laser or light system. The IR or laser system would have particular advantage where, for example, it is desired to provide directional control of a transmitted command signal such as may be useful for directional spell casting, target practice, and wand-based shooting galleries.

Light-Activated Interactive Play System

Figure 27:
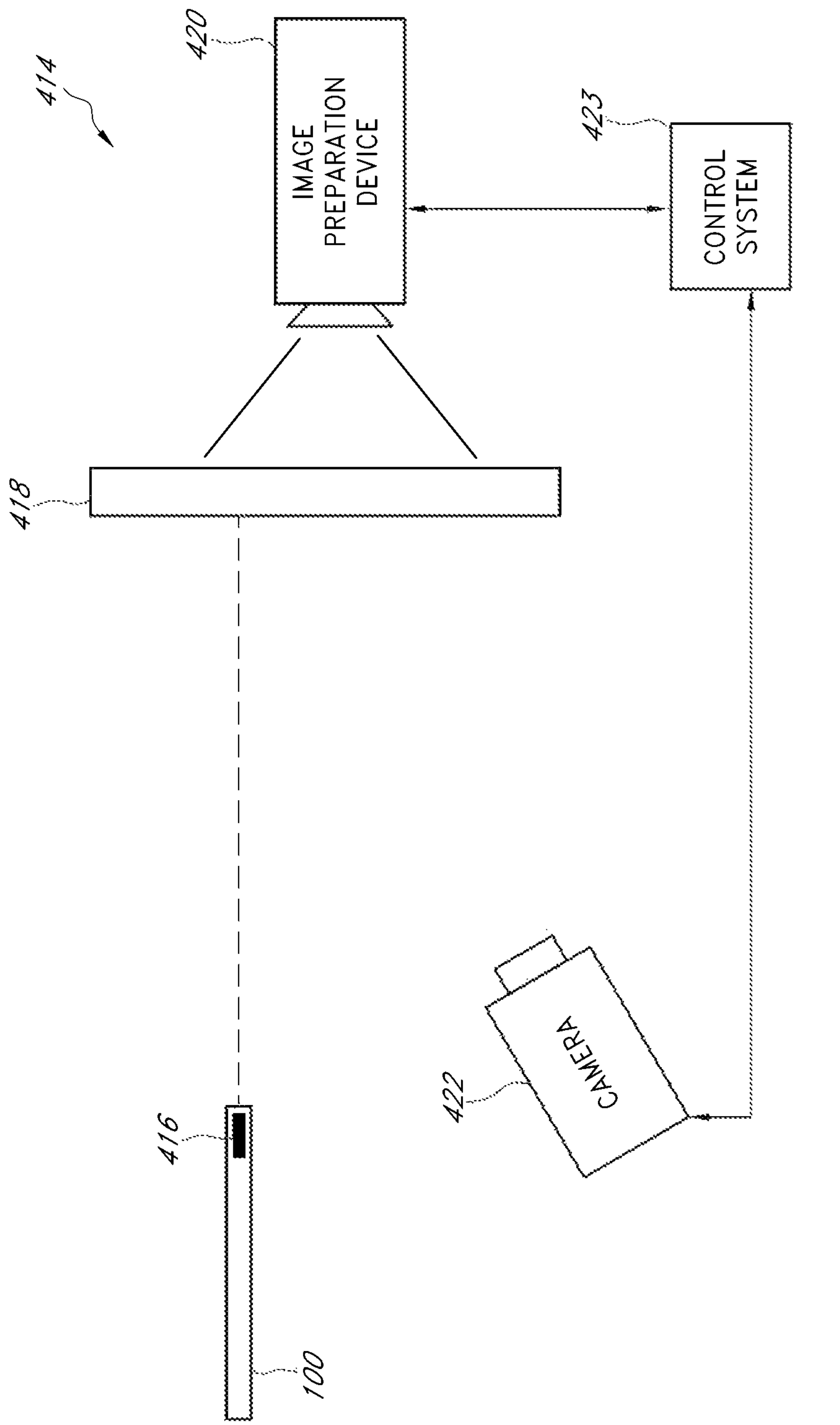
FIG. 27 is a simplified illustration of an interactive play system usable with light-activation in accordance with one preferred embodiment of the present invention.

For example, FIG. 27 illustrates an exemplary embodiment of a light-activated interactive play system 414 for use with embodiments of the invention utilizing laser technology. As shown in FIG. 27, the interactive play system 414 comprises the magic wand 100 having a light emitting module 416, a display device 418, an image preparation device 420, a camera 422, and a control system 423.

The light emitting module 416 of the wand 100 advantageously emits a directional signal, such as, for example, visible or infrared light. In one embodiment, the light emitting module 416 comprises a semiconductor laser. The signal output from the light emitting module 416 is emitted from an end opening of the wand 100 in a direction substantially parallel to the wand body. The signal may be generated from particular motions of the wand 100, as described herein, or from other input from the user.

In one embodiment, the user operates the wand 100 such that the signal emitted from the light emitting module 416 is directed to the display device 418. The display device 418 may comprises any device, apparatus or medium usable to intercept, reflect, and/or capture the signal emitted from the light emitting module 416 at an arbitrary position on the display device. In one embodiment, the display device 418 comprises a screen. In other embodiments, the display device 418 may comprise a wall, a mist, a door, a transparent surface, or the like.

Furthermore, the illustrated interactive play system 414 comprises the image preparation device 420, which operates to cause at least one image to appear on the display device 418. In one embodiment, the image preparation device 420 projects a video image and/or a still image onto the display device 418. For example, the image preparation device 420 may comprise a video projector, an LCD projector, or the like. In other embodiments, the image preparation device 420 may comprise multiple devices usable to project or to cause an image to appear on the display device 418. A skilled artisan will recognize from the disclosure herein a wide variety of objects, characters, and/or images that may be projected on the display device 418. For instance, the image preparation device 420 may project the image of mythical creatures, such as a dragon or a unicorn; magical objects, such as a flying carpet; or fantasy characters, such as a wizard or an elf; combinations of the same or the like.

In the illustrated embodiment, the display device 418 comprises a translucent material and is arranged in front of the image preparation device 420. In such an arrangement, the user's view of the image preparation device 420 may be partially or entirely obstructed by the display device 418. In other embodiments, the image preparation device 420 may be located near, to the side of, or in front of the display device 418 so long as an image may appear on the display device 418. In yet other embodiments, the image preparation device 420 is electrically coupled to the display device 418 through a wired or wireless transmission medium so as to cause images to appear on the display device.

In an embodiment, the camera 422 is directed at the display device 418 and advantageously captures, detects and/or records the arbitrary position of the signal emitted from the light emitting module 416 as the signal is intercepted by the display device 418. For example, the camera 422 may comprise a high-speed still camera or a specialized video camera used to take periodic or continuous photographs of a surface of display device 418. In an embodiment of the invention in which the light emitting module 416 outputs an infrared signal, the camera 422 is configured to record the infrared signal as it is intercepted by the display device 418. The camera 422 advantageously outputs a signal based on the captured image data to the control system 423, which captured image data includes information indicative of the position of the signal output by the light emitting module 416. In yet other embodiments, multiple cameras 422 are used in the interactive play system 414 to capture, detect, or record the position of the light emitting module signal as it is intercepted by the display device 418. For example, multiple cameras 422 may be directed at different sections of the display device 418 and/or may record or capture data from different angles.

In one embodiment, the control system 423 advantageously communicates with at least the image preparation device 420 and the camera 422. For example, the control system 423 may comprise a general purpose or a special purpose processor. However, an artisan will recognize that the control system 423 may comprise an application-specific integrated circuit (ASIC) or one or more modules configured to execute on one or more processors.

The control system 423 receives and processes the image data received from the camera 422. In one embodiment, the control system 423 analyzes the position and/or movement of the signal from the light emitting module 416 to determine modifications to be made to the subsequent images to be produced by the image preparation device 420. For example, the control system 423 may determine from the image data that a user has cast a certain "spell" by motioning the wand 100, and therefore the light emitting module 416, in a particular recognizable pattern. The control system 423 may make this determination by tracking the movement(s) of the light emitting module signal across the display device 418, which movement is recorded in the image data output from the camera 422.

For example, the control system 423 may initially command the image preparation device 420 to project an image of a brick wall onto the display device 418. The user, who sees the image of the brick wall, points his or her wand 100 toward the brick wall such that the light emitting module 416 outputs a signal, such as a red dot caused by a laser, onto the brick wall (and the display device 418). The user then motions the wand in a particular pattern, such as is described herein, to cause a desired motion of the red dot across the display device 418. The camera 422 records this movement in its image data, which is output to the control system 423 for processing. If the control system 423 determines from the image data that a certain spell has been cast, such as a "move wall" spell, the control system 423 causes the image preparation device 420 to project an image of the wall disappearing or moving out of the path or view of the user.

Although the interactive play system 414 is disclosed with reference to particular embodiments, a skilled artisan will recognize from the disclosure herein a wide variety of alternatives usable with the system 414. For example, the display device 418 may comprise a large liquid crystal display (LCD) screen coupled to an image preparation device 420 comprising a digital video source, such as a memory. Furthermore, sensors, such as optical or infrared sensors, usable to detect the position and/or movement of the light emitting module signal may be used in place of, or in combination with, the camera 422.

In yet another embodiment, the control system 423 may be in communication with a central system or database and/or various receivers capable of causing one or more play effects. Thus, the control system 423 may, in response to the signal emitted from the light emitting module 416, control or cause play effects other than modifications to the image on the display device 418. For example, the control system 423 may command a light to turn on or a book to open based on the signal captured by the camera 422.

Figure 27A:
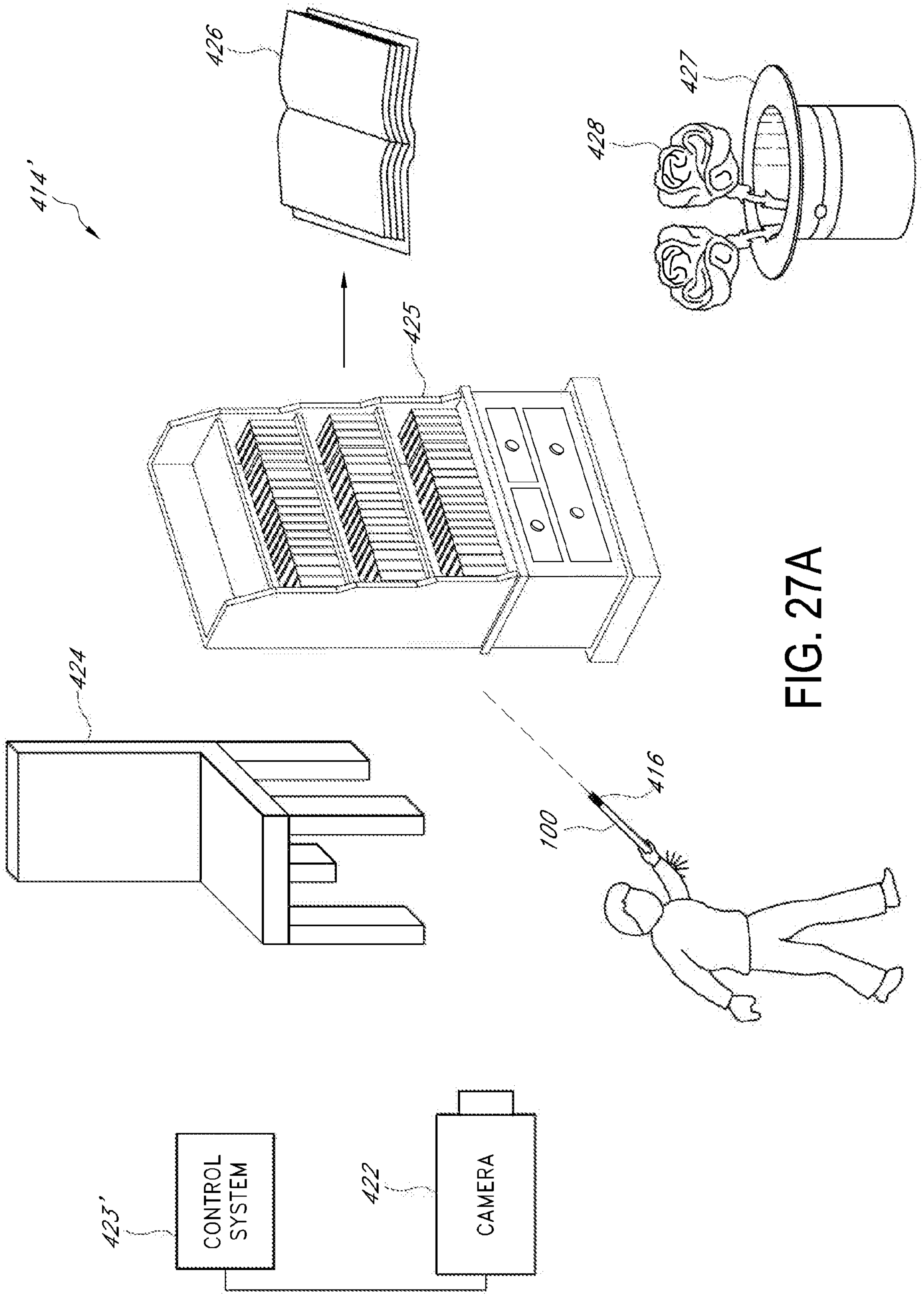
FIG. 27A is a simplified illustration of another embodiment of an interactive play system usable with light-activation.

FIG. 27A depicts yet another embodiment of an interactive system for use with light-activation. As shown, a light-activated interactive play system 414' includes similar components as the interactive play system 414 of FIG. 27. In particular, the illustrated interactive play system 414' includes the camera 422 that advantageously captures, detects and/or records the position of a signal emitted from the light emitting module 416 of the wand 100. In one embodiment, the camera 422 is located within a substantially enclosed area, such as, for example, a room, and detects the signal emitted from the light emitting module 416 within the room and/or directed at objects or effects within the room. In other embodiments, multiple cameras 422 are located within a single room.

The camera 422 communicates with a control system 423'. Similar to the control system 423 of FIG. 27, the control system 423' receives and processes the image data received from the camera 422. For example, the control system 423' may analyze the position and/or movement of the signal from the light emitting module 416 within a room. In one embodiment, the control system 423' advantageously communicates with one or more effects, such as through wired or wireless communications, to control or trigger the effects based on the image data from the camera 422. For example, as illustrated in FIG. 27A, the interactive play system 414' includes effects such as a chair 424, a bookshelf 425 having at least one book 426, and a magic hat 427 with flowers 428.

An embodiment of a method for interactive game play will now be described with reference to FIG. 27A. A user or game participant enters a room having the interactive system 414'. The user then maneuvers his or her wand 100 such that the light emitting module 416 emits its signal in a certain direction and/or pattern, which signal is captured by the camera 422. The control system 423' then receives image data from the camera 422 that includes information relating to the position and/or movement of the signal within the room. Using this image data, the control system 423' triggers and/or controls at least one special effect.

For example, in one embodiment, if the user directs the signal from the light emitting module 416 toward the chair 424, the control system 423' causes the chair to "levitate" or to move. If the user directs the signal from the light emitting module 416 toward the bookshelf 425, the control system 423' may cause the book 426 to move or to open. If the user directs the signal from the light emitting module 416 toward the magic hat 427, the control system 423' may cause the flowers 428 to appear. Each of these described special effects may be controlled by associated effects controllers, such as motors and/or processors, that are in communication with the control system 423'. In addition, a skilled artisan will recognize from the disclosure herein a wide variety of special effects usable with the interactive system 414'. For example, the control system 423' may trigger a cuckoo clock, a light to turn on, an inanimate object to speak, and so forth.

Figure 27B:
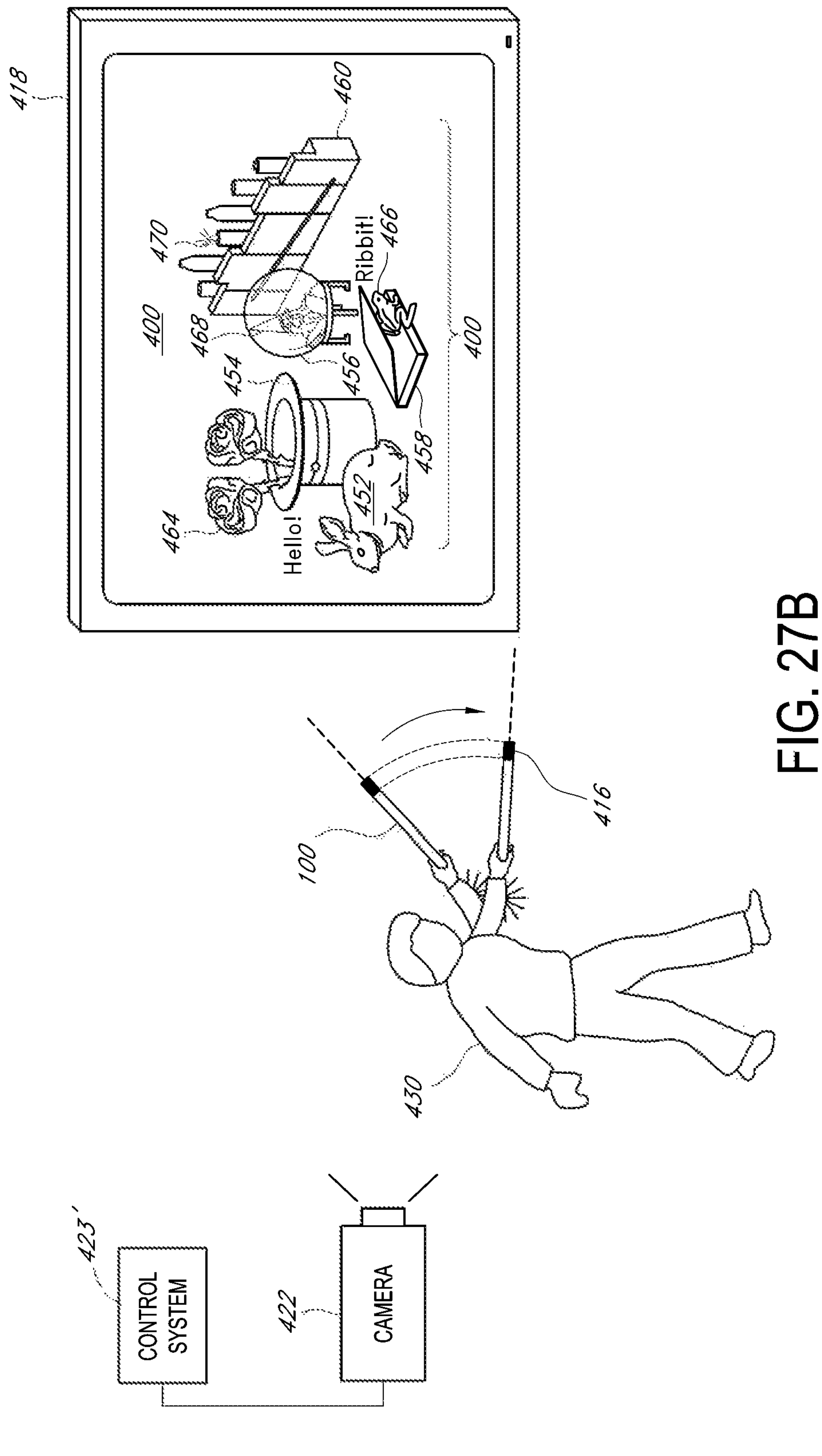
FIG. 27B is a simplified illustration of another embodiment of an interactive play system usable with light-activation.

In yet other embodiments of the invention, such as illustrated in FIG. 27B, the user performs a predetermined pattern or movement of the wand 100 to initiate a "magic spell." The movement of the wand 100 causes a corresponding movement of the signal emitted by the light emitting module 416, which signal is captured by the camera 422. The control system 423' then processes the image data received from the camera 422 to determine which "spell" was cast and to cause or trigger the special effect(s) associated with the particular spell.

Competitive Games and Play Effects

It will be apparent to those skilled in the art from the disclosure herein that the invention disclosed and described herein facilitates a plethora of new and unique gaming opportunities and interactive play experiences heretofore unknown in the entertainment industry. In one embodiment the invention provides a unique play experience that may be carried out within a compatible play facility, retail space and/or other facility utilizing a wand as disclosed and described herein. With a wand or other similarly enabled device, play participants can electronically and "magically" interact with their surrounding play environment(s) to produce desired play effects, thereby fulfilling play participants' fantasies of practicing, performing and mastering "real" magic.

Figure 28:
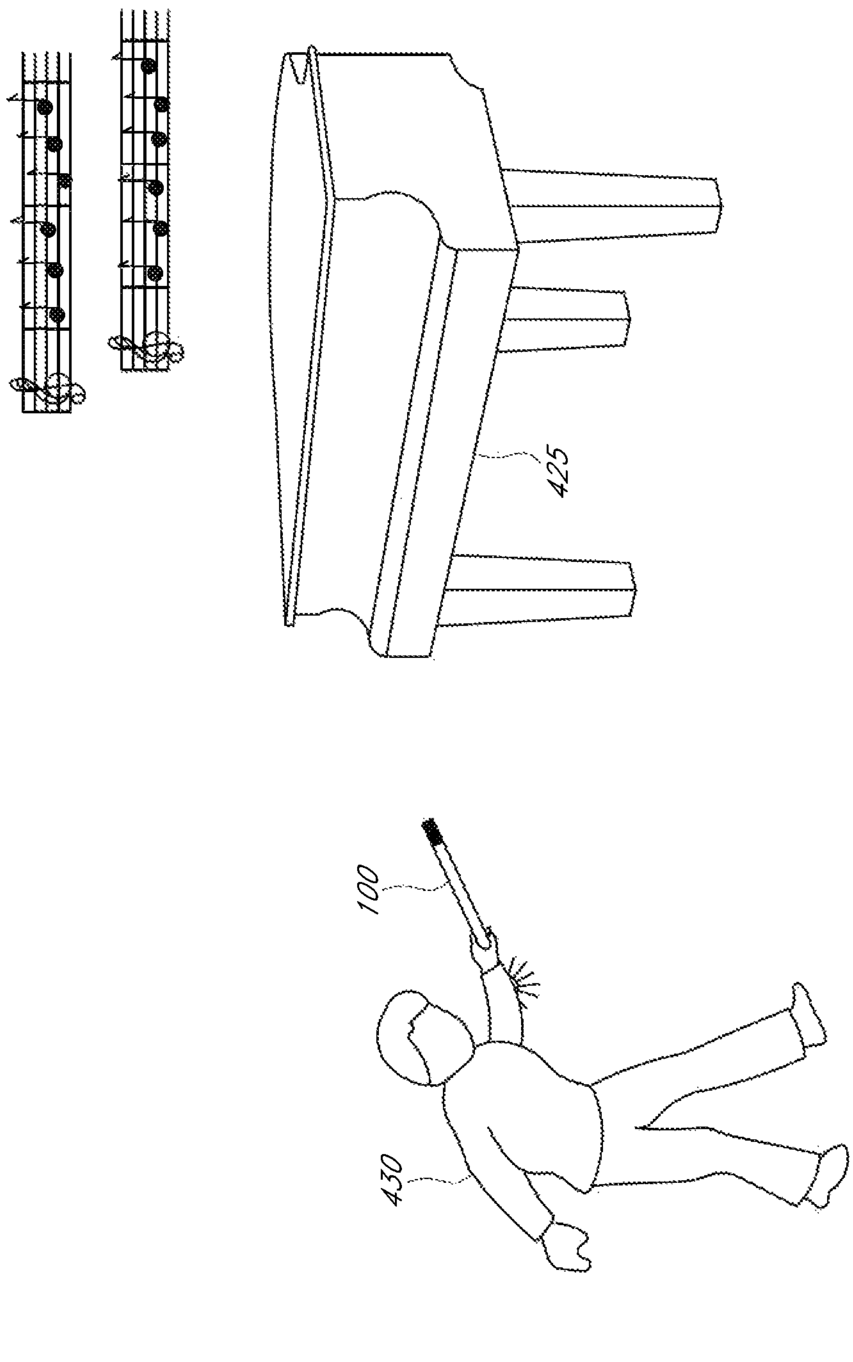
FIG. 28 is a perspective illustration of one preferred embodiment of a wand-actuated play effect comprising a player piano controlled at least in part by the output of an RF receiver and/or magnetic reed switch having features and advantages in accordance with the present invention.

For example, FIG. 28 illustrates one preferred embodiment of a wand-actuated play effect comprising a player piano 429 that is adapted to be responsive to or controlled by an RF command signal transmitted by magic wand toy 100. Those skilled in the art will readily appreciate that an RF receiver and associated controller, such as disclosed and described herein, can easily be concealed within the piano 429 and/or in the vicinity thereof such that it electronically interfaces with and directs various selected control circuitry associated with the piano 429. These may include, for example, circuitry for controlling: power on/off, song selection, playing speed and volume, instrument selection and special sound effects, sound sampling, combinations of the same or the like. In operation, user 430 would wave the wand 100 in accordance with one or more specific learned motions selected by the user to achieve a desired effect (e.g., piano on/off, play next song, speed-up/slow down, change piano sound, combinations of the same or the like). Most preferably, the wand 100 contains internal activation circuitry, such as described herein, such that the wand may be activated by the motion induced thereon by a user and so that actuation and control of the special effect appears to be, and has the feeling to user 430 of being, created by "real" magic.

Figure 29:
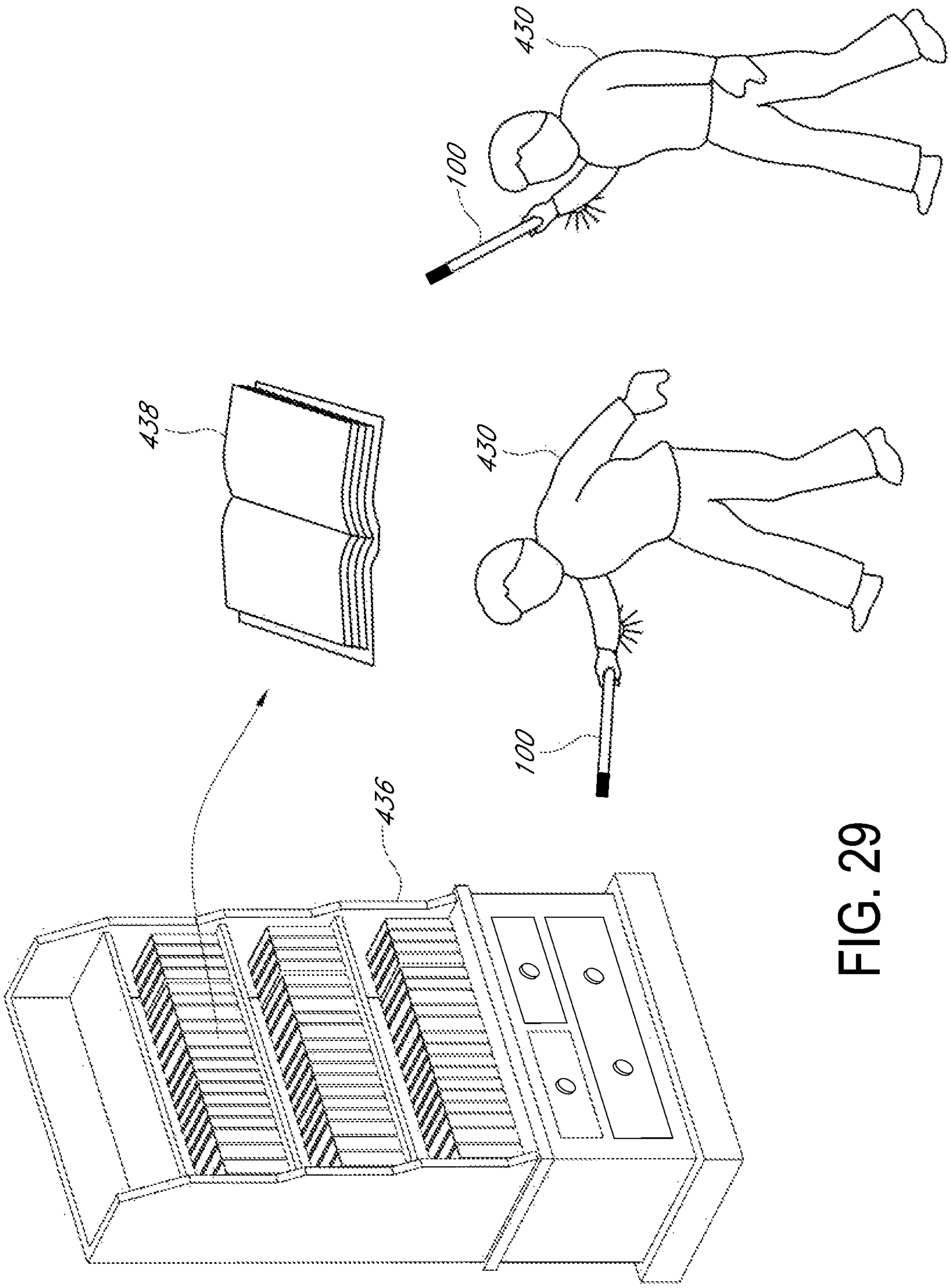
FIG. 29 is a perspective illustration of another preferred embodiment of a wand-actuated play effect comprising bookshelves with simulated levitating books controlled at least in part by the output of an RF receiver and/or magnetic reed switch having features and advantages in accordance with the present invention.

FIG. 29 illustrates another preferred embodiment of a wand-actuated play effect comprising magical or "enchanted" bookshelves 436. The bookshelves contain multiple shelves of simulated or real books 438 that are controlled by one or more concealed actuators. The actuators are preferably positioned and arranged such that, when actuated, they cause one or more selected books to move, vibrate or levitate. Again, those skilled in the art will readily appreciate that an RF receiver and/or associated controller, such as disclosed and described herein, can easily be concealed within the bookshelves 436 and/or in the vicinity thereof. Movement and vibration of selected books can be provided, for example, by various linear stepper-motor actuators associated with one or more of the books 438. Each actuator may be controlled, for example, by a magnetic reed switch closure hidden behind the binder of each book. As a user 430 lightly touches the binder of each book with a magnetically-tipped wand 100 the associated reed switch (not shown) is closed, connecting power to an associated vibrator/actuator. Then, as the user 430 waves the wand 100 in one or more particular ways the selected book appears to vibrate or move as if it is being lifted or controlled by the magic wand 100. More spectacular effects may include, for example: (i) an effect that causes all or some of the books 438 to vibrate or move violently, randomly and/or in a rhythmic pattern (e.g., as if dancing); (ii) an effect that causes one or more books to appear as if floating or levitating; (iii) an effect that causes all or some of the books to magically rearrange themselves; (iv) an effect that causes one or more selected books to talk or tell stories; and (v) an effect that causes two or more books to appear to have a quarrel, argument or debate (e.g., about an interesting historical fact or event). Some or all of these larger, more spectacular effects may be, and preferably are, restricted to only users 430 who possess and have learned to use, for example, a Level-3 wand or above. Thus, for example, a goal-oriented or object-driven, interactive game may be provided wherein play participants compete with one another to learn and master certain game tasks in order to achieve successively more challenging goals or objectives and to thereby earn additional powers, spells, abilities, points, special recognition and/or other rewards within the context of an overall game experience. Preferably, in each case and regardless of the level of wand used, actuation and control of the special effect appears to be, and has the feeling to user 430 of being, created by "real" magic. Of course, many other possible fun and/or exciting special effects will be readily apparent and obvious from the disclosure herein to persons skilled in the art.

Figure 30:
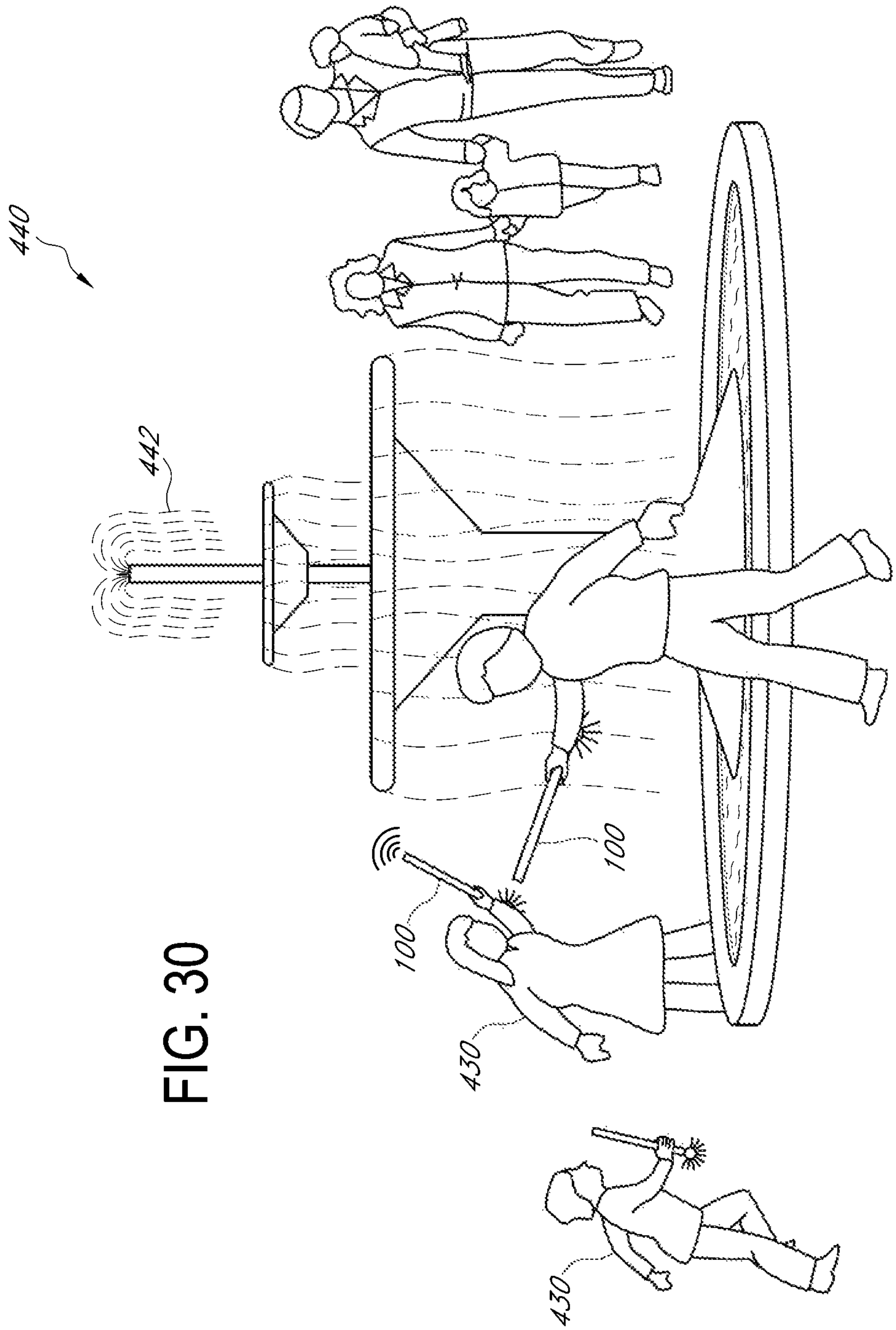
FIG. 30 is a perspective illustration of another preferred embodiment of a wand-actuated play effect comprising a water fountain effect controlled at least in part by the output of an RF receiver and/or magnetic reed switch having features and advantages in accordance with the present invention.

FIG. 30 illustrates another preferred embodiment of a wand-actuated play effect comprising a water fountain 440 having one or more associated water features 442 responsive to or controlled by an RF command signal transmitted by one or more wands 100. An RF receiver and associated controller, such as disclosed and described herein, can easily be placed within an associated fountain control system or panel, electronically interfacing therewith to direct or control various selected fountain features or functions. These may include, for example, on/off control of water flow, fountain lighting, special water features 442, combinations of the same or the like. In operation, one or more users 430 would wave their wands 100 in accordance with one or more specific learned motions selected by each user to achieve a desired effect (e.g., fountain on, next water feature, increase/decrease water feature, change lighting intensity/color, or the like). Most preferably, each wand 100 contains internal activation circuitry, such as described herein, such that each wand may be activated by the motion induced thereon by each user and so that actuation and control of the special effect appears to be, and has the feeling to users 430 of being, created by "real" magic.

Figure 31A:
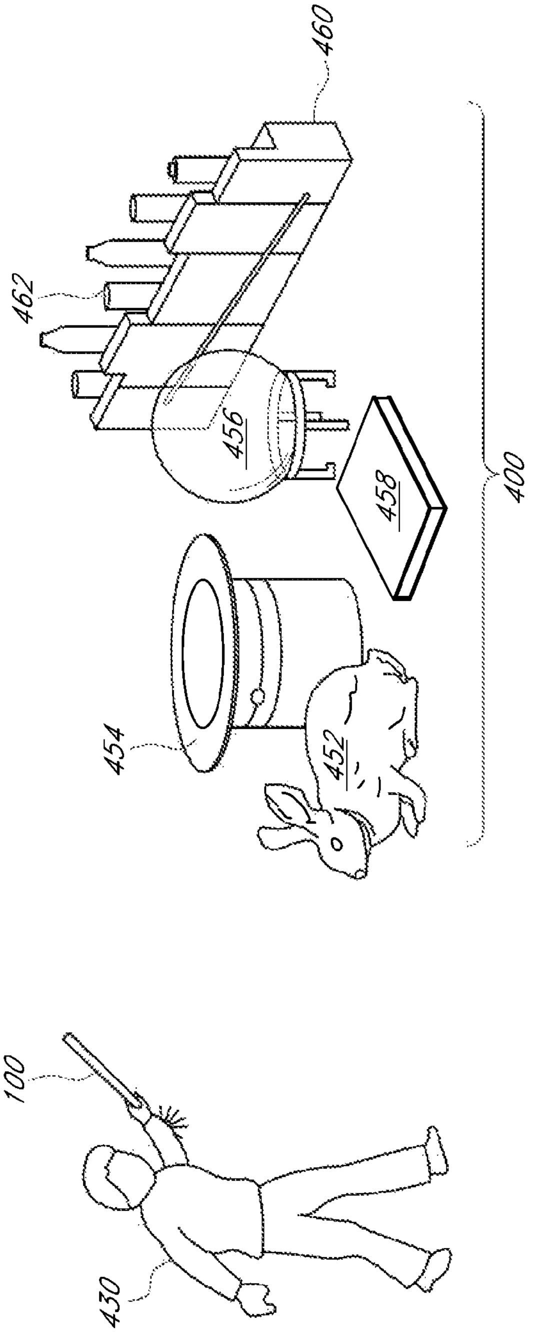
FIGS. 31A and 31B are time-sequenced perspective views of a magic training center comprising various wand-actuated play effects controlled at least in part by the output of one or more RF receivers and/or magnetic reed switches having features and advantages in accordance with the present invention.
Figure 31B:
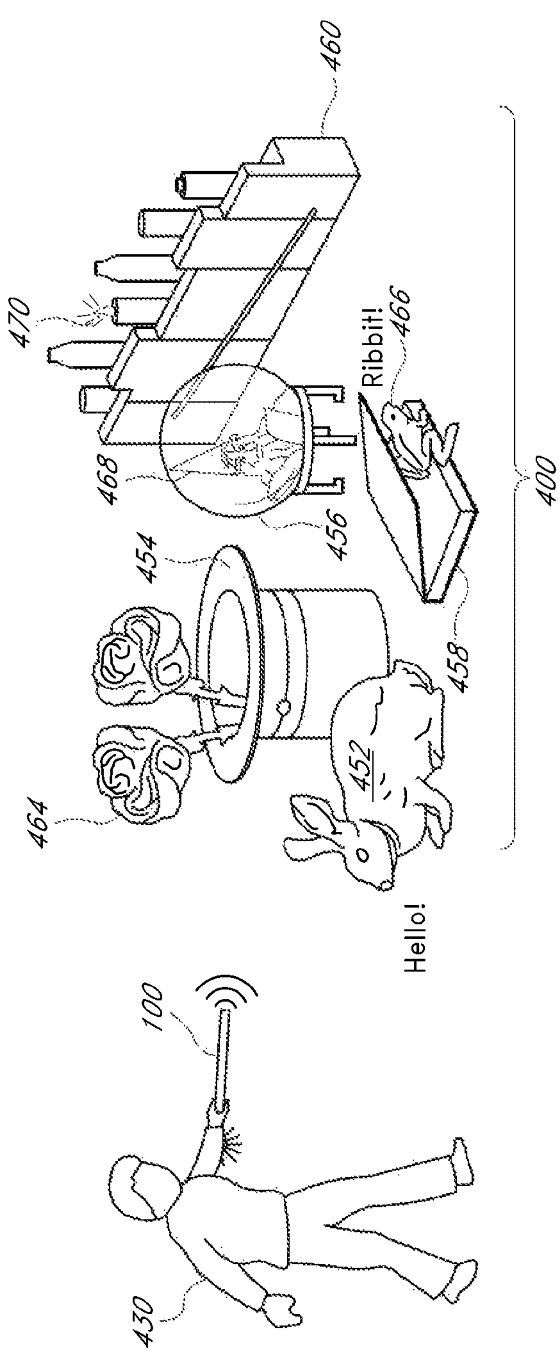

FIGS. 31A and 31B are time-lapsed schematic illustrations of a preferred embodiment of a play facility or play center constructed in accordance with the present invention. The play facility may comprise a family entertainment center, retail entertainment space, arcade, theme park, destination resort, restaurant, or the like, themed as a magic training center or any variety of other suitable themes as may be desired. The play facility preferably comprises multiple wand-actuated play effects 400, such as talking animals 452, magic hats 454, crystal balls 456, enchanted books 458, and various shooting-gallery-style pop-up target effects 460, 462. These may be physical play objects configured with special effects, as illustrated, and/or they may be graphical or computer-generated images displayed, for example, on one or more associated computer monitors, TV monitors, DVD display monitors, or computer gaming consoles and the like, such as illustrated in FIG. 27B. Those skilled in the art will readily appreciate from the disclosure herein that all of these effects and many other possible play effects may be actuated or controlled by wand 100 using one or more RF receivers, RFID reader/writers and/or magnetic reed switches, as disclosed and described above.

Some interactive play effects 400 may have simple or immediate consequences, while others may have complex and/or delayed consequences and/or possible interactions with other effects. Some play effects 400 may be local (short range) while other effects may be remote (long range). Each play participant 430, or sometimes a group of play participants working together, preferably must experiment with the various play effects using their magic wands 100 in order to discover and learn how to create one or more desired effect(s). Once one play participant figures it out, he or she can use the resulting play effect to surprise and entertain other play participants. Yet other play participants will observe the activity and will attempt to also figure it out in order to turn the tables on the next group. Repeated play on a particular play element can increase the participants' skills in accurately using the wand 100 to produce desired effects or increasing the size or range of such effects.

Most preferably, a live-action object-oriented or goal-oriented, interactive game is provided whereby play participants compete with one another (and/or against themselves) within a compatible play space to learn and master certain play effects and game tasks in order to achieve successively more challenging goals or game objectives and to thereby earn additional powers, spells, abilities, points, special recognition and/or other rewards within the context of an overall game experience. For example, play participants can compete with one another to see which participant or group of participants can create bigger, longer, more accurate or more spectacular effects. Other goals and game objectives may be weaved into an entertaining story, such as a magical quest or treasure hunt in which play participants are immersed. The first task may be to build a magic wand. The next task may be to learn to use the magic wand to locate and open a secret treasure box filled with magical secrets (e.g., various spell formulas or magical powers). The ultimate goal may be to find and transform a particular frog (identified by, e.g., secret markings or other secret characteristics) into a prince/princess. Of course, many other gaming and theming possibilities are possible and desirable. Optionally, various "take home" play effects can also be provided for the purpose of allowing play participants to continue the magical experience (and practice their skills) at home.

In one preferred embodiment, a user 430 would preferably point and/or wave the wand 100 in accordance with one or more specific learned motions or "spells" selected to achieve a desired effect on one or more selected objects. For example, as illustrated in FIG. 31B, one spell may cause rabbit 452 to talk; another spell may cause hat 454 to magically sprout flowers 464; another spell may cause book 458 to open with a frog 466 jumping out; another spell may cause an image of a wizard 468 to magically appear (with optional sound and lighting effects) within crystal ball 456; another spell may cause candle 462 to magically light itself with a pop-up flame 470. Most preferably, wand 100 contains internal activation circuitry, such as described herein, such that the wand may be activated by the motion induced thereon by user 430 and so that actuation and control of the special effect appears to be, and has the feeling to users 430 of being, created by "real" magic. To provide added mystery and fun, certain effects 400 may be hidden such that they must be discovered by play participants. If desired, various clues can be provided such as, for example, part of a magical mystery game.

In each of the play effects described above, it is possible, and in many cases desirable, to provide additional control interlocks so that multiple input signals are required to actuate a given desired effect. For example, a proximity sensor may be provided associated with a given effect and electronically interlocked with the effect controller such that the effect cannot be operated if the proximity sensor is not also actuated. This could help reduce inadvertent or random actuation of the various effects. Similarly, voice activated controls and voice recognition software could also be implemented and interlocked with the effect controller so that, for example, a user 430 would need to say a particular "magic" word or phrase while waving the magic wand 100 in order to actuate a desired effect.

As mentioned, the proximity sensor may be used to provide a "hover" effect that is indicative of the initialization of a control interlock. For example, when a proximity sensor in the wand 100 is moved within a particular distance of a receiver and/or effects controller, a "hover" effect occurs, such as, for example, the turning on of a light, the movement or vibration of an object, or any other perceptible signal (visual or audible) that notifies the user that a play effect may be initiated. This "hover" effect may notify the user that a spell may be cast so as to cause one or more effects.

In other embodiments, an RFID reader is preferably interlocked with one or more effects controllers in order to provide more precise control of various effects and also improved tracking of game progress, points, or the like. For example, one or more objects or targets 452, 454, 456, 458, 462 can be selected at close range using an RFID transponder and associated RFID reader. Once all such desired objects have been selected, the long range RF capabilities of the wand 100 can be used to control all of the selected objects/effect simultaneously. Those skilled in the art will readily appreciate from the disclosure herein that similar functionality can be easily provided with various magnetic reed switches and the like provided in association with each object or target. If desired, various pop-up targets 462 and the like may be arranged in a shooting gallery 460 whereby a user 430 can practice aiming the wand 100 and casting various spells at one or more desired targets 462. In this case the wand 100 preferably is adapted to send directional signals, such as infrared or laser, instead of or in addition to RF signals as described herein.

FIGS. 32A-D illustrate one preferred embodiment of a wand-actuated game 500 having unique features and benefits in accordance with the present invention. The game 500 basically comprises a 3×7 grid of lighted squares (including optional visual graphics and/or sound effects) that are controlled by a game effects controller (not shown) and one or more RF receivers (not shown). Those skilled in the art will readily appreciate and understand from the disclosure herein how to set up and program a game controller and/or one or more RF receivers as disclosed and described herein so as to achieve the game functionality and various effects as will be described herein below. Preferably, one RF receiver (or IR receiver, RFID receiver, or the like) is provided for each play participant 430 so that command signals from each player can be distinguished. For example, multiple RF receivers may be directionally focused or range-adjusted so as to receive RF command signals only from a selected corresponding player 430*a* or 430*b*.

Individual squares within a defined playing field 504 are preferably lit or dimmed in a timed sequence in response to one or more predetermined RF command signals ("spells") received from one or more RF-enabled wands 100. Preferably, special 3×1 arrays of squares 510*a*, 510*b* (labeled 1-2-3) are provided at opposite ends of a playing field 504 and are adapted to respond to a signal imposed by, for example, the presence, proximity or weight of play participants 430*a*,

430*b*, as they stand on each square. These special squares may be raised or otherwise differentiated, as desired, to indicate their special function within the game 500. Actuating individual squares within arrays 510*a* and 510*b* (e.g., by stepping or standing on them) allows play participants 430*a*, 430*b* to select a corresponding column of squares in the playing field 504 in which they may desire to launch an attack, counterattack or defense using various learned spells or incantations. Spells may be actuated, for example, by waving wand 100 in one or more particular learned motions selected to produce a desired play effect or spell. An infinite variety of such spells are possible as described above.

Preferably, when a spell is successfully cast by a player 430*a* or 430*b*, the first square immediately in front of the player lights up or is otherwise controlled to produce a special effect indicating that a spell has been cast. Other squares in the same column are then preferably lit in a timed sequence or progression moving toward the opposing player (see, e.g., FIGS. 32B and 32C). Most preferably, the lighting effects for each square and/or other associated special effects are controlled or varied in a way to indicate the type of spell cast (e.g., a fire ball spell, ice spell, transforming spell, or the like). For example, various colors or patterns of lights may be used to indicate each spell. Alternatively, various graphic images and/or associated sound effects may be used to indicate each spell. These may be displayed, for example, on an overhead TV or associated computer monitor (not shown).

Figure 32A:
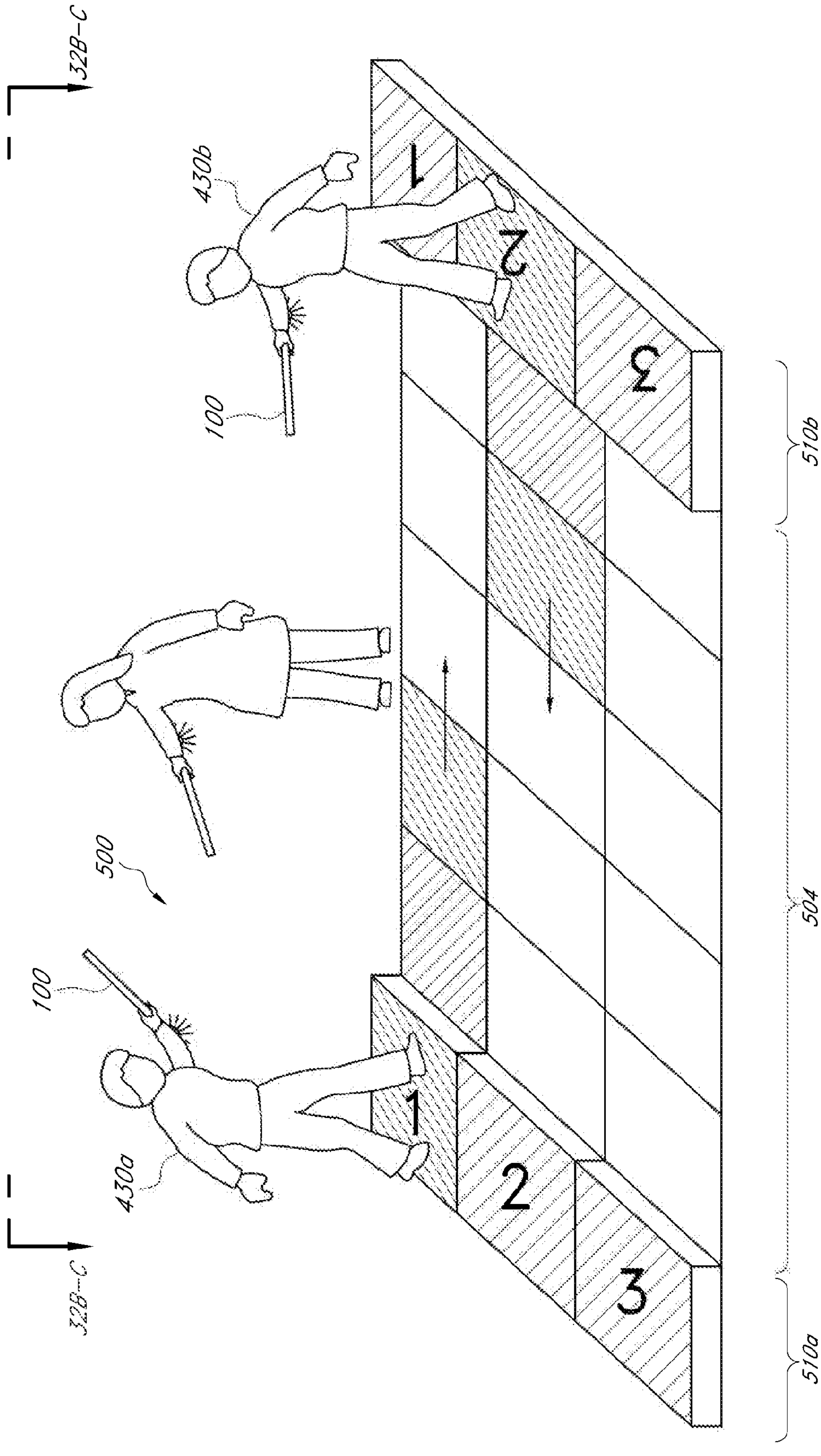
FIG. 32A is a perspective illustration of one preferred embodiment of a wand-actuated game comprising a grid of lighted squares that are controlled at least in part by one or more RF receivers and/or magnetic reed switches having features and advantages in accordance with the present invention.
Figure 32B:
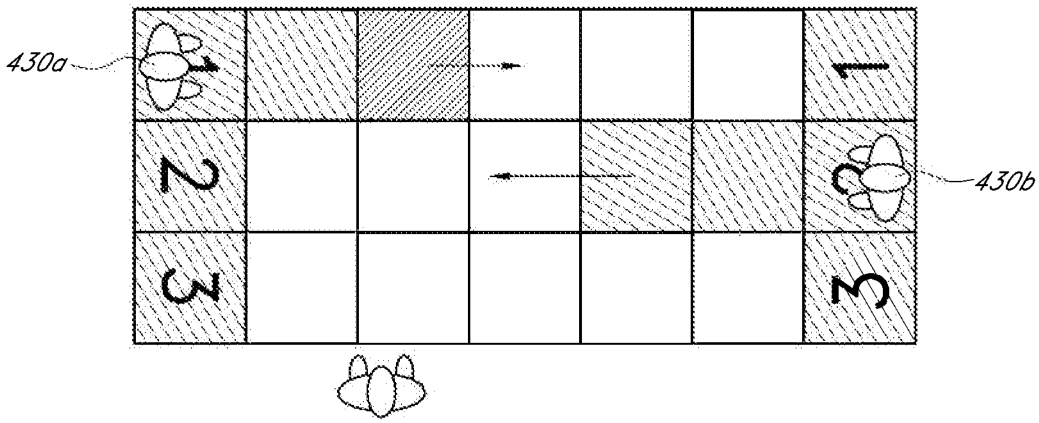
FIGS. 32B-32D are time-sequenced top plan views of the wand-actuated game of FIG. 32A, illustrating the preferred operation thereof and having features and advantages in accordance with the present invention.
Figure 32C:
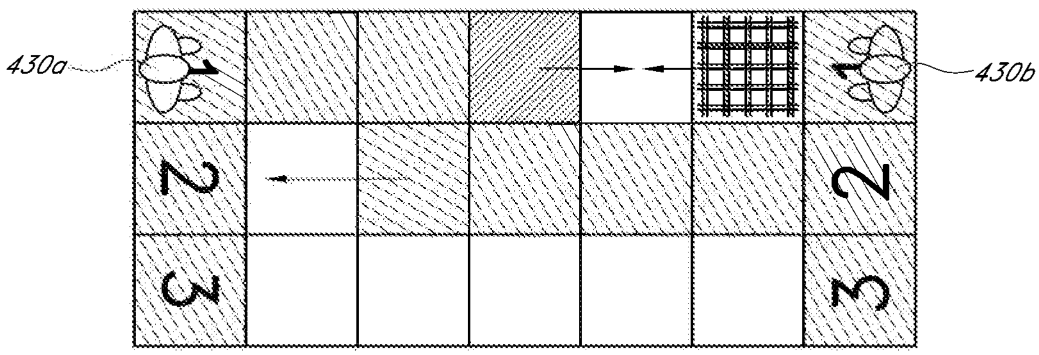
Figure 32D:
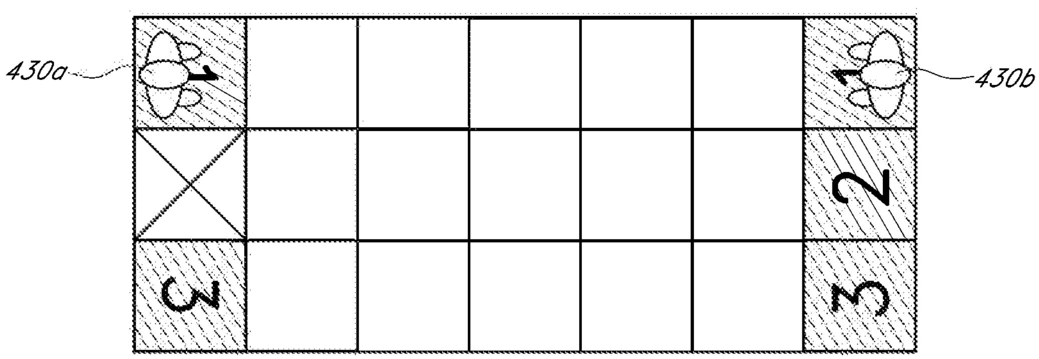
Figure 33A:
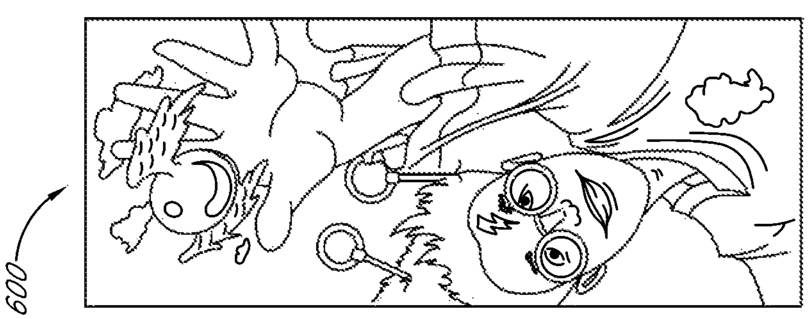
FIGS. 33A-33D are front views of various role-play character cards for use within an interactive play structure.
Figure 33B:
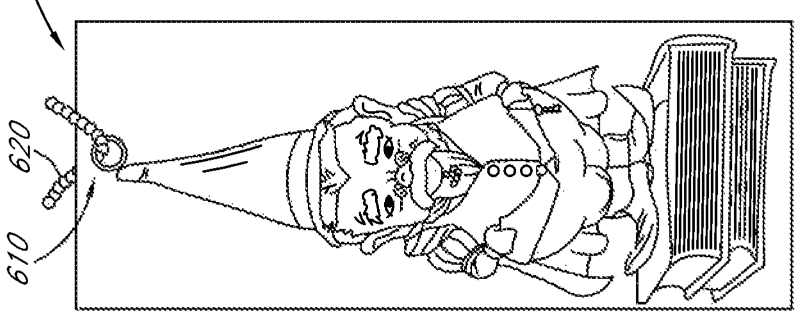
Figure 33C:
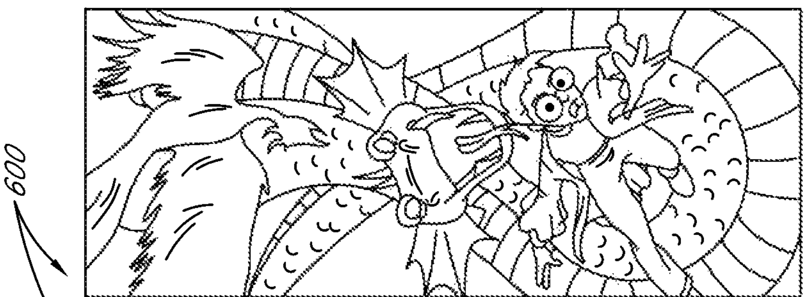
Figure 33D:
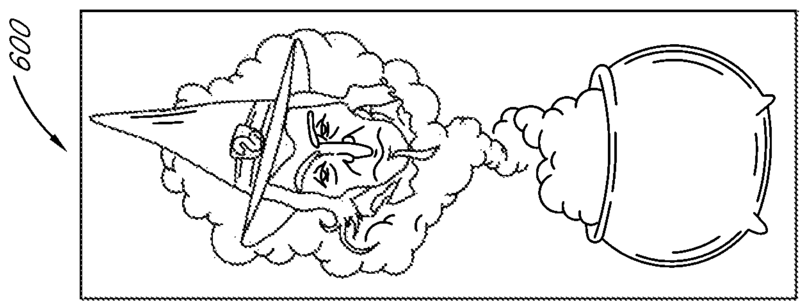

When an opposing player perceives that a spell has been cast and is moving toward him, that player (e.g., player 430*b* in FIG. 32B) attempts to quickly identify the type of spell and to cast in the same column a counter-measure or "blocking spell" in an attempt to neutralize or block the advancing spell (see, e.g., FIG. 32C). The blocking spell may be cast, for example, using the same particular wand motion or series of wand motions used to cast the "forward spell", except with a "block" command added. Thus, a blocking spell is launched toward the advancing spell, as indicated by a progression of lighted squares and/or other effects controlled in a similar fashion as described above. If the blocking spell is effective (i.e., properly selected and executed), then the advancing spell is neutralized and the lighted column of squares is cleared (see, e.g., FIGS. 32C and 32D). If the blocking spell is ineffective, then the advancing spell continues until it reaches the end of the column. Preferably, whenever a spell reaches the opposing side, points and/or other gaming advancements are awarded to the successful player. These may vary, for example, depending upon the difficulty level of the spell, the experience level of the opposing player, and the like. In one particularly preferred embodiment, successful players are rewarded (and unsuccessful players are punished) by allowing certain spells to "capture" or disable the opposing player's special square in each corresponding column (see, e.g., FIG. 32D). Once all of a player's special squares 510*a*, 510*b* have been captured or disabled the game is ended.

Preferably, the speed of game play progresses and becomes faster and faster as game play continues (e.g., spells move faster). In this manner, the game 500 continually challenges game participants to improve their reaction speed and spell accuracy. The game also encourages players to learn and master more difficult or complex spells, as these will typically be harder and take longer for an opponent to successfully block. Certain additional spells or advanced commands may also be provided for speeding up a spell or slowing down an advancing spell. An infinite variety and possibility of other spells and game play nuances are possible and desirable in accordance with the fundamental aspects of the invention disclosed and described herein.

Those skilled in the art will also recognize from the disclosure herein that the game 500 is not limited to use with RF-enabled input devices, such as wands, cards, tokens and the like, as described herein. Alternatively, the game 500 may be readily adapted and used with a wide variety of other input devices, including, without limitation, RFID tracking, magnetic actuators, joysticks, push-buttons, computer mouse or keypad, foot pedals, motion sensors, virtual-reality gloves and the like, proximity sensors, weight sensors, or the like. Similarly, the game 500 is not limited to use with a magic theme, but may be implemented in a wide variety of other suitable themes such as, without limitation, war games, martial arts, "shoot-out" games, alien invasion, memory games, board games, educational games, trivia games, strategy games, and the like. It is also specifically contemplated that the game 500 may be expanded or modified to accommodate 3 or more players. For example, a six-sided game field accommodating up to six different players may easily be implemented using a similar playing field made up of hexagonal "squares".

Master System

In addition, a skilled artisan will recognize from the disclosure herein that the foregoing competitive games and/or play effects may use a central or master system to coordinate, control, and/or monitor the status of the games or effects in a particular area. For example, a central database may be used to monitor the skill levels of all those who are participating in the competitive game in a particular location. In other embodiments, the central system may comprise a centralized computer network that monitors the operation of each wand 100 (e.g., the play effects caused by operation of the wand) within a particular area. In yet other embodiments, the wands 100 may automatically download information from the central system.

If a master system is utilized, preferably each wand 100 and/or RFID card 325 is configured to electronically send and receive information to and from various receivers or transceivers 300 distributed throughout a play environment using a send receive radio frequency ("SRRF") communication protocol. This communications protocol provides the basic foundation for a complex, interactive entertainment system which creates a seemingly magic interactive play experience for play participants who possess and learn to use the magic wand. In its most refined embodiments, a user may electronically send and receive information to and from other wands and/or to and from a master control system located within and/or associated with any of a number of play environments, such as a family entertainment facility, restaurant play structure, television/video/radio programs, computer software program, game console, web site, etc. This newly created network of SRRF-compatible play and entertainment environments provides a complex, interactive play and entertainment system that creates a seamless magical interactive play experience that transcends conventional physical and temporal boundaries.

SRRF may generally be described as an RF-based communications technology and protocol that allows pertinent information and messages to be sent and received to and from two or more SRRF compatible devices or systems. While the specific embodiments described herein are specific to RF-based communication systems, those skilled in the art will readily appreciate that the broader interactive play concepts taught herein may be realized using any number of commercially available 2-way and/or 1-way medium range wireless communication devices and communication protocols such as, without limitation, infrared-, digital-, analog, AM/FM-, laser-, visual-, audio-, and/or ultrasonic-based systems, as desired or expedient.

The SRRF system can preferably send and receive signals (up to 40 feet) between tokens and fixed transceivers. The system is preferably able to associate a token with a particular zone as defined by a token activation area approximately 10-15 feet in diameter. Different transceiver and antenna configurations can be utilized depending on the SRRF requirements for each play station. The SRRF facility tokens and transceivers are networked throughout a play environment. These devices can be hidden in or integrated into the environmental infrastructure, such as walls, floors, ceilings and play station equipment. Therefore, the size and packaging of these transceivers is not particularly critical.

In a preferred embodiment, an entire entertainment facility may be configured with SRRF technology to provide a master control system for an interactive entertainment play environment using SRRF-compatible magic wands and/or tracking devices. A typical entertainment facility provided with SRRF technology may allow 300-400 or more users to more-or-less simultaneously send and receive electronic transmissions to and from the master control system using a magic wand or other SRRF-compatible tracking device.

In particular, the SRRF system uses a software program and data-base that can track the locations and activities of up to a hundred or more users. This information is then used to adjust the play experience for each user based on "knowing" where the user/player has been, what objectives that player has accomplished and how many points or levels have been reached. The system can then send messages to the user throughout the play experience. For example, the system can allow or deny access to a user into a new play area based on how many points or levels have been reached by that user and/or based on what objectives that user has accomplished or helped accomplish. It can also indicate, via sending a message to the user the amount of points or specific play objectives necessary to complete a "mission" or enter the next level of play. The master control system can also send messages to the user from other users.

The system is preferably sophisticated enough that it can allow multiple users to interact with each other adjusting the game instantly. The master system can also preferably interface with digital imaging and/or video capture so that the users activities can be visually tracked. Any user can locate another user either through the video capturing system or by sending a message to another device. At the end of a visit, users are informed of their activities and the system interfaces with printout capabilities. The SRRF system is preferably capable of sending and receiving signals up to 100 feet. Transmitter devices can also be hidden in walls or other structures in order to provide additional interactivity and excitement for play participants.

Suitable embodiments of the SRRF technology described above may be obtained from a number of suitable sources, such as AXCESS, Inc. and, in particular, the AXCESS active RFID network system for asset and people tacking applications. In another preferred embodiment the system comprises a network of transceivers 300 installed at specific points throughout a facility. Players are outfitted or provided with a reusable "token"-a standard AXCESS personnel tag clipped to their clothing in the upper chest area. As each player enters a specific interactive play area or "game zone" within the facility, the player's token receives a low frequency activation signal containing a zone identification number (ZID). The token then responds to this signal by transmitting both its unique token identification number (TID) along with the ZID, thus identifying and associating the player with a particular zone.

The token's transmitted signal is received by a transceiver 300 attached to a data network built into the facility. Using the data network, the transceiver forwards the TID/ZID data to a host computer system. The host system uses the SRRF information to log/track the guest's progress through the facility while interfacing with other interactive systems within the venue. For example, upon receipt of a TID/ZID message received from Zone 1, the host system may trigger a digital camera focused on that area, thus capturing a digital image of the player which can now be associated with both their TID and the ZID at a specific time. In this manner the SRRF technology allows the master control system to uniquely identify and track people as they interact with various games and activities in a semi-controlled play environment. Optionally, the system may be configured for two-way messaging to enable more complex interactive gaming concepts.

In another embodiment, the SRRF technology can be used in the home. For enabling magic at the home, a small SRRF module is preferably incorporated into one or more portable toys or objects that may be as small as a beeper. The SRRF module supports two-way communications with a small home transceiver, as well as with other SRRF objects. For example, a magic wand 100 can communicate with another magic wand 100.

The toy or object may also include the ability to produce light, vibration or other sound effects based on signals received through the SRRF module to complement the operation of the wand and/or the effects achieved. In a more advanced implementation, the magical object may be configured such that it is able to display preprogrammed messages of up to 50 characters or more on a LCD screen when triggered by user action (e.g. button) or via signals received through the SRRF module. This device is also preferably capable of displaying short text messages transmitted over the SRRF wireless link from another SRRF-compatible device. For example, FIG. 19G shows a toy wand 100 having an LCD screen 113 for displaying short text messages.

Preferably, the SRRF transceiver 300 is capable of supporting medium-to-long range (10-40 feet) two-way communications between SRRF objects and a host system, such as a PC running SRRF-compatible software. This transceiver 300 has an integral antenna and interfaces to the host computer through a dedicated communication port using industry standard RS232 serial communications. It is also desirable that the SRRF transmission method be flexible such that it can be embedded in television or radio signals, videotapes, DVDs, video games and other programs media, stripped out and re-transmitted using low cost components. The exact method for transposing these signals, as well as the explicit interface between the home transceiver and common consumer electronics (i.e. TVs, radios, VCRs, DVD players, A/V receivers, etc.) is not particularly important, so long as the basic functionality as described above is achieved. The various components needed to assemble such an SRRF system suitable for use with the present invention are commercially available and their assembly to achieve the desired functionality described above can be readily determined by persons of ordinary skill in the art. If desired, each SRRF transceiver may also incorporate a global positioning ("GPS") device to track the exact location of each play participant within one or more play environments.

Most desirably, a SRRF module can be provided in "chip" form to be incorporated with other electronics, or designed as a packaged module suitable for the consumer market. If desired, the antenna can be embedded in the module, or integrated into the toy and attached to the module. Different modules and antennas may be required depending on the function, intelligence and interfaces required for different devices. A consumer grade rechargeable or user replaceable battery may also be used to power both the SRRF module and associated toy electronics.

Interactive Game Play

Embodiments of the present invention may be carried out using a wide variety of suitable game play environments, storylines and characters, as will be readily apparent to those skilled in the art. The following specific game play examples are provided for purposes of illustration and for better understanding of the invention and should not be taken as limiting the invention in any way:

EXAMPLE 1

An overall interactive gaming experience and entertainment system is provided (called the "Magic" experience), which tells a fantastic story that engages children and families in a never-ending adventure based on a mysterious treasure box filled with magical objects. Through a number of entertainment venues such as entertainment facilities, computer games, television, publications, web sites, and the like, children learn about and/or are trained to use these magical objects to become powerful "wizards" within one or more defined "Magic" play environments. The play environments may be physically represented, such as via an actual existing play structure or family entertainment center, and/or it may be visually/aurally represented via computer animation, television radio and/or other entertainment venue or source.

The magical objects use the SRRF communications system allowing for messages and information to be received and sent to and from any other object or system. Optionally, these may be programmed and linked to the master SRRF system. Most preferably, the "magic wand" 100 is configured to receive messages from any computer software, game console, web site, and entertainment facility, television program that carries the SRRF system. In addition, the magic wand can also preferably send messages to any SRRF compatible system thus allowing for the "wand" to be tracked and used within each play environment where the wand is presented. The toy or wand 100 also preferably enables the user to interact with either a Master system located within a Magic entertainment facility and/or a home-based system using common consumer electronic devices such as a personal computer, VCR or video game system.

The master control system for a Magic entertainment facility generally comprises: (1) a "token" (gag, toy, wand 100 or other device) carried by the user 430, (2) a plurality of receivers or transceivers 300 installed throughout the facility, (3) a standard LAN communications system (optional), and (4) a master computer system interfaced to the transceiver network (optional). If a Master computer system is used, preferably the software program running on the Master computer is capable of tracking the total experience for hundreds of users substantially in real time. The information is used to adjust the play for each user based on knowing the age of the user, where the user has played or is playing, points accumulated, levels reached and specific objectives accomplished. Based on real-time information obtained from the network, the system can also send messages to the user as they interact throughout the Magic experience.

The Master system can quickly authorize user access to a new play station area or "zone" based on points or levels reached. It can also preferably indicate, via sending a message to the user, the points needed or play activities necessary to complete a "mission." The Master system can also send messages to the user from other users. The system is preferably sophisticated enough to allow multiple users to interact with each other while enjoying the game in real-time.

Optionally, the Master system can interface with digital imaging and video capture so that the users' activities can be visually tracked. Any user can then locate another user either through the video capturing system or by sending a message to another device. At the end of a visit, users are informed of their activities and other attributes related to the Magic experience via display or printout.

For relatively simple interactive games, the Master system may be omitted in order to save costs. In that case, any game-related information required to be shared with other receivers or transceivers may be communicated via an RS-232 hub network, Ethernet, or wireless network, or such information may be stored on the wand itself and/or an associated RFID card or badge carried by the play participant. For retrofit applications, it is strongly preferred to provide substantially all stand-alone receivers or transceivers that do not communicate to a master system or network. This is to avoid the expense of re-wiring existing infrastructure. For these applications, any information required to be shared by the game system is preferably stored on the wand or other RFID device(s) carried by the play participants. Alternatively, if a more complex game experience is demanded, any number of commercially available wireless networks may be provided without requiring rewiring of existing infrastructure.

EXAMPLE 2

A computer adventure game is provided in which one or more play participants assume the role of an imaginary character "Pajama Sam" from the popular series of computer games published by Humongous Entertainment, Inc. of Woodinville, Wash. A Pajama Sam adventure character card 700, such as illustrated in FIGS. 34A, 34B, is provided to each play participant. The card may be packaged and sold together with the game software, and/or it may be sold separately, as convenience and market demands dictate.

The card 700 may be constructed substantially the same as the cards 325, 600 illustrated and described above in connection with FIGS. 20C-D and 33, except with different character illustrations and/or graphics. For example, each card 700 may include a different character from the Pajama Sam computer game series representing a role-play character desired to be imagined by a play participant. The obverse side (FIG. 34B) includes an RFID tag 720, such as illustrated and described above in connection with FIG. 20D. Preferably, the tag 720 is covered with an adhesive paper label 725. Alternatively, the tag 720 may be molded directly into a plastic sheet substrate from which the card 700 is then formed. Alternatively, a magnetic "swipe" strip and/or other well-known information storage means may be used with efficacy, so long as it is relatively compact, durable and inexpensive.

The particular size, shape and theme of the card 700 is relatively unimportant. In the particular embodiment illustrated, the card 700 is shaped and themed similar to a baseball trading card so that they may be collected and stored conveniently in any baseball card album or the like. If desired, a hole or eyelet (not shown) may be provided at the top of the card 700 so as to facilitate wearing the card 700 as a pendant on a necklace or as key-chain trinket. Of course, smaller, pocket-sized cards and/or other similar RFID or magnetic transponder devices may also be used where convenience and market demand dictates. Such alternative suitable transponder devices are commercially available, such as from Texas Instruments, Inc. (http://www.tiris.com, e.g., Prod. Nos. RI-TRP-W9WK, RI-TRP-R9QL, RI-TRP-WFOB).

A specially configured computer, video game, home game console, hand-held gaming device or similar gaming device is provided with a reader, and more preferably a reader/writer such as described above, that is able to communicate with the tag 720 or other information storage means associated with the card 700. As each play participant plays his or her favorite Pajama Sam game the Pajama Sam character represented by the card 700 gains (or loses) certain attributes, such as speed, dexterity, and/or the possession of certain tools or objects associated with the game play. All of this information is preferably stored on the card 700 so that the character attributes may be easily and conveniently transported to other similarly-equipped computer games, video games, home game consoles, hand-held game units, play facilities, and the like. In this manner, an imaginary role-play character is created and stored on a card that is able to seamlessly transcend from one play medium to the next.

For example, in the course of playing a typical Pajama Sam game, players must "find" certain objects or tools that they will use to solve certain puzzles or tasks presented by the game. Players "pick up" these objects or tools by clicking their mouse on the desired object. The computer game software then keeps a record of which objects have been collected and displays those objects on the computer screen when requested by the player. This is illustrated by FIG. 35A, which is a screen shot from the computer game, "Pajama Sam, in No Need to Hide When Its Dark Outside," published by Humongous Entertainment., Inc. © 1996. The game begins in Pajama Sam's bedroom, and the player is asked to find and click on certain objects 810 that Pajama Sam needs to begin his adventure—namely his flashlight, PajamaMan lunch box and PajamaMan mask. As these objects are located and collected, they are displayed on the bottom of the computer screen, as illustrated in FIG. 35A.

Figure 35B:
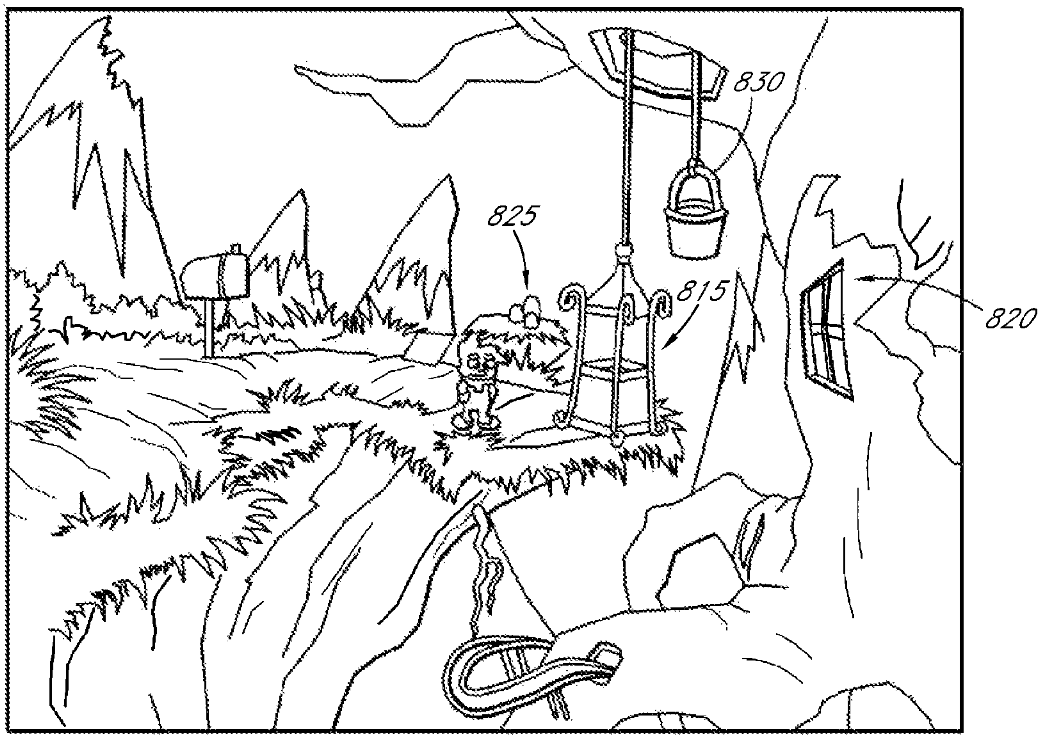
Figure 35C:
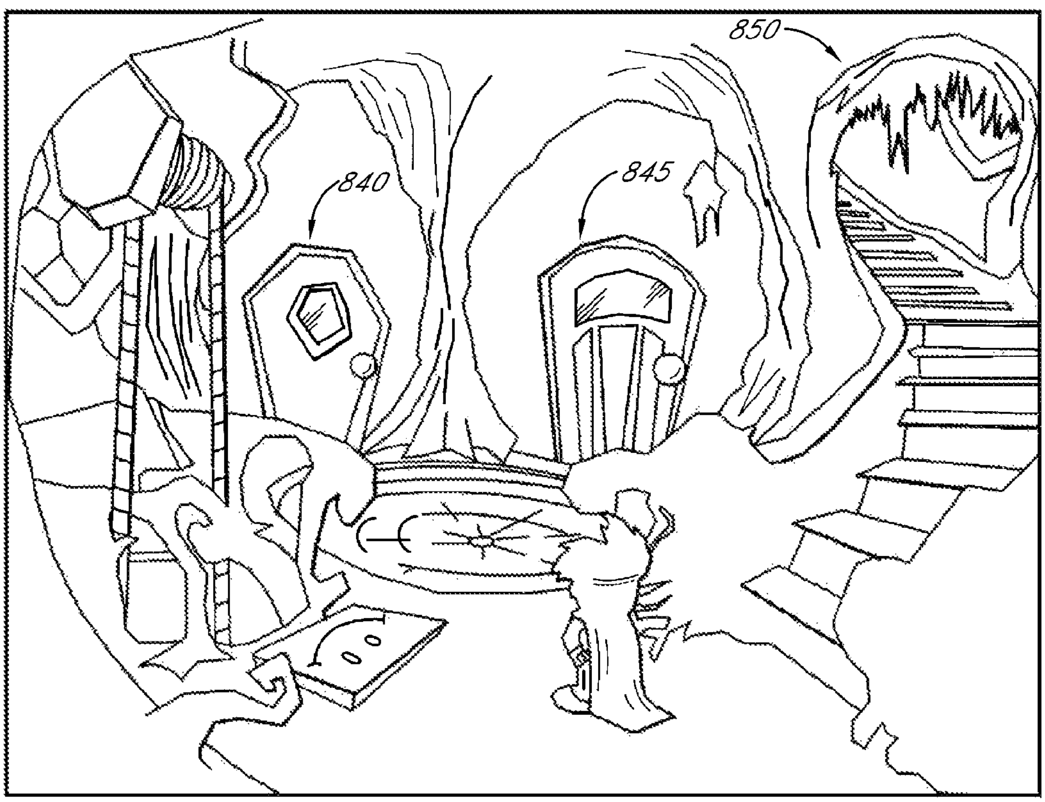
Figure 35D:
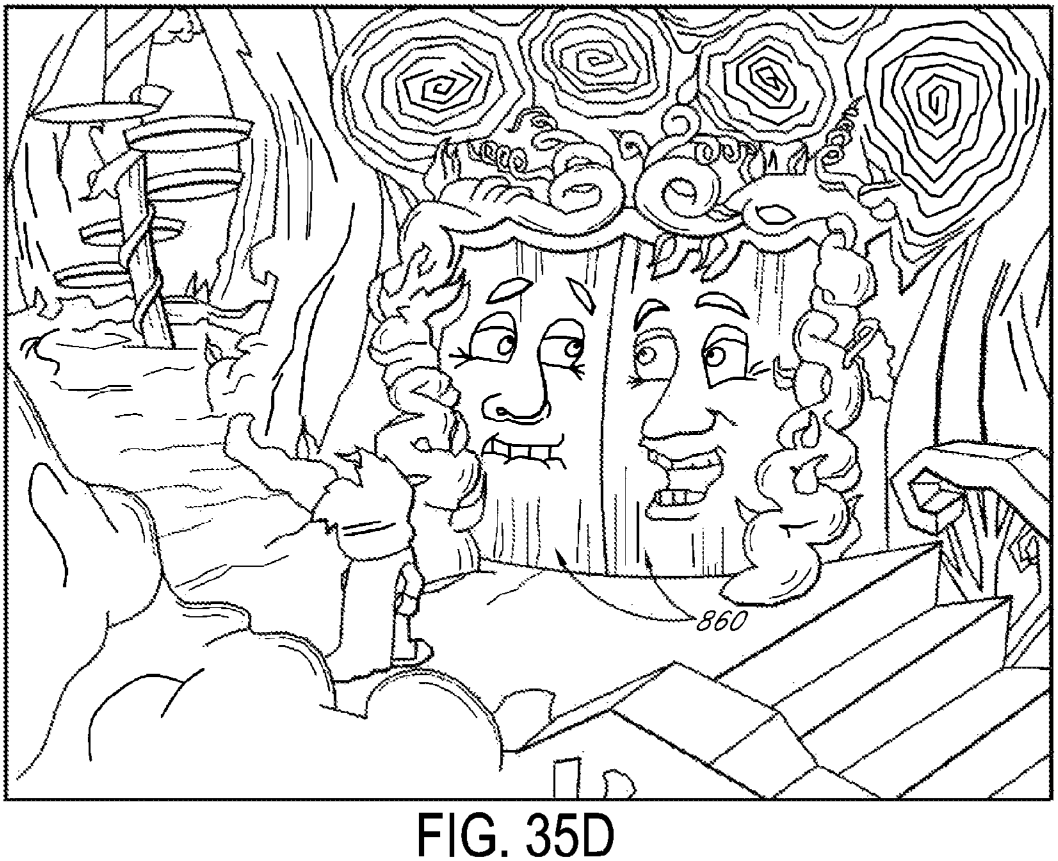
Figure 35E:
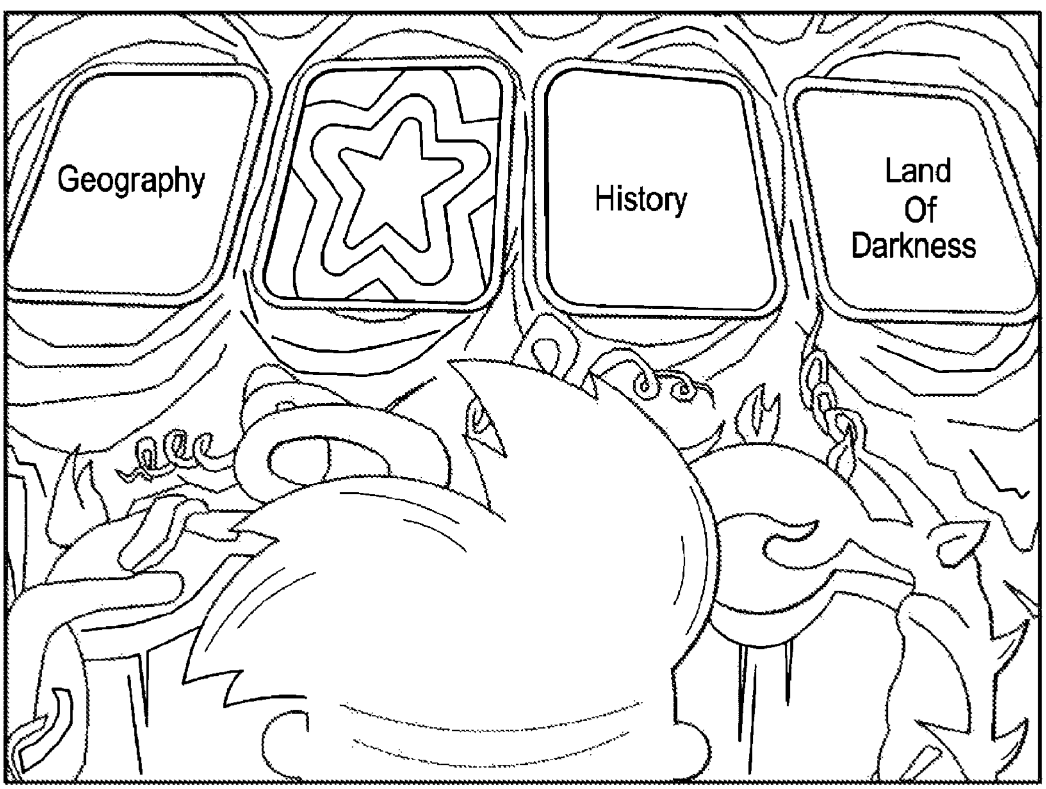
Figure 35F:
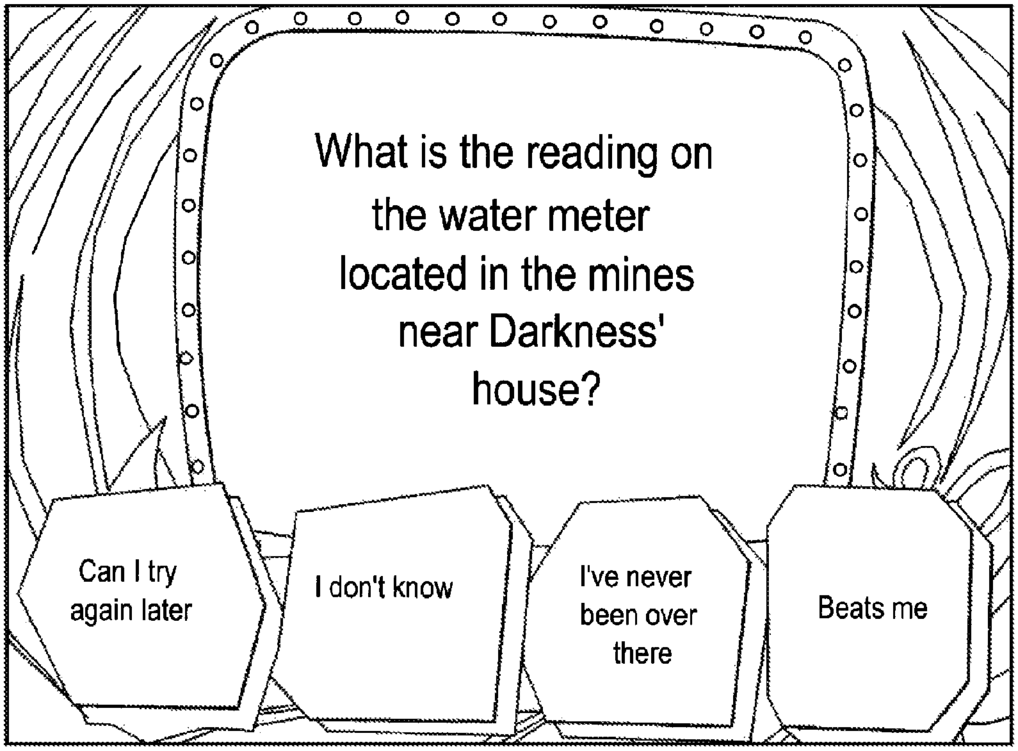
Figure 35G:
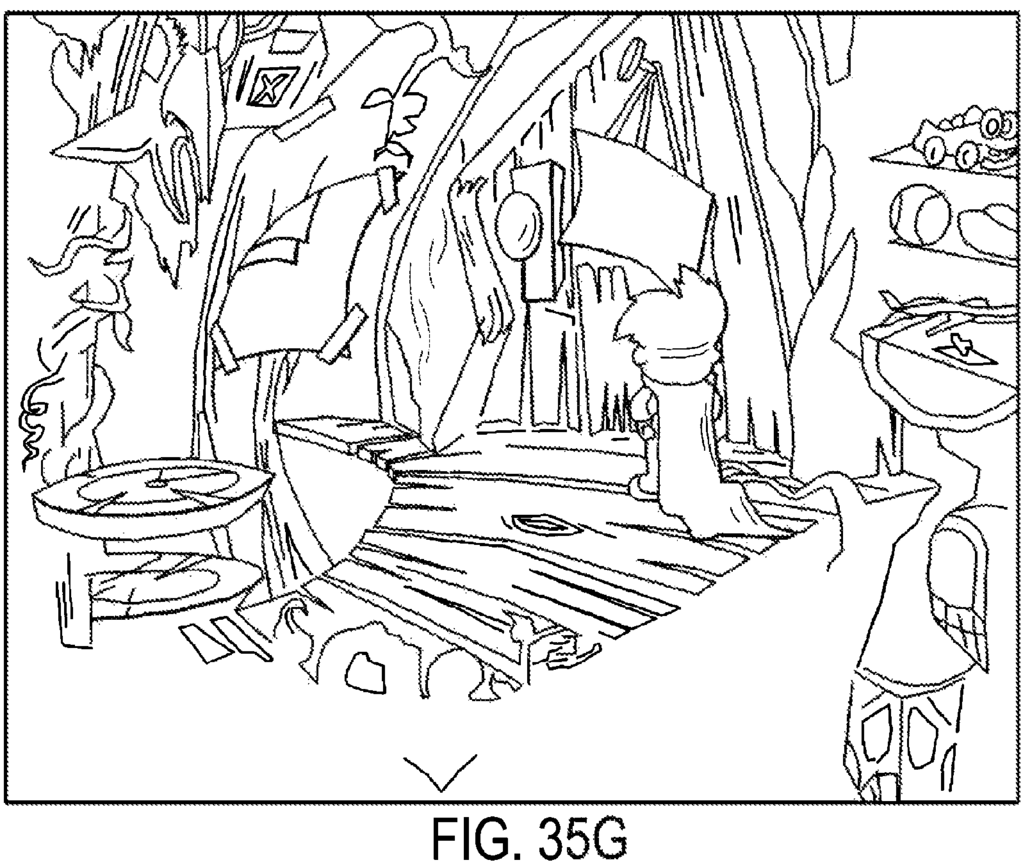

FIG. 35B is a screen shot from the same game where the player faces his first challenge or puzzle to solve. He or she must somehow make Pajama Sam operate the elevator 815 to take Pajama Sam up into the tree house 820 where his arch-enemy "Darkness" resides. To solve the puzzle the player explores the scene with his mouse and clicks on objects that might be useful to solve the puzzle. Eventually, the player will discover a pile of rocks 825 which Pajama Sam picks up and tosses into the basket 830 to operate the elevator. In the next scene (FIG. 35E) Pajama Sam is inside the tree house and the player must decide which of three possible paths to take representing doors 840, 845 and 850. Doorway 850 leads to the scene illustrated in FIG. 35D in which Pajama Sam (and the player) is challenged to a trivia game by a pair of talking doors. The player chooses from different categories of questions and attempts to choose correct answers from a multiple choice list provided by the game (see FIG. 35E). Ultimately, the player is challenged with a question specific to the game (see FIG. 35F) and which requires the player to have visited a particular location within the game where the information is contained. If the player has not completed that portion of the computer game, he or she cannot answer the question posed and Pajama Sam cannot advance in the adventure game (see FIG. 35G).

If the player were to quit the game at this point, he or she could save the game on the host computer and return to the same computer later to complete the adventure. But the Pajama Sam character itself, its attributes, experiences and accomplishments are not portable and cannot presently be transferred from one game or gaming environment to another. However, the Pajama Sam adventure card 700 in accordance with the present invention enables a play participant to continue the adventure somewhere else (e.g. at a friend's house, or a video arcade facility) without having to restart the game and repeat the steps that the player has already accomplished. With the Pajama Sam adventure card 700, relevant details of the game experience and the Pajama Sam character are stored on the card 700 so that the player can take the card to another computer, game console, hand-held game device or a designated Pajama Sam play facility, to continue the adventure in a new and exciting play environment.

For example, the Pajama Sam play facility could be configured as a physical play space having theming and game play that parallels that of one or more of the Pajama Same computer adventure games. Now our computer game player who has a Pajama Sam adventure card 700 can visit this play facility and the facility would be able to read the information on the card and determine that this particular player has already completed the first puzzle in the first Pajama Sam computer adventure game. If the player desires, he or she will be allowed to advance automatically in the game play within the Pajama Sam play facility so that the player can work on a new puzzle. If the player successfully solves a new puzzle at the play facility, this information will be recorded on the Pajama Sam adventure card 700. The next time he or she plays the computer game the card can be automatically read and the computer experience can be modified or updated in accordance with the new information recorded on the card. In this manner, the character role-play experience becomes portable, personal and long-term. This, in turn, facilitates the development of even more sophisticated and complex role-play characters and longer, more enjoyable role play experiences as players are able to continue playing with and developing the same role-play character(s) over long periods of time and in different and varied play environments.

Similarly, various other video games, home game consoles, and/or hand-held game units can be and preferably are configured to communicate with the Pajama Sam adventure card 700 in a similar manner as described above and/or using other well-known information storage and communication techniques. In this manner, a play participant can use the Pajama Sam adventure card 700 and the role play character he or she has developed with specific associated attributes in a favorite video action game, role-play computer game, internet adventure game or the like.

EXAMPLE 3

A trading card game is provided wherein a plurality of cards depicting various real or imaginary persons, characters and/or objects are provided and wherein each card has recorded or stored thereon in an electronically readable format certain selected information pertaining to the particular person, character or object, such as performance statistics, traits/powers, or special abilities. The information is preferably stored on an RFID tracking tag associated with each card and which can be read electronically and wirelessly over a predetermined range preferably greater than about 1 cm when placed in the proximity of a suitably configured RF reader. Optionally, the RFID tag may be read/write capable such that the information stored thereon may be changed or updated in any manner desired. Alternatively, a magnetic strip, bar code or similar information storage means may be used to store relevant information on the card.

Figure 36A:
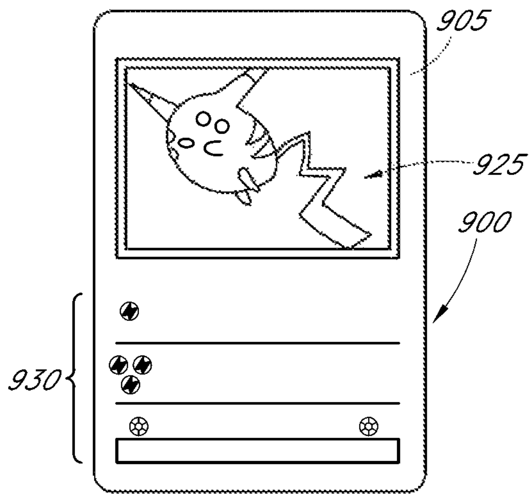
FIGS. 36A and 36B are front and rear views, respectively, of a trading or playing card having features and advantages in accordance with the present invention.
Figure 36B:
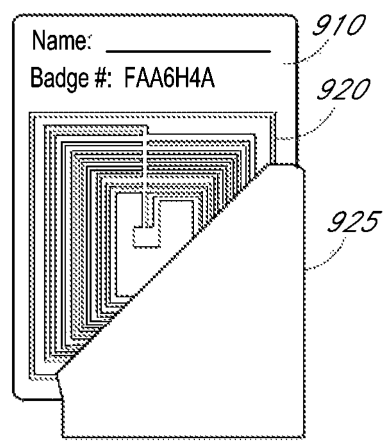
Figure 36C:
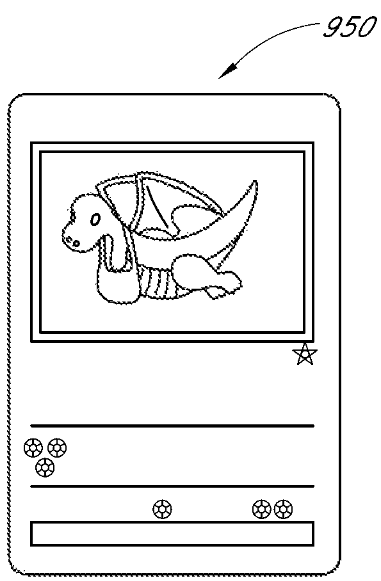
FIGS. 36C and 36D are front views of several alternative embodiments of trading or playing cards having features and advantages in accordance with the present invention.
Figure 36D:
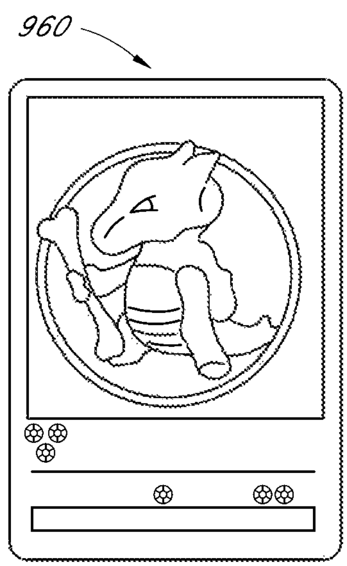

FIGS. 36A and 36B depict one preferred embodiment of a trading card 900 having features and advantages in accordance with the present invention. The particular trading card illustrated in FIG. 36A is provided in the theme of the popular Pokemon characters and, in particular, the character Pikachu. FIGS. 36C and 36D illustrate several other possible Pokemon themed trading cards which may be provided in accordance with the present invention. Each card preferably comprises a paper, cardboard or plastic substrate having a front side 905 and a back side 910. The front 905 of the card 900 may be imprinted with graphics, photos, or any other information as desired. In the particular embodiment illustrated, the front 905 contains an image of the Pikachu character 925 in keeping with the Pokemon theme. In addition, the front 905 of the card 900 may include any number of other designs or information 930 pertinent to its application. For example, the character's type, size and evolution may be indicated, along with any special powers or traits the character may possess.

The obverse side 910 of the card 900 preferably contains the card electronics comprising a radio frequency tag 920 pre-programmed with the pertinent information for the particular person, character or object portrayed on the front of the card. The tag 920 generally comprises a spiral wound antenna 950, a radio frequency transmitter chip 960 and various electrical leads and terminals 970 connecting the chip 960 to the antenna. If desired, the tag 920 may be covered with an adhesive paper label (not shown) or, alternatively, the tag may be molded directly into a plastic sheet substrate from which the card 900 is formed.

Preferably, the tag 920 is passive (requires no batteries) so that it is inexpensive to purchase and maintain. Such tags and various associated readers and other accessories are commercially available in a wide variety of configurations, sizes and read ranges. RFID tags having a read range of between about 10 cm to about 100 cm are particularly preferred, although shorter or longer read ranges may also be acceptable. The particular tag illustrated is the 13.56 MHz tag sold under the brand name Tag-it™ available from Texas Instruments, Inc. (http://www.tiris.com, Product No. RI-I03-110A). The tag 920 has a useful read/write range of about 25 cm and contains 256-bits of on-board memory arranged in 8×32-bit blocks which may be programmed (written) and read by a suitably configured read/write device. If a longer read/write range and/or more memory is desired, optional battery-powered tags may be used instead, such as available from AXCESS, Inc. and/or various other vendors known to those skilled in the art.

Cards 900 may be collected or traded and/or they may be used to play various games, such as a Pokemon arena competition using an electronic interface capable of reading the card information. Such games may be carried out using a specially configured gaming device or, alternatively, using a conventional computer gaming platform, home game console, arcade game console, hand-held game device, internet gaming device or other gaming device that has been modified to include an RF reader or magnetic "swipe" reader device as illustrated and described above. Advantageously, play participants can use the trading cards 900 to transport information pertinent to a particular depicted person, character or object to a favorite computer action game, adventure game, interactive play structure or the like. For example, a suitably configured video game console and video game may be provided which reads the card information and recreates the appearance and/or traits of the particular depicted person, character or object within the game. If desired, the game console may further be configured to write information to the card in order to change or update certain characteristics or traits of the character, person or object depicted by the card 900 in accordance with a predetermined game play progression.

Of course, those skilled in the art will readily appreciate that the underlying concept of an RFID trading card 900 and card game is not limited to cards depicting fantasy characters or objects, but may be implemented in a wide variety of alternative embodiments, including sporting cards, baseball, football and hockey cards, movie character cards, dinosaur cards, educational cards and the like. If desired, any number of other suitable collectible/tradable tokens or trinkets may also be provided with a similar RFID tag device in accordance with the teachings of the present invention as dictated by consumer tastes and market demand.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A dual-mode gaming system for playing an interactive game wherein a first game mode is carried out in a computer-generated play environment via one or more computer animations provided by a first gaming device and wherein a second game mode is carried out in a physical play environment via one or more physical toys associated with a second gaming device, said dual-mode gaming system comprising:

one or more gaming toys each representing a person, character or object in said game, each of said one or more gaming toys comprising a passive radio frequency identification (RFID) tag, each said RFID tag comprising: (i) a unique tag identification (ID) uniquely identifying said corresponding gaming toy in said game, and (ii) non-volatile, programmable memory configured to store a first selection of information comprising one or more changeable attributes of said corresponding person, character or object in said game;

a second gaming device configured to communicate with said first gaming device and to wirelessly power and communicate with said one or more gaming toys, said second gaming device comprising: i) an RFID reader configured to wirelessly power and communicate with each said RFID tag when in readable proximity therewith so as to ascertain a second selection of information, including at least said unique tag ID and said first selection of information, and to communicate said second selection of information to said first gaming device; and ii) an effects controller configured to control one or more associated sound or lighting effects in accordance with said game; and game software stored on a storage device and configured to be executed by said first and second gaming devices to carry out said game, said game software comprising program instructions that, upon execution: (i) cause said first gaming device to display in said computer-generated play environment a person, character or object having attributes corresponding to said first selection of information; and (ii) cause said second gaming device to modify said first selection of information based on a game participant's progress or performance in said game.

2. The dual-mode gaming system of claim 1 wherein each said RFID tag is configured to provide two-way wireless communications with said RFID reader over a limited communication range greater than 1 cm and less than 25 cm and wherein said two-way wireless communications are facilitated at least in part through inductive coupling.

3. The dual-mode gaming system of claim 1 wherein said first selection of information comprises one or more items of information selected from the following group: points accumulated in said game, tasks completed in said game, and levels earned in said game.

4. The dual-mode gaming system of claim 1 wherein said one or more gaming toys comprise a plurality of collectible tokens, trinkets or pendants each representing a different person, character or object in said game.

5. The dual-mode gaming system of claim 1 wherein at least one of said gaming toys comprises a toy wand configured to be held by said game participant and moved freely in the air and wherein said toy wand further comprises at least one sensor selected from the group consisting of: a tilt sensor, an accelerometer, and a gyroscope.

6. The dual-mode gaming system of claim 1 wherein said second gaming device further comprises a radio frequency (RF) transceiver configured to wirelessly communicate a third selection of information, including at least said unique tag ID, to a wireless-compatible device over a limited wireless communication range of greater than 10 feet and less than 100 feet.

7. The dual-mode gaming system of claim 1 wherein said first gaming device comprises a digital camera and wherein said game software comprises program instructions that, upon execution, cause said digital camera to selectively capture one or more digital images of said game participant playing said game.

8. A gaming system for playing an interactive game wherein a first portion of said game is carried out in a computer-generated play environment via one or more computer animations provided by a game control system comprising a host computer, home game console or hand-held gaming device, and wherein a second portion of said game is carried out in a physical play environment via one or more physical toys associated with an intermediary gaming device, said gaming system comprising:

one or more gaming toys each representing a different game character in said game, each of said one or more gaming toys comprising a passive radio frequency identification (RFID) tag, each said RFID tag comprising: (i) a unique tag identification (ID) uniquely identifying said corresponding gaming toy in said game, and (ii) non-volatile, programmable memory configured to store a first selection of information comprising one or more character attributes of said corresponding game character;

an intermediary gaming device configured to communicate with said game control system and to wirelessly power and communicate with said one or more gaming toys, said intermediary gaming device comprising: i) an RFID reader configured to wirelessly power and communicate with each said RFID tag when in readable proximity therewith so as to ascertain a second selection of information, including at least said unique tag ID and said first selection of information, and to communicate said second selection of information to said game control system; and ii) an effects controller configured to activate one or more associated sound or lighting effects when said one or more gaming toys is placed in readable proximity with said RFID reader; and game software stored in non-volatile memory and configured to be executed by said game control system and said intermediary gaming device to carry out said game, said game software comprising program instructions that, upon execution: (i) cause said game control system to display in said computer-generated play environment a game character having attributes corresponding to said first selection of information; and (ii) cause said intermediary gaming device to modify said first selection of information based at least in part on a game participant's progress or performance in said game.

9. The gaming system of claim 8 wherein each said RFID tag is configured to provide two-way wireless communications with said RFID reader over a limited communication range greater than 1 cm and less than 25 cm and wherein said two-way wireless communications are facilitated at least in part through inductive coupling.

10. The gaming system of claim 8 wherein said one or more gaming toys comprise a plurality of collectible tokens, trinkets or pendants each representing a different game character in said game.

11. The gaming system of claim 8 wherein at least one of said gaming toys comprises a toy wand configured to be held by said game participant and moved freely in the air and wherein said toy wand further comprises at least one sensor selected from the group consisting of: a tilt sensor, an accelerometer, and a gyroscope.

12. The gaming system of claim 8 wherein said effects controller is configured to produce a first sound or lighting effect when said first selection of information satisfies a first set of conditions and a second sound or lighting effect when said first selection of information satisfies a second set of conditions and wherein first sound or lighting effect is different than said second sound or lighting effect and wherein said first set of conditions is different than said second set of conditions.

13. The gaming system of claim 8 wherein said intermediary gaming device further comprises a radio frequency (RF) transceiver configured to wirelessly communicate a third selection of information, including at least said unique tag ID, to a wireless-compatible device over a limited wireless communication range of greater than 10 feet and less than 100 feet.

14. The gaming system of claim 8 wherein said game control system is configured to control a digital camera in said physical play environment and wherein said game software comprises program instructions that, upon execution, cause said digital camera to selectively capture one or more digital images of said game participant playing said game in said physical play environment.

15. A gaming system for playing an interactive game wherein a first portion of said game is carried out in a computer-generated play environment via one or more computer animations provided by a game control system comprising a host computer, home game console or hand-held gaming device, and wherein a second portion of said game is carried out in a physical play environment via one or more physical toys associated with an intermediary gaming device and via a digital camera controlled by said game control system, said gaming system comprising:

one or more gaming toys each representing a different character or object in said game, each of said one or more gaming toys comprising a passive radio frequency identification (RFID) tag, each said RFID tag comprising: (i) a unique identifier uniquely identifying said corresponding gaming toy in said game, and (ii) non-volatile, programmable memory configured to store a first selection of information comprising one or more attributes of said corresponding character or object in said game;

an intermediary gaming device configured to communicate with said game control system and to wirelessly power and communicate with said one or more gaming toys, said intermediary gaming device comprising an RFID reader configured to wirelessly power and communicate with each said RFID tag when in readable proximity therewith so as to ascertain a second selection of information, including at least said unique identifier and said first selection of information, and to communicate said second selection of information to said game control system; and game software stored on a data storage device readable by a computing device and configured to be executed by said game control system and said intermediary gaming device to carry out said game, said game software comprising program instructions that, upon execution: (i) cause said game control system to display in said computer-generated play environment a game character having attributes corresponding to said first selection of information; (ii) cause said intermediary gaming device to modify said first selection of information based at least in part on a game participant's progress or performance in said game; and (iii) cause said digital camera to selectively capture one or more digital images of said game participant playing said game in said physical play environment.

16. The gaming system of claim 15 wherein each said RFID tag is configured to provide two-way wireless communications with said RFID reader over a limited communication range greater than 1 cm and less than 25 cm and wherein said two-way wireless communications are facilitated at least in part through inductive coupling.

17. The gaming system of claim 15 wherein said one or more gaming toys comprise a plurality of collectible tokens, trinkets or pendants each representing a different character or object in said game.

18. The gaming system of claim 15 wherein said intermediary gaming device further comprises an effects controller configured to activate one or more associated sound or lighting effects when said one or more gaming toys is placed in readable proximity with said RFID reader.

19. The gaming system of claim 18 wherein said effects controller is configured to produce a first sound or lighting effect when said first selection of information satisfies a first set of conditions and a second sound or lighting effect when said first selection of information satisfies a second set of conditions and wherein first sound or lighting effect is different than said second sound or lighting effect and wherein said first set of conditions is different than said second set of conditions.

20. The gaming system of claim 15 wherein said intermediary gaming device further comprises a radio frequency (RF) transceiver configured to wirelessly communicate a third selection of information, including at least said unique identifier, to a wireless-compatible device over a limited wireless communication range of greater than 10 feet and less than 100 feet.

* * * * *